US010515046B2

(12) United States Patent
Fleming et al.

(10) Patent No.: US 10,515,046 B2
(45) Date of Patent: Dec. 24, 2019

(54) PROCESSORS, METHODS, AND SYSTEMS WITH A CONFIGURABLE SPATIAL ACCELERATOR

(71) Applicant: Intel Corporation, Santa Clara, CA (US)

(72) Inventors: Kermin Fleming, Hudson, MA (US); Kent D. Glossop, Merrimack, NH (US); Simon C. Steely, Jr., Hudson, NH (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/640,543

(22) Filed: Jul. 1, 2017

(65) Prior Publication Data

US 2019/0018815 A1 Jan. 17, 2019

(51) Int. Cl.

| | |
|---|---|
| ***G06F 13/42*** | (2006.01) |
| ***G06F 9/50*** | (2006.01) |
| ***G06F 15/82*** | (2006.01) |

(52) U.S. Cl.

CPC .......... *G06F 13/423* (2013.01); *G06F 9/5027* (2013.01); *G06F 15/825* (2013.01)

(58) Field of Classification Search

CPC combination set(s) only.
See application file for complete search history.

(56) References Cited

U.S. PATENT DOCUMENTS

| | | | |
|---|---|---|---|
| 672,177 | A | 4/1901 | Metcalf |
| 5,093,920 | A | 3/1992 | Agrawal et al. |
| 5,241,635 | A | 8/1993 | Papadopoulos et al. |
| 5,465,368 | A | 11/1995 | Davidson et al. |
| 5,560,032 | A | 9/1996 | Nguyen et al. |
| 5,574,944 | A | 11/1996 | Stager |
| 5,581,767 | A | 12/1996 | Katsuki et al. |

(Continued)

FOREIGN PATENT DOCUMENTS

| | | | |
|---|---|---|---|
| EP | 2660716 | A1 | 11/2013 |
| EP | 2854026 | A1 | 4/2015 |

(Continued)

OTHER PUBLICATIONS

Abandonment from U.S. Appl. No. 15/640,544, mailed Mar. 20, 2018, 2 pages.

(Continued)

*Primary Examiner* — Raymond N Phan
(74) *Attorney, Agent, or Firm* — Nicholson De Vos Webster & Elliott LLP

(57) ABSTRACT

Systems, methods, and apparatuses relating to a configurable spatial accelerator are described. In one embodiment, a processor includes a synchronizer circuit coupled between an interconnect network of a first tile and an interconnect network of a second tile and comprising storage to store data to be sent between the interconnect network of the first tile and the interconnect network of the second tile, the synchronizer circuit to convert the data from the storage between a first voltage or a first frequency of the first tile and a second voltage or a second frequency of the second tile to generate converted data, and send the converted data between the interconnect network of the first tile and the interconnect network of the second tile

24 Claims, 88 Drawing Sheets

(56) References Cited

U.S. PATENT DOCUMENTS

| | | | | |
|---|---|---|---|---|
| 5,655,096 | A | 8/1997 | Branigin | |
| 5,787,029 | A | 7/1998 | De Angel | |
| 5,790,821 | A | 8/1998 | Pflum | |
| 5,805,827 | A | 9/1998 | Chau et al. | |
| 5,930,484 | A | 7/1999 | Tran et al. | |
| 5,933,429 | A | 8/1999 | Bubenik et al. | |
| 6,020,139 | A | 2/2000 | Schwartz et al. | |
| 6,088,780 | A | 7/2000 | Yamada et al. | |
| 6,141,747 | A | 10/2000 | Witt | |
| 6,205,533 | B1 * | 3/2001 | Margolus | G06F 15/8023 712/13 |
| 6,314,503 | B1 | 11/2001 | D'Errico et al. | |
| 6,393,454 | B1 | 5/2002 | Chu | |
| 6,393,536 | B1 | 5/2002 | Hughes et al. | |
| 6,553,482 | B1 | 4/2003 | Witt | |
| 6,604,120 | B1 | 8/2003 | De Angel | |
| 6,615,333 | B1 | 9/2003 | Hoogerbrugge et al. | |
| 6,725,364 | B1 | 4/2004 | Crabill | |
| 7,000,072 | B1 | 2/2006 | Aisaka et al. | |
| 7,181,578 | B1 | 2/2007 | Guha et al. | |
| 7,257,665 | B2 | 8/2007 | Niell et al. | |
| 7,290,096 | B2 | 10/2007 | Jeter, Jr. et al. | |
| 7,379,067 | B2 | 5/2008 | Deering et al. | |
| 7,486,678 | B1 | 2/2009 | Devanagondi et al. | |
| 7,509,484 | B1 | 3/2009 | Golla et al. | |
| 7,546,331 | B2 | 6/2009 | Islam et al. | |
| 7,630,324 | B2 | 12/2009 | Li et al. | |
| 7,660,911 | B2 | 2/2010 | McDaniel | |
| 7,911,960 | B1 | 3/2011 | Aydemir et al. | |
| 7,936,753 | B1 | 5/2011 | Colloff et al. | |
| 7,987,479 | B1 | 7/2011 | Day | |
| 8,001,510 | B1 | 8/2011 | Miller et al. | |
| 8,010,766 | B2 | 8/2011 | Bhattacharjee et al. | |
| 8,055,880 | B2 | 11/2011 | Fujisawa et al. | |
| 8,156,284 | B2 | 4/2012 | Vorbach et al. | |
| 8,160,975 | B2 | 4/2012 | Tang et al. | |
| 8,225,073 | B2 | 7/2012 | Master et al. | |
| 8,332,597 | B1 | 12/2012 | Bennett | |
| 8,495,341 | B2 | 7/2013 | Busaba et al. | |
| 8,561,194 | B2 | 10/2013 | Lee | |
| 8,578,117 | B2 | 11/2013 | Burda et al. | |
| 8,619,800 | B1 | 12/2013 | Finney et al. | |
| 8,806,248 | B2 | 8/2014 | Allarey et al. | |
| 8,812,820 | B2 | 8/2014 | Vorbach et al. | |
| 8,935,515 | B2 | 1/2015 | Colavin et al. | |
| 8,966,457 | B2 | 2/2015 | Ebcioglu et al. | |
| 8,990,452 | B2 | 3/2015 | Branson et al. | |
| 9,026,769 | B1 | 5/2015 | Jamil et al. | |
| 9,104,474 | B2 | 8/2015 | Kaul et al. | |
| 9,135,057 | B2 | 9/2015 | Branson et al. | |
| 9,170,846 | B2 | 10/2015 | Delling et al. | |
| 9,213,571 | B2 | 12/2015 | Ristovski et al. | |
| 9,268,528 | B2 | 2/2016 | Tannenbaum et al. | |
| 9,429,983 | B1 | 8/2016 | Chall et al. | |
| 9,473,144 | B1 | 10/2016 | Thiagarajan et al. | |
| 9,594,521 | B2 | 3/2017 | Blagodurov et al. | |
| 9,658,676 | B1 | 5/2017 | Witek et al. | |
| 9,696,928 | B2 | 7/2017 | Cain, III et al. | |
| 9,760,291 | B2 | 9/2017 | Beale et al. | |
| 9,762,563 | B2 | 9/2017 | Davis et al. | |
| 9,847,783 | B1 | 12/2017 | Teh et al. | |
| 9,923,905 | B2 | 3/2018 | Amiri et al. | |
| 9,946,718 | B2 | 4/2018 | Bowman et al. | |
| 10,108,417 | B2 | 10/2018 | Krishna et al. | |
| 10,187,467 | B2 | 1/2019 | Nagai | |
| 10,331,583 | B2 | 6/2019 | Ahsan et al. | |
| 2002/0026493 | A1 | 2/2002 | Scardamalia et al. | |
| 2002/0090751 | A1 | 7/2002 | Grigg et al. | |
| 2002/0103943 | A1 | 8/2002 | Lo et al. | |
| 2002/0178285 | A1 | 11/2002 | Donaldson et al. | |
| 2002/0184291 | A1 | 12/2002 | Hogenauer | |
| 2003/0023830 | A1 * | 1/2003 | Hogenauer | G06F 9/30145 712/24 |
| 2003/0028750 | A1 | 2/2003 | Hogenauer | |
| 2003/0120802 | A1 | 6/2003 | Kohno | |
| 2003/0126233 | A1 | 7/2003 | Bryers et al. | |
| 2003/0163649 | A1 | 8/2003 | Kapur et al. | |
| 2003/0177320 | A1 | 9/2003 | Sah et al. | |
| 2003/0225814 | A1 | 12/2003 | Saito et al. | |
| 2003/0233643 | A1 | 12/2003 | Thompson et al. | |
| 2004/0001458 | A1 | 1/2004 | Dorenbosch et al. | |
| 2004/0022094 | A1 | 2/2004 | Radhakrishnan et al. | |
| 2004/0022107 | A1 | 2/2004 | Zaidi et al. | |
| 2004/0124877 | A1 | 7/2004 | Parkes | |
| 2004/0128401 | A1 | 7/2004 | Fallon et al. | |
| 2004/0263524 | A1 | 12/2004 | Lippincott | |
| 2005/0025120 | A1 | 2/2005 | O'Toole et al. | |
| 2005/0076187 | A1 | 4/2005 | Claydon | |
| 2005/0108776 | A1 | 5/2005 | Carver et al. | |
| 2005/0134308 | A1 * | 6/2005 | Okada | G06F 15/7867 326/39 |
| 2005/0138323 | A1 | 6/2005 | Snyder | |
| 2005/0166038 | A1 | 7/2005 | Wang et al. | |
| 2005/0172103 | A1 | 8/2005 | Inuo et al. | |
| 2006/0041872 | A1 | 2/2006 | Poznanovic et al. | |
| 2006/0101237 | A1 | 5/2006 | Mohl et al. | |
| 2006/0130030 | A1 | 6/2006 | Kwiat et al. | |
| 2006/0179255 | A1 | 8/2006 | Yamazaki | |
| 2006/0179429 | A1 | 8/2006 | Eggers et al. | |
| 2006/0200647 | A1 | 9/2006 | Cohen | |
| 2006/0236008 | A1 | 10/2006 | Asano et al. | |
| 2007/0011436 | A1 | 1/2007 | Bittner, Jr. et al. | |
| 2007/0033369 | A1 | 2/2007 | Kasama et al. | |
| 2007/0118332 | A1 | 5/2007 | Meyers et al. | |
| 2007/0143546 | A1 | 6/2007 | Narad | |
| 2007/0180315 | A1 | 8/2007 | Aizawa et al. | |
| 2007/0203967 | A1 | 8/2007 | Dockser et al. | |
| 2007/0204137 | A1 | 8/2007 | Tran | |
| 2007/0226458 | A1 | 9/2007 | Stuttard et al. | |
| 2007/0266223 | A1 | 11/2007 | Nguyen | |
| 2007/0276976 | A1 | 11/2007 | Gower et al. | |
| 2007/0299980 | A1 | 12/2007 | Amini et al. | |
| 2008/0005392 | A1 | 1/2008 | Amini et al. | |
| 2008/0072113 | A1 | 3/2008 | Tsang et al. | |
| 2008/0082794 | A1 | 4/2008 | Yu et al. | |
| 2008/0133889 | A1 | 6/2008 | Glew | |
| 2008/0133895 | A1 | 6/2008 | Sivtsov et al. | |
| 2008/0184255 | A1 | 7/2008 | Watanabe et al. | |
| 2008/0218203 | A1 * | 9/2008 | Arriens | H03K 19/17736 326/38 |
| 2008/0263330 | A1 | 10/2008 | May et al. | |
| 2008/0270689 | A1 | 10/2008 | Gotoh | |
| 2008/0307258 | A1 | 12/2008 | Challenger et al. | |
| 2009/0013329 | A1 | 1/2009 | May et al. | |
| 2009/0037697 | A1 | 2/2009 | Ramani et al. | |
| 2009/0063665 | A1 | 3/2009 | Bagepalli et al. | |
| 2009/0113169 | A1 | 4/2009 | Yang et al. | |
| 2009/0119456 | A1 | 5/2009 | Park, II et al. | |
| 2009/0175444 | A1 | 7/2009 | Douglis et al. | |
| 2009/0182993 | A1 | 7/2009 | Fant | |
| 2009/0300324 | A1 | 12/2009 | Inuo | |
| 2009/0300325 | A1 | 12/2009 | Paver et al. | |
| 2009/0309884 | A1 | 12/2009 | Lippincott et al. | |
| 2009/0328048 | A1 | 12/2009 | Khan et al. | |
| 2010/0017761 | A1 | 1/2010 | Higuchi et al. | |
| 2010/0115168 | A1 | 5/2010 | Bekooij | |
| 2010/0180105 | A1 | 7/2010 | Asnaashari | |
| 2010/0191911 | A1 | 7/2010 | Heddes et al. | |
| 2010/0217915 | A1 | 8/2010 | O'Connor et al. | |
| 2010/0228885 | A1 | 9/2010 | McDaniel et al. | |
| 2010/0254262 | A1 | 10/2010 | Kantawala et al. | |
| 2010/0262721 | A1 | 10/2010 | Asnaashari et al. | |
| 2010/0302946 | A1 | 12/2010 | Yang et al. | |
| 2011/0004742 | A1 | 1/2011 | Hassan | |
| 2011/0008300 | A1 | 1/2011 | Wouters et al. | |
| 2011/0040822 | A1 | 2/2011 | Eichenberger et al. | |
| 2011/0083000 | A1 | 4/2011 | Rhoades et al. | |
| 2011/0099295 | A1 | 4/2011 | Wegener | |
| 2011/0107337 | A1 | 5/2011 | Cambonie et al. | |
| 2011/0133825 | A1 | 6/2011 | Jones et al. | |
| 2011/0202747 | A1 | 8/2011 | Busaba et al. | |
| 2011/0302358 | A1 | 12/2011 | Yu et al. | |
| 2011/0314238 | A1 | 12/2011 | Finkler et al. | |
| 2011/0320724 | A1 | 12/2011 | Mejdrich et al. | |

(56) References Cited

U.S. PATENT DOCUMENTS

| | | | |
|---|---|---|---|
| 2012/0017066 | A1 | 1/2012 | Vorbach et al. |
| 2012/0066483 | A1 | 3/2012 | Boury et al. |
| 2012/0079168 | A1 | 3/2012 | Chou et al. |
| 2012/0089812 | A1 | 4/2012 | Smith |
| 2012/0124117 | A1 | 5/2012 | Yu et al. |
| 2012/0126851 | A1 | 5/2012 | Kelem et al. |
| 2012/0128107 | A1 | 5/2012 | Oren |
| 2012/0144126 | A1 | 6/2012 | Nimmala et al. |
| 2012/0174118 | A1 | 7/2012 | Watanabe et al. |
| 2012/0239853 | A1 | 9/2012 | Moshayedi |
| 2012/0260239 | A1 | 10/2012 | Martinez et al. |
| 2012/0278543 | A1 | 11/2012 | Yu et al. |
| 2012/0278587 | A1 | 11/2012 | Caufield et al. |
| 2012/0303932 | A1 | 11/2012 | Farabet et al. |
| 2012/0303933 | A1 | 11/2012 | Manet et al. |
| 2012/0317388 | A1 | 12/2012 | Driever et al. |
| 2012/0324180 | A1 | 12/2012 | Asnaashari et al. |
| 2012/0330701 | A1 | 12/2012 | Hyder et al. |
| 2013/0024875 | A1 | 1/2013 | Wang et al. |
| 2013/0036287 | A1 | 2/2013 | Chu et al. |
| 2013/0067138 | A1 | 3/2013 | Schuette et al. |
| 2013/0080652 | A1 | 3/2013 | Cradick et al. |
| 2013/0080993 | A1 | 3/2013 | Stravers et al. |
| 2013/0081042 | A1 | 3/2013 | Branson et al. |
| 2013/0125127 | A1 | 5/2013 | Mital et al. |
| 2013/0145203 | A1 | 6/2013 | Fawcett et al. |
| 2013/0147515 | A1 | 6/2013 | Wasson et al. |
| 2013/0151919 | A1 | 6/2013 | Huynh |
| 2013/0166879 | A1 | 6/2013 | Sun et al. |
| 2013/0315211 | A1 | 11/2013 | Balan et al. |
| 2014/0032860 | A1 | 1/2014 | Yamada et al. |
| 2014/0098890 | A1 | 4/2014 | Sermadevi et al. |
| 2014/0115300 | A1 | 4/2014 | Bodine |
| 2014/0188968 | A1 | 7/2014 | Kaul et al. |
| 2014/0215189 | A1 | 7/2014 | Airaud et al. |
| 2014/0281409 | A1 | 9/2014 | Abdallah et al. |
| 2014/0380024 | A1 | 12/2014 | Spadini et al. |
| 2015/0007182 | A1 | 1/2015 | Rossbach et al. |
| 2015/0026434 | A1 | 1/2015 | Basant et al. |
| 2015/0033001 | A1 | 1/2015 | Ivanov |
| 2015/0067305 | A1 | 3/2015 | Olson et al. |
| 2015/0067368 | A1 | 3/2015 | Henry et al. |
| 2015/0082011 | A1 | 3/2015 | Mellinger et al. |
| 2015/0089162 | A1 | 3/2015 | Ahsan et al. |
| 2015/0089186 | A1 | 3/2015 | Kim et al. |
| 2015/0100757 | A1 | 4/2015 | Burger et al. |
| 2015/0106596 | A1* | 4/2015 | Vorbach ................ G06F 9/3001 712/221 |
| 2015/0113184 | A1 | 4/2015 | Stanford-Jason et al. |
| 2015/0188847 | A1 | 7/2015 | Chopra et al. |
| 2015/0261528 | A1 | 9/2015 | Ho et al. |
| 2015/0317134 | A1 | 11/2015 | Kim et al. |
| 2016/0077568 | A1 | 3/2016 | Kandula et al. |
| 2016/0098279 | A1 | 4/2016 | Glew |
| 2016/0098420 | A1 | 4/2016 | Dickie et al. |
| 2016/0239265 | A1 | 8/2016 | Duong et al. |
| 2017/0031866 | A1 | 2/2017 | Nowatzki et al. |
| 2017/0083313 | A1 | 3/2017 | Sankaralingam et al. |
| 2017/0092371 | A1 | 3/2017 | Harari |
| 2017/0163543 | A1 | 6/2017 | Wang et al. |
| 2017/0255414 | A1 | 9/2017 | Gerhart et al. |
| 2017/0262383 | A1 | 9/2017 | Lee et al. |
| 2017/0286169 | A1 | 10/2017 | Ravindran et al. |
| 2017/0293766 | A1 | 10/2017 | Schnjakin et al. |
| 2017/0315815 | A1 | 11/2017 | Smith et al. |
| 2017/0315978 | A1 | 11/2017 | Boucher et al. |
| 2017/0371836 | A1 | 12/2017 | Langhammer |
| 2018/0081806 | A1 | 3/2018 | Kothinti et al. |
| 2018/0081834 | A1 | 3/2018 | Wang et al. |
| 2018/0088647 | A1* | 3/2018 | Suryanarayanan ..... G06F 1/266 |
| 2018/0095728 | A1 | 4/2018 | Hasenplaugh et al. |
| 2018/0101502 | A1 | 4/2018 | Nassif et al. |
| 2018/0113797 | A1 | 4/2018 | Breslow et al. |
| 2018/0188983 | A1 | 7/2018 | Fleming, Jr. et al. |
| 2018/0188997 | A1 | 7/2018 | Fleming, Jr. et al. |
| 2018/0189063 | A1 | 7/2018 | Fleming et al. |
| 2018/0189231 | A1 | 7/2018 | Fleming, Jr. et al. |
| 2018/0189239 | A1 | 7/2018 | Nurvitadhi et al. |
| 2018/0189675 | A1 | 7/2018 | Nurvitadhi et al. |
| 2018/0218767 | A1 | 8/2018 | Wolff |
| 2018/0248994 | A1 | 8/2018 | Lee et al. |
| 2018/0285385 | A1 | 10/2018 | West et al. |
| 2018/0293162 | A1 | 10/2018 | Tsai et al. |
| 2018/0300181 | A1 | 10/2018 | Hetzel et al. |
| 2018/0316760 | A1 | 11/2018 | Chernin et al. |
| 2018/0332342 | A1 | 11/2018 | Wu et al. |
| 2018/0365181 | A1 | 12/2018 | Cottam et al. |
| 2018/0373509 | A1 | 12/2018 | Zhang et al. |
| 2019/0004878 | A1 | 1/2019 | Adler et al. |
| 2019/0004945 | A1 | 1/2019 | Fleming et al. |
| 2019/0004955 | A1 | 1/2019 | Adler et al. |
| 2019/0004994 | A1 | 1/2019 | Fleming et al. |
| 2019/0005161 | A1 | 1/2019 | Fleming et al. |
| 2019/0007332 | A1 | 1/2019 | Fleming et al. |
| 2019/0042217 | A1 | 2/2019 | Glossop et al. |
| 2019/0042218 | A1 | 2/2019 | Zhang |
| 2019/0042513 | A1 | 2/2019 | Fleming, Jr. et al. |
| 2019/0095369 | A1 | 3/2019 | Fleming et al. |
| 2019/0095383 | A1 | 3/2019 | Fleming et al. |
| 2019/0101952 | A1 | 4/2019 | Diamond et al. |
| 2019/0102179 | A1 | 4/2019 | Fleming et al. |
| 2019/0102338 | A1 | 4/2019 | Tang et al. |
| 2019/0129720 | A1 | 5/2019 | Ivanov |
| 2019/0205263 | A1 | 7/2019 | Fleming et al. |
| 2019/0205269 | A1 | 7/2019 | Fleming, Jr. et al. |
| 2019/0205284 | A1 | 7/2019 | Fleming et al. |
| 2019/0303153 | A1 | 10/2019 | Halpern |
| 2019/0303168 | A1 | 10/2019 | Fleming |
| 2019/0303263 | A1 | 10/2019 | Fleming, Jr. et al. |
| 2019/0303297 | A1 | 10/2019 | Fleming |
| 2019/0303312 | A1 | 10/2019 | Ahsan |

FOREIGN PATENT DOCUMENTS

| | | | |
|---|---|---|---|
| RU | 2374684 | C1 | 11/2009 |
| WO | 2007031696 | A1 | 3/2007 |
| WO | 2014035449 | A1 | 3/2014 |
| WO | 2015044696 | A2 | 4/2015 |

OTHER PUBLICATIONS

Advisory Action from U.S. Appl. No. 14/037,468, dated Aug. 11, 2017, 3 pages.

Arvind., et al., "Executing a Program on the MIT Tagged-Token Dataflow Architecture," Mar. 1990, IEEE Transactions on Computers, vol. 39 (3), pp. 300-318.

Asanovic K., et al., "The Landscape of Parallel Computing Research: A View from Berkeley," Dec. 18, 2006, Electrical Engineering and Computer Sciences University of California at Berkeley, Technical Report No. UCB/EECS-2006-183, http://www.eecs.berkeley.edu/Pubs/TechRpts/2006/EECS-2006-183.html, 56 pages.

Ball T., "What's in a Region? or Computing Control Dependence Regions in Near-Linear Time for Reducible Control Flow," Dec. 1993, ACM Letters on Programming Languages and Systems, 2(1-4):1-16, 24 pages.

Bluespec, "Bluespec System Verilog Reference Guide," Jun. 16, 2010, Bluespec, Inc, 453 pages.

Bohm I., "Configurable Flow Accelerators," Mar. 3, 2016, XP055475839. retrieved from http://groups.inf.ed.ac.uk/pasta/rareas_cfa.html on Oct. 25, 2018, 3 pages.

Burger D., et al., "Scaling to the End of Silicon with EDGE Architectures," Jul. 12, 2004, vol. 37 (7), pp. 44-55.

Carloni L.P., et al., "The Theory of Latency Insensitive Design," Sep. 2001, IEEE Transactions on Computer-Aided Design of Integrated Circuits and Systems, vol. 20 (9), 18 pages.

Chandy K.M., et al., "Parallel Program Design: A Foundation," Addison-Wesley Publishing Company, Aug. 1988, 552 pages.

Compton K., et al., "Reconfigurable Computing: A Survey of Systems and Software," ACM Computing Surveys, Jun. 2002, vol. 34 (2), pp. 171-210.

(56) References Cited

OTHER PUBLICATIONS

Cong J., et al., "Supporting Address Translation for Accelerator-Centric Architectures," Feb. 2017, IEEE International Symposium on High Performance Computer Architecture (HPCA), 12 pages.
"Coral Collaboration: Oak Ridge, Argonne, Livermore," Benchmark codes, downloaded from https://asc.llnl.gov/CORAL-benchmarks/ on Nov. 16, 2018, 6 pages.
Dally W.J., et al., "Principles and Practices of Interconnection Networks," Morgan Kaufmann, 2003, 584 pages.
Dennis J.B., et al., "A Preliminary Architecture for a Basic Data-Flow Processor," 1975, In Proceedings of the 2nd Annual Symposium on Computer Architecture, pp. 125-131.
Dijkstra E.W., "Guarded Commands, Nondeterminacy and Formal Derivation of Programs," Aug. 1975, Communications of the ACM, vol. 18 (8), pp. 453-457.
Eisenhardt S., et al., "Optimizing Partial Reconfiguration of Multi-Context Architectures," Dec. 2008, 2008 International Conference on Reconfigurable Computing and FPGAs, 6 pages.
Emer J., et al., "Asim: A Performance Model Framework," Feb. 2002, Computer, vol. 35 (2), pp. 68-76.
Emer J.S., et al., "A Characterization of Processor Performance in the VAX-11/780," In Proceedings of the 11th Annual International Symposium on Computer Architecture, Jun. 1984, vol. 12 (3), pp. 274-283.
Extended European Search Report for Application No. 17207172.2, dated Oct. 1, 2018, 14 pages.
Extended European Search Report for Application No. 17210484.6, dated May 29, 2018, 8 pages.
Final Office Action from U.S. Appl. No. 13/994,582, dated Oct. 3, 2017, 11 pages.
Final Office Action from U.S. Appl. No. 14/037,468, dated Jun. 1, 2017, 18 pages.
Final Office Action from U.S. Appl. No. 14/037,468, dated Jun. 15, 2018, 7 pages.
Final Office Action from U.S. Appl. No. 14/037,468, dated May 16, 2016, 24 pages.
Final Office Action from U.S. Appl. No. 14/037,468, dated Oct. 5, 2016, 17 pages.
Fleming K., et al., "Leveraging Latency-Insensitivity to Ease Multiple FPGA Design," In Proceedings of the ACM/SIGDA International Symposium on Field Programmable Gate Arrays, FPGA'12, Feb. 22-24, 2012, pp. 175-184.
Fleming K.E., et al., "Leveraging Latency-Insensitive Channels to Achieve Scalable Reconfigurable Computation," Feb. 2013, 197 pages.
Fleming et al., U.S. Appl. No. 15/396,038, titled "Memory Ordering in Acceleration Hardware," 81 pages, filed Dec. 30, 2016.
Fleming et al., U.S. Appl. No. 15/396,049, titled "Runtime Address Disambiguation in Acceleration Hardware," filed Dec. 30, 2016, 97 pages.
Govindaraju V., et al., "Dynamically Specialized Datapaths for Energy Efficient Computing," 2011, In Proceedings of the 17th International Conference on High Performance Computer Architecture, 12 pages.
Hauser J.R., et al., "Garp: a MIPS processor with a Reconfigurable Coprocessor," Proceedings of the 5th Annual IEEE Symposium on Field-Programmable Custom Computing Machines, 1997, 10 pages.
Hoogerbrugge J., et al., "Transport-Triggering vs. Operation-Triggering," 1994, In Compiler Construction, Lecture Notes in Computer Science, vol. 786, Springer, pp. 435-449.
Ibrahim Eng., Walaa Abd el Aziz, "Binary Floating Point Fused Multiply Add Unit", Faculty Of Engineering, Cairo University Giza, Egypt, 2012, 100 Pages.
International Preliminary Report on Patentability for Application No. PCT/RU2011/001049, dated Jul. 10, 2014, 6 pages.
International Search Report and Written Opinion for Application No. PCT/RU2011/001049, dated Sep. 20, 2012, 6 pages.
International Search Report and Written Opinion received for PCT Patent Application No. PCT/US2017/050663, dated Dec. 28, 2017, 14 pages.
Kalte H., et al., "Context Saving and Restoring for Multitasking in Reconfigurable Systems," International Conference on Field Programmable Logic and Applications, Aug. 2005, pp. 223-228.
Kim et al., "Energy-Efficient and High Performance CGRA-based Multi-Core Architecture," Journal of Semiconductor Technology and Science, vol. 14 (3), Jun. 2014, 16 pages.
King M., et al., "Automatic Generation of Hardware/Software Interfaces," Proceedings of the 17th International Conference on Architectural Support for Programming Languages and Operating Systems, ASPLOS'12, Mar. 2012, 12 pages.
Knuth D.E., et al., "Fast Pattern Matching In Strings," Jun. 1977, SIAM Journal of Computing, vol. 6(2), pp. 323-350.
Lee T., et al., "Hardware Context-Switch Methodology for Dynamically Partially Reconfigurable Systems," Journal of Information Science and Engineering, vol. 26, Jul. 2010, pp. 1289-1305.
Li S., et al., "Case Study: Computing Black-Scholes with Intel® Advanced Vector Extensions," Sep. 6, 2012, 20 pages.
Marquardt A., et al., "Speed and Area Trade-OFFS in Cluster-Based FPGA Architectures," Feb. 2000, IEEE Transactions on Very Large Scale Integration (VLSI) Systems, vol. 8 (1), 10 pages.
Matsen F.A., et al., "The CMU warp processor," In Supercomputers: Algorithms, Architectures, and Scientific Computation, 1986, pp. 235-247.
McCalpin J.D., "Memory Bandwidth and Machine Balance in Current High Performance Computers," IEEE Computer Society Technical Committee on Computer Architecture (TCCA) Newsletter, Dec. 1995, 7 pages.
McCalpin J.D., "STREAM: Sustainable memory bandwidth in high performance computers," 2016, 4 pages.
Mei B., et al., "ADRES: An Architecture with Tightly Coupled VLIW Processor and Coarse-Grained Reconfigurable Matrix," 2003, In Proceedings of International Conference on Field-Programmable Logic and Applications, 10 pages.
Merrill D., et al., "Revisiting sorting for GPGPU stream architectures," In Proceedings of the 19th International Conference on Parallel Architectures and Compilation Techniques (PACT'10), Feb. 2010, 17 pages.
Mirsky E., at al., "Matrix: A Reconfigurable Computing Architecture with Configurable Instruction Distribution and Deployable Resources," 1996, In Proceedings of the IEEE Symposium on FPGAs for Custom Computing Machines, pp. 157-166.
Natalie E.J., et al., "On-Chip Networks," Synthesis Lectures on Computer Architecture, Morgan and Claypool Publishers, 2009, 148 pages.
Non-Final Office Action from U.S. Appl. No. 14/037,468, dated Oct. 19, 2017, 19 pages.
Non-Final Office Action from U.S. Appl. No. 15/396,402, dated Nov. 1, 2018, 22 pages.
Non-Final Office Action from U.S. Appl. No. 15/640,540, dated Oct. 26, 2018, 8 pages.
Non-Final Office Action from U.S. Appl. No. 15/396,038, dated Oct. 5, 2018, 38 pages.
Non-Final Office Action from U.S. Appl. No. 15/396,049, dated Jun. 15, 2018, 33 pages.
Non-Final Office Action from U.S. Appl. No. 15/859,473, dated Oct. 15, 2018, 10 pages.
Non-Final Office Action from U.S. Appl. No. 13/994,582, dated Mar. 23, 2017, 9 pages.
Non-Final Office Action from U.S. Appl. No. 13/994,582, dated Feb. 37, 2018, 12 pages.
Non-Final Office Action from U.S. Appl. No. 14/037,468, dated Aug. 27, 2015, 10 pages.
Non-Final Office Action from U.S. Appl. No. 14/037,468, dated Dec. 2, 2016, 16 pages.
Non-Final Office Action from U.S. Appl. No. 15/283295, dated Apr. 30, 2018, 18 pages.
Non-Final Office Action from U.S. Appl. No. 15/396,395, dated Jul. 20, 2018, 18 pages.
Non-Final Office Action from U.S. Appl. No. 15/640,533, dated Apr. 19, 2018, 8 pages.
Non-Final Office Action from U.S. Appl. No. 15/640,534, dated Apr. 26, 2018, 8 pages.

(56) References Cited

OTHER PUBLICATIONS

Non-Final Office Action from U.S. Appl. No. 15/640,535, dated May 15, 2018, 13 pages.
Non-Final Office Action from U.S. Appl. No. 15/721,802, dated Mar. 38, 2018, 8 pages.
Non-Final Office Action from U.S. Appl. No. 15/721,809, dated Jun. 14, 2018, 12 pages.
Notice of Allowance from U.S. Appl. No. 15/721,802, dated Nov. 30, 2018, 30 pages.
Notice of Allowance from U.S. Appl. No. 15/640,533, dated Oct. 10, 2018, 8 pages.
Notice of Allowance from U.S. Appl. No. 15/640,535, dated Oct. 9, 2018, 7 pages.
Notice of Allowance from U.S. Appl. No. 15/640,538, dated Oct. 17, 2018, 10 pages.
Notice of Allowance from U.S. Appl. No. 13/994,582, dated Aug. 7, 2018, 8 pages.
Notice of Allowance from U.S. Appl. No. 14/037,468, dated Aug. 28, 2018, 9 pages.
Notice of Allowance from U.S. Appl. No. 15/640,534, dated Sep. 12, 2018, 7 pages.
Notice of Allowance from U.S. Appl. No. 15/721,802, dated Jul. 31, 2018, 6 pages.
Panesar G., et al., "Deterministic Parallel Processing," International Journal of Parallel Programming, Aug. 2006, vol. 34 (4), pp. 323-341.
Parashar A., et al., "Efficient Spatial Processing Element Control via Triggered Instructions," IEEE Micro, vol. 34 (3), Mar. 10, 2014, pp. 120-137.
Parashar et al., "LEAP: A Virtual Platform Architecture for FPGAs," Intel Corporation, 2010, 6 pages.
Pellauer M., et al., "Efficient Control and Communication Paradigms for Coarse-Grained Spatial Architectures," Sep. 2015, ACM Transactions on Computer Systems, vol. 33 (3), Article 10, 32 pages.
Pellauer M., et al., "Soft Connections: Addressing the Hardware-Design Modularity Problem," 2009, In Proceedings of the 46th ACM/IEEE Design Automation Conference (DAC'09), pp. 276-281.
Raaijmakers S., "Run-Time Partial Reconfiguration on the Virtex-11 Pro," 2007, 69 pages.
Schmit H., et al., "PipeRench: A Virtualized Programmable Datapath in 0.18 Micron Technology," 2002, IEEE 2002 Custom Integrated Circuits Conference, pp. 63-66.
Shin T., et al., "Minimizing Buffer Requirements for Throughput Constrained Parallel Execution of Synchronous Dataflow Graph," ASPDAC '11 Proceedings of the 16th Asia and South Pacific Design Automation Conference , Jan. 2011, 6 pages.
Smith A., et al., "Dataflow Predication," 2006, In Proceedings of the 39th Annual IEEE/ACM International Symposium on Microarchitecture, 12 pages.
Swanson S., et al., "The WaveScalar Architecture," May 2007, ACM Transactions on Computer Systems, vol. 25 (2), Article No. 4, 35 pages.
Taylor M.B., et al., "The Raw Microprocessor: A Computational Fabric for Software Circuits and General-Purpose Programs," 2002, IEEE Micro, vol. 22 (2), pp. 25-35.
Truong D.N., et al., "A 167-Processor Computational Platform in 65 nm CMOS," IEEE Journal of Solid-State Circuits, Apr. 2009, vol. 44 (4), pp. 1130-1144.
Van de Geijn R.A., et al., "SUMMA: Scalable Universal Matrix Multiplication Algorithm," 1997, 19 pages.
Vijayaraghavan M., et al., "Bounded Dataflow Networks and Latency-Insensitive Circuits," In Proceedings of the 7th IEEE/ACM International Conference on Formal Methods and Models for Codesign (MEMOCODE'09), Jul. 13-15, 2009, pp. 171-180.
Wikipedia, The Free Encyclopedia, "Priority encoder," https://en.wikipedia.org/w/index.php?Title=Priority_encoder&oldid=746908667, revised Oct. 30, 2016, 2 pages.
Wikipedia, The Free Encyclopedia, "Truth table," Logical Implication Table, https://enwikipedia.org/wiki/Truth_table#Logical_implication, revised Nov. 18, 2016, 1 page.
Wikipedia, "TRIPS Architecture," retrieved from https://en.wikipedia.org/wiki/TRIPS_architecture on Oct. 14, 2018, 4 pages.
Williston, Roving Reporter, Intel® Embedded Alliance, "Roving Reporter: FPGA + Intel® Atom TM = Configurable Processor," Dec. 2010, 5 pages.
Ye Z.A., et al., "CHIMAERA: A High-Performance Architecture with a Tightly-Coupled Reconfigurable Functional Unit," Proceedings of the 27th International Symposium on Computer Architecture (ISCA'00), 2000, 11 pages.
Yu Z., et al., "An Asynchronous Array of Simple Processors for DSP Applications," IEEE International Solid-State Circuits Conference, ISSCC'06, Feb. 8, 2006, 10 pages.
Corrected Notice of Allowance from U.S. Appl. No. 14/037,468, dated May 29, 2019, 12 pages.
Corrected Notice of Allowance from U.S. Appl. No. 15/396,395, dated Jun. 7, 2019, 8 pages.
Corrected Notice of Allowance from U.S. Appl. No. 15/721,802, dated Jun. 12, 2019, 11 pages.
International Search Report and Written Opinion for Application No. PCT/US2019/020270, dated Jun. 14, 2019, 11 pages.
International Search Report and Written Opinion for Application No. PCT/US2019/019965, dated Jun. 13, 2019, 9 pages.
International Search Report and Written Opinion for Application No. PCT/US2019/020287, dated Jun. 12, 2019, 9 pages.
Notice of Allowance from U.S. Appl. No. 15/640,534, dated May 31, 2019, 9 pages.
Notice of Allowance from U.S. Appl. No. 15/640,533, dated May 22, 2019, 19 pages.
Notice of Allowance from U.S. Appl. No. 15/640,535, dated May 24, 2019, 19 pages.
Notice of Allowance from U.S. Appl. No. 15/721,809, dated Jun. 6, 2019, 32 pages.
Notice of Allowance from U.S. Appl. No. 15/859,454, dated Jun. 7, 2019, 55 pages.
Notice of Allowance from U.S. Appl. No. 16/024,801, dated Jun. 5, 2019, 64 pages.
International Preliminary Report on Patentability for Application No. PCT/US2017/055849, dated Apr. 25, 2019, 6 pages.
International Search Report and Written Opinion for Application No. PCT/US2017/055849, dated Dec. 26, 2017, 8 pages.
Notice of Allowance from U.S. Appl. No. 15/396,395, dated May 15, 2019, 23 pages.
Canis A., et al., "LegUp: An Open-Source High-Level Synthesis Tool for FPGA-Based Processor/Accelerator Systems," ACM Transactions on Embedded Computing Systems, vol. 1(1), Article 1, Jul. 2012, 25 pages.
Corrected Notice of Allowance from U.S. Appl. No. 14/037,468, dated Apr. 1, 2019, 10 pages.
Corrected Notice of Allowance from U.S. Appl. No. 15/640,534, dated Apr. 26, 2019, 21 pages.
Govindaraju et al.,"DySER: Unifying Functionality and Parallelism Specialization for Energy-Efficient Computing," Published by the IEEE Computer Society, Sep./Oct. 2012, pp. 38-51.
International Preliminary Report on Patentability for Application No. PCT/US2017/050663, dated Apr. 11, 2019, 11 pages.
Non-Final Office Action from U.S. Appl. No. 15/640,541, dated Apr. 12, 2019, 61 pages.
Non-Final Office Action from U.S. Appl. No. 15/640,542, dated Apr. 2, 2019, 59 pages.
Notice of Allowance from U.S. Appl. No. 15/283,295, dated Apr. 10, 2019, 49 pages.
Notice of Allowance from U.S. Appl. No. 15/640,534, dated Apr. 2, 2019, 9 pages.
Notice of Allowance from U.S. Appl. No. 15/855,964, dated Apr. 24, 2019, 15 pages.
Smith A., et al., "Compiling for EDGE Architectures," Appears in the Proceedings of the 4th International Symposium on code Generation and Optimization, 2006, 11 pages.

(56) References Cited

OTHER PUBLICATIONS

"The LLVM Compiler Infrastructure," retrieved from http://www.llvm.org/, on May 1, 2018, maintained by the llvm-admin team, 4 pages.
"Benchmarking DNN Processors," Nov. 2016, 2 pages.
Chen Y., et al., "Eyeriss: A Spacial Architecture for Energy-Efficient Dataflow for Convolutional Neural Networks," Jun. 2016, 53 pages.
Chen Y., et al., "Eyeriss: A Spacial Architecture for Energy-Efficient Dataflow for Convolutional Neural Networks," International Symposium on Computer Architecture (ISCA), Jun. 2016, pp. 367-379.
Chen Y., et al., "Eyeriss: An Energy-Efficient Reconfigurable Accelerator for Deep Convolutional Neural Networks," IEEE International Conference on Solid-State Circuits (ISSCC), Feb. 2016, pp. 262-264.
Chen Y., et al., "Eyeriss: An Energy-Efficient Reconfigurable Accelerator For Deep Convolutional Neural Networks," IEEE International Solid-State Circuits Conference, ISSCC, 2016, 9 pages.
Chen Y., et al., "Eyeriss: An Energy-Efficient Reconfigurable Accelerator For Deep Convolutional Neural Networks," IEEE International Solid-State Circuits Conference, ISSCC 2016, Digest of Technical Papers, retrieved from eyeriss-isscc2016, spreadsheet, http://eyeriss.mit.edu/benchmarking.html, 2016, 7 pages.
Chen Y., et al., "Eyeriss v2: A Flexible and High-Performance Accelerator for Emerging Deep Neural Networks," Jul. 2018, 14 pages.
Chen Y., et al., "Understanding the Limitations of Existing Energy-Efficient Design Approaches for Deep Neural Networks," Feb. 2018, 3 pages.
Chen Y., et al., "Using Dataflow to Optimize Energy Efficiency of Deep Neural Network Accelerators," IEEE Micro's Top Picks from the Computer Architecture Conferences, May/Jun. 2017, pp. 12-21.
Chen Y.H., et al., "Eyeriss: An Energy-Efficient Reconfigurable Accelerator for Deep Convolutional Neural Networks," 2016 IEEE International Solid-State Circuits Conference (ISSCC), Jan. 2016, 12 pages.
Corrected Notice of Allowance from U.S. Appl. No. 15/640,535, dated Feb. 13, 2019, 7 pages.
Corrected Notice of Allowance from U.S. Appl. No. 15/721,802, dated Dec. 18, 2018, 8 pages.
Emer J., et al., "Hardware Architectures for Deep Neural Networks at CICS/MTL Tutorial," Mar. 27, 2017, 258 pages.
Emer J., et al., "Hardware Architectures for Deep Neural Networks at ISCA Tutorial," Jun. 24, 2017, 290 pages.
Emer J., et al., "Hardware Architectures for Deep Neural Networks at MICRO-49 Tutorial," Oct. 16, 2016, 300 pages.
Emer J., et al., "Tutorial on Hardware Architectures for Deep Neural Networks," Nov. 2016, 8 pages.
Final Office Action from U.S. Appl. No. 15/396,038, dated Mar. 11, 2019, 36 pages.
Final Office Action from U.S. Appl. No. 15/396,049, dated Dec. 27, 2018, 38 pages.
Final Office Action from U.S. Appl. No. 15/721,809, dated Dec. 26, 2018, 46 pages.
Final Office Action from U.S. Appl. No. 15/859,473, dated Feb. 26, 2019, 13 pages.
"Full Day Tutorial Held at MICRO-49," Oct. 15-19, 2016, retrieved from https://www.microarch.org/micro49/ on Feb. 14, 2019, 2 pages.
Han S., et al., "Deep Compression: Compressing Deep Neural Networks with Pruning, Trained Quantization and Huffman Coding," ICLR, Feb. 2016, 14 pages.
Han S., et al., "EIE: Efficient Inference Engine On Compressed Deep Neural Network," 43rd ACM/IEEE Annual International Symposium On Computer Architecture, ISCA 2016, Seoul, South Korea, Jun. 18-22, 2016, retrieved from eie-isca2016, spreadsheet, http://eyeriss.mit.edu/benchmarking.html, 7 pages.
Han S., et al., "EIE: Efficient Inference Engine on Compressed Deep Neural Network," ISCA, May 2016, 12 pages.
Hsin Y., "Building Energy-Efficient Accelerators for Deep Learning," at Deep Learning Summit Boston, May 2016, retrieved from https://www.re-work.co/events/deep-learning-boston-2016 on Feb. 14, 2019, 10 pages.
Hsin Y., "Deep Learning & Artificial Intelligence," at GPU Technology Conference, Mar. 26-29, 2018, retrieved from http://www.gputechconf.com/resources/poster-gallery/2016/deep-learning-artificial-intelligence on Feb. 14, 2019, 4 pages.
Intel® Architecture, "Instruction Set Extensions and Future Features Programming Reference," 319433-034, May 2018, 145 pages.
Intel, "Intel® 64 and IA-32 Architectures Software Developer Manuals," Oct. 12, 2016, Updated—May 18, 2018, 19 pages.
Lewis D., et al., "The Stratix™ 10 Highly Pipelined FPGA Architecture," FPGA 2016, Altera, Feb. 23, 2016, 26 pages.
Lewis D., et al., "The Stratix™ 10 Highly Pipelined FPGA Architecture," FPGA'16, ACM, Feb. 21-23, 2016, pp. 159-168.
Non-Final Office Action from U.S. Appl. No. 15/719,285, dated Feb. 25, 2019, 47 pages.
Non-Final Office Action from U.S. Appl. No. 15/855,964, dated Dec. 13, 2018, 13 pages.
Notice of Allowance from U.S. Appl. No. 15/283,295, dated Jan. 3, 2019, 7 pages.
Notice of Allowance from U.S. Appl. No. 15/640,534, dated Jan. 4, 2019, 37 pages.
Notice of Allowance from U.S. Appl. No. 14/037,468, dated Mar. 7, 2019, 51 pages.
Notice of Allowance from U.S. Appl. No. 15/396,395, dated Dec. 28, 2018, 36 pages.
Notice of Allowance from U.S. Appl. No. 15/640,533, dated Feb. 14, 2019, 43 pages.
Notice of Allowance from U.S. Appl. No. 15/640,535, dated Feb. 6, 2019, 38 pages.
Notice of Allowance from U.S. Appl. No. 15/640,540, dated Mar. 14, 2019, 39 pages.
Notice of Allowance from U.S. Appl. No. 15/719,281, dated Jan. 24, 2019, 36 pages.
Notice of Allowance from U.S. Appl. No. 15/721,802, dated Mar. 18, 2019, 23 pages.
Suleiman A., et al., "Towards Closing the Energy Gap Between HOG and CNN Features for Embedded Vision," IEEE International Symposium of Circuits and Systems (ISCAS), May 2017, 4 pages.
Sze V., "Designing Efficient Deep Learning Systems," in Mountain View, CA, Mar. 27-28, 2019, retrieved from https://professional.mit.edu/programs/short-programs/designing-efficient-deep-learning-systems-OC on Feb. 14, 2019, 2 pages.
Sze V., et al., "Efficient Processing of Deep Neural Networks: A Tutorial and Survey," Mar. 2017, 32 pages.
Sze V., et al., "Efficient Processing of Deep Neural Networks: A Tutorial and Survey," Proceedings of the IEEE, Dec. 2017, vol. 105 (12), pp. 2295-2329.
Sze V., et al., "Hardware for Machine Learning: Challenges and Opportunities," IEEE Custom Integrated Circuits Conference (CICC), Oct. 2017, 9 pages.
"Tutorial at MICRO-50," The 50th Annual IEEE/ACM International Symposium on Microarchitecture, Oct. 14-18, 2017, retrieved from https://www.microarch.org/micro50/ on Feb. 14, 2019, 3 pages.
"Tutorial on Hardware Architectures for Deep Neural Networks at ISCA 2017," The 44th International Symposium on Computer Architecture, Jun. 24-28, 2017, retrieved from http://isca17.ece.utoronto.ca/doku.php on Feb. 14, 2019, 2 pages.
Yang T., et al., "Deep Neural Network Energy Estimation Tool," IEEE Conference on Computer Vision and Pattern Recognition CVPR 2017, Jul. 21-26, 2017, retrieved from https://energyestimation.mit.edu/ on Feb. 21, 2019, 4 pages.
Yang T., et al., "NetAdapt: Platform-Aware Neural Network Adaptation for Mobile Applications," European Conference on Computer Vision (ECCV), Version 1, Apr. 9, 2018, 16 pages.
Yang T., et al ., "A Method to Estimate the Energy Consumption of Deep Neural Networks," Asilomar Conference on Signals, Systems and Computers, Oct. 2017, 5 pages.

(56) References Cited

OTHER PUBLICATIONS

Yang T., et al ., "Designing Energy-Efficient Convolutional Neural Networks using Energy-Aware Pruning," IEEE Conference on Computer Vision and Pattern Recognition (CVPR), Jul. 2017, 9 pages.
Yang T., et al., "Designing Energy-Efficient Convolutional Neural Networks using Energy-Aware Pruning," IEEE Conference on Computer Vision and Pattern Recognition CVPR 2017, Jul. 21-26, 2017, retrieved from http://www.rle.mit.edu/eems/wp-content/uploads/2017/07/2017_cvpr_poster.pdf on Feb. 21, 2019, 1 page.
Yang T., et al., "Designing Energy-Efficient Convolutional Neural Networks using Energy-Aware Pruning," IEEE CVPR, Mar. 2017, 6 pages.
Yang T., et al., "NetAdapt: Platform-Aware Neural Network Adaptation for Mobile Applications," European Conference on Computer Vision (ECCV), Version 2, Sep. 28, 2018, 16 pages.
Final Office Action from U.S. Appl. No. 15/396,402, dated May 17, 2019, 85 pages.
Notice of Allowance from U.S. Appl. No. 15/859,466, dated May 17, 2019, 56 pages.
Corrected Notice of Allowance from U.S. Appl. No. 15/855,964, dated Jun. 25, 2019, 7 pages.
Corrected Notice of Allowance from U.S. Appl. No. 15/640,534, dated Jul. 2, 2019, 12 pages.
International Search Report and Written Opinion for Application No. PCT/US2019/020243, dated Jun. 19, 2019, 11 pages.
Notice of Allowance from U.S. Appl. No. 15/640,535, dated Jun. 21, 2019, 8 pages.
Notice of Allowance from U.S. Appl. No. 15/396,049, dated Jul. 2, 2019, 70 pages.
Notice of Allowance from U.S. Appl. No. 15/640,538, dated Jul. 3, 2019, 76 pages.
Notice of Allowance from U.S. Appl. No. 15/640,540, dated Jul. 1, 2019, 36 pages.
Final office action from U.S. Appl. No. 15/640,542, dated Aug. 7, 2019, 46 pages.
International Search Report and Written Opinion for Application No. PCT/US2019/034358, dated Sep. 18, 2019, 10 pages.
International Search Report and Written Opinion for Application No. PCT/US2019/034400, dated Sep. 19, 2019, 11 pages.
International Search Report and Written Opinion for Application No. PCT/US2019/034433, dated Sep. 20, 2019, 10 pages.
International Search Report and Written Opinion for Application No. PCT/US2019/034441, dated Sep. 23, 2019, 10 pages.
Non-Final office action from U.S. Appl. No. 16/443,717, dated Sep. 30, 2019, 25 pages.
Non-Final office action from U.S. Appl. No. 16/236,423, dated Aug. 21, 2019, 75 pages.
Notice of Allowance from U.S. Appl. No. 15/396,395, dated Aug. 7, 2019, 12 pages.
Notice of Allowance from U.S. Appl. No. 15/640,535, dated Aug. 21, 2019, 13 pages.
Notice of Allowance from U.S. Appl. No. 15/640,541, dated Aug. 13, 2019, 19 pages.
Notice of Allowance from U.S. Appl. No. 15/396,038, dated Oct. 2, 2019, 62 pages.
Notice of Allowance from U.S. Appl. No. 15/396,402, dated Sep. 16, 2019, 15 pages.
Notice of Allowance from U.S. Appl. No. 15/640,533, dated Sep. 12, 2019, 16 pages.
Notice of Allowance from U.S. Appl. No. 15/721,809, dated Sep. 5, 2019, 8 pages.
Notice of Allowance from U.S. Appl. No. 15/859,454, dated Sep. 12, 2019, 8 pages.
Notice of Allowance from U.S. Appl. No. 15/859,473, dated Sep. 24, 2019, 65 pages.
Notice of Allowance from U.S. Appl. No. 15/944,761, dated Sep. 12, 2019, 75 pages.
Notice of Allowance from U.S. Appl. No. 16/024,801, dated Sep. 12, 2019, 10 pages.
Notice of Allowance from U.S. Appl. No. 15/640,538, dated Sep. 20, 2019, 8 pages.
Notice of Allowance from U.S. Appl. No. 15/719,285, dated Jul. 23, 2019, 26 pages.

* cited by examiner

```
void func (int x,y) {
   x = x * y;
   return x;
}
```
PROGRAM SOURCE
FIG. 41A
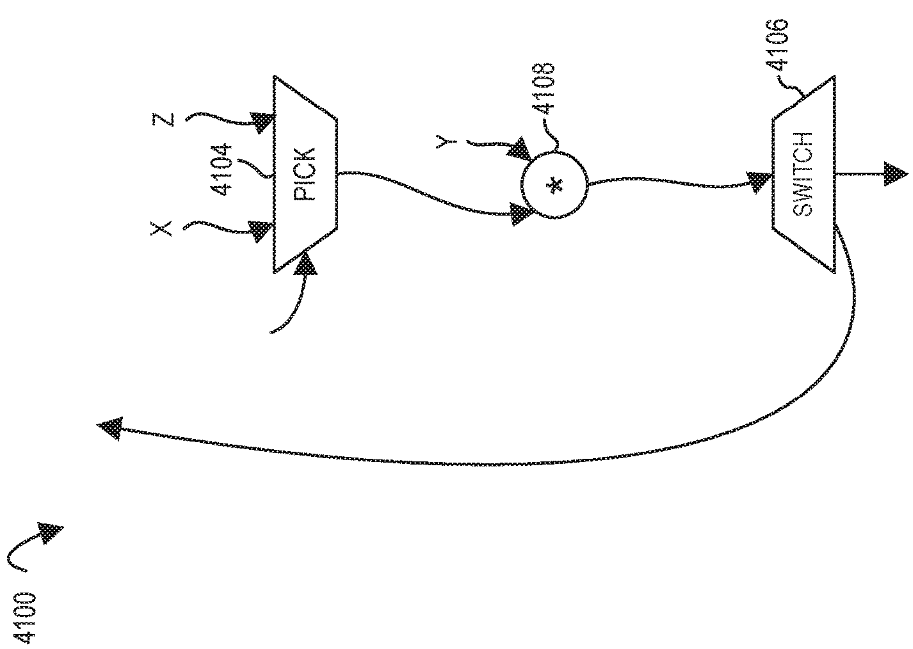
DATAFLOW GRAPH
FIG. 41B
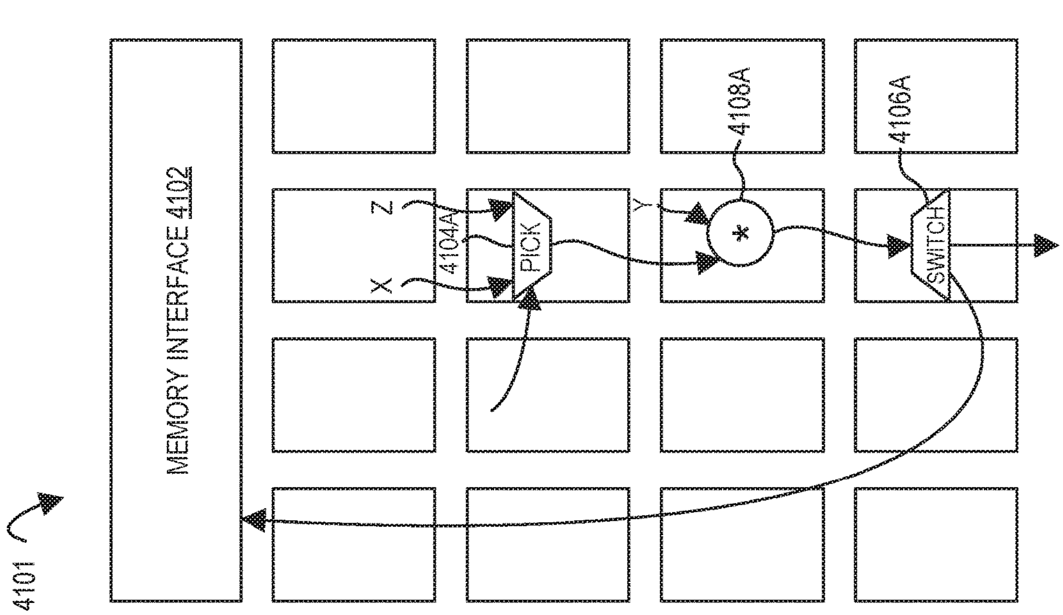
CONFIGURED CSA
FIG. 41C

4300

```
void memcpy(void *A, void *B, int N) {
    for(int index = 0; index < N; index++) {
        a[index] = b[index]
    }
}
```

FIG. 43

```
ld32 Rdata, Raddr
ld32 Rdata2, Raddr2
mul32 Rv0, Rdata, 17
mul32 Rv1, Rdata2, Rdata2
add32 Rres, Rv0, Rv1
st32 Raddr, Rres
ld32 Rdata3, Raddr3
```

SEQUENTIAL ASSEMBLY 5502

FIG. 55A

```
.lic .i32 data; .lic .i64 addr;
.lic .i32 data2; .lic .i64 addr2;
.lic .i32 data3; .lic .i64 addr3;
.lic .i32 v0; .lic .i32 v1; .lic .i32 res
ld32 data, addr
ld32 data2, addr2
mul32 v0, data, 17
mul32 v1, data2, data2
add32 res, v0, v1
st32 addr, res, done, %ign
ld32 data3, addr3, %ign, done
```

DATAFLOW ASSEMBLY 5504

FIG. 55B

DATAFLOW GRAPH 5506

```
if (i < n)
    y = x + a;
else
    y = i + x;
```

C SOURCE CODE 5602

FIG. 56A

```
.lic .i1 test
cmplts32 test, i, n
switch32 %ign, aT, test, a
switch32 iF, %ign, test, i
switch32 xF, xT, test, x
add32 yT, xT, aT      # True path
add32 yF, iF, xF      # False path
pick32 y, test, yF, yT
add32 z, y, 1
```

DATAFLOW ASSEMBLY 5604

FIG. 56B

DATAFLOW GRAPH 5606

```
int i = 0;
int sum = 0;
do {
    sum = sum + i;
    i = i + 1;
} while (i < n);
return sum;
```

C SOURCE CODE 5702

FIG. 57A

```
# Loop control channels.
.lic .i1 picker
.lic .i1 switcher

# Offset values in picker with an initial 0.
.curr picker; .value 0; .avail 0

# Generate value of i for each loop iteration
pick32 top_i, picker, init_i, loopback_i
add32 bottom_i, top_i, 1
switch32 %ign, loopback_i, switcher, bottom_i

# Repeat value of n for each execution of the loop.
pick32 loop_n, picker, init_n, loopback_n
switch32 %ign, loopback_n, switcher, loop_n

# Comparison at the bottom of the loop.
cmplts32 switcher, bottom_i, loop_n
mov1 picker, switcher

# Add up the sum around the loop iteration.
pick32 top_sum, picker, init_sum, loopback_sum
add32 bottom_sum, top_sum, top_i
switch32 out_sum, loopback_sum, switcher, bottom_sum
```

DATAFLOW ASSEMBLY 5704

FIG. 57B

DATAFLOW GRAPH 5706

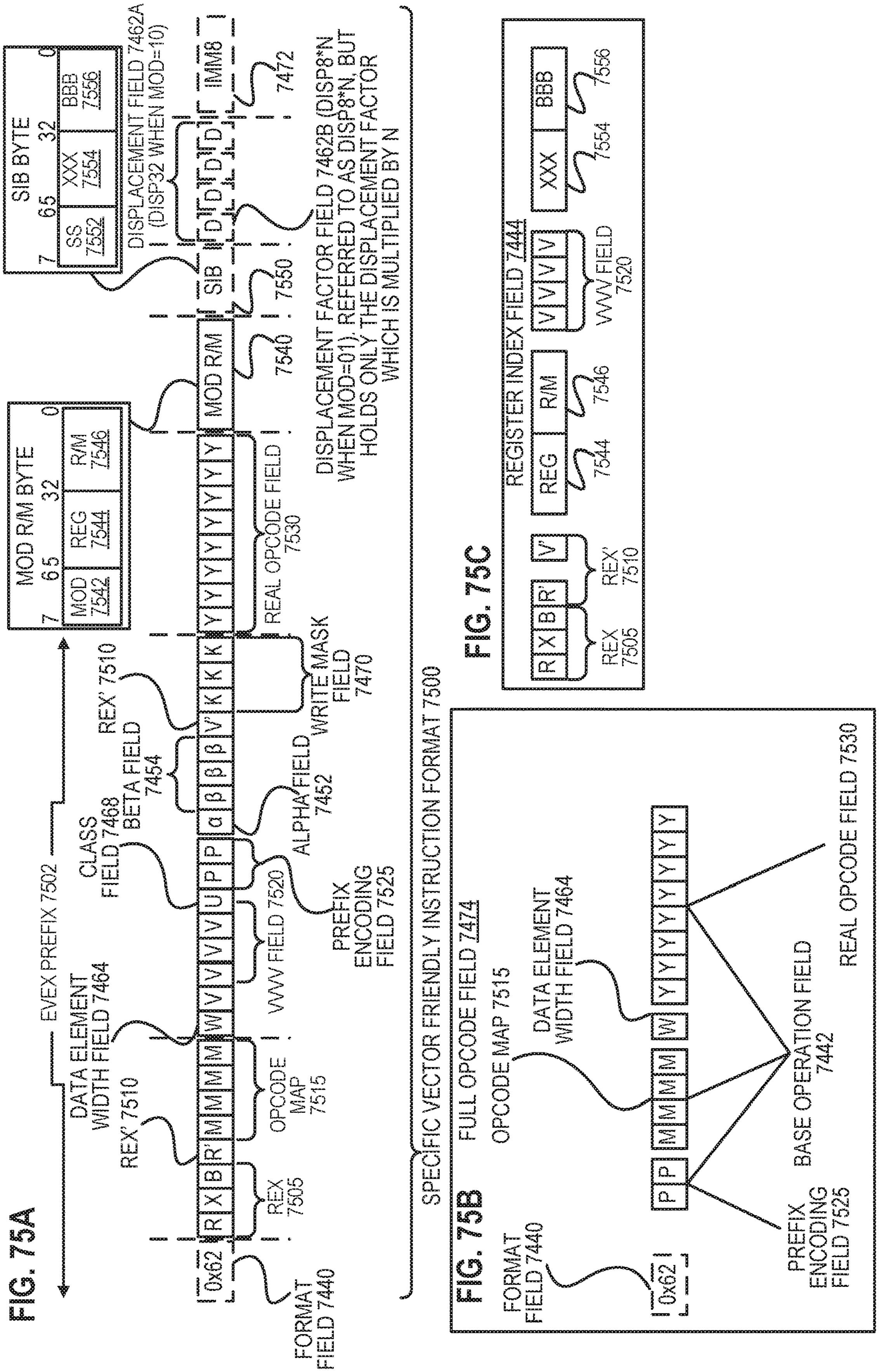

FIG. 75A
EVEX PREFIX 7502
0x62
R X B R' M M M M W V V V V U P P α β β β V' K K K Y Y Y Y Y Y Y Y MOD R/M SIB D' D' D' D' IMM8
FORMAT FIELD 7440
REX 7505
REX' 7510
OPCODE MAP 7515
DATA ELEMENT WIDTH FIELD 7464
VVVV FIELD 7520
CLASS FIELD 7468
PREFIX ENCODING FIELD 7525
ALPHA FIELD 7452
BETA FIELD 7454
REX' 7510
WRITE MASK FIELD 7470
REAL OPCODE FIELD 7530
MOD R/M BYTE
7 6 5 3 2 0
MOD 7542
REG 7544
R/M 7546
7540
SIB BYTE
7 6 5 3 2 0
SS 7552
XXX 7554
BBB 7556
7550
DISPLACEMENT FIELD 7462A (DISP32 WHEN MOD=10)
DISPLACEMENT FACTOR FIELD 7462B (DISP8*N WHEN MOD=01), REFERRED TO AS DISP8*N, BUT HOLDS ONLY THE DISPLACEMENT FACTOR WHICH IS MULTIPLIED BY N
7472
SPECIFIC VECTOR FRIENDLY INSTRUCTION FORMAT 7500
FIG. 75B
FULL OPCODE FIELD 7474
FORMAT FIELD 7440
0x62
P P M M M M W Y Y Y Y Y Y Y Y
OPCODE MAP 7515
DATA ELEMENT WIDTH FIELD 7464
PREFIX ENCODING FIELD 7525
BASE OPERATION FIELD 7442
REAL OPCODE FIELD 7530
FIG. 75C
REGISTER INDEX FIELD 7444
R X B R' V' REG R/M V V V V XXX BBB
REX 7505
REX' 7510
7544
7546
VVVV FIELD 7520
7554
7556

FIG. 77A
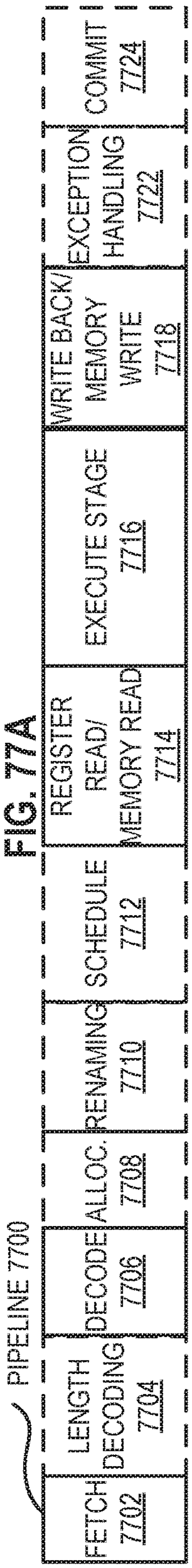
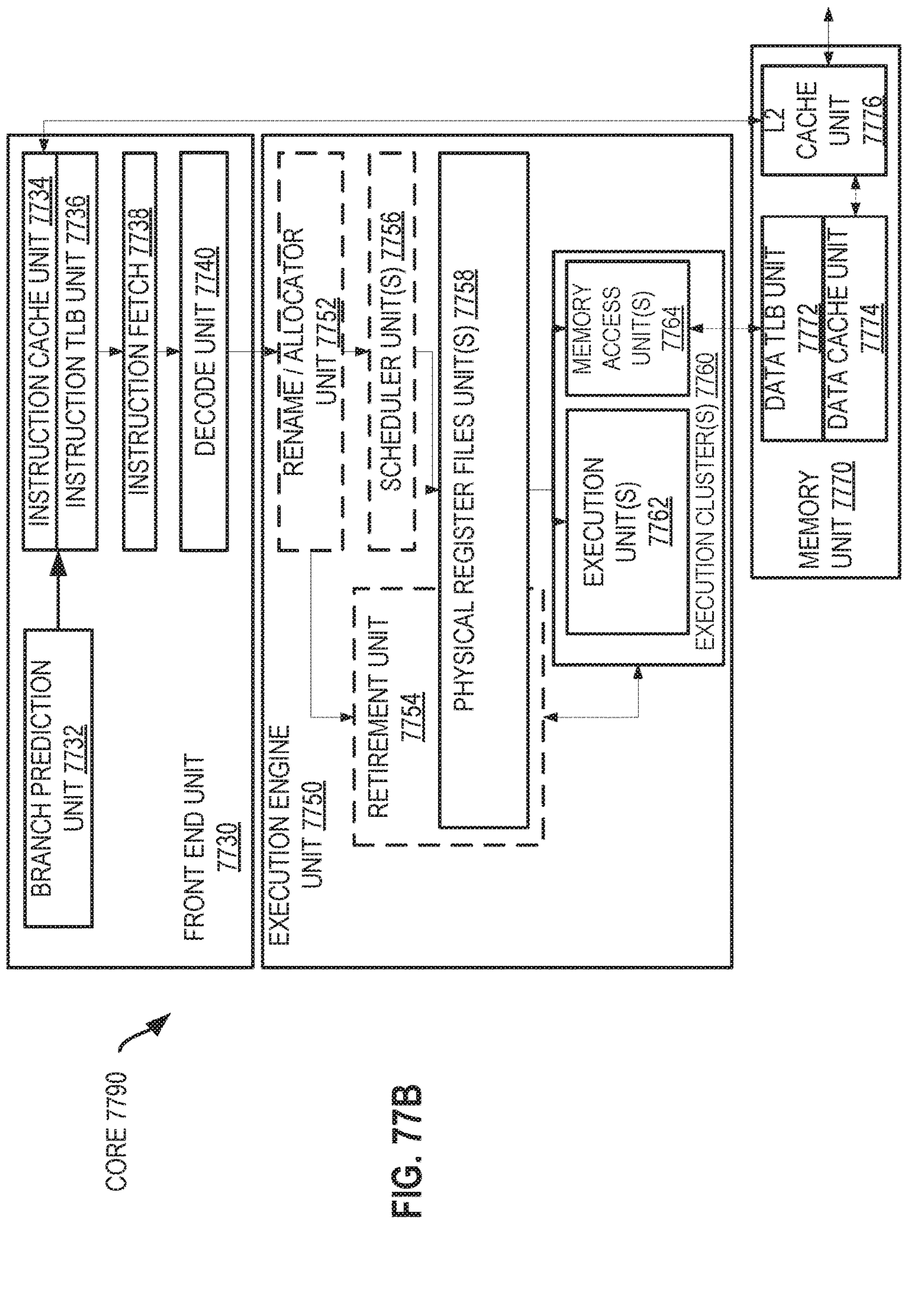
FIG. 77B

PROCESSORS, METHODS, AND SYSTEMS WITH A CONFIGURABLE SPATIAL ACCELERATOR

STATEMENT REGARDING FEDERALLY SPONSORED RESEARCH AND DEVELOPMENT

This invention was made with Government support under contract number H98230-13-D-0124 awarded by the Department of Defense. The Government has certain rights in this invention.

TECHNICAL FIELD

The disclosure relates generally to electronics, and, more specifically, an embodiment of the disclosure relates to a configurable spatial array.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 41A illustrates a program source according to embodiments of the disclosure.

FIG. 41B illustrates a dataflow graph for the program source of FIG. 21A according to embodiments of the disclosure.

FIG. 41C illustrates an accelerator with a plurality of processing elements configured to execute the dataflow graph of FIG. 21B according to embodiments of the disclosure.

FIG. 43 illustrates a program source according to embodiments of the disclosure.

FIG. 55A illustrates sequential assembly code according to embodiments of the disclosure.

FIG. 55B illustrates dataflow assembly code for the sequential assembly code of FIG. 35A according to embodiments of the disclosure.

FIG. 56A illustrates C source code according to embodiments of the disclosure.

FIG. 56B illustrates dataflow assembly code for the C source code of FIG. 36A according to embodiments of the disclosure.

FIG. 57A illustrates C source code according to embodiments of the disclosure.

FIG. 57B illustrates dataflow assembly code for the C source code of FIG. 37A according to embodiments of the disclosure.

FIG. 75A is a block diagram illustrating fields for the generic vector friendly instruction formats in FIGS. 54A and 54B according to embodiments of the disclosure.

FIG. 75B is a block diagram illustrating the fields of the specific vector friendly instruction format in FIG. 55A that make up a full opcode field according to one embodiment of the disclosure.

FIG. 75C is a block diagram illustrating the fields of the specific vector friendly instruction format in FIG. 55A that make up a register index field according to one embodiment of the disclosure.

FIG. 77A is a block diagram illustrating both an exemplary in-order pipeline and an exemplary register renaming, out-of-order issue/execution pipeline according to embodiments of the disclosure.

FIG. 77B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
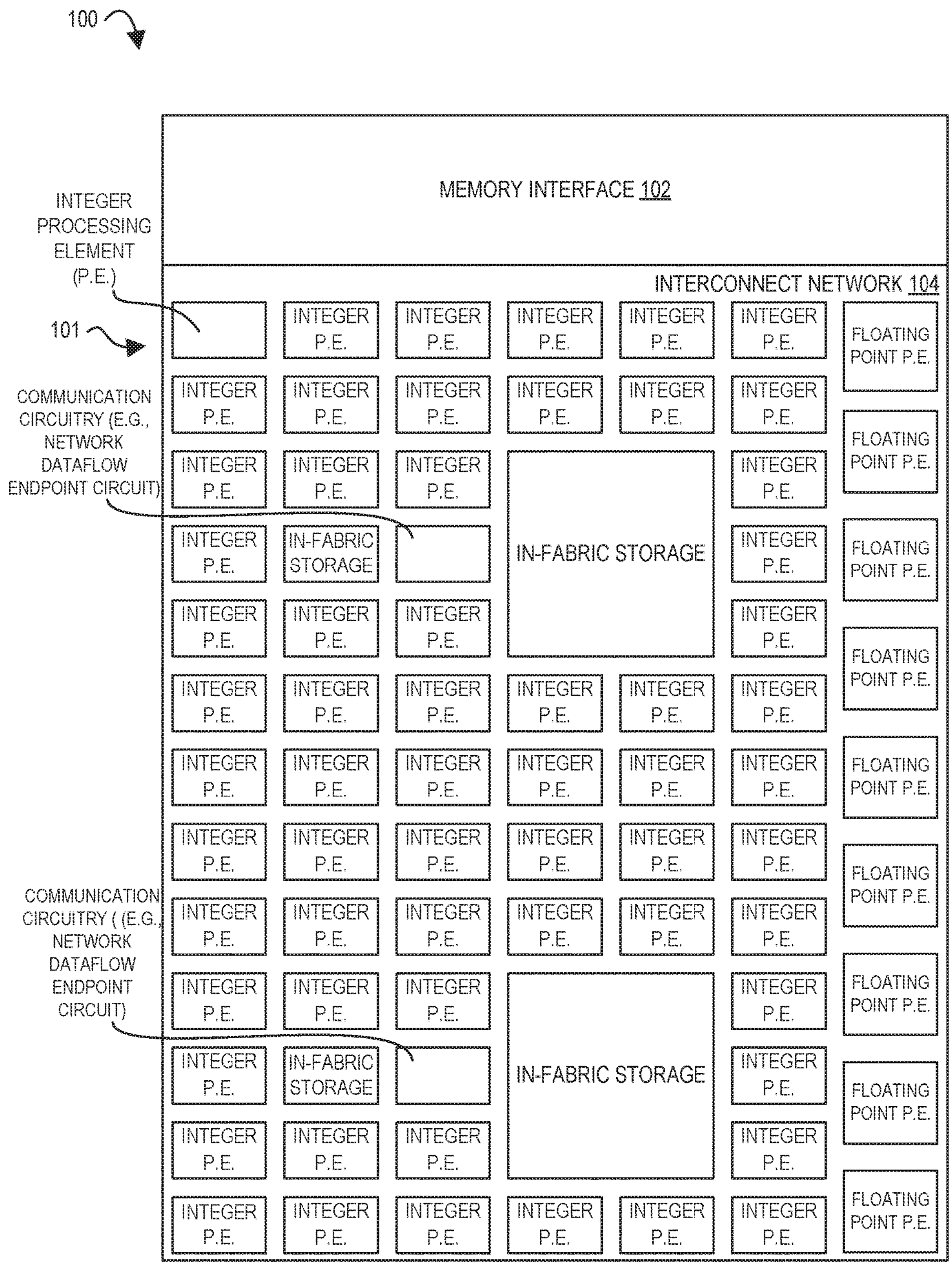
FIG. 1 illustrates an accelerator tile according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. One non-limiting example of an operation is a blend operation to input a plurality of vectors elements and output a vector with a blended plurality of elements. In certain embodiments, multiple operations are accomplished with the execution of a single instruction.

Exascale performance, e.g., as defined by the Department of Energy, may require system-level floating point performance to exceed 10^18 floating point operations per second (exaFLOPs) or more within a given (e.g., 20 MW) power budget. Certain embodiments herein are directed to a spatial array of processing elements (e.g., a configurable spatial accelerator (CSA)) that targets high performance computing (HPC), for example, of a processor. Certain embodiments herein of a spatial array of processing elements (e.g., a CSA) target the direct execution of a dataflow graph to yield a computationally dense yet energy-efficient spatial microarchitecture which far exceeds conventional roadmap architectures. Certain embodiments herein overlay (e.g., high-radix) dataflow operations on a communications network, e.g., in addition to the communications network's routing of data between the processing elements, memory, etc. and/or the communications network performing other communications (e.g., not data processing) operations. Certain embodiments herein are directed to a communications network (e.g., a packet switched network) of a (e.g., coupled to) spatial array of processing elements (e.g., a CSA) to perform certain dataflow operations, e.g., in addition to the communications network routing data between the processing elements, memory, etc. or the communications network performing other communications operations. Certain embodiments herein are directed to network dataflow endpoint circuits that (e.g., each) perform (e.g., a portion or all) a dataflow operation or operations, for example, a pick or switch dataflow operation, e.g., of a dataflow graph. Certain embodiments herein include augmented network endpoints (e.g., network dataflow endpoint circuits) to support the control for (e.g., a plurality of or a subset of) dataflow operation(s), e.g., utilizing the network endpoints to perform a (e.g., dataflow) operation instead of a processing element (e.g., core) or arithmetic-logic unit (e.g. to perform arithmetic and logic operations) performing that (e.g., dataflow) operation. In one embodiment, a network dataflow endpoint circuit is separate from a spatial array (e.g. an interconnect or fabric thereof) and/or processing elements.

Below also includes a description of the architectural philosophy of embodiments of a spatial array of processing elements (e.g., a CSA) and certain features thereof. As with any revolutionary architecture, programmability may be a risk. To mitigate this issue, embodiments of the CSA architecture have been co-designed with a compilation tool chain, which is also discussed below.

INTRODUCTION

Exascale computing goals may require enormous system-level floating point performance (e.g., 1 ExaFLOPs) within an aggressive power budget (e.g., 20 MW). However, simultaneously improving the performance and energy efficiency of program execution with classical von Neumann architectures has become difficult: out-of-order scheduling, simultaneous multi-threading, complex register files, and other structures provide performance, but at high energy cost. Certain embodiments herein achieve performance and energy requirements simultaneously. Exascale computing power-performance targets may demand both high throughput and low energy consumption per operation. Certain embodiments herein provide this by providing for large numbers of low-complexity, energy-efficient processing (e.g., computational) elements which largely eliminate the control overheads of previous processor designs. Guided by this observation, certain embodiments herein include a spatial array of processing elements, for example, a configurable spatial accelerator (CSA), e.g., comprising an array of processing elements (PEs) connected by a set of light-weight, back-pressured (e.g., communication) networks. An example of a CSA tile is depicted in FIG. 1. Certain embodiments of processing (e.g., compute) elements are dataflow operators, e.g., multiple of a dataflow operator that only processes input data when both (i) the input data has arrived at the dataflow operator and (ii) there is space available for storing the output data, e.g., otherwise no processing is occurring. Certain embodiments (e.g., of an accelerator or CSA) do not utilize a triggered instruction.

FIG. 1 illustrates an accelerator tile 100 embodiment of a spatial array of processing elements according to embodiments of the disclosure. Accelerator tile 100 may be a portion of a larger tile. Accelerator tile may be on a single die of a semiconductor. Accelerator tile 100 executes a dataflow graph or graphs. A dataflow graph may generally refer to an explicitly parallel program description which arises in the compilation of sequential codes. Certain embodiments herein (e.g., CSAs) allow dataflow graphs to be directly configured onto the CSA array, for example, rather than being transformed into sequential instruction streams. Certain embodiments herein allow a first (e.g., type of) dataflow operation to be performed by one or more processing elements (PEs) of the spatial array and, additionally or alternatively, a second (e.g., different, type of) dataflow operation to be performed by one or more of the network communication circuits (e.g., endpoints) of the spatial array.

The derivation of a dataflow graph from a sequential compilation flow allows embodiments of a CSA to support familiar programming models and to directly (e.g., without using a table of work) execute existing high performance computing (HPC) code. CSA processing elements (PEs) may be energy efficient. In FIG. 1, memory interface 102 may couple to a memory (e.g., memory 202 in FIG. 2) to allow accelerator tile 100 to access (e.g., load and/store) data to the (e.g., off die) memory. Depicted accelerator tile 100 is a heterogeneous array comprised of several kinds of PEs coupled together via an interconnect network 104. Accelerator tile 100 may include one or more of integer arithmetic PEs, floating point arithmetic PEs, communication circuitry (e.g., network dataflow endpoint circuits), and in-fabric storage, e.g., as part of spatial array of processing elements 101. Dataflow graphs (e.g., compiled dataflow graphs) may be overlaid on the accelerator tile 100 for execution. In one embodiment, for a particular dataflow graph, each PE handles only one or two (e.g., dataflow) operations of the graph. The array of PEs may be heterogeneous, e.g., such that no PE supports the full CSA dataflow architecture and/or one or more PEs are programmed (e.g., customized) to perform only a few, but highly efficient operations. Certain embodiments herein thus yield a processor or accelerator having an array of processing elements that is computationally dense compared to roadmap architectures and yet achieves approximately an order-of-magnitude gain in energy efficiency and performance relative to existing HPC offerings.

Certain embodiments herein provide for performance increases from parallel execution within a (e.g., dense) spatial array of processing elements (e.g., CSA) where each PE and/or network dataflow endpoint circuit utilized may perform its operations simultaneously, e.g., if input data is available. Efficiency increases may result from the efficiency of each PE and/or network dataflow endpoint circuit, e.g., where each PE's operation (e.g., behavior) is fixed once per configuration (e.g., mapping) step and execution occurs on local data arrival at the PE, e.g., without considering other fabric activity, and/or where each network dataflow endpoint circuit's operation (e.g., behavior) is variable (e.g., not fixed) when configured (e.g., mapped). In certain embodiments, a PE and/or network dataflow endpoint circuit is (e.g., each a single) dataflow operator, for example, a dataflow operator that only operates on input data when both (i) the input data has arrived at the dataflow operator and (ii) there is space available for storing the output data, e.g., otherwise no operation is occurring.

Certain embodiments herein include a spatial array of processing elements as an energy-efficient and high-performance way of accelerating user applications. In one embodiment, applications are mapped in an extremely parallel manner. For example, inner loops may be unrolled multiple times to improve parallelism. This approach may provide high performance, e.g., when the occupancy (e.g., use) of the unrolled code is high. However, if there are less used code paths in the loop body unrolled (for example, an exceptional code path like floating point de-normalized mode) then (e.g., fabric area of) the spatial array of processing elements may be wasted and throughput consequently lost.

One embodiment herein to reduce pressure on (e.g., fabric area of) the spatial array of processing elements (e.g., in the case of underutilized code segments) is time multiplexing. In this mode, a single instance of the less used (e.g., colder)

code may be shared among several loop bodies, for example, analogous to a function call in a shared library. In one embodiment, spatial arrays (e.g., of processing elements) support the direct implementation of multiplexed codes. However, e.g., when multiplexing or demultiplexing in a spatial array involves choosing among many and distant targets (e.g., sharers), a direct implementation using dataflow operators (e.g., using the processing elements) may be inefficient in terms of latency, throughput, implementation area, and/or energy. Certain embodiments herein describe hardware mechanisms (e.g., network circuitry) supporting (e.g., high-radix) multiplexing or demultiplexing. Certain embodiments herein (e.g., of network dataflow endpoint circuits) permit the aggregation of many targets (e.g., sharers) with little hardware overhead or performance impact. Certain embodiments herein allow for compiling of (e.g., legacy) sequential codes to parallel architectures in a spatial array.

Certain embodiments herein utilize multiple accelerator tiles (for example, multiple sets of spatial arrays of processing elements (e.g., processing elements 101) where those processing elements of a tile are connected together, e.g., by a (e.g., circuit switched) network. In one embodiment, a computing system includes multiple accelerator tiles (e.g., multiple instances of accelerator tile 100), for example, configured to perform a (single) dataflow graph.

Figure 2:
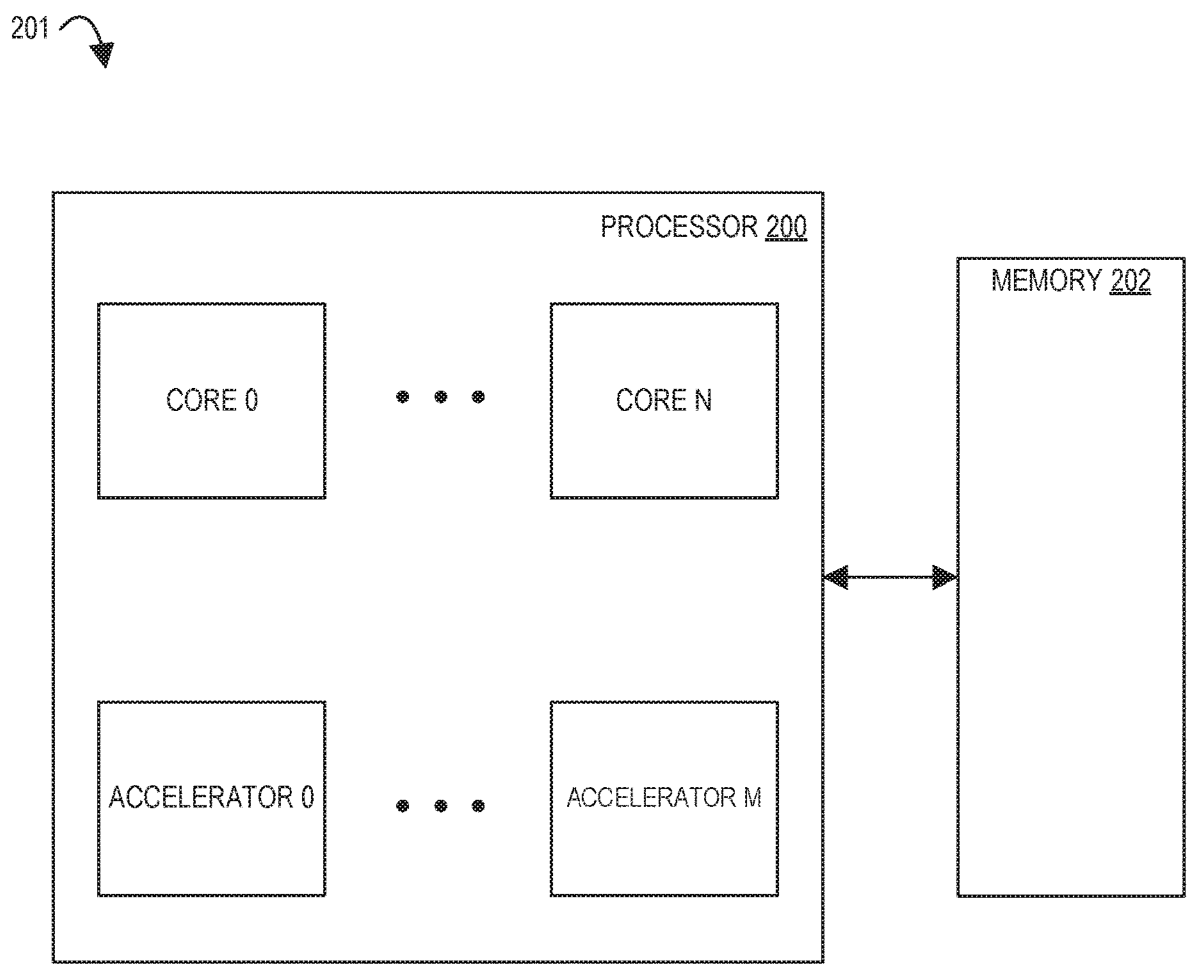
FIG. 2 illustrates a hardware processor coupled to a memory according to embodiments of the disclosure.

FIG. 2 illustrates a hardware processor 200 coupled to (e.g., connected to) a memory 202 according to embodiments of the disclosure. In one embodiment, hardware processor 200 and memory 202 are a computing system 201. In certain embodiments, one or more of accelerators is a CSA according to this disclosure. In certain embodiments, one or more of the cores in a processor are those cores disclosed herein. Hardware processor 200 (e.g., each core thereof) may include a hardware decoder (e.g., decode unit) and a hardware execution unit. Hardware processor 200 may include registers. Note that the figures herein may not depict all data communication couplings (e.g., connections). One of ordinary skill in the art will appreciate that this is to not obscure certain details in the figures. Note that a single headed arrow in the figures may not require one-way communication, for example, it may indicate two-way communication (e.g., to or from that component or device). Note that a double headed arrow in the figures may not require two-way communication, for example, it may indicate one-way communication (e.g., to or from that component or device). Any or all combinations of communications paths may be utilized in certain embodiments herein. Depicted hardware processor 200 includes a plurality of cores (0 to N, where N may be 1 or more) and hardware accelerators (0 to M, where M may be 1 or more) according to embodiments of the disclosure. Hardware processor 200 (e.g., accelerator(s) and/or core(s) thereof) may be coupled to memory 202 (e.g., data storage device). Hardware decoder (e.g., of core) may receive an (e.g., single) instruction (e.g., macro-instruction) and decode the instruction, e.g., into micro-instructions and/or micro-operations. Hardware execution unit (e.g., of core) may execute the decoded instruction (e.g., macro-instruction) to perform an operation or operations.

Section 1 below discusses utilizing numerous hardware components of spatial architectures (e.g., CSAs), for example, as an energy-efficient and high-performance way of accelerating user applications. Section 2 below discloses embodiments of CSA architecture. In particular, novel embodiments of integrating memory within the dataflow execution model are disclosed. Section 3 delves into the microarchitectural details of embodiments of a CSA. In one embodiment, the main goal of a CSA is to support compiler produced programs. Section 4 below examines embodiments of a CSA compilation tool chain. The advantages of embodiments of a CSA are compared to other architectures in the execution of compiled codes in Section 5. Finally the performance of embodiments of a CSA microarchitecture is discussed in Section 6, further CSA details are discussed in Section 7, and a summary is provided in Section 8.

1. Example Hardware Components of Spatial Architectures

In certain embodiments, processing elements (PEs) communicate using dedicated virtual circuits which are formed by statically configuring a (e.g., circuit switched) communications network. These virtual circuits (e.g., statically configured communications channels) may be flow controlled and fully back-pressured, e.g., such that a PE will stall if either the source has no data or its destination is full. At runtime, data may flow through the PEs implementing the mapped dataflow graph (e.g., mapped algorithm). For example, data may be streamed in from memory, through the (e.g., fabric area of a) spatial array of processing elements, and then back out to memory.

Such an architecture may achieve remarkable performance efficiency relative to traditional multicore processors: compute, e.g., in the form of PEs, may be simpler and more numerous than cores and communications may be direct, e.g., as opposed to an extension of the memory system. However, in building a (e.g., large) spatial array (e.g., spanning potentially a whole chip), certain embodiments may include data traversing between two different tiles (e.g., two different power and/or clock domains), such that a full-chip spatial array may be composed for a single dataflow graph (e.g., program). In one embodiment, data (e.g., on a configurable data path network and/or a configurable flow control (e.g., backpressure) path network) crosses between these domains in a dataflow like manner. Certain embodiments herein provide for communications microarchitecture (e.g., hardened synchronization resources, which may include one or more synchronizer circuits) that allows data to cross between a first tile (e.g., having a first power and/or clock domain) and a second tile (e.g., having a different, second power and/or clock domain), for example, to produce a full-chip dataflow array. Certain synchronizer circuits herein allow for the (e.g., full) transmittal of data between a first voltage and/or a first frequency of a first tile and a second voltage and/or a second frequency of a second tile. Certain embodiments herein provide a tile spanning microarchitecture that enables full-chip programs.

Figure 3:
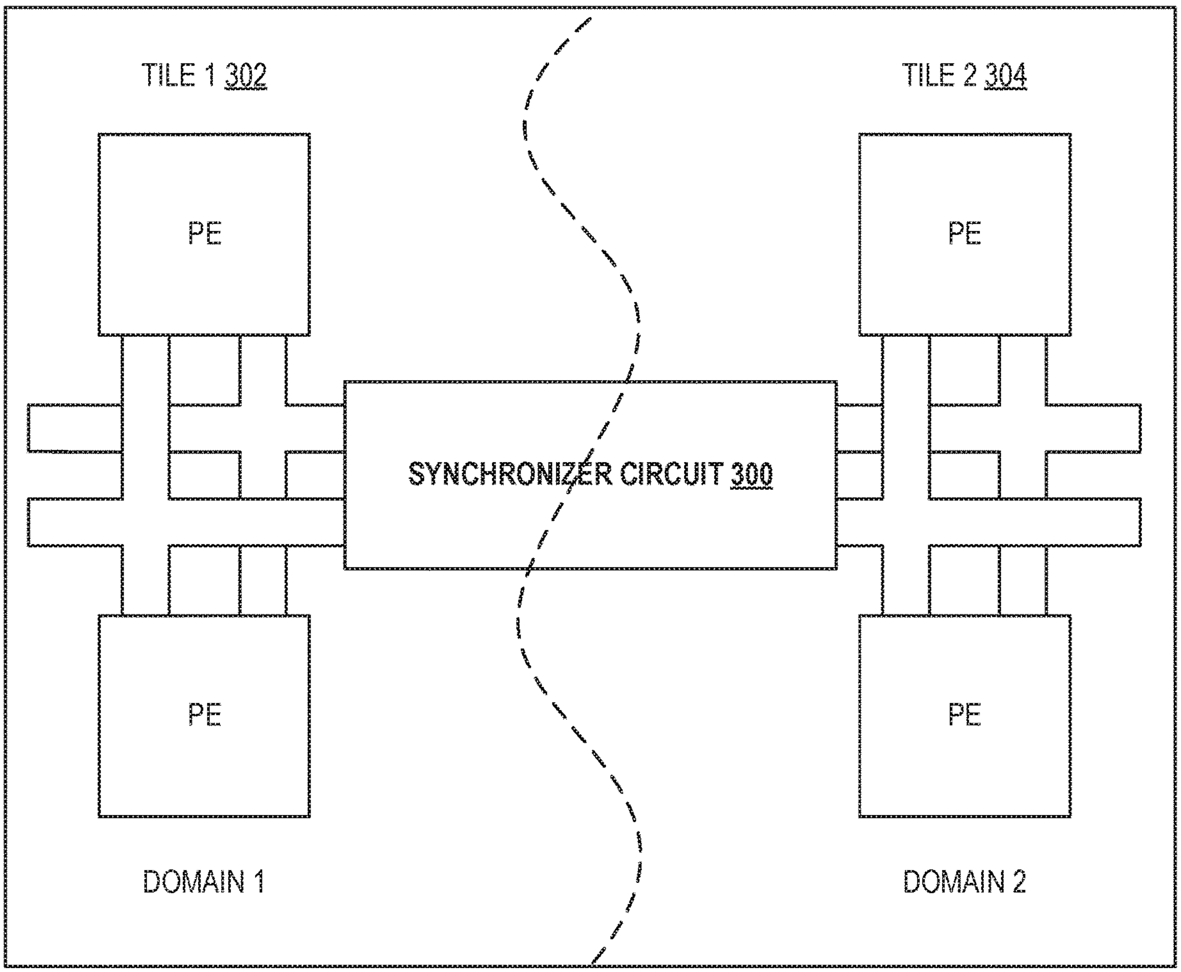
FIG. 3 illustrates a synchronizer circuit coupled between a first accelerator tile in a first domain and a second accelerator tile in a second domain according to embodiments of the disclosure.

FIG. 3 illustrates a synchronizer circuit 300 coupled between a first accelerator tile 302 in a first domain and a second accelerator tile 304 in a second domain according to embodiments of the disclosure. Each tile is depicted as having a plurality of processing elements (PEs). Each processing element in a tile may be coupled to other processing elements in that tile with a (e.g., interconnect) network. Network may be any network discussed herein, for example, a circuit switched network. Although each network is depicted as having two lines (e.g., channels), a single or any plurality of lines and/or channels on each line may be utilized. First tile 302 may have (e.g., operate in) a first power and/or clock domain and a second tile 304 may have (e.g., operate in) a different, second power and/or clock domain. Synchronizer circuit 300 may convert data (e.g., control data and/or data to be operated on) between the first domain and the second domain, e.g., as discussed below). Certain embodiments herein include processing elements in each domain that communicate with statically configured, asynchronous communications channels. Certain embodiments herein include a domain crossing synchronizer circuit (e.g., as a replacement for one or more of the PEs discussed herein), e.g., at the edge of each power and/or clock domain. A synchronizer circuit may provide for the clock asynchronous and level switching used to move between domains, e.g., enabling a unified, full-chip programming model.

A synchronizer circuit(s) may provide for the level change and synchronization of data, e.g., fronted by a circuit-switched communications framework in the style of the other PEs discussed herein. In one embodiment, a synchronizer circuit may be configured to be bypassed if regional voltage and clocking are matched (e.g., the voltage and/or clocking matches in domain 1 and domain 2).

FIG. 3 shows a baseline integration of a synchronizer circuit into the (e.g., course grained) fabrics (e.g., networks) of two adjacent accelerator tiles. Synchronizer circuits may function as a buffer PEs, e.g., but with the source (e.g., source PE) and destination (e.g., destination PE) in different tiles, with the size of the buffers larger than in a PE, and/or including voltage and frequency crossing mechanisms (circuitry). From a program perspective, however, synchronizer circuits may appear as a queue (e.g., buffer), for example, of a PE.

Figure 4:
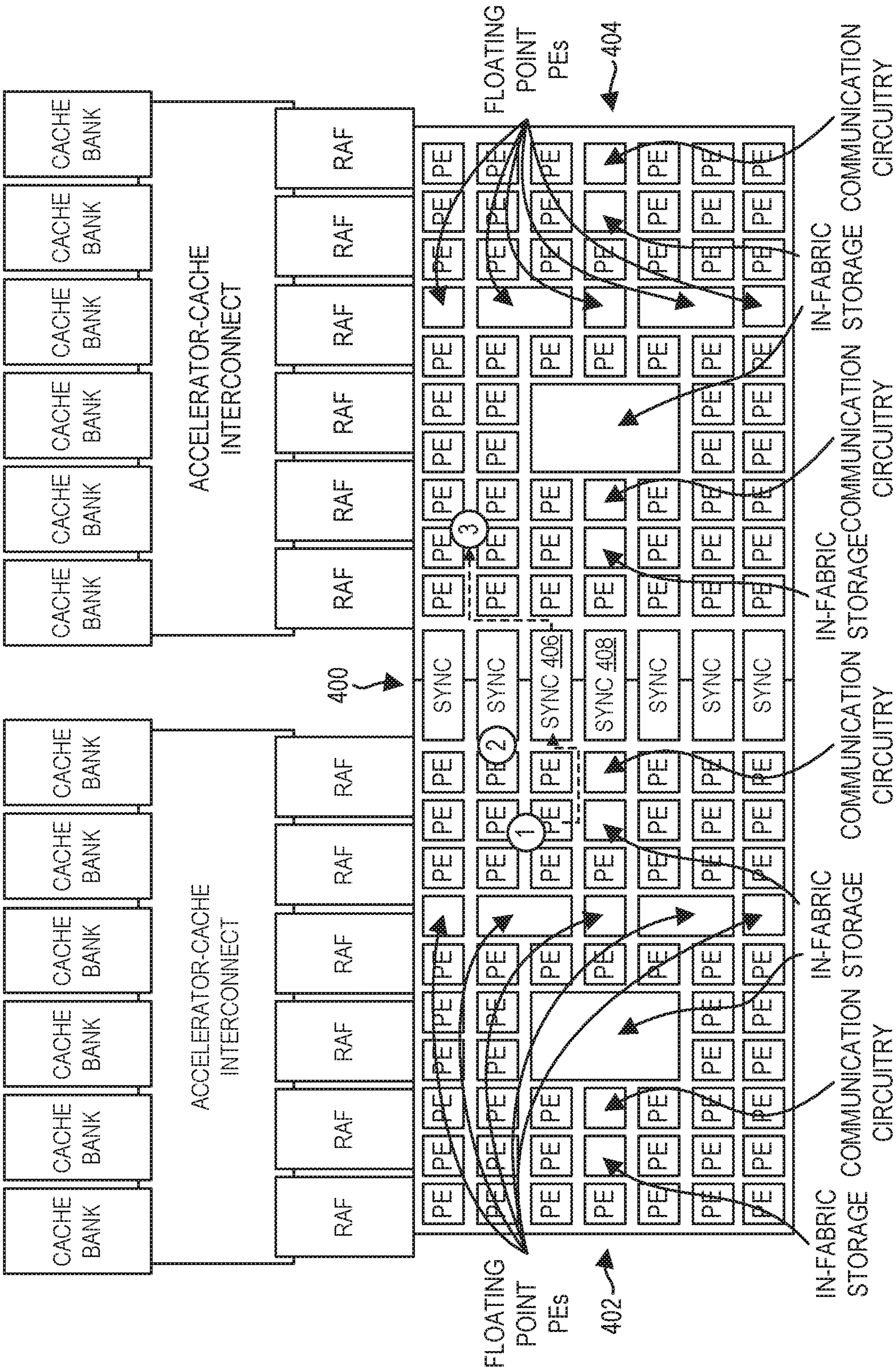
FIG. 4 illustrates a plurality of synchronizer circuits coupled between a first accelerator tile in a first domain and a second accelerator tile in a second domain according to embodiments of the disclosure.

FIG. 4 illustrates a plurality of synchronizer circuits 400 coupled between a first accelerator tile 402 in a first domain and a second accelerator tile 404 in a second domain according to embodiments of the disclosure. As depicted, each row of processing elements is to include a synchronizer circuit. In another embodiment, a single processing element or any plurality of processing elements may utilize a (e.g., single) synchronizer circuit. The components in a tile may be as depicted, or include one or more of the components discussed herein. For example, in one embodiment, each tile includes a network and a plurality of processing elements. FIG. 4 depicts a sample data flow between adjacent tiles, e.g., between processing element (1) of first tile 402 and processing element (3) of second tile 404. One of the plurality of synchronizer circuits 400 may be utilized to allow data flow between processing element (1) of first tile 402 and processing element (3) of second tile 404. Synchronizer circuit 406 may be selected (e.g., by compiler) to be in a (e.g., direct or shortest) path between the two cross-tile components that are to communicate. Synchronizer circuit 406 may be selected (e.g., by compiler) to minimize the latency and/or path length, e.g., where long paths may increase latency. Synchronizer circuit 406 thus provides for processing element (1) of first tile 402 and processing element (3) of second tile 404 to communicate even though they reside in different tiles (e.g., domains). In one embodiment, synchronizer circuit 406 provides for data to flow (e.g., only) from processing element (1) of first tile 402 to processing element (3) of second tile 404. In one embodiment, a synchronizer circuit (e.g., separate synchronizer circuit 408 or synchronizer circuit 406) provides for data to flow from processing element (1) of first tile 402 to processing element (3) of second tile 404.

Figure 5:
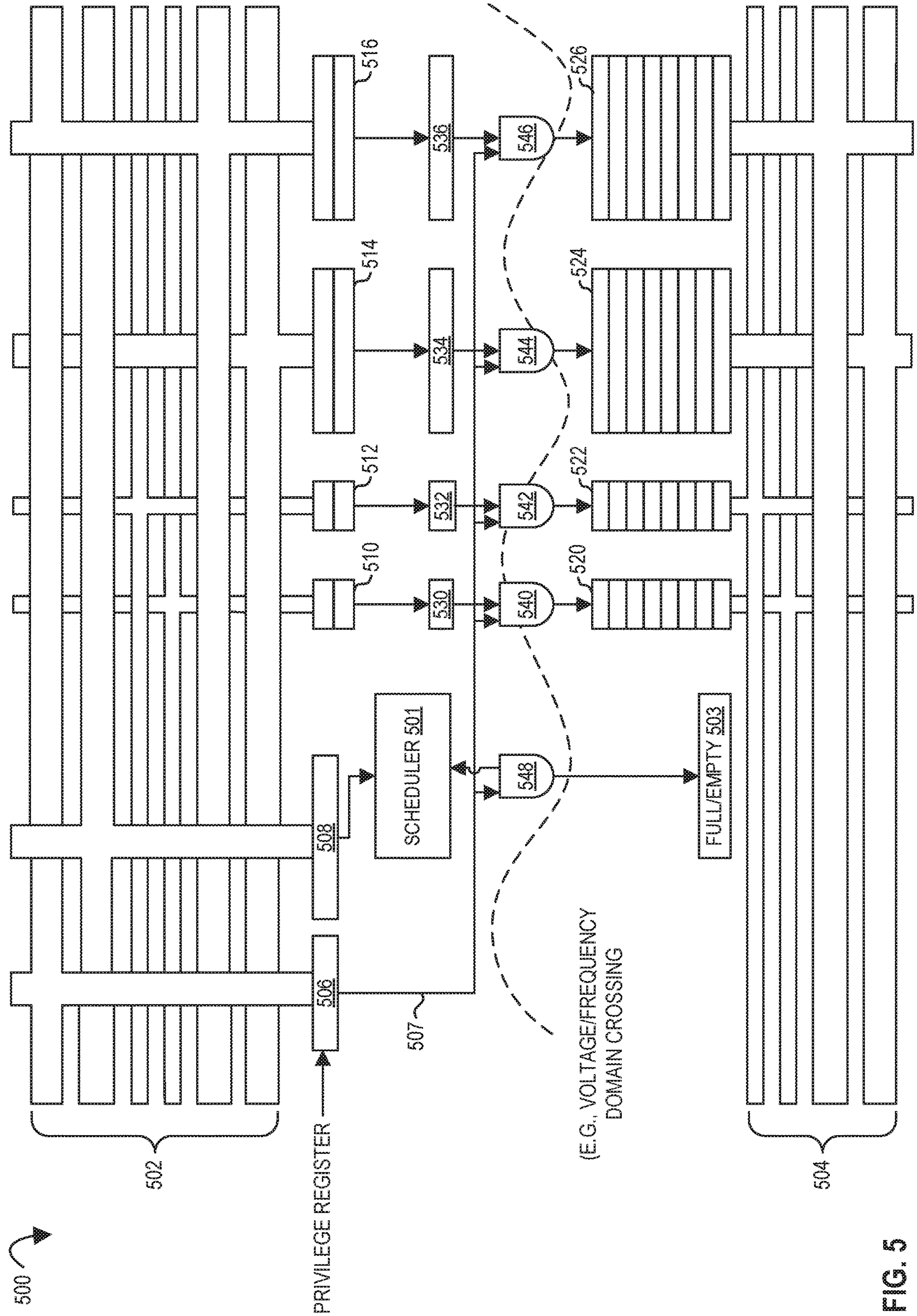
FIG. 5 illustrates a synchronizer circuit coupled between a network of a first accelerator tile in a first domain and a network of a second accelerator tile in a second domain according to embodiments of the disclosure.

FIG. 5 illustrates a synchronizer circuit 500 coupled between a network 502 of a first accelerator tile in a first domain and a network 504 of a second accelerator tile in a second domain according to embodiments of the disclosure. The following discusses data flowing from network 502 to network 504 via synchronizer circuit 500. In certain embodiments, a synchronizer circuit (e.g., second synchronizer circuit or synchronizer circuit 500) provides for data to flow from network 502 to network 504. Network may be any of the networks discussed herein, for example, circuit switched network, e.g., as in FIG. 75A. A component of first tile in a first domain may be coupled to a component of a second tile in a second domain, e.g., via synchronizer circuit 500. Component may be a processing element, for example, any processing element as discussed herein, e.g., processing element 4700 in FIG. 47. In one embodiment, a first tile is in a first power domain and/or clock (e.g., frequency) domain and a second tile is in a second power domain and/or clock (e.g., frequency) domain. First tile (e.g., a processing element thereof) may be configured (e.g., programmed) to send data to a second tile (e.g., a processing element thereof).

As discussed below, programs, viewed as dataflow graphs, may be mapped onto the architecture by configuring PEs and the network. Generally, PEs may be configured as dataflow operators, and once all input operands arrive at the PE, some operation may then occur, and the result are forwarded to the desired downstream PEs. PEs may communicate over dedicated virtual circuits which are formed by statically configuring a circuit-switched communications network. For example, a first processing element of a first tile may use first network 502 to send its data (e.g., output) through synchronizer circuit 500 to a second processing element of a second tile via second network 504. During configuration (e.g., by a compiler of the network and/or PEs) knowledge of a domain crossing (from a first to a second power domain and/or clock (e.g., frequency) domain) may lead to the determination (e.g., by the compiler) to use one or more synchronizer circuits. Network 502 (e.g., shown as an example with four channels (e.g., of a circuit switched network or networks)) may output data (e.g., received from a PE) to synchronizer circuit 500, for example, in one of (e.g., input) buffers (e.g., registers) 510, 512, 514, 516). Although four input buffers, and their respective channels, are shown, a single or any plurality of buffers and/or channels may be utilized in certain embodiments. For example, first processing element of a first tile (e.g., as in 4) may use first network 502 to send data to a buffer of synchronizer circuit, e.g., based on a circuit-switched network being set to have the synchronizer circuit (e.g., buffer thereof) as the destination for that data. In one embodiment, the data may be the output from a processing element according to (e.g., as a node of) a dataflow graph. For example, data may be the output of a pick operator or other operator discussed herein. Control data (e.g., memory dependency token and/or flow control data) may be received, e.g., in control input buffer 508. For example, the data to be transmitted (e.g., in a single transaction) between network 502 and network 504 may include data from a plurality of buffers (e.g., buffers 510, 512, 514, 516). When the data is ready (e.g., arrives in all of the buffers that will be utilized), e.g., based on a control value or values) in control input buffer 508, scheduler 501 may then schedule that data for transmittal to network 504, and particularly, corresponding buffers of the (e.g., output) buffers (520, 522, 524, 526). Although four output buffers, and their respective channels, are shown, a single or any plurality of buffers and/or channels may be utilized in certain embodiments. Different registers may have different data widths, e.g., storage capacities.

Scheduler 501 may schedule a domain crossing operation or operations, for example, when input data and control input arrives. Scheduler 501 may be configured (e.g., programmed) during or separate from the configuration (e.g., programming) of a dataflow graph into a spatial array (e.g., the network and/or PEs thereof). Data may be any data discussed herein.

Optionally, synchronizer circuit may include a privilege value (e.g., to store a configuration value) to turn off and on the cross-domain (e.g., cross-tile) connections, for example, so an operating system (OS) (e.g., executing on a processor) (e.g., a driver of an OS) and/or compiler may turn off/on the crossing (e.g., for security reasons, such as, but not limited to, if tiles are used for different processes). In one embodiment, privilege value is a zero to turn off the cross-domain (e.g., cross-tile) connections, and a non-zero value (e.g., a binary one) to turn on the cross-domain (e.g., cross-tile) connections. Privilege value may be the signal used to indicate the beginning of privilege configuration and to indicate to indicate the synchronizer circuit components that they should accept incoming values according to the configuration microprotocol. Privilege value may be set by sending privilege value data on network 502 to privilege register 506, e.g., during configuration and not run-time of PEs. In one embodiment, the privilege value also includes the values and functionality discussed in reference to the CFG_START signal used in a (e.g., base) protocol, e.g., as discussed below. Particularly, one or more (e.g., each) input buffer (510, 512, 514, 516) and/or output buffer (520, 522, 524, 526) include a respective AND gate (540, 542, 544, 546) therebetween. The flow of data may thus be stopped when the privilege value is set to zero, e.g., such that the output of the AND gates (540, 542, 544, 546) will thus be zero.

Synchronizer circuit may include multiple stages to move data between the tiles, e.g., as might be utilized in the case that the tiles were separated by a significant physical distance. Larger buffers (e.g., in comparison to a PE) may be utilized to achieve full bandwidth in the face of such latency. Crossing elements (e.g., synchronizer circuits) may be enabled via a privileged configuration mode. In FIG. 5, the privilege configuration register is used to enable the inter-tile communications signaling, e.g., to ensure that tiles assigned to different processes cannot communicate and/or ensure that unrelated processes cannot snoop each other's data.

Optionally, one or more (e.g., each) metastability buffers (530, 532, 534, 536) may be included between input buffers (510, 512, 514, 516) and/or output buffers (520, 522, 524, 526), e.g., shown disposed before respective AND gates (540, 542, 544, 546). Metastability buffers (530, 532, 534, 536) may store (e.g., a single item in each of) the data from input buffers (510, 512, 514, 516). Scheduler 501 may cause that data in metastability buffers (530, 532, 534, 536) to be converted from first power domain and/or clock (e.g., frequency) domain to a second power domain and/or clock (e.g., frequency) domain to generate converted data. That converted data may then be stored (e.g., sent) in an entry of (e.g., one item of data in each of) output buffers (520, 522, 524, 526), for example, to then traverse to the target (e.g., destination) component in that second domain, e.g., the second processing element as the target as discussed above. Note that the voltage/frequency domain crossing is shown with a dotted line merely as an example and this disclosure is not so limited.

Full/empty register 503 may be utilized to store flow control, e.g., queue flow control. This flow control may utilize executing grey code to coordinate across (e.g., based on sensor data from each domain) a clock/frequency domain. In certain embodiments herein, dataflow control and back pressure cross these domains.

Figure 6:
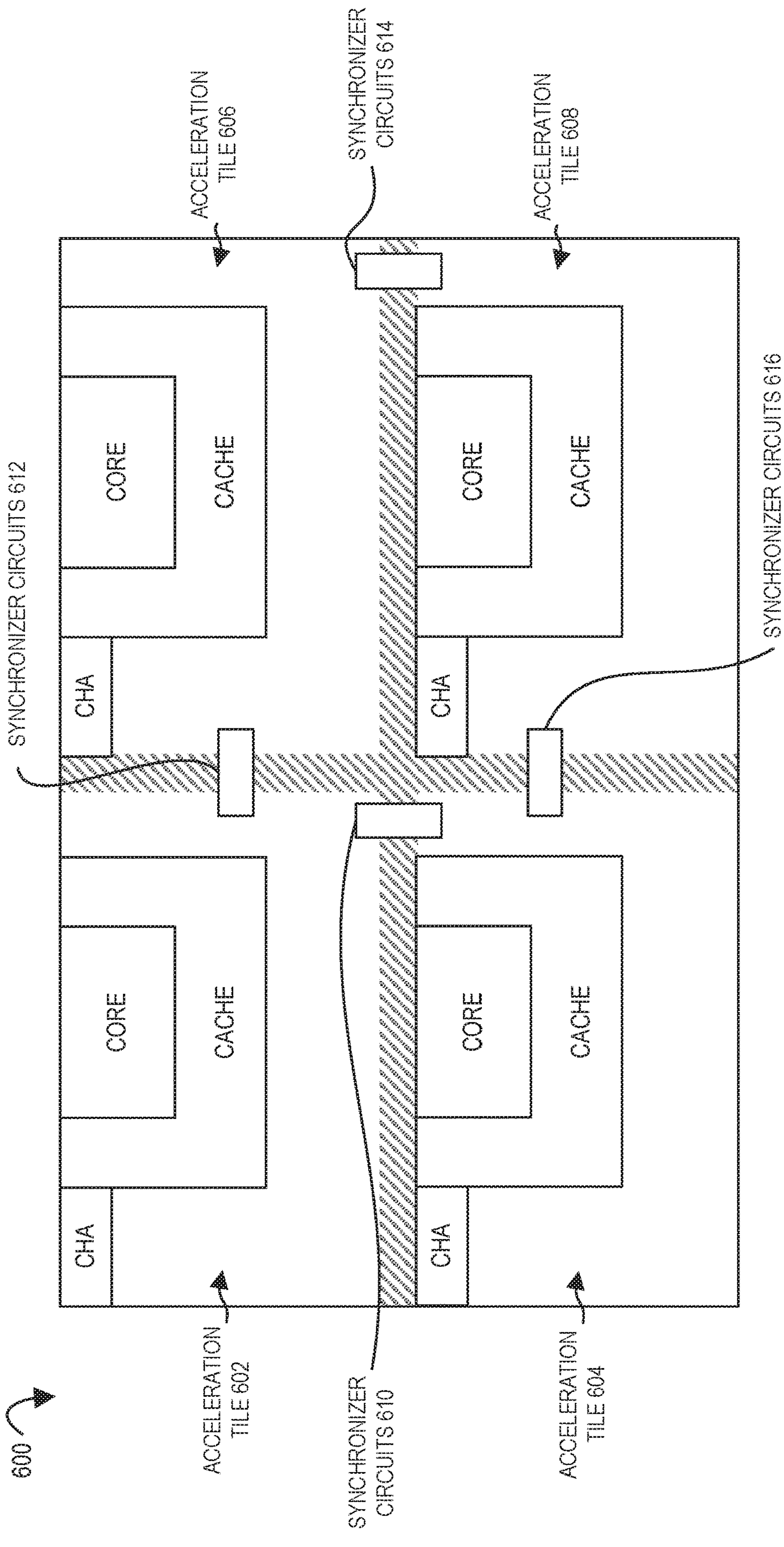
FIG. 6 illustrates a processor with a plurality of sets of synchronizer circuits coupled between a first accelerator tile in a first domain, a second accelerator tile in a second domain, a third accelerator tile in a third domain, and a fourth accelerator tile in a fourth domain according to embodiments of the disclosure.

FIG. 6 illustrates a processor 600 with a plurality of sets of synchronizer circuits (610, 612, 614, 616) coupled between a first accelerator tile 602 in a first domain, a second accelerator tile 604 in a second domain, a third accelerator tile 606 in a third domain, and a fourth accelerator tile 608 in a fourth domain according to embodiments of the disclosure. Each set of synchronizer circuits may include one or a plurality of synchronizer circuit 500 in FIG. 5. Each set of synchronizer circuits may include a subset of synchronizer circuits for (e.g., one-way) communication from a tile to another tile and/or a subset of synchronizer circuits for (e.g., one-way) communication from that another tile to the tile. Accelerator tile (e.g., according to any disclosure herein) may be coupled to a processor core and/or cache (e.g., an cache home agent (CHA)), e.g., as discussed herein. A cache home agent (CHA) may serve as the local coherence and cache controller (e.g., caching agent) and/or also serves as the global coherence and memory controller interface (e.g., home agent).

First set of synchronizer circuits 610 is depicted as coupled between first accelerator tile 602 in a first domain a second accelerator tile 604 in a second domain, e.g., to synchronize data between those domains. Second set of synchronizer circuits 612 is depicted as coupled between first accelerator tile 602 in a first domain and third accelerator tile 606 in a third domain, e.g., to synchronize data between those domains. Third set of synchronizer circuits 614 is depicted as coupled between third accelerator tile 606 in a third domain and fourth accelerator tile 608 in a fourth domain, e.g., to synchronize data between those domains. Fourth set of synchronizer circuits 616 is depicted as coupled between second accelerator tile 604 in a second domain and fourth accelerator tile 608 in a fourth domain, e.g., to synchronize data between those domains. All four accelerator tiles may thus be joined to form a single spatial array (e.g., fabric). In certain embodiments, a synchronizer circuit or synchronizer circuits may provide for dataflow (e.g., in one or both directions) between two tiles, dataflow (e.g., in one or both directions) between more than two tiles (e.g., 3, 4, 5, 6, 7, 8 tiles, etc.), for example, through another tile(s) (e.g., dataflow from tile 602 to tile 608 through tile 604 or tile 606) and/or dataflow (e.g., in one or both directions) from one tile to more than one other tile (e.g., dataflow from tile 602 to tile 604 and to tile 606.

Figure 7:
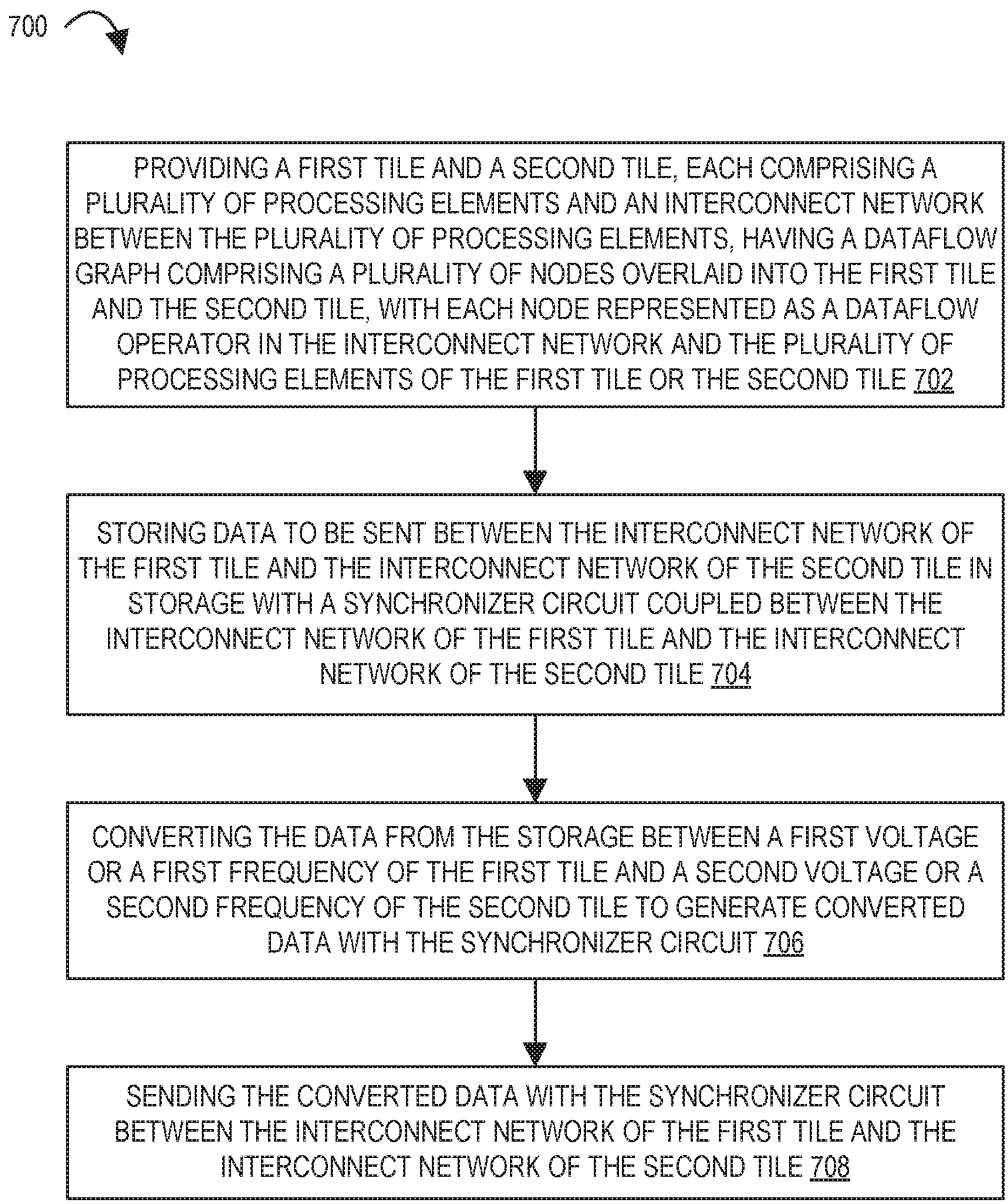
FIG. 7 illustrates a flow diagram according to embodiments of the disclosure.

FIG. 7 illustrates a flow diagram 700 according to embodiments of the disclosure. Depicted flow 700 includes providing a first tile and a second tile, each comprising a plurality of processing elements and an interconnect network between the plurality of processing elements, having a dataflow graph comprising a plurality of nodes overlaid into the first tile and the second tile, with each node represented as a dataflow operator in the interconnect network and the plurality of processing elements of the first tile or the second tile 702; storing data to be sent between the interconnect network of the first tile and the interconnect network of the second tile in storage with a synchronizer circuit coupled between the interconnect network of the first tile and the interconnect network of the second tile 704; converting the data from the storage between a first voltage or a first frequency of the first tile and a second voltage or a second frequency of the second tile to generate converted data with the synchronizer circuit; 706 and sending the converted data with the synchronizer circuit between the interconnect network of the first tile and the interconnect network of the second tile 708.

Figure 8:
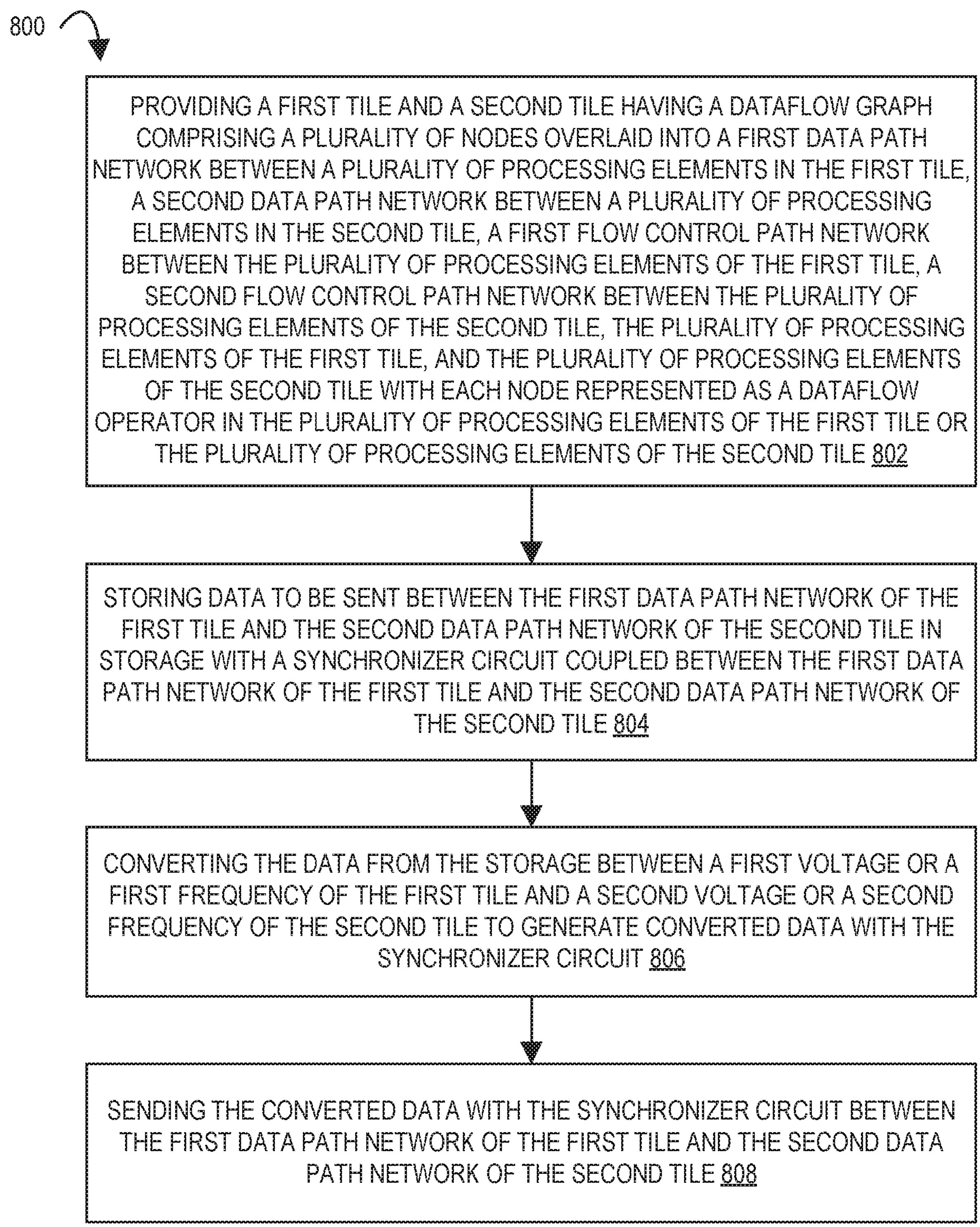
FIG. 8 illustrates a flow diagram according to embodiments of the disclosure.

FIG. 8 illustrates a flow diagram 800 according to embodiments of the disclosure. Depicted flow 800 includes providing a first tile and a second tile having a dataflow graph comprising a plurality of nodes overlaid into a first data path network between a plurality of processing elements in the first tile, a second data path network between a plurality of processing elements in the second tile, a first flow control path network between the plurality of processing elements of the first tile, a second flow control path network between the plurality of processing elements of the second tile, the plurality of processing elements of the first tile, and the plurality of processing elements of the second tile with each node represented as a dataflow operator in the plurality of processing elements of the first tile or the plurality of processing elements of the second tile 802; storing data to be sent between the first data path network of the first tile and the second data path network of the second tile in storage with a synchronizer circuit coupled between the first data path network of the first tile and the second data path network of the second tile 804; converting the data from the storage between a first voltage or a first frequency of the first tile and a second voltage or a second frequency of the second tile to generate converted data with the synchronizer circuit 806; and sending the converted data with the synchronizer circuit between the first data path network of the first tile and the second data path network of the second tile 808.

Figure 9:
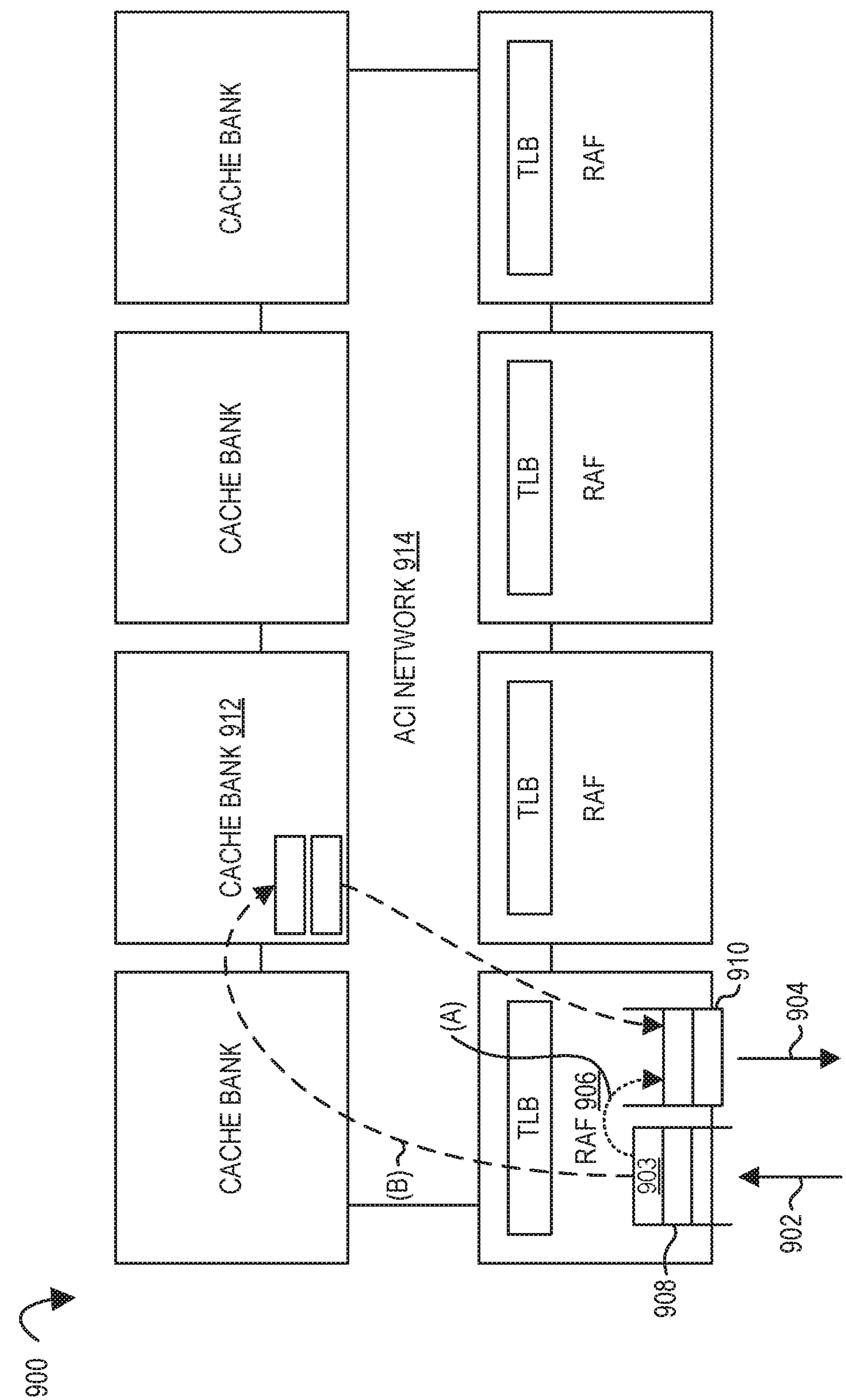
FIG. 9 illustrates the logical operation of a memory backed extended buffer (e.g., queue) in the context of a spatial array memory subsystem according to embodiments of the disclosure.
Figure 10:
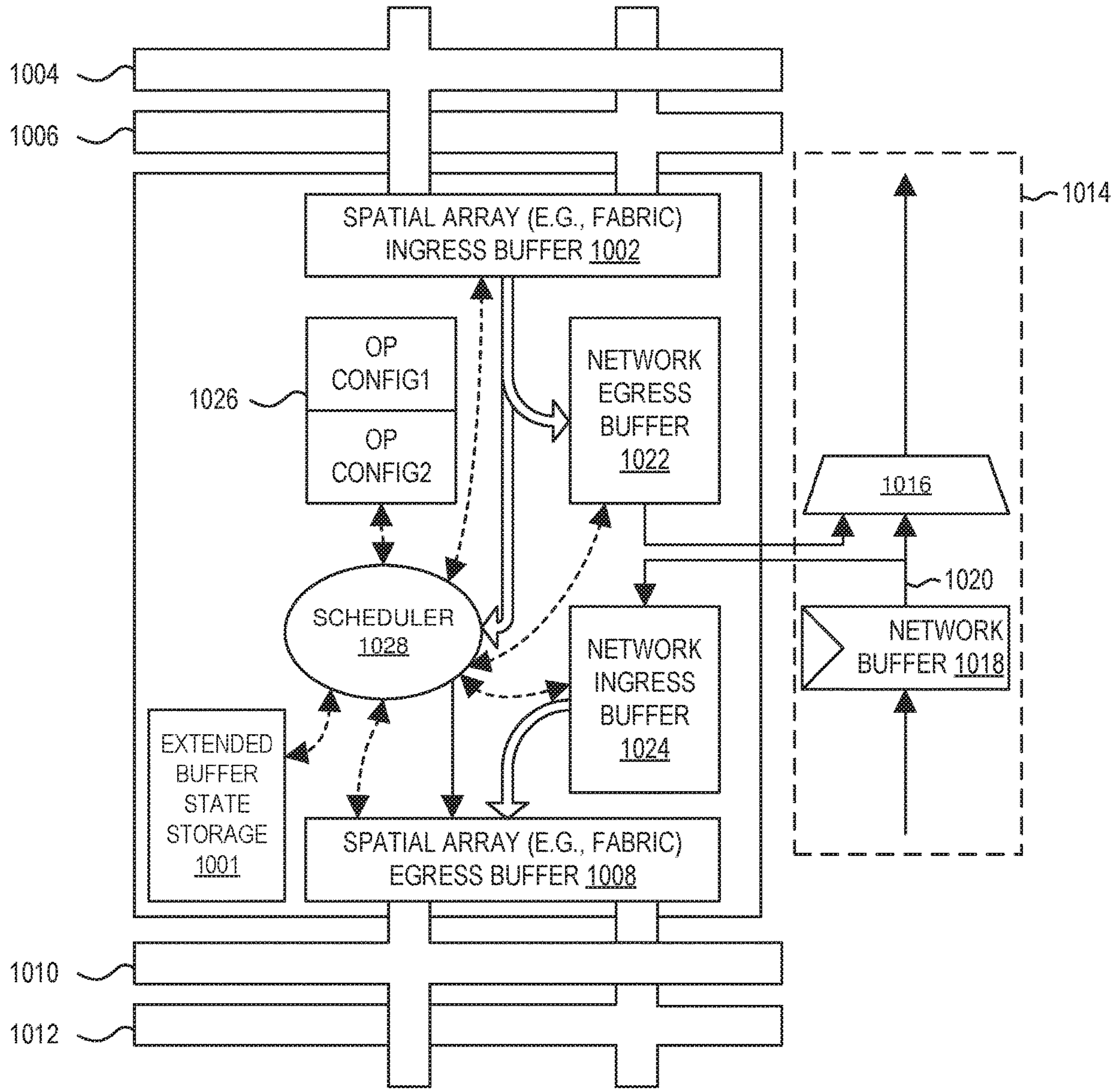
FIG. 10 illustrates a network dataflow endpoint circuit including extended buffer functionality according to embodiments of the disclosure.
Figure 11:
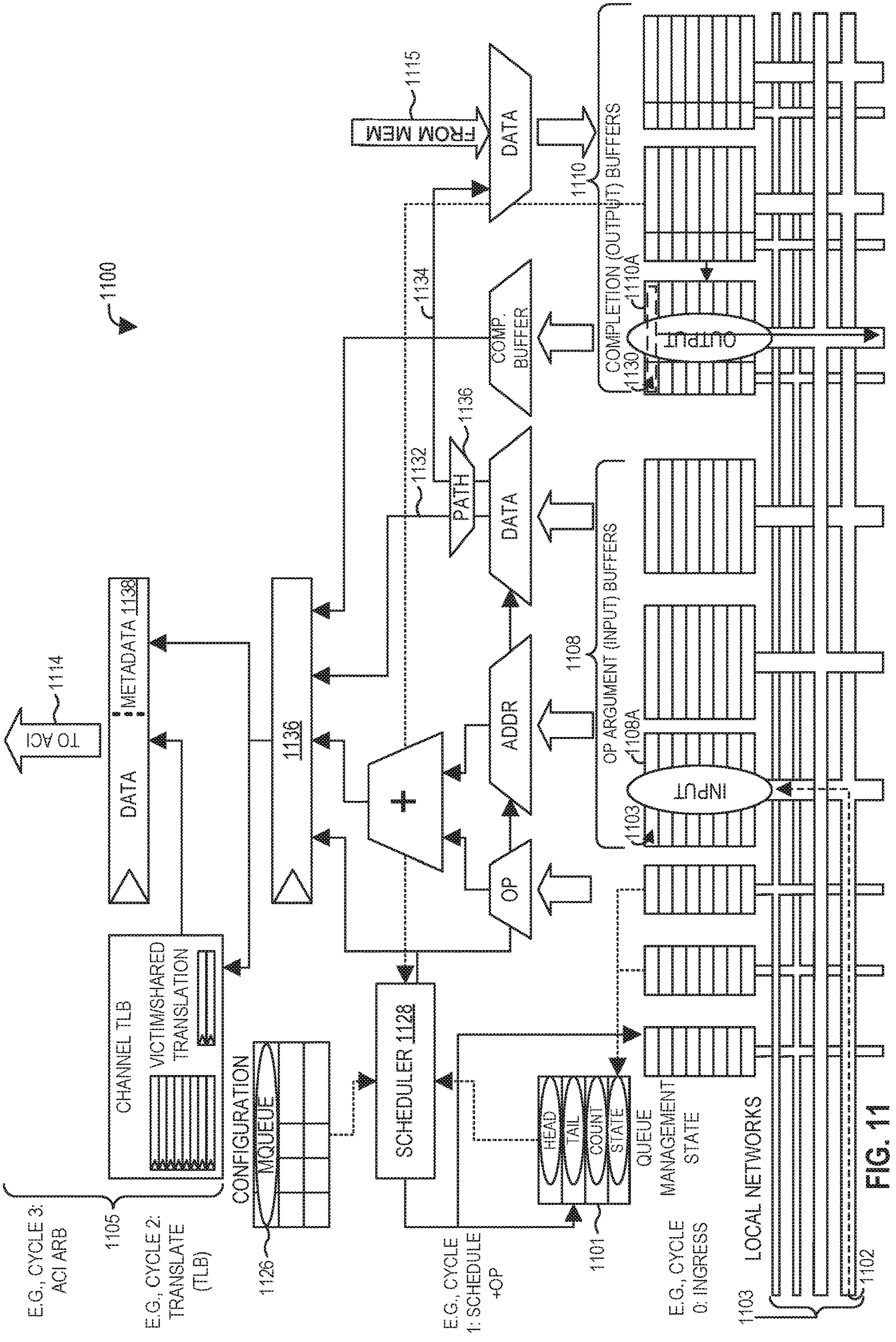
FIG. 11 illustrates a spatial array element that includes extended buffer functionality according to embodiments of the disclosure.

Turning now to FIGS. 9-11, embodiments of extending (e.g., unbounded) queues are disclosed. In various embodiments herein, an element (e.g., of a spatial array) includes one or more buffers, for example, the buffers of a processing element and/or the buffers of a network dataflow endpoint circuit. Certain embodiments herein provide for an extension of buffer space (e.g., registers of a component), e.g., to store data into (e.g., separate) memory as needed (e.g., when buffers are full). Certain embodiments herein extend buffer space to prevent a stall of an executing program (e.g., dataflow graph). Certain embodiments herein prevent or lessen the occurrence of a deadlock in a dataflow graph, e.g., where there is not knowledge (e.g., by a compiler) beforehand of the size of the buffers (e.g., statically).

A spatial array may supply some form of storage within the spatial array (e.g., fabric). These storage elements may provide some useful modes such as buffer mode (e.g., first in first out (FIFO) or queue mode), which may be used in addition to basic modes such as RAM or ROM. However, certain implementations tie the structure size (e.g., of a buffer) to the physical size of the underlying hardware storage (e.g., registers or other hardware). Certain embodiments herein provide for the backing of such fixed-size in-fabric storage with a direct interface to the backing memory hierarchy. Embodiments of such an architecture and microarchitecture provide a useful abstraction in the mapping of dataflow graphs to bounded-buffer microarchitectures. Certain embodiments herein provide hardware to support an extended (e.g., elastic) buffer configuration (e.g., state) into the certain in-fabric blocks of a spatial array and hardware interfaces to support the backing of this buffer by the system memory hierarchy. This configuration may enable a programmer or compiler to specify that the particular buffer (e.g., queue) is backed by memory, e.g., giving that queue a larger capacity. Hardware may manage the buffer (e.g., queue) in such a way that the data spillover (e.g., exceeding the physical underlying storage of a buffer) and fills to memory.

Coarse-grained spatial architectures, such as the one shown in FIG. 1, may be the composition of light-weight processing elements connected by an inter-PE network. Programs, viewed as control-dataflow graphs, may be mapped onto the architecture by configuring PEs and the network. Generally, PEs may be configured as dataflow operators, e.g., where once all input operands arrive at the PE, some operation occurs, and results are forwarded to downstream PEs in a pipelined fashion. Dataflow operators may choose to consume incoming data on a per-operator basis. Some operators, like those handling the unconditional evaluation of arithmetic expressions often consume all incoming data. However, it is sometimes useful for operators to maintain state, for example, in accumulation. PEs may communicate using dedicated virtual circuits which are formed by statically configuring a circuit-switched communications network. These virtual circuits may be flow controlled and fully back-pressured, e.g., such that PEs will stall if either the source has no data or destination is full. At runtime, data may flow through the PEs implementing the mapped dataflow graph. For example, data may be streamed in from memory, through the fabric, and then back out to memory.

Such an architecture may achieve remarkable performance efficiency, e.g., relative to traditional multicore processors, when executing dataflow graphs: compute, in the form of PEs, may be simpler and more numerous than larger cores and communications may be direct, as opposed to an extension of the memory system. In certain embodiments, buffering plays a key role in both improving the performance most dataflow graphs and in the correctness of a (e.g., small) subset of dataflow graphs. Certain embodiments herein provide a failsafe mechanism, e.g., ensuring correctness and, in some cases, improving performance in dataflow graphs by supplying larger (virtual) buffers. Certain embodiments herein provide direct support for backing buffers with virtual memory, for example, without providing a buffer explicitly in software, e.g., consuming gates in a FPGA and PEs in the CSA. These software solutions may introduce significant overhead in terms of area, throughput, latency, and energy. To maximize these critical metrics, a hardware solution may be desired. Certain embodiments herein ensure the correctness and performance of dataflow graphs with statically undecidable buffering requirements.

FIG. 9 illustrates the logical operation of a memory backed extended buffer 901 (e.g., queue) in the context of a spatial array memory subsystem 900 according to embodiments of the disclosure. A buffer of a component (e.g., a processing element) may have no further storage space (e.g., full), for example, a buffer or processing element 4600 in FIG. 46 or a buffer of network endpoint circuit 10 in FIG. 10. In one embodiment, when that element (e.g., PE or network endpoint circuit) receives additional data 902 that it does not have storage space for (e.g., in input buffer 908), it may make room for that data 902 by sending other data 903 already in the storage space (e.g., input buffer) and a request to utilize extended buffer storage space for that other data 903, e.g., and then store data 902 when (e.g., now) that there is available space (e.g., in input buffer 908). A memory interface circuit (e.g., request address file (RAF) circuit 906) may send the data 903 for storage (for example, and the request to utilized extended buffer storage, e.g., as metadata with the payload data). In one embodiment, the memory interface circuit stores that data 903 in its output buffers (e.g., registers). In another embodiment, the memory interface circuit stores that data 903 externally from its buffers (e.g., registers), for example, storing that data in cache memory. In FIG. 9, request address file (RAF) circuit 906 receives data 902 in full input buffer 908 and then makes room for data 902 by moving (e.g., equally or great sized) data 903 from input buffer 908, and then may store data 902 within input buffer(s) 908 (e.g., registers) within the RAF circuit 906. In one embodiment, RAF circuit 906 stores data 903 within output buffer(s) 910 (e.g., registers) within the RAF circuit 906, e.g., as designated as (direct) path A. In one embodiment (for example, when input buffer(s) 908 and/or output buffers 910 of RAF circuit 906 are full or being otherwise utilized), RAF circuit 906 stores data 903 in external memory from RAF circuit 906 (for example, in a cache bank, e.g., depicted as cache bank 912), e.g., as designated as path B. RAF circuit 906 may send and/or receive data with the cache (e.g., cache bank 912) through a (e.g., packet-switched) network, e.g., Accelerator Cache Interface (ACI) network 914 (described in more detail in Section 3.4). Although one items (e.g., cache line) is depicted as being stored in cache bank 912, a single data item (e.g., cache line) or plurality of data items (e.g., cache lines) may be sent and/or stored (e.g., in one transaction). On request for the stored data item (e.g., from the element (e.g., PE or network endpoint circuit) that sent that data 903) and/or when storage space is available in (e.g., input buffer of) RAF circuit 906, the RAF circuit 906 may pull that item of data 903 back, e.g., into its (not-full) input buffer 908 or output buffer 910. In one embodiment, RAF circuit 906 loads data 903 directly (e.g., without using the cache and/or network connection to the cache) back into input buffers 908 (e.g., in correct order from where it was previously stored in input buffer) from output buffers 910 of RAF circuit 906. In one embodiment, RAF circuit 906 causes the load of data 903 back into input buffers 908 from cache bank 912 itself (or into output buffers 910 of RAF circuit 906 and then into input buffers 908).

In one embodiment, RAF circuit 906 pulls data 903 directly (e.g., without using the cache and/or network connection to the cache) from output buffers 910 of RAF circuit 906, e.g., and then the data 903 is sent 904 to requestor (for example, on a circuit-switched network, e.g., as discussed herein). In one embodiment, RAF circuit 906 causes the pull of data 903 from cache bank 912 into output buffers 910 of RAF circuit 906, and then data 903 is sent 904 to requestor (for example, on a circuit-switched network, e.g., as discussed herein). In one embodiment, a memory interface circuit (e.g., request address file RAF circuit 906) may service requests for data from a memory (e.g., from cache banks), e.g., additionally or alternatively to having extended queue functionality.

In certain embodiments, an extended buffer (e.g., queue) construct is an interface to backing storage, e.g., an extension to spatial array (e.g., fabric)—memory interface components. FIG. 9 shows one implementation of an extended buffer. Here, the buffer (e.g., queue) storage may be split between an existing buffer in the memory interface block and the (e.g., virtual) memory (e.g., cache), for example, with the local storage providing fast local buffering and low-latency operation when the buffer (e.g., queue) is lightly utilized and the virtual memory interface providing extra depth. When the local storage is fully utilized, some (e.g., already queued) queue values may be sent to the backing virtual memory store. As the local storage drains, these values may be pulled back in to the spatial array (e.g., fabric) for use in a dataflow graph. Both of these operations may cause the creation of memory transactions. Certain embodiments herein introduce new state elements and control circuitry to manage these operations. Turning now to FIGS. 10-11, FIG. 10 discusses an embodiment of a network dataflow endpoint circuit including extended queue functionality. FIG. 11 discusses an embodiment of extended queue functionality, for example, to be utilized with a processing element and/or a network dataflow endpoint circuit (e.g., as discussed further below).

FIG. 10 illustrates a network dataflow endpoint circuit 1000 including extended buffer functionality according to embodiments of the disclosure. Particularly, network dataflow endpoint circuit 1000 includes a state (e.g., for scheduler 528), for example, to store data in extended buffer state storage 1001, that (e.g., when set) causes data from one or more of the depicted buffers in FIG. 10 (e.g., when full) to be sent to one or more of the depicted buffers in FIG. 10 to storage external from that network dataflow endpoint circuit 1000, e.g., to make room for the new data in the buffer that was previously full. In one embodiment, e.g., when a buffer is full (e.g., instead of back pressuring that data channel), network dataflow endpoint circuit 1000 may make room for that data (e.g., data item 902 in FIG. 9) by causing buffered data (e.g., data item 903 in FIG. 9) to be sent to external storage (e.g., output buffer 910 or cache bank 912 in FIG. 9). A further description of the functionality of network circuit 1000 may be ascertained by reading the below discussion.

As one example, spatial array (e.g., fabric) ingress buffer 1002 (e.g., part of buffer connected to network 1006 channel) may be full. In one embodiment, e.g., instead of sending that data back to its sender or stalling that sender, a data item is instead sent for (e.g., external) storage by a memory interface circuit, for example, to spatial array (e.g., fabric) egress buffer 1008 or to memory external to circuit 1000. When spatial array (e.g., fabric) ingress buffer 1002 (e.g., part of buffer connected to network 1006 channel) is not full, it may then request that item, e.g., based on a backpressure signal from spatial array (e.g., fabric) ingress buffer 1002 indicating available space from the external storage, e.g., via RAF 906 in FIG. 9. In one embodiment, a buffer or buffers of a component (e.g., a processing element or network dataflow endpoint circuit) may be configured (e.g., programmed) to allow the extended buffer functionality or not, e.g., via setting a value in extended buffer state storage 1001 accordingly. In one embodiment, the data (e.g., and any metadata) may be sent via any network, for example, network 1014 in FIG. 10, e.g., a packet-switched network. In one embodiment, network dataflow endpoint circuit 1000 reloads that data directly (e.g., without using the cache and/or network connection to the cache) back into spatial array (e.g., fabric) ingress buffer 1002 (e.g., in correct order from where it was previously stored in input buffer) from spatial array (e.g., fabric) egress buffer 1008. In one embodiment, network dataflow endpoint circuit 1000 causes the load of data back into spatial array (e.g., fabric) ingress buffer 1002 from memory itself (or into buffer 1008, 1022, or 1024 and then into spatial array (e.g., fabric) ingress buffer 1002). Although discussed for spatial array ingress buffer 1002, any buffer may utilize the extended buffer functionality.

Microarchitectural extensions may support extended buffers (e.g., queues). For example, FIG. 10 shows such an extension in the context of memory network interface block (e.g., network dataflow endpoint circuit 1000). A new extended buffer (e.g., queue) configuration (e.g., state) may express the extended buffer (e.g., queue) to any fabric block supporting a buffer interface. This configuration may bind block (e.g., PE or network dataflow endpoint circuit) resources such as input and output buffers and a queue management resource to form an extended buffer (e.g., queue). Block control circuitry (e.g., within a scheduler) may be expanded to control and schedule extended buffer (e.g., queue) operations. For example, when the control circuitry detects that local buffer (e.g., storage) is full, it will produce a store of the incoming data to be stored external and/or it will produce a load when that local buffer is not full (e.g., has an available slot for that data) to load that data into the local buffer from the storage external. The control circuit may also steer incoming values to the local buffer (e.g., queue) storage or memory as appropriate to maintain the buffer (e.g., queue) ordering, e.g., it will keep data in the order it was originally received by the component, e.g., regardless of if the external storage was utilized. In certain embodiments, storing portions of the hardware buffer to virtual memory (e.g., a cache) includes (e.g., the control circuitry) maintaining metadata about the state of the in-memory queue. In one embodiment, store the in-memory extended buffer (e.g., queue) in a ring-buffer style. This may include the maintenance of a buffer (e.g., queue) virtual base address, the size of the buffer (e.g., queue) and head and tail offsets (e.g., pointers) relative to the buffer (e.g., queue). Certain embodiments herein provision multiple sets of this metadata per fabric block (e.g., PE or network dataflow endpoint circuit).

Overflowing Allocated Extended Space:

In certain embodiment, the secondary storage (e.g., cache) used to back the (e.g., virtual) extended buffers may also overflow. Detection of fullness may include monitoring if the virtual memory queue (e.g., cache) is full. In the case that the virtual memory queue (e.g., cache) is full, the fabric block (e.g., PE or network dataflow endpoint circuit) may trigger an interrupt (e.g., by writing to a control register) for assistance. At this point, the block (e.g., PE or network dataflow endpoint circuit) may (e.g., gracefully) stall. New memory may be allocated (e.g., by software), copy the old queue state to the new memory space, and then update the fabric block with metadata reflecting the state of the new in-memory store.

Composition with Other Fabric Primitives:

Spatial fabrics may provide many forms of storage. A FPGA may provide in-fabric SRAM. Such buffering structures may also include extended buffer (e.g., queue) support to form extended buffer (e.g., queue) with deeper in-fabric buffering. This capability may be used to tune the extended buffer (e.g., queue) for expected-case utilization.

Other Spatial Architectures:

Generally, spatial architectures, including FPGAs, may have finite in-fabric storage. Thus, extended buffer (e.g., queue) functionality may be provided to any such spatial architecture as a beneficial abstraction. Such architectures may opt for embodiments of a hardened solution (e.g., as discussed above), or could implement the queues as a soft-configuration in their fabric.

FIG. 10 illustrates a network dataflow endpoint circuit 1000 according to embodiments of the disclosure. Although multiple components are illustrated in network dataflow endpoint circuit 1000, one or more instances of each component may be utilized in a single network dataflow endpoint circuit. An embodiment of a network dataflow endpoint circuit may include any (e.g., not all) of the components in FIG. 10.

FIG. 10 depicts the microarchitecture of a (e.g., mezzanine) network interface showing embodiments of main data (solid line) and control data (dotted) paths. This microarchitecture provides a configuration storage and scheduler to enable (e.g., high-radix) dataflow operators. Certain embodiments herein include data paths to the scheduler to enable leg selection and description. FIG. 10 shows a high-level microarchitecture of a network (e.g., mezzanine) endpoint (e.g., stop), which may be a member of a ring network for context. To support (e.g., high-radix) dataflow operations, the configuration of the endpoint (e.g., operation configuration storage 1026) to include configurations that examine multiple network (e.g., virtual) channels (e.g., as opposed to single virtual channels in a baseline implementation). Certain embodiments of network dataflow endpoint circuit 1000 include data paths from ingress and to egress to control the selection of (e.g., pick and switch types of operations), and/or to describe the choice made by the scheduler in the case of PickAny dataflow operators or SwitchAny dataflow operators. Flow control and backpressure behavior may be utilized in each communication channel, e.g., in a (e.g., packet switched communications) network and (e.g., circuit switched) network (e.g., fabric of a spatial array of processing elements).

As one description of an embodiment of the microarchitecture, a pick dataflow operator may function to pick one output of resultant data from a plurality of inputs of input data, e.g., based on control data. A network dataflow endpoint circuit 1000 may be configured to consider one of the spatial array ingress buffer(s) 1002 of the circuit 1000 (e.g., data from the fabric being control data) as selecting among multiple input data elements stored in network ingress buffer(s) 1024 of the circuit 1000 to steer the resultant data to the spatial array egress buffer 1008 of the circuit 1000. Thus, the network ingress buffer(s) 1024 may be thought of as inputs to a virtual mux, the spatial array ingress buffer 1002 as the multiplexer select, and the spatial array egress buffer 1008 as the multiplexer output. In one embodiment, when a (e.g., control data) value is detected and/or arrives in the spatial array ingress buffer 1002, the scheduler 1028 (e.g., as programmed by an operation configuration in storage 1026) is sensitized to examine the corresponding network ingress channel. When data is available in that channel, it is removed from the network ingress buffer 1024 and moved to the spatial array egress buffer 1008. The control bits of both ingresses and egress may then be updated to reflect the transfer of data. This may result in control flow tokens or credits being propagated in the associated network.

Initially, it may seem that the use of packet switched networks to implement the (e.g., high-radix staging) operators of multiplexed and/or demultiplexed codes hampers performance. For example, in one embodiment, a packet-switched network is generally shared and the caller and callee dataflow graphs may be distant from one another. Recall, however, that in certain embodiments, the intention of supporting multiplexing and/or demultiplexing is to reduce the area consumed by infrequent code paths within a dataflow operator (e.g., by the spatial array). Thus, certain embodiments herein reduce area and avoid the consumption of more expensive fabric resources, for example, like PEs, e.g., without (substantially) affecting the area and efficiency of individual PEs to supporting those (e.g., infrequent) operations.

Turning now to further detail of FIG. 10, depicted network dataflow endpoint circuit 1000 includes a spatial array (e.g., fabric) ingress buffer 1002, for example, to input data (e.g., control data) from a (e.g., circuit switched) network. As noted above, although a single spatial array (e.g., fabric) ingress buffer 1002 is depicted, a plurality of spatial array (e.g., fabric) ingress buffers may be in a network dataflow endpoint circuit. In one embodiment, spatial array (e.g., fabric) ingress buffer 1002 is to receive data (e.g., control data) from a communications network of a spatial array (e.g., a spatial array of processing elements), for example, from one or more of network 1004 and network 1006. In one embodiment, network 1004 is part of network 2413 in FIG. 24.

Depicted network dataflow endpoint circuit 1000 includes a spatial array (e.g., fabric) egress buffer 1008, for example, to output data (e.g., control data) to a (e.g., circuit switched) network. As noted above, although a single spatial array (e.g., fabric) egress buffer 1008 is depicted, a plurality of spatial array (e.g., fabric) egress buffers may be in a network dataflow endpoint circuit. In one embodiment, spatial array (e.g., fabric) egress buffer 1008 is to send (e.g., transmit) data (e.g., control data) onto a communications network of a spatial array (e.g., a spatial array of processing elements), for example, onto one or more of network 1010 and network 1012. In one embodiment, network 1010 is part of network 2413 in FIG. 24.

Additionally or alternatively, network dataflow endpoint circuit 1000 may be coupled to another network 1014, e.g., a packet switched network. Another network 1014, e.g., a packet switched network, may be used to transmit (e.g., send or receive) (e.g., input and/or resultant) data to processing elements or other components of a spatial array and/or to transmit one or more of input data or resultant data. In one embodiment, network 1014 is part of the packet switched communications network 2414 in FIG. 24, e.g., a time multiplexed network.

Network buffer 1018 (e.g., register(s)) may be a stop on (e.g., ring) network 1014, for example, to receive data from network 1014.

Depicted network dataflow endpoint circuit 1000 includes a network egress buffer 1022, for example, to output data (e.g., resultant data) to a (e.g., packet switched) network. As noted above, although a single network egress buffer 1022 is depicted, a plurality of network egress buffers may be in a network dataflow endpoint circuit. In one embodiment, network egress buffer 1022 is to send (e.g., transmit) data (e.g., resultant data) onto a communications network of a spatial array (e.g., a spatial array of processing elements), for example, onto network [1014. In one embodiment, network 1014 is part of packet switched network 2414 in FIG. 24. In certain embodiments, network egress buffer 1022 is to output data (e.g., from spatial array ingress buffer 1002) to (e.g., packet switched) network 1014, for example, to be routed (e.g., steered) to other components (e.g., other network dataflow endpoint circuit(s)).

Depicted network dataflow endpoint circuit 1000 includes a network ingress buffer 1022, for example, to input data (e.g., inputted data) from a (e.g., packet switched) network. As noted above, although a single network ingress buffer 1024 is depicted, a plurality of network ingress buffers may be in a network dataflow endpoint circuit. In one embodiment, network ingress buffer 1024 is to receive (e.g., transmit) data (e.g., input data) from a communications network of a spatial array (e.g., a spatial array of processing elements), for example, from network 1014. In one embodiment, network 1014 is part of packet switched network 2414 in FIG. 24. In certain embodiments, network ingress buffer 1024 is to input data (e.g., from spatial array ingress buffer 1002) from (e.g., packet switched) network 1014, for example, to be routed (e.g., steered) there (e.g., into spatial array egress buffer 1008) from other components (e.g., other network dataflow endpoint circuit(s)).

In one embodiment, the data format (e.g., of the data on network 1014) includes a packet having data and a header (e.g., with the destination of that data). In one embodiment, the data format (e.g., of the data on network 1004 and/or 1006) includes only the data (e.g., not a packet having data and a header (e.g., with the destination of that data)). Network dataflow endpoint circuit 1000 may add (e.g., data output from circuit 1000) or remove (e.g., data input into circuit 1000) a header (or other data) to or from a packet. Coupling 1020 (e.g., wire) may send data received from network 1014 (e.g., from network buffer 1018) to network ingress buffer 1024 and/or multiplexer 1016. Multiplexer 1016 may (e.g., via a control signal from the scheduler 1028) output data from network buffer 1018 or from network egress buffer 1022. In one embodiment, one or more of multiplexer 1016 or network buffer 1018 are separate components from network dataflow endpoint circuit 1000. A buffer may include a plurality of (e.g., discrete) entries, for example, a plurality of registers.

In one embodiment, operation configuration storage 1026 (e.g., register or registers) is loaded during configuration (e.g., mapping) and specifies the particular operation (or operations) this network dataflow endpoint circuit 1000 (e.g., not a processing element of a spatial array) is to perform (e.g., data steering operations in contrast to logic and/or arithmetic operations). Buffer(s) (e.g., 1002, 1008, 1022, and/or 1024) activity may be controlled by that operation (e.g., controlled by the scheduler 1028). Scheduler 1028 may schedule an operation or operations of network dataflow endpoint circuit 1000, for example, when (e.g., all) input (e.g., payload) data and/or control data arrives. Dotted lines to and from scheduler 1028 indicate paths that may be utilized for control data, e.g., to and/or from scheduler 1028. Scheduler may also control multiplexer 1016, e.g., to steer data to and/or from network dataflow endpoint circuit 1000 and network 1014.

Figure 24:
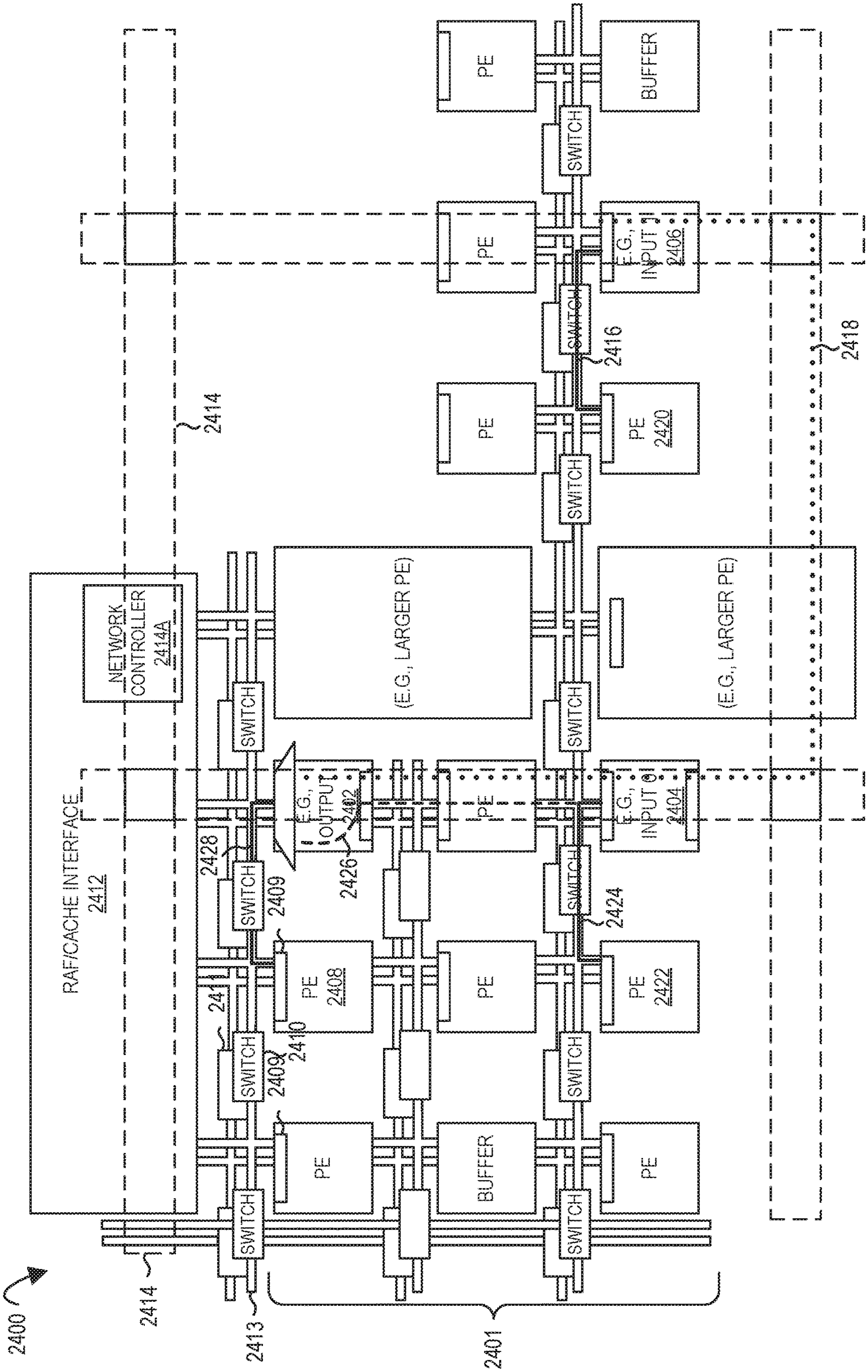
FIG. 24 illustrates a spatial array of processing elements with a plurality of network dataflow endpoint circuits according to embodiments of the disclosure.

In reference to the distributed pick operation in FIG. 24 above, network dataflow endpoint circuit 2402 may be configured (e.g., as an operation in its operation configuration register 1026 as in FIG. 10) to receive (e.g., in (two storage locations in) its network ingress buffer 1024 as in FIG. 10) input data from each of network dataflow endpoint circuit 2404 and network dataflow endpoint circuit 2406, and to output resultant data (e.g., from its spatial array egress buffer 1008 as in FIG. 10), for example, according to control data (e.g., in its spatial array ingress buffer 1002 as in FIG. 10). Network dataflow endpoint circuit 2404 may be configured (e.g., as an operation in its operation configuration register 1026 as in FIG. 10) to provide (e.g., send via circuit 2404's network egress buffer 1022 as in FIG. 10) input data to network dataflow endpoint circuit 2402, e.g., on receipt (e.g., in circuit 2404's spatial array ingress buffer 1002 as in FIG. 10) of the input data from processing element 2422. This may be referred to as Input 0 in FIG. 24. In one embodiment, circuit switched network is configured (e.g., programmed) to provide a dedicated communication line between processing element 2422 and network dataflow endpoint circuit 2404 along path 2424. Network dataflow endpoint circuit 2404 may include (e.g., add) a header packet with the received data (e.g., in its network egress buffer 1022 as in FIG. 10) to steer the packet (e.g., input data) to network dataflow endpoint circuit 2402. Network dataflow endpoint circuit 2406 may be configured (e.g., as an operation in its operation configuration register 1026 as in FIG. 10) to provide (e.g., send via circuit 2406's network egress buffer 1022 as in FIG. 10) input data to network dataflow endpoint circuit 2402, e.g., on receipt (e.g., in circuit 2406's spatial array ingress buffer 1002 as in FIG. 10) of the input data from processing element 2420. This may be referred to as Input 1 in FIG. 24. In one embodiment, circuit switched network is configured (e.g., programmed) to provide a dedicated communication line between processing element 2420 and network dataflow endpoint circuit 2406 along path 2416. Network dataflow endpoint circuit 2406 may include (e.g., add) a header packet with the received data (e.g., in its network egress buffer 1022 as in FIG. 10) to steer the packet (e.g., input data) to network dataflow endpoint circuit 2402.

When network dataflow endpoint circuit 2404 is to transmit input data to network dataflow endpoint circuit 2402 (e.g., when network dataflow endpoint circuit 2402 has available storage room for the data and/or network dataflow endpoint circuit 2404 has its input data), network dataflow endpoint circuit 2404 may generate a packet (e.g., including the input data and a header to steer that data to network dataflow endpoint circuit 402 on the packet switched communications network 2414 (e.g., as a stop on that (e.g., ring) network). This is illustrated schematically with dashed line 2426 in FIG. 24. Network 2414 is shown schematically with multiple dotted boxes in FIG. 24. Network 2414 may include a network controller 2414A, e.g., to manage the ingress and/or egress of data on network 2414A.

When network dataflow endpoint circuit 2406 is to transmit input data to network dataflow endpoint circuit 2402 (e.g., when network dataflow endpoint circuit 2402 has available storage room for the data and/or network dataflow endpoint circuit 2406 has its input data), network dataflow endpoint circuit 2404 may generate a packet (e.g., including the input data and a header to steer that data to network dataflow endpoint circuit 2402 on the packet switched communications network 2414 (e.g., as a stop on that (e.g., ring) network). This is illustrated schematically with dashed line 2418 in FIG. 24.

Network dataflow endpoint circuit 2402 (e.g., on receipt of the Input 0 from network dataflow endpoint circuit 2404 in circuit 2402's network ingress buffer(s), Input 1 from network dataflow endpoint circuit 2406 in circuit 2402's network ingress buffer(s), and/or control data from processing element 2408 in circuit 2402's spatial array ingress buffer) may then perform the programmed dataflow operation (e.g., a Pick operation in this example). The network dataflow endpoint circuit 2402 may then output the according resultant data from the operation, e.g., to processing element 2408 in FIG. 24. In one embodiment, circuit switched network is configured (e.g., programmed) to provide a dedicated communication line between processing element 2408 (e.g., a buffer thereof) and network dataflow endpoint circuit 2402 along path 2428. A further example of a distributed Pick operation is discussed below in reference to FIG. 37-39. Buffers in FIG. 24 may be the small, unlabeled boxes in each PE.

FIG. 11 illustrates a spatial array element 1100 that includes extended buffer functionality according to embodiments of the disclosure. Spatial array element 1100 (e.g., block) is depicted as a request address file (RAF) circuit, e.g., as disclosed herein. In another embodiment, the spatial array element 1100 may be (or coupled to) a processing element (PE), e.g., as disclosed herein. For example, a PE with one or more buffers. In another embodiment, the spatial array element 1100 may be (or coupled to) a network endpoint circuit, e.g., as disclosed herein. For example, a network endpoint circuit with one or more buffers. When the component (e.g., PE or network endpoint circuit) receives additional data that it does not have storage space for (e.g., in its buffer(s), the component may make room for that data by sending other data already in its storage space (e.g., in its buffer(s)) and a request to utilize extended buffer storage space for that other data.

Particularly, FIG. 11 depicts the configuration for an extended buffer. Here, spatial array element 1100 includes a state (e.g., for scheduler 1028), for example, to store data in extended buffer state storage 1001, that (e.g., when set) causes data from one or more of the depicted buffers in FIG. 11 (e.g., when full) to be sent from the one or more of the depicted buffers in FIG. 11 to storage of (e.g., or external from) that spatial array element 1100, e.g., to make room for the new data in the buffer that was previously full. In one embodiment, e.g., when a buffer is full (e.g., instead of back pressuring that data channel), spatial array element 1100 may make room for that data (e.g., data item 1102 in FIG. 11) by causing buffered data (e.g., data item 1103 in FIG. 9) to be sent to external storage (e.g., a cache bank 912 through ACI network 1114). A further description of the functionality of RAF circuits or processing elements may be ascertained by reading the discussion herein.

As one example, a PE coupled to spatial array element 1100 (e.g., a PE coupled to a RAF circuit) may have a PE buffer that is full. In response to that fullness (and/or receipt of an additional item to be stored in that PE buffer), PE may send a previously stored data item from the PE buffer to other storage. That other storage may be a buffer in RAF circuit. The RAF circuit may have its targeted buffer (or all its buffers) full, and thus the RAF circuit may use the extended buffer functionality discussed herein, e.g., to move an item from its targeted buffer to other storage (e.g., cache). Processing element may be processing element 4600 in FIG. 46

As another example, spatial array element's 1100 (e.g., a RAF circuit or PE) input buffer 1108A (e.g., part of buffers 1108 connected to network 1103 channel) may be full. In one embodiment, e.g., instead of sending that data back to its sender or stalling that sender, a data item is instead sent to other (e.g., external) storage, e.g., via a memory coupling. When input buffer 1108A (e.g., part of buffer connected to network 1103 channel) is not full, it may then request that item, e.g., based on a backpressure signal from one of input buffers 1108 (e.g., input buffer 1108A) or one of output buffers 1110 (e.g., output buffer 1110A), indicating available space from the external storage, e.g., via memory coupling 1105 in FIG. 11. In one embodiment, a buffer or buffers of a component (e.g., a processing element or network dataflow endpoint circuit) may be configured (e.g., programmed) to allow the extended buffer functionality or not, e.g., via setting a value in configuration register 1126. In one embodiment, the data (e.g., from register 1136) (for example, and any metadata, e.g., as packet from register 1138) may be sent via any path or network, for example, path 1132 to network 1114 in FIG. 11, e.g., a packet-switched network.

As an example, input buffer 1108A of spatial array element 1100 (e.g., shown as a RAF circuit) may have no further storage space (e.g., full). In one embodiment, when input buffer 1108A receives additional data 1102 that it does not have storage space for (e.g., in input buffer 1108A), it may make room for that data 1102 by sending other data 1103 already in the storage space (e.g., input buffer 1108A) and a request to utilize extended buffer storage space for that other data 1103, e.g., and then store data 1102 when (e.g., now) that there is available space (e.g., in input buffer 1108A). A memory coupling 1105 may send the data 1103 for storage external to the input buffers (e.g., input buffers 1108 of spatial array element 1100), for example, and a request to utilized extended buffer storage, e.g., as metadata with the payload data.

In one embodiment, the spatial array element 1100 stores that data 1103 in its output buffers 1110 (e.g., output buffer 1110A), e.g., via path 1134 from extended buffer path multiplexer 1130, for example, when its output buffers 1110 (e.g., output buffer 1110A) have available storage space. In another embodiment, the spatial array element 1100 stores that data 1103 externally from its buffers (e.g., registers), for example, storing that data in (e.g., cache) memory.

In FIG. 11, data 1103 may be sent via path 1132 from extended buffer path multiplexer 1130 to memory coupling 1105. The input buffer 1108A of spatial array element 1100 may then store data 1102. The configuration to cause utilization of extended buffers may be stored in configuration register 1126. Scheduler 1128 may cause the control signals and other action to be taken, e.g., on detection of receipt of data (e.g., data 1102) and/or that a buffer (e.g., input buffers 1108 or input buffer 1108 itself) is full. Spatial array element 1100 (e.g., scheduler 1128) may then update one or more values in extended buffer state storage 1101. In one embodiment, extended buffer state storage 1101 includes four fields: head, tail, count, and state. Head may be a pointer to the extended memory queue head (e.g., in cache or other memory). Tail may be a pointer to the extended memory queue tail (e.g., in cache or other memory). Count may be a value representing the depth of the extended queue, e.g., as a bound. A base pointer may be included too. State may be a value that refers to which operations are being driven into the scheduler 1128, for example, whether the buffers and/or memory coupling are draining, filling, etc. Extended buffer state storage 1101 may include values for a queue virtual base address, the size of the queue, and head and tail offsets relative to the queue (e.g., in cache or other memory). Channel translation lookaside buffer (TLB) (e.g., of memory coupling 1105 or a RAF circuit) may be updated with the address of the value that is being sent to cache, e.g., the address for data 1103 in cache. In one embodiment, memory coupling 1105 and/or spatial array element 1100 loads data 1103 directly (e.g., without using the cache and/or memory coupling 1105 (e.g., network connection) to the cache) back into input buffers 1108 (e.g., in correct order from where it was previously stored in input buffer) from output buffers 1110. In one embodiment, RAF memory coupling and/or spatial array element 1100 causes the load of data 1103 back into input buffers 1108 from memory (e.g., cache bank) itself (or into output buffers 1110, e.g., and then back into input buffers 1108).

For example, on request for the stored data item 1103 (e.g., from the element (e.g., PE or network endpoint circuit) that sent that data 1103) and/or when storage space is available in (e.g., output buffers 1108 or output buffer 1108A itself of) spatial array element 1100, spatial array element 1100 (e.g., scheduler 1128) may pull that item of data 1103 back, e.g., into its (not-full) output buffer (e.g., buffer 1108A) and/or into its (not-full) input buffer (e.g., buffer 1110A). In one embodiment, spatial array element 1100 (e.g., scheduler 1128) causes a pull 1115 (e.g., by memory coupling 1105) of data 1103 from memory (e.g., cache memory) into output buffers 1110 or output buffer 1110A itself, e.g., and then data 1103 may be sent 1104 to requestor (for example, on a circuit-switched network, e.g., as discussed herein), and/or into input buffers 1108 or input buffer 1108A itself (e.g., directly or via an output buffer 1110 and/or network 1103). In one embodiment, (e.g., channel) TLB may be checked for the address of data 1103 and then be sent, and TLB entry updated (or deleted) accordingly.

Turning now to FIGS. 12-15, embodiments of a configurable, queue-based interface between processors and spatial architectures are disclosed. Spatial architectures may be an energy-efficient and high-performance way of accelerating user applications, e.g., of executing a dataflow graph. Certain embodiments herein of a spatial architecture communicate with a processor, e.g., a spatial accelerator communicating with a core of the processor. A processor with a core may be as discussed herein. Certain embodiments herein execute (e.g., compute) in cooperation with an associated processor core. As such the core and accelerator may communicate in some fashion. Generally, communications may occur through memory, for example, the processor may set up some workspace for the accelerator, e.g., through-memory sharing for bulky transfers and large communications, but not for small transfers. Certain embodiments herein provide a configurable memory-mapped queueing interface. In one embodiment, the configurability of an interface includes that it may present a single external interface (e.g., to a processor) and map that interface to many configurations of a spatial array (e.g., fabric).

Certain embodiments herein implementing queue based communications between a processor and a configurable accelerator (e.g., FPGA and CSA), which may be referred to as logical fabric queues (LFQs). Certain embodiments herein provide for a logical fabric queue (LFQ) architecture and microarchitecture, e.g., provide a lower-latency and lighter-weight communication with a processor (e.g., a core thereof). In one embodiment, LFQs are efficient for smaller (e.g., cache-line-level) transfers, for example, of the kind that might be used to pass arguments into the accelerator or to retrieve return values from the accelerator. In one embodiment, LFQs simplify both software on the calling processor and within the configurable accelerator. Because configurable accelerators may have different requirements under different configurations, for example, where in-bound data is to be delivered, certain embodiments herein provide for a programmable interface to capture possible accelerator configurations. There are several methods for using an LFQ interface from a software and architectural perspective which are compatible with the configurable accelerators (e.g., CSA) discussed herein, for example, memory-mapped I/O, instruct set architecture (ISA) visible queues, or network interface.

Certain embodiments herein provide cache-line-packing mechanisms, e.g., to ensure that use of instructions like enqueue and monitor or monitor and wait (mwait) are minimized (e.g., invoked as few times as possible). Certain embodiments herein provide for significant improvement both in performance and in code complexity, e.g., a significant consideration in spatial architectures. Certain embodiments herein provide for a communications infrastructure that is not fixed, e.g., that are suitable for use in a more general programmable architecture.

A spatial array may use (e.g., access) memory. Certain embodiments herein overlay LFQ mechanisms on this memory infrastructure. Certain embodiments herein introduce cache line-based memory-mapped queues at the memory interface. Certain queues use memory path structures (e.g., the ACI network discussed herein) to steer data between the memory interface and specific endpoints on the fabric side (e.g., the RAF circuits herein). Certain embodiments herein permit in-bound cache lines to be disaggregated for fabric consumption and allows outbound results to be aggregated into a (e.g., single) cache line for response. Certain embodiments herein provide for configuration bits to allow the mapping of fabric endpoints to cache line addresses.

Certain embodiments of an LFQ microarchitecture provide explicit hardware resources to handle queue-based communication, e.g., such that hardening (e.g., the hardware) reduces resource pressure in the configurable spatial array (e.g., fabric) and greatly reduces latency. For example, implementing a queue in memory may require several memory accesses. In a (e.g., slow) fabric like a FPGA, this may add hundreds of nanoseconds worth of latency. By distributing queue endpoints across the fabric, certain embodiments herein eliminate the need to implement such distribution in the fabric itself. This may be especially important in fabrics like the CSA, e.g., which trade general purpose control for density, frequency, and energy efficiency. Certain embodiments simplifies host software, e.g., by aggregating outbound requests into cache lines to reduce the number of monitor commands utilized on the host side. Certain embodiments herein of an LFQ interface convey arguments into the spatial accelerator and obtain results from the spatial accelerator. Certain embodiments of spatial accelerators may be intended to make hot loops run fast, e.g., thus it may be beneficial to locate (e.g., execute) less common code elsewhere, for example, in a core of a processor. Certain embodiments herein of an LFQ interface orchestrate such communications. Certain embodiments herein of an LFQ interface may be used to facilitate accelerator-to-accelerator communications. Certain embodiments herein provide for low-latency communications in the context of dataflow-oriented accelerators, e.g., such as an embodiment of a CSA.

Figure 12:
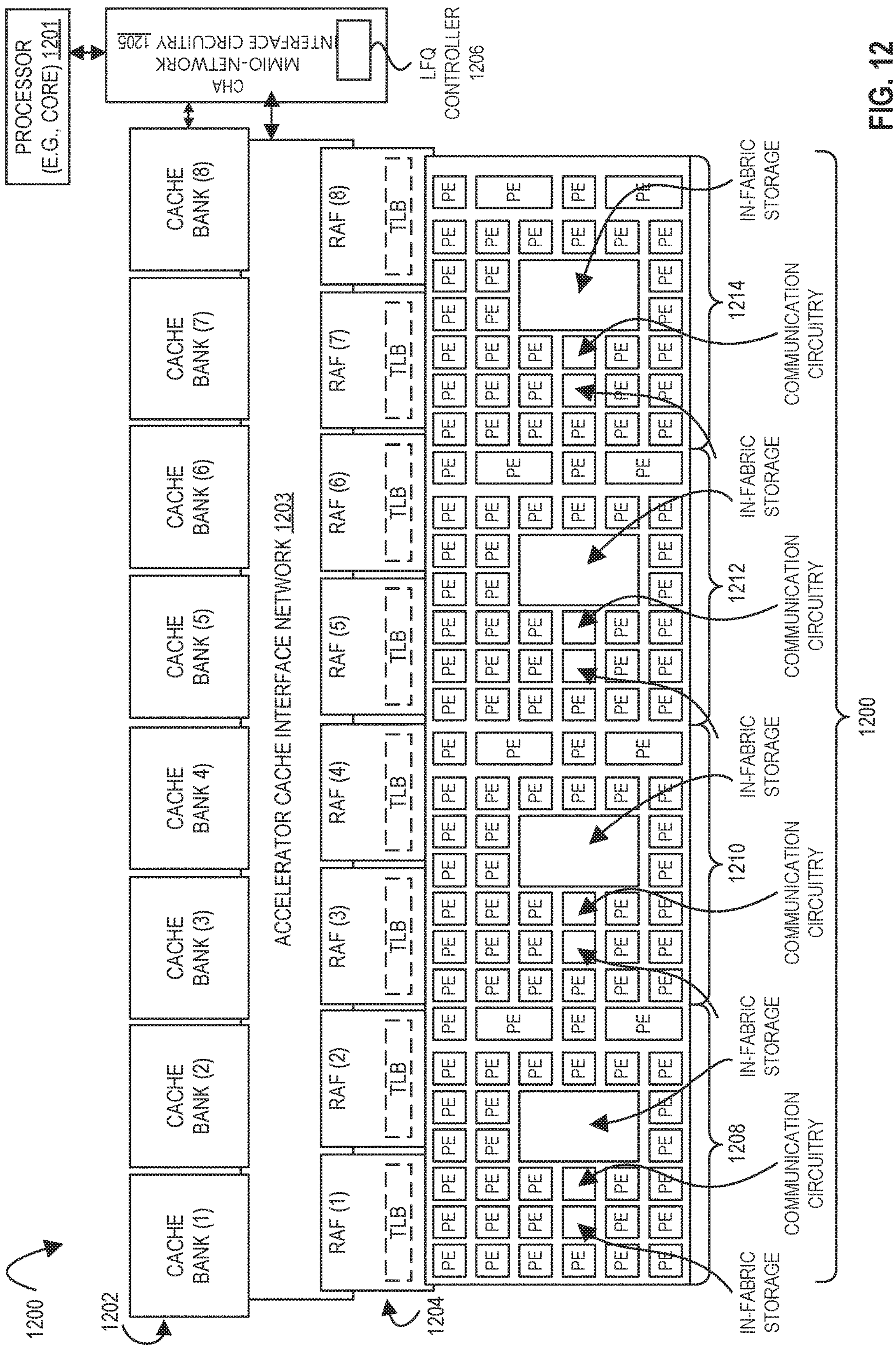
FIG. 12 illustrates a processor coupled to a spatial accelerator according to embodiments of the disclosure.
Figure 14:
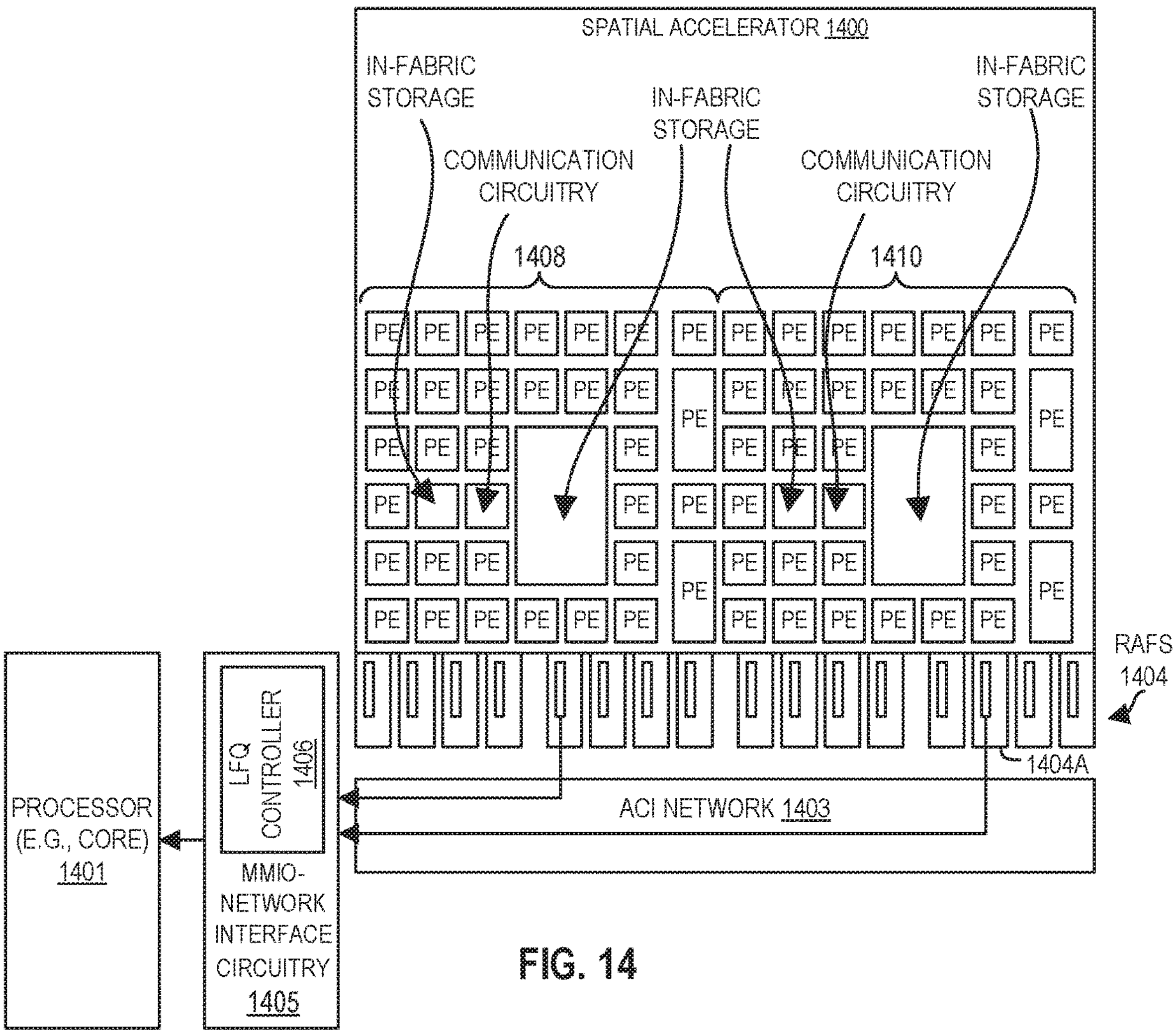
FIG. 14 illustrates a spatial accelerator sending data to a processor according to embodiments of the disclosure.
Figure 15:
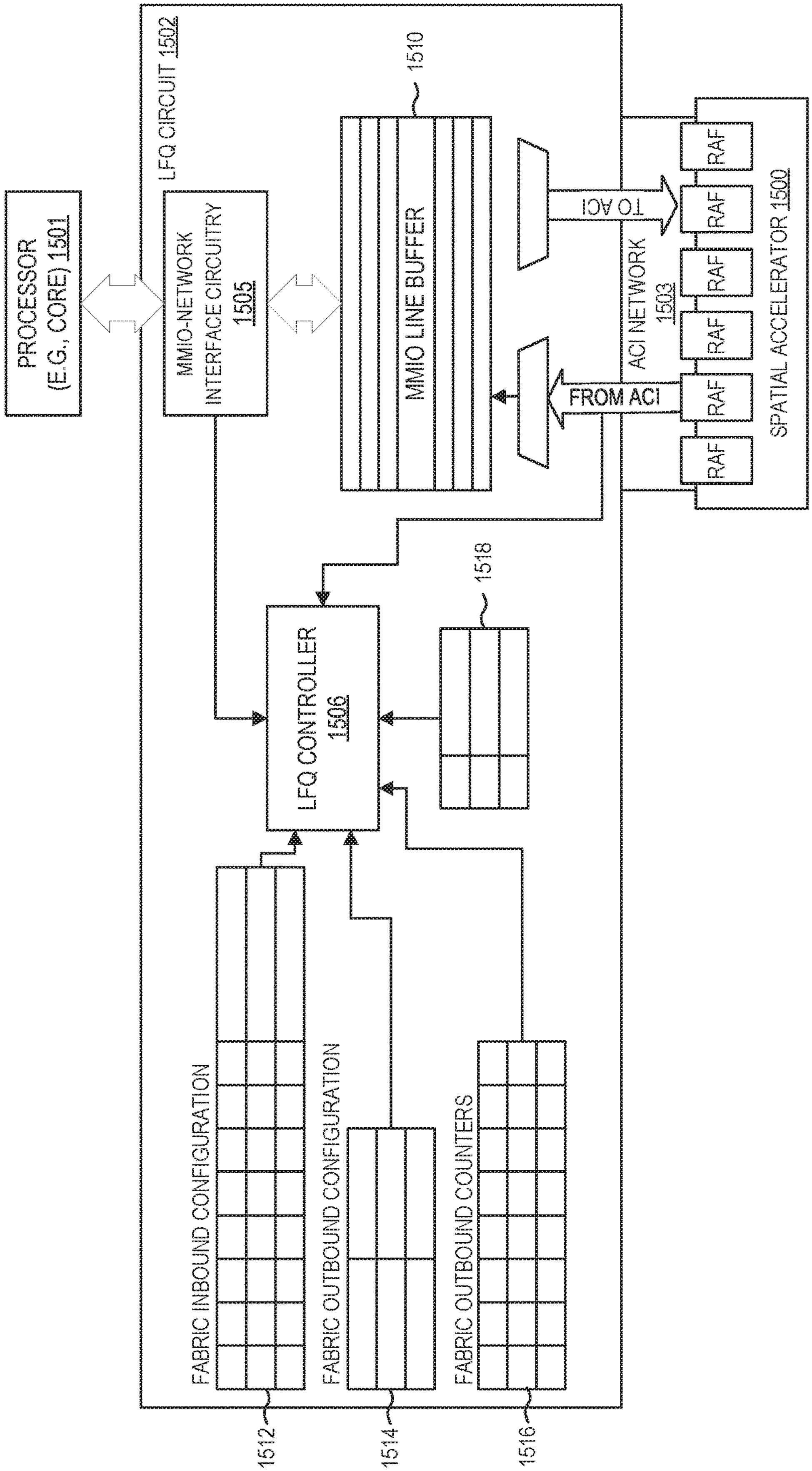
FIG. 15 illustrates a circuit having a controller in hardware to control sending data between a processor and a spatial accelerator according to embodiments of the disclosure.

FIG. 12 illustrates a processor 1201 coupled to a spatial accelerator 1200 according to embodiments of the disclosure. Depicted processor 1201 is coupled to a plurality of memory interface circuits (e.g., request address file (RAF) circuits 1204) that are coupled between a plurality of accelerator tiles and a plurality of cache banks. Fabric-facing interfaces (e.g., RAF circuits 1204) may be connected to cache banks 1202 by way of the accelerator cache interface (ACI) network 1203. Certain embodiments herein use the ACI network 1203, the RAF circuit 1204 interface capabilities, and/or the CHA 1205 to provide a general memory-mapped interface for queues. Logical Fabric Queue (LFQ) may be used as an interface between processor 1201 and spatial accelerator 1200. LFQ controller 1206 may control the interface. Memory subsystem (e.g., the ACI network 1203, the RAF circuit 1204 interface capabilities, and/or the cache home agent (CHA) 1205) may be treated as stateless (e.g., always read or written, other than memory ordering). Certain embodiments herein provide for a hardened (e.g., in hardware) communication resources (e.g., interface) between processor and spatial accelerator 1201 (e.g., CSA). In one embodiment at the fabric level, certain embodiments herein graph a new message type on top of memory interface (e.g., another port as in FIG. 13 or FIG. 14) to inject these new messages (e.g., as shown in FIG. 15). In one embodiment, once data is in the queue (e.g., in a (e.g., output or completion buffer of a RAF), the hardware may fracture the data (e.g., from 64-byte to many smaller (e.g., 64-bit or 32-bit) parts). In one embodiment, when there is a write to an address by the processor, the write occurs as in FIG. 13. A cache home agent (CHA) may serve as the local coherence and cache controller (e.g., caching agent) and/or also serves as the global coherence and memory controller interface (e.g., home agent).

Example LFQ architecture and microarchitecture is discussed in reference to FIG. 12, e.g., providing a provisional cache microarchitecture for the accelerator 1200. In this microarchitecture, the ACI network 1203 may provide a general purpose interconnect between the fabric interfaces (RAF circuits 1204), cache banks 1202, and/or an external interface (e.g., cache home agent (CHA). CHA 1205 may include a memory mapped input/output (MMIO) to input/out of spatial fabric (e.g., network and/or bus) interface (e.g., port) (e.g., MMIO-Network interface). MMIO-Network interface may be a MMIO to bus type of interface. Certain embodiments herein leverage this interconnect to provide the main transport layer of a queue-based fabric interface. Particularly, CHA 1205 (e.g., MMIO-Network interface circuitry thereof) may allow a processor and spatial array (e.g., accelerator 1200) to communicate. RAF circuit(s) may be any RAF circuit described herein, e.g., 4700 in FIG. 47. ACI network may be as described herein. Spatial accelerator may be any spatial accelerator discussed herein, e.g., CSA. Memory interface may be as in Section 3.3 here.

Figure 13:
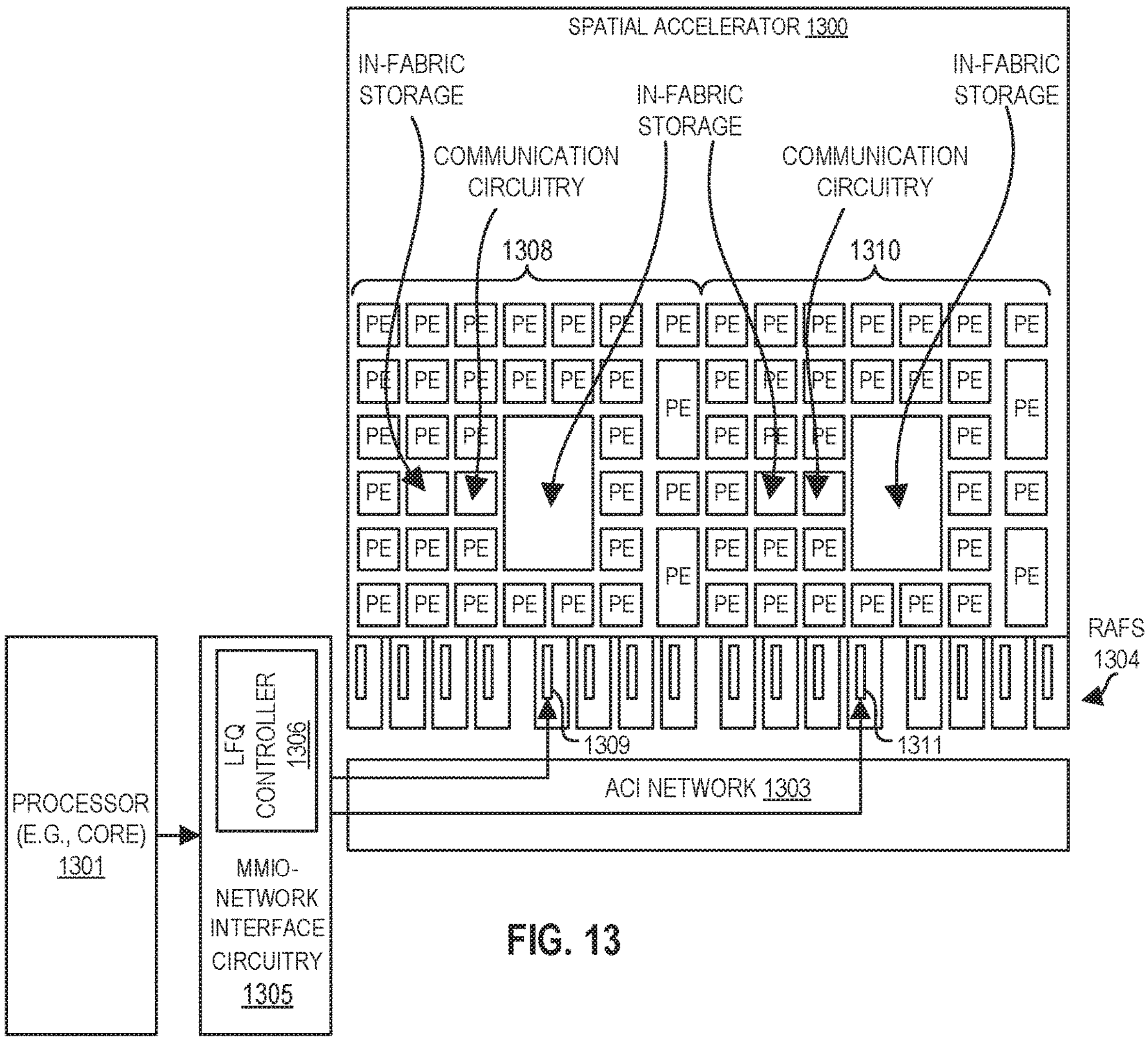
FIG. 13 illustrates a processor sending data to a spatial accelerator according to embodiments of the disclosure.

FIG. 12 also illustrates a plurality of memory interface circuits (e.g., request address file (RAF) circuits 1204) coupled between a spatial array 1200 of a plurality of (accelerator) tiles and a plurality of cache banks 1202 according to embodiments of the disclosure. Although a plurality of tiles are depicted, a spatial accelerator 1200 may be a single tile. Although eight cache banks are depicted, a single cache bank or any plurality of cache banks may be utilized. In one embodiment, the number of RAFs and cache banks may be in a ratio of either 1:1 or 1:2. Cache banks may contain full cache lines (e.g., as opposed to sharding by word), for example, with each line (e.g., address) having exactly one home in the cache. Cache lines may be mapped to cache banks via a pseudo-random function. The CSA may adopt the shared virtual memory (SVM) model to integrate with other tiled architectures. Certain embodiments include an Accelerator Cache Interface (Interconnect) (ACI) network 1201 (e.g., a packet switched network) connecting the RAFs to the cache banks and/or CHA 1205. This network may carry address and data between the RAFs and the cache and/or CHA. The topology of the ACI network 1201 may be a cascaded crossbar, e.g., as a compromise between latency and implementation complexity. Cache 1202 may be a first (L1) or second level (L2) cache. Cache may also include (e.g., as part of a next level (L3) a cache home agent 1205 (CHA), for example, to serve as the local coherence and cache controller (e.g., caching agent) and/or also serve as the global coherence and memory controller interface (e.g., home agent). Turning now to FIGS. 13-15, embodiments of communications between a processor (e.g., a core of processor) and spatial accelerator are discussed. In certain embodiments, the processor and spatial accelerator may include those components and/or functionality as discussed in any of FIGS. 13-15.

FIG. 13 illustrates a processor 1301 sending data to a spatial accelerator 1300 according to embodiments of the disclosure. Processor 1301 (e.g., a core of multiple cores thereof) may have a requirement to send (e.g., write) data to spatial accelerator 1300. Processor 1301 may write data (e.g., a cache line of data), e.g., through MMIO-Network interface circuitry 1305, e.g., for example, by processor 1301 decoding and executing an instruction that writes (e.g., stores) data (e.g., cache line) to a memory address of memory mapped IO (e.g., MMIO-Network 1305). LFQ controller 1306 may detect the write to MMIO-Network interface circuitry 1305 (e.g., a monitored memory location thereof) from processor 1301 (e.g., and not from spatial accelerator 1300) and the cause that item of data (e.g., a cache line) to be broken into smaller (e.g., non-overlapping) data items. Those smaller data items may then be stored (e.g., in response to the instruction writing to MMIO-Network interface circuitry 1305) into one or more (e.g., completion) buffers of RAF circuits 1304, e.g., here the item of data is broken into two smaller data items (e.g., two 64-bit words) that are stored in (e.g., completion) buffer 1309 of a first RAF and (e.g., completion) buffer 1311 of a second RAF. In one embodiment, to cause this distribution, configuration information is loaded in to both the LFQ (e.g., configuration) controller 1306 and/or into the appropriate RAFs (e.g., scheduler), for example, at fabric configuration time.

FIG. 14 illustrates a spatial accelerator 1400 sending data to a processor 1401 according to embodiments of the disclosure. Spatial accelerator 1400 (e.g., one or more RAFs thereof) sends (e.g., smaller items of) data to the LFQ controller 1406, e.g., where it is buffered and eventually the larger section of data is written to the processor 1401 (e.g., a core of multiple cores thereof). Spatial accelerator 1400 may have a requirement to send (e.g., write) data to processor 1401, e.g., through MMIO-Network interface circuitry 1405, e.g., for example, by processor 1301 decoding and executing an instruction that monitors a memory address (e.g., of MMIO-Network interface circuitry 1405) and waits for a data update to read that updated data (e.g., a cache line of data). LFQ controller 1406 may detect the write(s) of smaller (e.g., fewer bits of) data items to storage (e.g., MMIO line buffer 1510 in FIG. 15) and then write larger data items to processor 1401 via MMIO-Network interface circuitry 1405. In one embodiment, one or more of RAF circuits 1404 may perform the writes of data from spatial accelerator into MMIO line buffer (e.g., MMIO line buffer 1510 in FIG. 15), for example, from completion buffer(s) of RAF circuit(s). For example, here the items of data may be two smaller data items (e.g., two 64-bit words) that are combined together and then sent in a single transaction to MMIO-Network interface circuitry 1405, e.g., for reading by processor 1401. In one embodiment, to cause this combination, configuration information is loaded in to both the LFQ (e.g., configuration) controller 1406 and/or into the appropriate RAFs (e.g., scheduler), for example, at fabric configuration time.

FIG. 14 illustrates a single RAF circuit 1404A sending data outbound, e.g., via ACI network 1403. In another embodiment, a plurality of RAF circuits may send data outbound to the processor, e.g., via LFQ circuitry. RAF circuit may send data from its completion (e.g., output) buffer to LFQ circuitry. This data may be buffered (e.g., at the LFQ controller 1406) and, once all data that is to be sent is aggregated, the data (e.g., cache line) may be written out, e.g., to MMIO-Network interface circuitry 1405. By aggregating cache lines in an LFQ circuit, certain embodiments herein avoid spurious monitoring and waiting (e.g., mwait) and/or wake-ups at any processor waiting for the spatial accelerator 1401 result. Certain embodiments herein provide for each data value passing between the fabric and the associated processor to go to a unique address and occur as part of a data (e.g., cache line) request, however there are other embodiments of interfacing with the fabric. In particular, it may be useful in certain embodiments to stream many values to and from a single location in the fabric, and to replicate a value across multiple locations in the fabric. Certain embodiments herein support each of these modes via minor augmentations at either the CHA (e.g., LFQ controller) or at a RAF circuit. As a second extension, certain embodiments herein provide a narrower 64-bit interface.

FIG. 15 illustrates a (e.g., LFQ) circuit 1502 having a (e.g., LFQ) controller 1506 in hardware to control sending data between a processor 1501 and a spatial accelerator 1500 according to embodiments of the disclosure. Circuit 1500 may be included as part of a CHA or other memory component. In one embodiment, the main data path of the LFQ circuit 1502 accepts incoming lines via MMIO-Network interface circuitry 1505 at the Network transfer granularity (e.g., smaller than the MMIO transfer granularity). The incoming data may be buffered in the MMIO line buffer 1510 of LFQ circuit 1500 and then transported into the spatial accelerator 1500 (e.g., fabric) using the ACI network 1503. For example, in order to intercept memory mapped interfaces, the fabric CHA (e.g., memory management unit) may be augmented to include an MMIO-Network interface circuitry 1505 as an endpoint. Certain embodiments herein do not specify the exact processor-to-fabric transport layer, but only assume the existence of such a transport layer. Certain embodiments herein assume that such a transport mechanism will be located at the CHA.

A transport mechanism may be backed with a configurable LFQ controller 1506, e.g., which manages LFQ transactions. The main data path of the LFQ circuit 1502 involves the aggregation or disaggregation of MMIO lines at the line buffer 1510. Inbound data (e.g., cache lines (for example, from the processor 1501 may be stored in the line buffer 1510 and then sent at the desired (e.g., smaller sized) granularity into the spatial accelerator 1500 (e.g., fabric). Outbound data (e.g., cache lines) may be assembled at the LFQ circuit (e.g., at the line buffer 1510, and, once complete, may either be sent over MMIO-Network interface circuitry 1505 (and/or may be written into the CSA cache to commit them into the coherent memory protocol). FIG. 15 depicts a (e.g., unified) line buffer 1510, e.g., in which buffers (or slots of the buffers) may be selectively allocated to various memory-mapped queues according to program requirements.

The control plane of the LFQ circuit 1502 may include two parts: configuration state and stateful queue management circuitry. Configuration state may ties resources together to support either an inbound LFQ transaction (e.g., as in FIG. 13 above) or an outbound LFQ transaction (e.g., as in FIG. 14 above). Inbound LFQ configuration (e.g., in inbound configuration storage 1512) may include the mapping of MMIO-Network (e.g., MMIO-Network interface circuitry) granularity of data (e.g., cache lines) to RAFs, the fabric queue counters 1518 (e.g., to count how many (e.g., RAF) buffers of the spatial accelerator 1500 are available), and the buffer range (e.g., which section(s) of (e.g., line) buffer 1510) that will be used by the LFQ circuit for each inbound transaction. Outbound configuration (e.g., in outbound configuration storage 1514 and outbound counters 1516) may include the mask used to determine LFQ data (e.g., cache lines) completion, the address (e.g., network (e.g., of MMIO-Network interface circuitry) or physical address) used to write the outbound data (e.g., cache lines), and the buffer range (e.g., which section(s) of (e.g., line) buffer 1510) that will be used by the LFQ circuit for each outbound transaction.

LFQ controller 1506 (e.g., queue management circuitry) may track the dynamic state of the RAF queues (e.g., buffers). Data transactions inbound to the fabric may include metadata noting which slot of the target completion buffer the data should be written to. Slot-tracking hardware may be included within LFQ controller 1506. This tracking hardware, when coupled with the RAF-side buffering, may form a disaggregated queue. By tracking completion buffer slots, LFQ controller 1506 may also effectively implement flow control.

LFQ controller 1506 may monitor the state of the various configuration and state elements, e.g., and then arbitrate the LFQ operation that executes next. For example, an in-bound LFQ operation may execute when the line buffer 1510 has a value and when all the (e.g., target) RAF circuit queues are known to have completion buffers available. If this condition is true, the LFQ controller 1506 may send the data portions of the line buffer 1510 to the corresponding configured RAF endpoint (e.g., as in FIG. 13).

Partial execution of in-bound LFQ operations is possible. This may arise when some RAF buffers are full and some are not, or if the ACI network 1503 bandwidth is insufficient for a full LFQ operation. LFQ controller 1506 may maintain a set of bits (e.g., in outbound counter 1516 storage) that reflect which RAF queues have received new values and which have not.

To support streaming either to or from a particular spatial array (e.g., fabric) endpoint (e.g., buffer of a RAF circuit), LFQ controller 1506 may include a list of a single RAF endpoint multiple times (e.g., for each item of data that is to go to or from that RAF). Data may be sent serially to each RAF circuit in address order, e.g., enabling a reasonable degree of control to software programmers.

In one embodiment, processor 1501 interfaces through MMIO-Network interface circuitry 1505, e.g., as discussed herein, or other memory-mapped I/O-style protocols, to spatial accelerator 1500. To facilitate such software, certain embodiments herein may expose metadata such as, but not limited to, the number of credits available. One queueing scheme largely makes use of existing buffering and control facilities located at the RAF circuits. For example, on the in-bound path, LFQ circuit 1502 may reuse RAF completion buffers. These buffers may (e.g., otherwise) serve to re-order load responses returning from the out-of-order memory subsystem. These response buffers may be already present as a dataflow-oriented queuing interface to the spatial accelerator 1500 (e.g., CSA fabric). However, a RAF circuit may also support unexpected, in-bound communications. A RAF circuit may include a new configuration reflecting the single-ended, in-bound queue. In an embodiment where the CHA interface supplies the correct completion buffer address directly, no other modifications are made the completion buffer.

The outbound path at the RAF may be approximately the dual of the inbound path. A RAF circuit may include a new configuration to allow the RAF to send a data request to the spatial accelerator 1500 (e.g., CSA fabric) directly. This may function akin to a store request. The metadata associated with this request, that is the outbound queue address, may be filled in to the address field of the outbound request. In one embodiment, the address field is a constant, and may be configured as such at the RAF. However, (e.g., for complex access patterns) LFQ circuit 1500 may allow the fabric to directly supply (e.g., CHA) addresses. LFQ circuit 1500 may use existing counters in a RAF (e.g., dependency token counters) to implement disaggregated flow control. Flow control may proceeds by existing mechanisms for supporting queue disaggregation in the ACI network 1503. For example, both the LFQ circuit 1500 and fabric endpoints (e.g., RAF circuits) (as appropriate) may begin with a supply of credits at configuration time. Credits may be used as messages are sent, and restored as either the fabric drains in-bound data, or outbound cache lines are completed and committed to memory. May include flow control credits to outbound data paths from the fabric, e.g., used by the finite buffering at the CHA (e.g., CHA 1205 in FIG. 12).

Certain embodiments herein provide hardware support for flow-controlled channels of different widths. Certain embodiments herein include multiple network widths to economize area, improve overall bandwidth, and reduce power. The following discusses two ways to build heterogeneous networks. The first way is to build dedicated networks, e.g., wherein each network supports a specific data width. This approach may be utilized when network widths are very different in size, for example, one width a single bit and the other width 64-bits. A second way to construct heterogeneously sized networks is to compose smaller networks to form a larger network. The chief microarchitectural enabler for this style of network may be the additional control circuitry which may be configured to combine the control signals of the smaller networks. This style of network may be most useful when dealing with mixed-precision data, for example 32-bit and 64-bit data in the same network microarchitecture.

Figure 16:
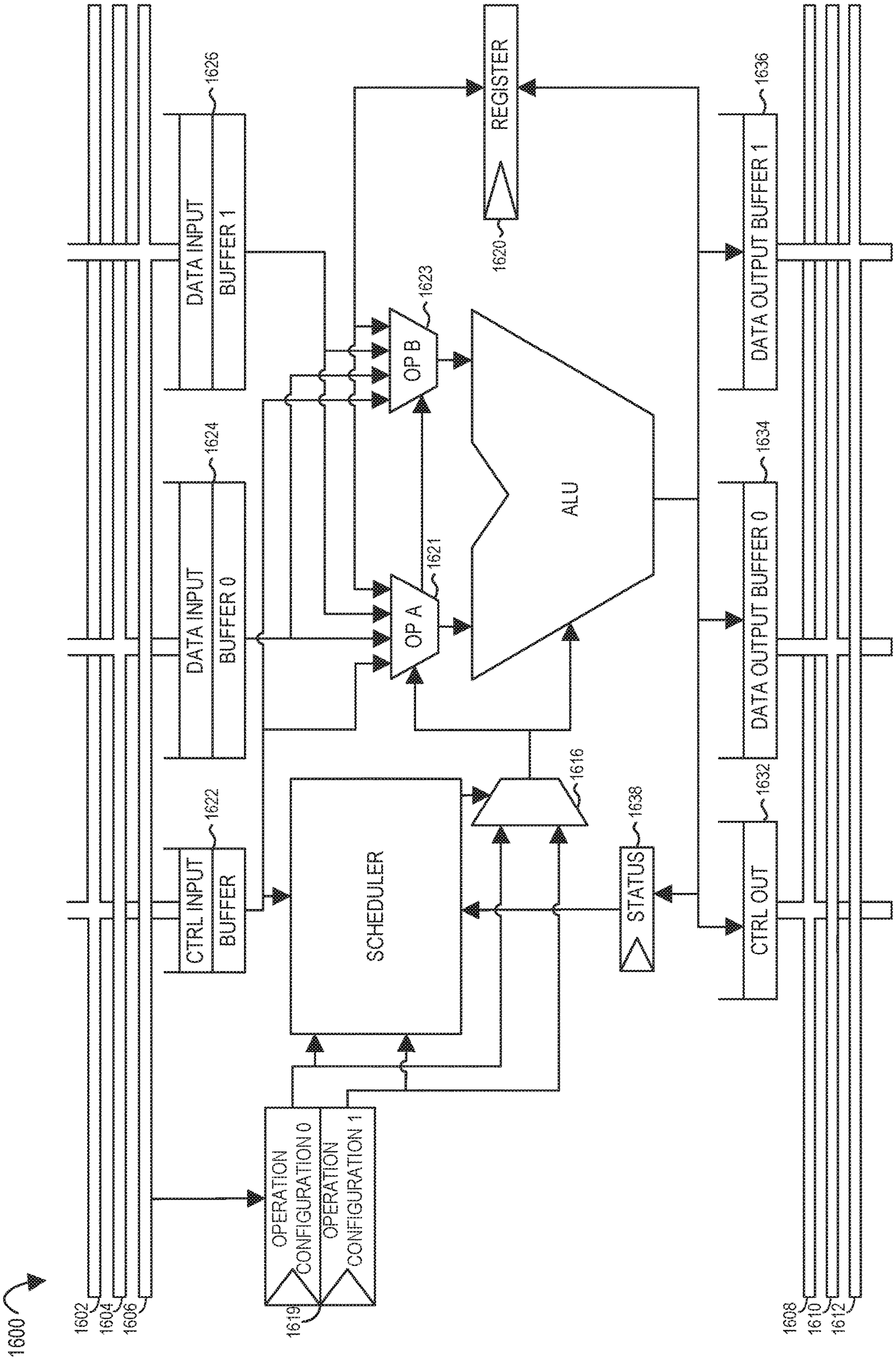
FIG. 16 illustrates a heterogeneous mix of network fabrics to accommodate data values of different widths according to embodiments of the disclosure.

FIG. 16 illustrates a heterogeneous mix of network fabrics (1602, 1604, 1606) and/or (1608, 1610, 1612) to accommodate data values of different widths according to embodiments of the disclosure. In one embodiment, a spatial array (e.g., CSA) includes two or more different sized networks, e.g., data lane of 1-bit, 32-bits or 64-bits. For example, a first data network (e.g., network 1604 and network 1610) (e.g., channel thereof) may have a first data width and a second data network (e.g., network 1606 and network 1612) may have a different, second data width. In such embodiments, the compilation of data may include having knowledge of this, e.g., to know where to and where to not route data to and/or from. In one embodiment, the size of resultant (e.g., determined by the complier), determines where to route the data, e.g., operation configuration zero may be for a first data width and operation configuration one may be for second, different data width. Network 1602 and network 1608 may be single-bit data width lanes.

FIG. 16 illustrates a processing element 1600 according to embodiments of the disclosure. In one embodiment, operation configuration register 1619 is loaded during configuration (e.g., mapping) and specifies the particular operation (or operations) this processing (e.g., compute) element is to perform. Register 1620 activity may be controlled by that operation (an output of mux 1616, e.g., controlled by the scheduler 1614). Scheduler 1614 may schedule an operation or operations of processing element 1600, for example, when input data and control input arrives. Control input buffer 1622 is connected to local network 1602 (e.g., and local network 1602 may include a data path network as in FIG. 41A and a flow control path network as in FIG. 41B) and is loaded with a value when it arrives (e.g., the network has a data bit(s) and valid bit(s)). Control output buffer 1632, data output buffer 1634, and/or data output buffer 1636 may receive an output of processing element 1600, e.g., as controlled by the operation (an output of mux 1616). Status register 1638 may be loaded whenever the ALU 1618 executes (also controlled by output of mux 1616). Data in control input buffer 1622 and control output buffer 1632 may be a single bit. Mux 1621 (e.g., operand A) and mux 1623 (e.g., operand B) may source inputs.

Figure 42:
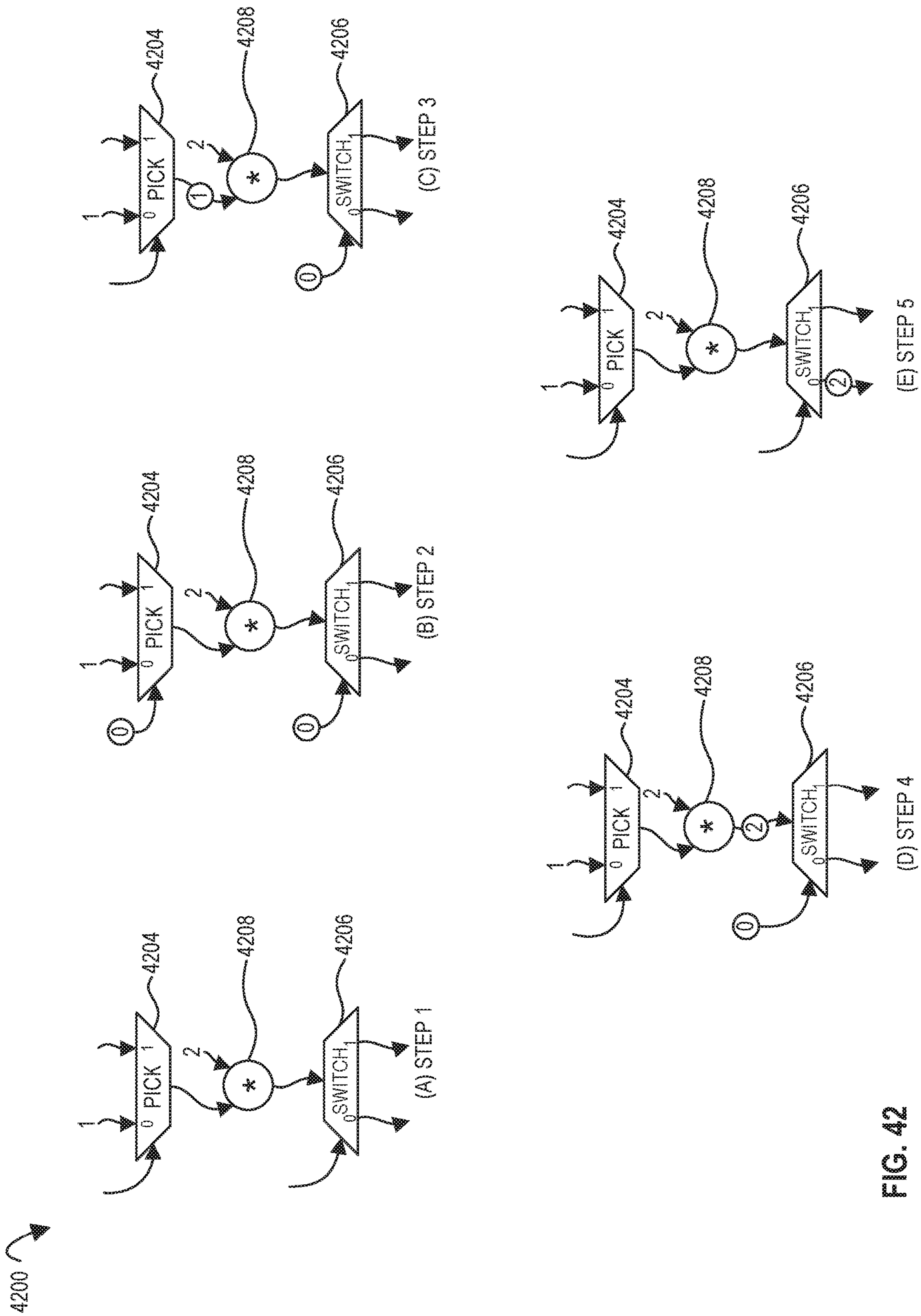
FIG. 42 illustrates an example execution of a dataflow graph according to embodiments of the disclosure.

For example, suppose the operation of this processing (e.g., compute) element is (or includes) what is called call a pick in FIG. 42. The processing element 1600 then is to select data from either data input buffer 1624 or data input buffer 1626, e.g., to go to data output buffer 1634 (e.g., default) or data output buffer 1636. The control bit in 1622 may thus indicate a 0 if selecting from data input buffer 1624 or a 1 if selecting from data input buffer 1626.

For example, suppose the operation of this processing (e.g., compute) element is (or includes) what is called call a switch in FIG. 42. The processing element 1600 is to output data to data output buffer 1634 or data output buffer 1636, e.g., from data input buffer 1624 (e.g., default) or data input buffer 1626. The control bit in 1622 may thus indicate a 0 if outputting to data output buffer 1634 or a 1 if outputting to data output buffer 1636.

Multiple networks (e.g., interconnects) may be connected to a processing element, e.g., (input) networks 1602, 1604, 1606 and (output) networks 1608, 1610, 1612. The connections may be switches, e.g., as discussed in reference to FIGS. 41A and 41B. In one embodiment, each network includes two sub-networks (or two channels on the network), e.g., one for the data path network in FIG. 41A and one for the flow control (e.g., backpressure) path network in FIG. 41B. As one example, local network 1602 (e.g., set up as a control interconnect) is depicted as being switched (e.g., connected) to control input buffer 1622. In this embodiment, a data path (e.g., network as in FIG. 41A) may carry the control input value (e.g., bit or bits) (e.g., a control token) and the flow control path (e.g., network) may carry the backpressure signal (e.g., backpressure or no-backpressure token) from control input buffer 1622, e.g., to indicate to the upstream producer (e.g., PE) that a new control input value is not to be loaded into (e.g., sent to) control input buffer 1622 until the backpressure signal indicates there is room in the control input buffer 1622 for the new control input value (e.g., from a control output buffer of the upstream producer). In one embodiment, the new control input value may not enter control input buffer 1622 until both (i) the upstream producer receives the "space available" backpressure signal from "control input" buffer 1622 and (ii) the new control input value is sent from the upstream producer, e.g., and this may stall the processing element 1600 until that happens (and space in the target, output buffer(s) is available).

Data input buffer 1624 and data input buffer 1626 may perform similarly, e.g., local network 1604 (e.g., set up as a data (as opposed to control) interconnect) is depicted as being switched (e.g., connected) to data input buffer 1624. In this embodiment, a data path (e.g., network as in FIG. 41A) may carry the data input value (e.g., bit or bits) (e.g., a dataflow token) and the flow control path (e.g., network) may carry the backpressure signal (e.g., backpressure or no-backpressure token) from data input buffer 1624, e.g., to indicate to the upstream producer (e.g., PE) that a new data input value is not to be loaded into (e.g., sent to) data input buffer 1624 until the backpressure signal indicates there is room in the data input buffer 1624 for the new data input value (e.g., from a data output buffer of the upstream producer). In one embodiment, the new data input value may not enter data input buffer 1624 until both (i) the upstream producer receives the "space available" backpressure signal from "data input" buffer 1624 and (ii) the new data input value is sent from the upstream producer, e.g., and this may stall the processing element 1600 until that happens (and space in the target, output buffer(s) is available). A control output value and/or data output value may be stalled in their respective output buffers (e.g., 1632, 1634, 1636) until a backpressure signal indicates there is available space in the input buffer for the downstream processing element(s).

A processing element 1600 may be stalled from execution until its operands (e.g., a control input value and its corresponding data input value or values) are received and/or until there is room in the output buffer(s) of the processing element 1600 for the data that is to be produced by the execution of the operation on those operands.

Spatial accelerators, especially coarse grained accelerators, may be constructed targeting a specific bitwidth (e.g., of data lanes). This may create an engineering tradeoff, e.g., tuning for larger or smaller bit widths may make a certain bit width more efficient, while other bit widths become less efficient. This may particularly be the case when considering 16, 32, and 64 bit architectures: 64 bit operations may be utilized, e.g., when dealing with some memory systems, and 16 and 32 bit operations may be utilized, e.g., for perceptual and machine learning workloads. Certain embodiments herein combine low bitwidth PEs to form higher bitwidth PEs, e.g., so that fabrics tuned to support 16 or 32 bit operations (or, in general, any lowwidth operation) may support 64 bit operation (or, in general, any higher precision).

Certain embodiments herein provide programmatic means of composing multiple PEs to form a single wider bit-width PE, e.g., without no impact on the frequency. Certain embodiments herein support 64-bit operations even if the fabric is primarily formed of 16 or 32 bit processing elements. Such support may be essential for memory system interfacing. Certain embodiments herein add direct bypass paths in the microarchitecture, for example, to enable higher width (e.g., 64-bit) operations to occur in a single cycle, e.g., thereby reducing the latency of critical address calculations in pointer chases.

Figure 17:
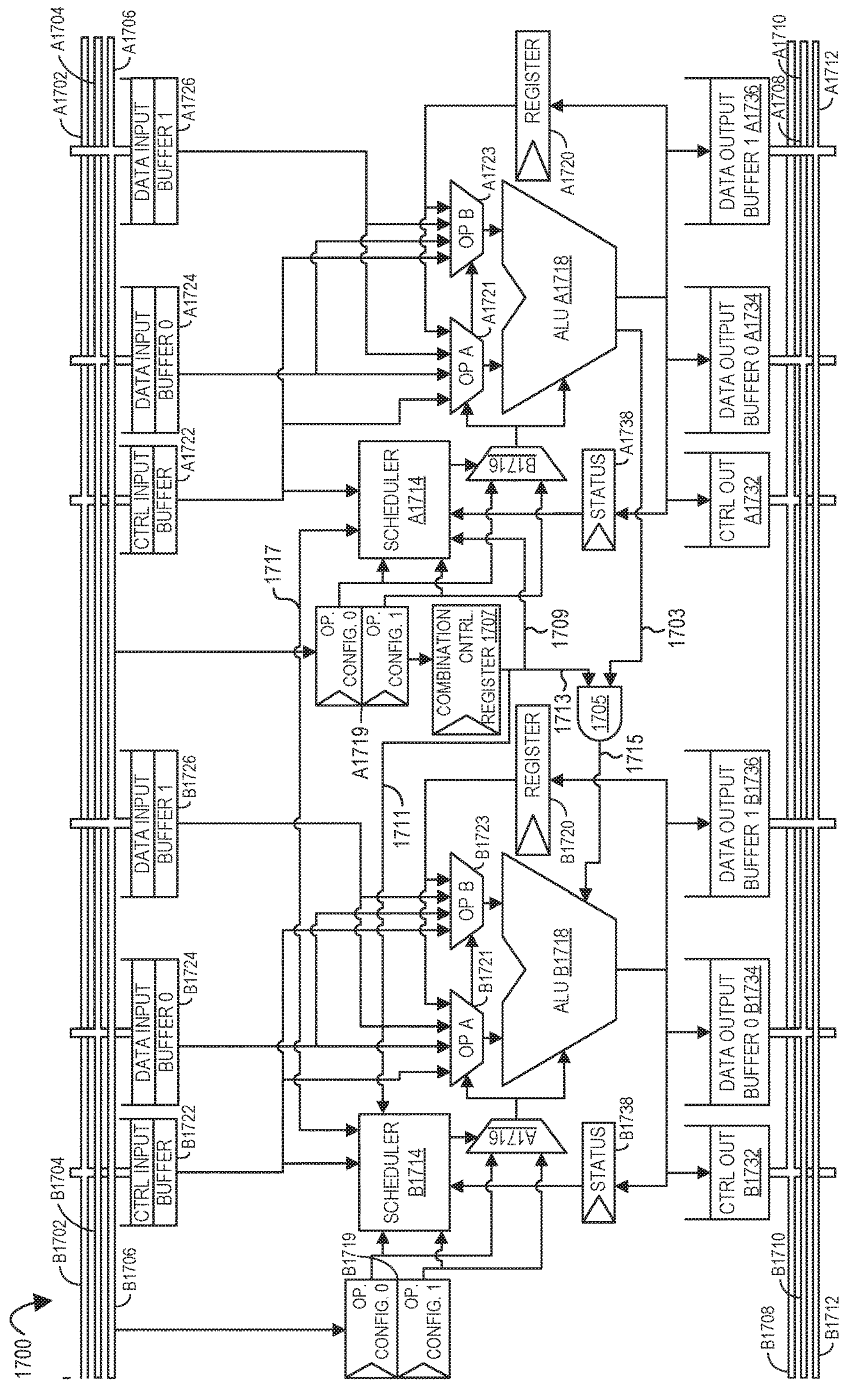
FIG. 17 illustrates a first processing element and a second processing element according to embodiments of the disclosure.

FIG. 17 illustrates a first processing element A1700 and a second processing element B1700 according to embodiments of the disclosure. In certain embodiments, first processing element A1700 and a second processing element B1700 of a first (e.g., lower) width are combined to logically form a single processing element with a higher width.

FIG. 17 illustrates a first processing element A1700 according to embodiments of the disclosure. In one embodiment, operation configuration register A1719 is loaded during configuration (e.g., mapping) and specifies the particular operation (or operations) this processing (e.g., compute) element is to perform. Register A1720 activity may be controlled by that operation (an output of mux A1716, e.g., controlled by the scheduler A1714). Scheduler A1714 may schedule an operation or operations of processing element A1700, for example, when input data and control input arrives. Control input buffer A1722 is connected to local network A1702 (e.g., and local network A1702 may include a data path network as in FIG. 41A and a flow control path network as in FIG. 41B) and is loaded with a value when it arrives (e.g., the network has a data bit(s) and valid bit(s)). Control output buffer A1732, data output buffer A1734, and/or data output buffer A1736 may receive an output of processing element A1700, e.g., as controlled by the operation (an output of mux A1716). Status register A1738 may be loaded whenever the ALU A1718 executes (also controlled by output of mux A1716). Data in control input buffer A1722 and control output buffer A1732 may be a single bit. Mux A1721 (e.g., operand A) and mux A1723 (e.g., operand B) may source inputs.

For example, suppose the operation of this processing (e.g., compute) element is (or includes) what is called call a pick in FIG. 42. The processing element A1700 then is to select data from either data input buffer A1724 or data input buffer A1726, e.g., to go to data output buffer A1734 (e.g., default) or data output buffer A1736. The control bit in A1722 may thus indicate a 0 if selecting from data input buffer A1724 or a 1 if selecting from data input buffer A1726.

For example, suppose the operation of this processing (e.g., compute) element is (or includes) what is called call a switch in FIG. 42. The processing element A1700 is to output data to data output buffer A1734 or data output buffer A1736, e.g., from data input buffer A1724 (e.g., default) or data input buffer A1726. The control bit in A1722 may thus indicate a 0 if outputting to data output buffer A1734 or a 1 if outputting to data output buffer A1736.

Multiple networks (e.g., interconnects) may be connected to a processing element, e.g., (input) networks A1702, A1704, A1706 and (output) networks A1708, A1710, A1712. The connections may be switches, e.g., as discussed in reference to FIGS. 41A and 41B. In one embodiment, each network includes two sub-networks (or two channels on the network), e.g., one for the data path network in FIG. 41A and one for the flow control (e.g., backpressure) path network in FIG. 41B. As one example, local network A1702 (e.g., set up as a control interconnect) is depicted as being switched (e.g., connected) to control input buffer A1722. In this embodiment, a data path (e.g., network as in FIG. 41A) may carry the control input value (e.g., bit or bits) (e.g., a control token) and the flow control path (e.g., network) may carry the backpressure signal (e.g., backpressure or no-backpressure token) from control input buffer A1722, e.g., to indicate to the upstream producer (e.g., PE) that a new control input value is not to be loaded into (e.g., sent to) control input buffer A1722 until the backpressure signal indicates there is room in the control input buffer A1722 for the new control input value (e.g., from a control output buffer of the upstream producer). In one embodiment, the new control input value may not enter control input buffer A1722 until both (i) the upstream producer receives the "space available" backpressure signal from "control input" buffer A1722 and (ii) the new control input value is sent from the upstream producer, e.g., and this may stall the processing element A1700 until that happens (and space in the target, output buffer(s) is available).

Data input buffer A1724 and data input buffer A1726 may perform similarly, e.g., local network A1704 (e.g., set up as a data (as opposed to control) interconnect) is depicted as being switched (e.g., connected) to data input buffer A1724. In this embodiment, a data path (e.g., network as in FIG. 41A) may carry the data input value (e.g., bit or bits) (e.g., a dataflow token) and the flow control path (e.g., network) may carry the backpressure signal (e.g., backpressure or no-backpressure token) from data input buffer A1724, e.g., to indicate to the upstream producer (e.g., PE) that a new data input value is not to be loaded into (e.g., sent to) data input buffer A1724 until the backpressure signal indicates there is room in the data input buffer A1724 for the new data input value (e.g., from a data output buffer of the upstream producer). In one embodiment, the new data input value may not enter data input buffer A1724 until both (i) the upstream producer receives the "space available" backpressure signal from "data input" buffer A1724 and (ii) the new data input value is sent from the upstream producer, e.g., and this may stall the processing element A1700 until that happens (and space in the target, output buffer(s) is available). A control output value and/or data output value may be stalled in their respective output buffers (e.g., A1732, A1734, A1736) until a backpressure signal indicates there is available space in the input buffer for the downstream processing element(s).

A processing element A1700 may be stalled from execution until its operands (e.g., a control input value and its corresponding data input value or values) are received and/or until there is room in the output buffer(s) of the processing element A1700 for the data that is to be produced by the execution of the operation on those operands.

FIG. 17 illustrates a processing element B1700 according to embodiments of the disclosure. In one embodiment, operation configuration register B1719 is loaded during configuration (e.g., mapping) and specifies the particular operation (or operations) this processing (e.g., compute) element is to perform. Register B1720 activity may be controlled by that operation (an output of mux B1716, e.g., controlled by the scheduler B1714). Scheduler B1714 may schedule an operation or operations of processing element B1700, for example, when input data and control input arrives. Control input buffer B1722 is connected to local network B1702 (e.g., and local network B1702 may include a data path network as in FIG. 41A and a flow control path network as in FIG. 41B) and is loaded with a value when it arrives (e.g., the network has a data bit(s) and valid bit(s)). Control output buffer B1732, data output buffer B1734, and/or data output buffer B1736 may receive an output of processing element B1700, e.g., as controlled by the operation (an output of mux B1716). Status register B1738 may be loaded whenever the ALU B1718 executes (also controlled by output of mux B1716). Data in control input buffer B1722 and control output buffer B1732 may be a single bit. Mux B1721 (e.g., operand A) and mux B1723 (e.g., operand B) may source inputs.

For example, suppose the operation of this processing (e.g., compute) element is (or includes) what is called call a pick in FIG. 42. The processing element B1700 then is to select data from either data input buffer B1724 or data input buffer B1726, e.g., to go to data output buffer B1734 (e.g., default) or data output buffer B1736. The control bit in B1722 may thus indicate a 0 if selecting from data input buffer B1724 or a 1 if selecting from data input buffer B1726.

For example, suppose the operation of this processing (e.g., compute) element is (or includes) what is called call a switch in FIG. 42. The processing element B1700 is to output data to data output buffer B1734 or data output buffer B1736, e.g., from data input buffer B1724 (e.g., default) or data input buffer B1726. The control bit in B1722 may thus indicate a 0 if outputting to data output buffer B1734 or a 1 if outputting to data output buffer B1736.

Multiple networks (e.g., interconnects) may be connected to a processing element, e.g., (input) networks B1702, B1704, B1706 and (output) networks B1708, B1710, B1712. The connections may be switches, e.g., as discussed in reference to FIGS. 41A and 41B. In one embodiment, each network includes two sub-networks (or two channels on the network), e.g., one for the data path network in FIG. 41A and one for the flow control (e.g., backpressure) path network in FIG. 41B. As one example, local network B1702 (e.g., set up as a control interconnect) is depicted as being switched (e.g., connected) to control input buffer B1722. In this embodiment, a data path (e.g., network as in FIG. 41A) may carry the control input value (e.g., bit or bits) (e.g., a control token) and the flow control path (e.g., network) may carry the backpressure signal (e.g., backpressure or no-backpressure token) from control input buffer B1722, e.g., to indicate to the upstream producer (e.g., PE) that a new control input value is not to be loaded into (e.g., sent to) control input buffer B1722 until the backpressure signal indicates there is room in the control input buffer B1722 for the new control input value (e.g., from a control output buffer of the upstream producer). In one embodiment, the new control input value may not enter control input buffer B1722 until both (i) the upstream producer receives the "space available" backpressure signal from "control input" buffer B1722 and (ii) the new control input value is sent from the upstream producer, e.g., and this may stall the processing element B1700 until that happens (and space in the target, output buffer(s) is available).

Data input buffer B1724 and data input buffer B1726 may perform similarly, e.g., local network B1704 (e.g., set up as a data (as opposed to control) interconnect) is depicted as being switched (e.g., connected) to data input buffer B1724. In this embodiment, a data path (e.g., network as in FIG. 41A) may carry the data input value (e.g., bit or bits) (e.g., a dataflow token) and the flow control path (e.g., network) may carry the backpressure signal (e.g., backpressure or no-backpressure token) from data input buffer B1724, e.g., to indicate to the upstream producer (e.g., PE) that a new data input value is not to be loaded into (e.g., sent to) data input buffer B1724 until the backpressure signal indicates there is room in the data input buffer B1724 for the new data input value (e.g., from a data output buffer of the upstream producer). In one embodiment, the new data input value may not enter data input buffer B1724 until both (i) the upstream producer receives the "space available" backpressure signal from "data input" buffer B1724 and (ii) the new data input value is sent from the upstream producer, e.g., and this may stall the processing element B1700 until that happens (and space in the target, output buffer(s) is available). A control output value and/or data output value may be stalled in their respective output buffers (e.g., B1732, B1734, B1736) until a backpressure signal indicates there is available space in the input buffer for the downstream processing element(s).

A processing element B1700 may be stalled from execution until its operands (e.g., a control input value and its corresponding data input value or values) are received and/or until there is room in the output buffer(s) of the processing element B1700 for the data that is to be produced by the execution of the operation on those operands. Networks (e.g., channels thereof) A1702, A1704, A1706 may be the same as networks (e.g., channels thereof) B1702, B1704, B1706, and accordingly for other networks.

First processing element A1700 and a second processing element B1700 of a first (e.g., lower) width are combined to logically form a single processing element with a higher width. For example, combination control register 1707 may have a value written to it (e.g., during configuration of the PEs) that controls whether first processing element A1700 and second processing element B1700 of a first (e.g., lower) width are combined to logically form a single processing element with a higher width, e.g., as the output of the combined PEs. In one embodiment, a first value (e.g., zero) turns the combination functionality off and a second value (e.g., one) turns the combination functionality on. That may be used as input as depicted on line 1711, line 1713, and/or line 1715. For example, a turned-on value in combination control register 1707 may make AND logic gate 1705 output a one when the other input (e.g., which will receive a one (control signal) when ALU A1718 outputs its output value). That value may then travel on line 1717 as an input to then cause ALU B1718 to perform its operations. When the value in combination control register 1707 turns the combination feature off, each PE may function on its own, e.g., to form a 32-bit output. When the value in combination control register 1707 turns the combination feature on, e.g., the circuitry may yoke the control together, e.g., to form a 64-bit output. In one embodiment, ALU A1718 may use lines 1703 and 1715 to provide a carry (e.g., arithmetic) to ALU B1718. In one embodiment, a single operation configuration in either of the first processing element A1700 and a second processing element B1700 may cause the other processing element to perform the combined operation. In another embodiment, a same operation configuration in used (e.g., configured) in both operation configuration register A1719 of the first processing element A1700 and operation configuration register B1719 of second processing element B1700.

For example, a turned-on value in combination control register 1707 may go to scheduler A1714 on line 1709 and scheduler B1714 on line 1711, e.g., to select the combined configuration from operation configuration register A1719 of the first processing element A1700 and operation configuration register B1719 of second processing element B1700. Line 1717 may be a path between scheduler A1714 and scheduler B1714, e.g., so they may agree to execute simultaneously (e.g., when all have values and room for output, e.g., four "inputs" total.

In one embodiment, the output from each first processing element A1700 and a second processing element B1700 goes out on its respective (e.g., 32-bit) channel. In another embodiment, the output from each first processing element A1700 and a second processing element B1700 goes out together on a single (e.g., 64-bit) channel.

Certain embodiments herein provide for a carry architecture and microarchitecture to enable the creation of wide arithmetic operations. Certain embodiments herein steer dynamically generated values to the carry chain of a processing element (e.g., an ALU thereof). Certain embodiments herein allow for wide-precision arithmetic operations, e.g., addition. This may be useful to construct wide operations, for example, to do 256-bit key sorting.

Figure 18:
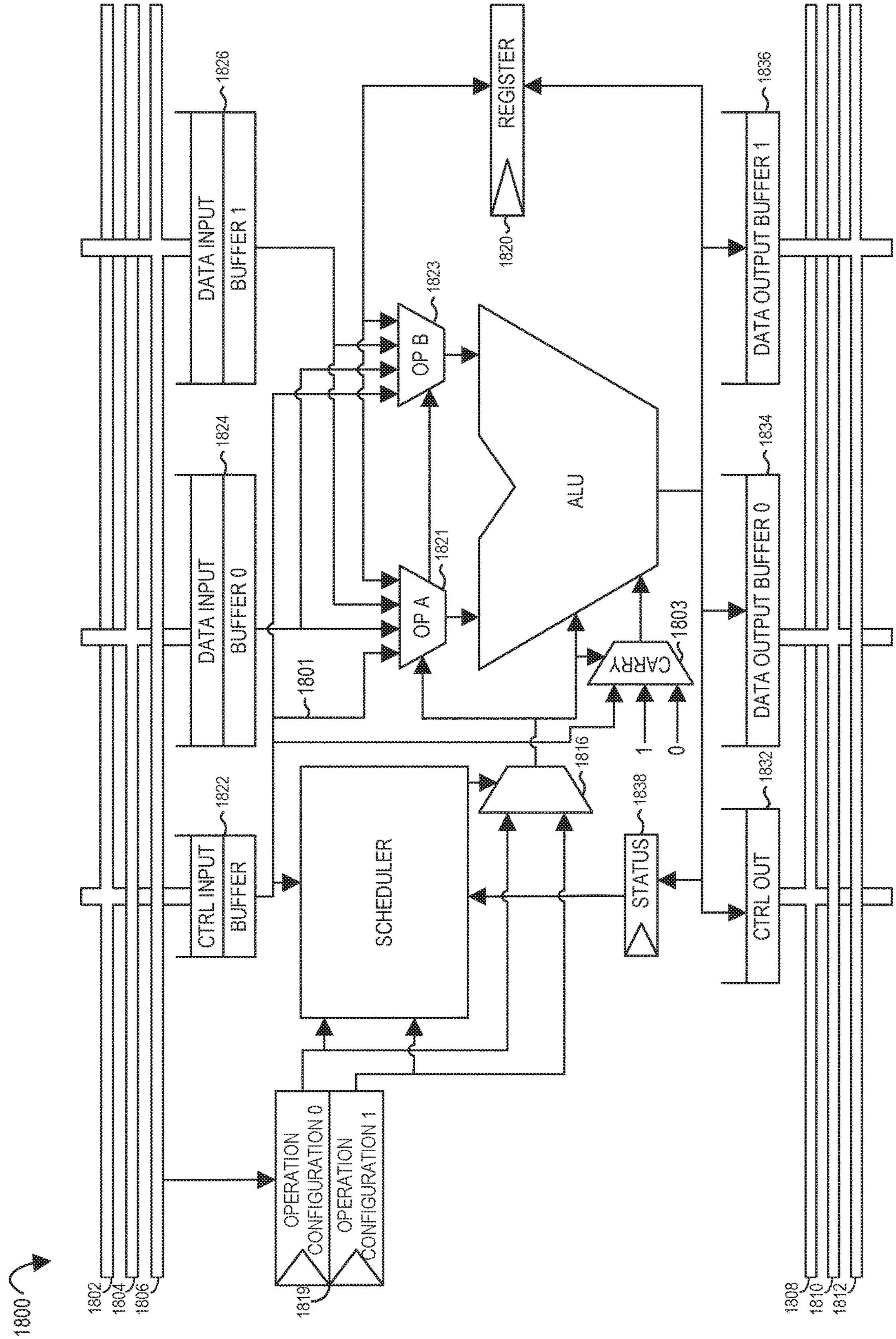
FIG. 18 illustrates a processing element that supports control carry-in according to embodiments of the disclosure.

FIG. 18 illustrates a processing element 1800 that supports control carry-in according to embodiments of the disclosure. In one embodiment, operation configuration register 1819 is loaded during configuration (e.g., mapping) and specifies the particular operation (or operations) this processing (e.g., compute) element is to perform. Register 1820 activity may be controlled by that operation (an output of mux 1816, e.g., controlled by the scheduler 1814). Scheduler 1814 may schedule an operation or operations of processing element 1800, for example, when input data and control input arrives. Control input buffer 1822 is connected to local network 1802 (e.g., and local network 1802 may include a data path network as in FIG. 41A and a flow control path network as in FIG. 41B) and is loaded with a value when it arrives (e.g., the network has a data bit(s) and valid bit(s)). Control output buffer 1832, data output buffer 1834, and/or data output buffer 1836 may receive an output of processing element 1800, e.g., as controlled by the operation (an output of mux 1816). Status register 1838 may be loaded whenever the ALU 1818 executes (also controlled by output of mux 1816). Data in control input buffer 1822 and control output buffer 1832 may be a single bit. Mux 1821 (e.g., operand A) and mux 1823 (e.g., operand B) may source inputs.

For example, suppose the operation of this processing (e.g., compute) element is (or includes) what is called call a pick in FIG. 42. The processing element 1800 then is to select data from either data input buffer 1824 or data input buffer 1826, e.g., to go to data output buffer 1834 (e.g., default) or data output buffer 1836. The control bit in 1822 may thus indicate a 0 if selecting from data input buffer 1824 or a 1 if selecting from data input buffer 1826.

For example, suppose the operation of this processing (e.g., compute) element is (or includes) what is called call a switch in FIG. 42. The processing element 1800 is to output data to data output buffer 1834 or data output buffer 1836, e.g., from data input buffer 1824 (e.g., default) or data input buffer 1826. The control bit in 1822 may thus indicate a 0 if outputting to data output buffer 1834 or a 1 if outputting to data output buffer 1836.

Multiple networks (e.g., interconnects) may be connected to a processing element, e.g., (input) networks 1802, 1804, 1806 and (output) networks 1808, 1810, 1812. The connections may be switches, e.g., as discussed in reference to FIGS. 41A and 41B. In one embodiment, each network includes two sub-networks (or two channels on the network), e.g., one for the data path network in FIG. 41A and one for the flow control (e.g., backpressure) path network in FIG. 41B. As one example, local network 1802 (e.g., set up as a control interconnect) is depicted as being switched (e.g., connected) to control input buffer 1822. In this embodiment, a data path (e.g., network as in FIG. 41A) may carry the control input value (e.g., bit or bits) (e.g., a control token) and the flow control path (e.g., network) may carry the backpressure signal (e.g., backpressure or no-backpressure token) from control input buffer 1822, e.g., to indicate to the upstream producer (e.g., PE) that a new control input value is not to be loaded into (e.g., sent to) control input buffer 1822 until the backpressure signal indicates there is room in the control input buffer 1822 for the new control input value (e.g., from a control output buffer of the upstream producer). In one embodiment, the new control input value may not enter control input buffer 1822 until both (i) the upstream producer receives the "space available" backpressure signal from "control input" buffer 1822 and (ii) the new control input value is sent from the upstream producer, e.g., and this may stall the processing element 1800 until that happens (and space in the target, output buffer(s) is available).

Data input buffer 1824 and data input buffer 1826 may perform similarly, e.g., local network 1804 (e.g., set up as a data (as opposed to control) interconnect) is depicted as being switched (e.g., connected) to data input buffer 1824. In this embodiment, a data path (e.g., network as in FIG. 41A) may carry the data input value (e.g., bit or bits) (e.g., a dataflow token) and the flow control path (e.g., network) may carry the backpressure signal (e.g., backpressure or no-backpressure token) from data input buffer 1824, e.g., to indicate to the upstream producer (e.g., PE) that a new data input value is not to be loaded into (e.g., sent to) data input buffer 1824 until the backpressure signal indicates there is room in the data input buffer 1824 for the new data input value (e.g., from a data output buffer of the upstream producer). In one embodiment, the new data input value may not enter data input buffer 1824 until both (i) the upstream producer receives the "space available" backpressure signal from "data input" buffer 1824 and (ii) the new data input value is sent from the upstream producer, e.g., and this may stall the processing element 1800 until that happens (and space in the target, output buffer(s) is available). A control output value and/or data output value may be stalled in their respective output buffers (e.g., 1832, 1834, 1836) until a backpressure signal indicates there is available space in the input buffer for the downstream processing element(s).

A processing element 1800 may be stalled from execution until its operands (e.g., a control input value and its corresponding data input value or values) are received and/or until there is room in the output buffer(s) of the processing element 1800 for the data that is to be produced by the execution of the operation on those operands.

Processing elements herein may also input and output carry connections (e.g., connection 1801). For example, ALU 1818 may add two four-bit numbers and that result may be 5-bits, so need to use an overflow bit (e.g., when output lane is not large enough to include the carry therein). This may be utilized for propagating carries, e.g., to other PE or PEs. Control input buffer 1822 and control output buffer 1832 (and network channels connected thereto) may be used to transport the carry bit. Configuration to use the network for carry bits may be part of the compiled graph, e.g., in the mapping step. Multiplexer 1803 (for example, controlled by scheduler 1814, e.g., by a configuration in operation configuration register 1819) may allow the selection of that carry bit, e.g., when the carry bit is detected (e.g., as output from ALU 1818). Carry bit may be routed to control output buffer 1832 and then travel to a downstream processing element, e.g., into downstream processing element's control input buffer. Additionally, multiplexer 1803 may supply a static zero and a static one, e.g., for addition and subtraction.

FIG. 18 shows an example of the microarchitecture and architectural support used for carry chaining in a processing element. Multiplexor 1803 may select among potential carry bits, e.g., including bits sourced external to the PE. Possible configuration(s) in operation in operation configuration register 1819 may be extended to support this mux select. FIG. 18 shows an embodiment of this microarchitecture in the context of an integer ALU, but other components may include and utilize a carry. Carry bit(s) may be used as data on a control network or on other network(s) (e.g., input channel(s)).

Figure 19:
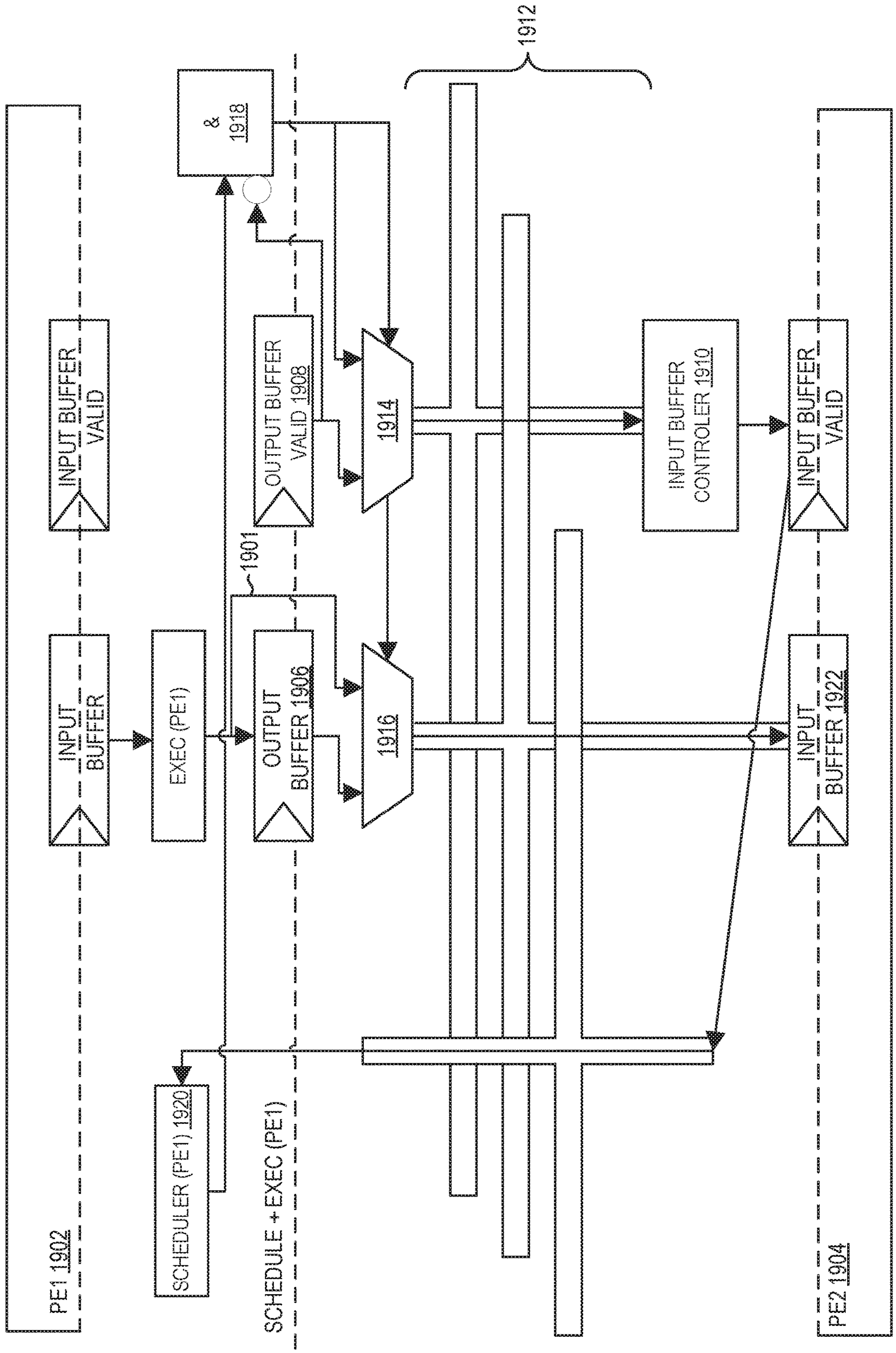
FIG. 19 depicts a bypass path between a first processing element and a second processing element according to embodiments of the disclosure.

Certain spatial arrays may either be asynchronous, e.g., in which a variable clock is used to accommodate application critical path, or synchronous in which a fixed amount of work is done per cycle, e.g., using a fixed clock. Synchronous fabrics may usually be clocked at much higher frequencies. However, the longest circuit critical path in the synchronous fabric may determine cycle time, e.g., which may add a latency penalty to designs which do not make use of this path. Certain embodiments herein provide an architecture for output bypassing, e.g., which allows the result of a processing element (PE) operation in a spatial fabric to be directly forwarded to a downstream PE, e.g., if cycle timing permits. Examples include direct forwarding to a neighboring PE or otherwise local PE. Certain embodiments herein utilize specific bypass routes, e.g., instead of a coarsely variable clock, to overcome issues with a critical path length. Certain embodiments herein extend a coarse-grained spatial architecture to support output bypassing. Although one benefit of output bypassing may occur in the inter-PE network, output bypassing may include modification only to the internal PEs. Certain embodiments herein utilize a bypass mux to select between the PE (e.g., ALU) output and the PE output buffer. The PE control circuit may control this mux select. Certain embodiments herein provide hardware support for output buffer bypassing. Certain embodiments herein provide for conditional dequeue to enables the concise description of many algorithms including sort and sparse matrix algebra. By implementing specific support for conditional dequeue, certain embodiments herein enable these algorithms to be realized on spatial architectures FIG. 19 depicts a (e.g., buffer) bypass path 1801 between a first processing element 1802 (PE1) and a second processing element 1804 (PE2) according to embodiments of the disclosure. Certain embodiments herein allow output data to not be stopped at output buffer (e.g., latch), so can go on the network directly, e.g., to bypass the output buffer. Certain embodiments herein provide two (e.g., types) of paths from an element of a spatial array (e.g., a processing element as discussed herein). The path utilized may be determined by a complier (e.g., placement route).

Input buffer controller 1810 may be on another (e.g., the other) side of the network 1912, for example, as part of another PE that the output data is to go to, e.g., PE 1904 (shown as a block). PE and networks may be any PE or network discussed herein. Output buffer valid 1906 may store data used to actuate PE2 1904 and/or used as input to PE2 1904, sent there by PE1 1902. Execution may indicates data is available out of PE1 1902, so then check PE2 1904 for room to store that data, e.g., in input buffer of PE1 1902. In one embodiment, a processing element may try to land remotely using the buffer bypass path, but if it cannot utilize the buffer bypass path, it may then either (i) don't perform the operation or (ii) land the data in the local output buffer. Scheduler 1920 may to control buffer bypass path 1801 with AND gate 1918 (e.g., with the NOT gate illustrated on an input as a hollow circle). AND gate may be utilized in the (ii) example above to land the data in the local output buffer. So AND gate may be optional to perform (ii) above.

FIG. 19 shows a detailed diagram of an output bypassing scheme. Based on a configuration value (e.g., to scheduler 1920), the bypass selection may be enabled. This may allow a compiler to determine whether a particular configuration will meet timing with bypassing enabled. The compiler may choose to disable bypass in the case that timing cannot be met.

Figure 20:
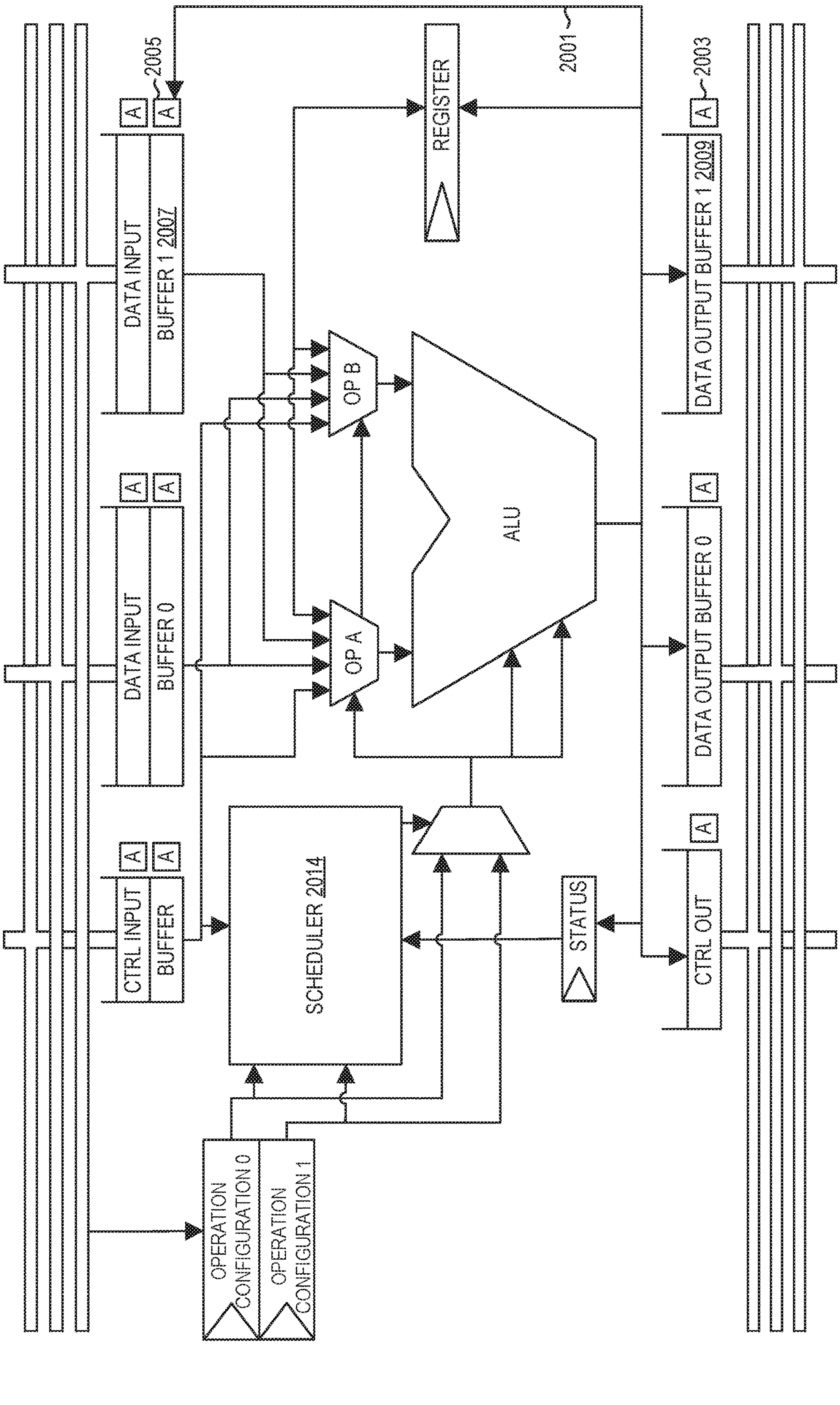
FIG. 20 illustrates a processing element that supports antitoken flow according to embodiments of the disclosure.
Figure 21:
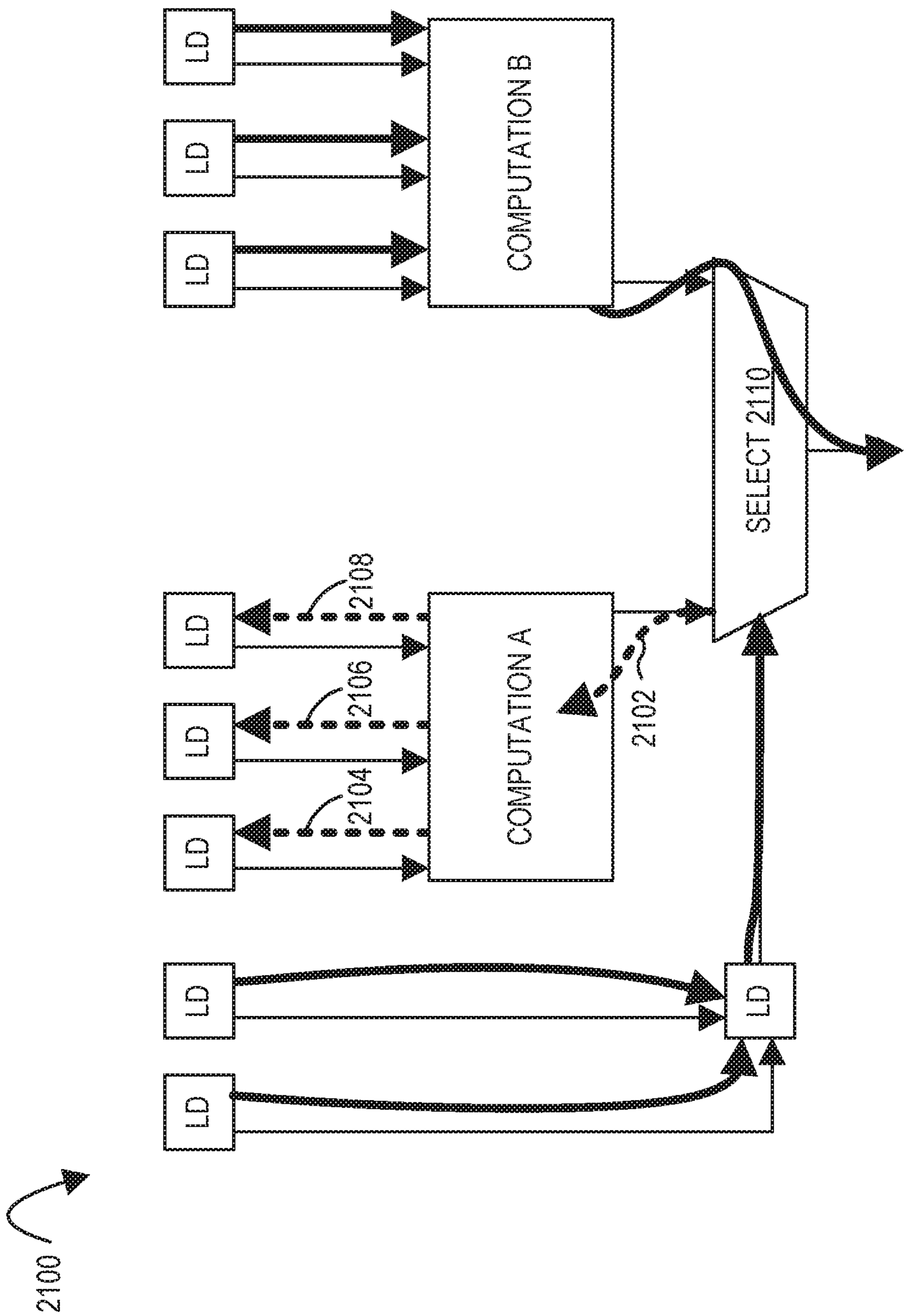
FIG. 21 illustrates an antitoken flow according to embodiments of the disclosure.

If bypassing is enabled, then scheduler 1920 of PE1 1902 will set the bypass mux 1916 (and/or output buffer valid mux 1914) based on whether the downstream PE has (e.g., input) buffer space in a given cycle. If no buffer is available (e.g., no usable space available in input buffer 1922 in PE2 1904), then the data will be steered to the local output buffer 1906. In one embodiment, a PE preserves operation ordering, e.g., so the bypass may not be used if prior computational results remain in the output buffer (e.g., there is no usable space). If (e.g., input) buffer 1922 is available at the downstream PE, then bypass multiplexors (1916, 1914) may be activated for both data and control, e.g., allowing the sending of the data to PE2 (e.g., input buffer of PE2) in a single cycle. Turning now to FIGS. 20-21, embodiments of antitokens are disclosed.

One way of improving energy efficiency is dynamically discovering that portions of the spatial execution of a dataflow graph do not have to be computed. For example, an "if" statement may utilize only the portions of the program graph that will be executed, e.g., depending on the direction of execution taken. Certain embodiments herein eliminating such dynamically unnecessary computations with antitokens. When control flow is resolved, antitokens may be injected into the system which propagate and eliminate unneeded forward data tokens (e.g., data values and/or control values). Certain embodiments herein provide the microarchitecture and architecture for implementing antitokens within a spatial array. Certain embodiments herein define a microarchitecture for the implementation of antitokens within a dataflow-oriented spatial architecture. Certain embodiments herein provide for the injection and propagation of antitokens, e.g., to avoid the execution of certain unneeded portions of a dataflow graph.

Antitokens may be used to build some classes of low-latency, low-energy dataflow graphs, e.g., since unused values may be dynamically eliminated and left uncomputed. This may be useful, for example, in datasets which have highly non-uniform cache behavior, or if the legs of a conditional (e.g., "if") statement involve substantial computation. Antitokens may also lower certain dataflow operations which block for input, like blocking select, to non-blocking, e.g., when the antitoken injection will eliminate any tokens in the non-chosen path. Power efficiency may be a key driver of spatial architectures. Antitokens may allow spatial programs to opportunistically eliminate computation based on flow control decisions. Thus, e.g., for some calculations, it may help reduce overall energy consumption.

FIG. 20 illustrates a processing element 2000 that supports antitoken flow according to embodiments of the disclosure. Antitoken field is depicted in FIG. 20 as its own data location (e.g., register space) that is labeled "A" (e.g., which may take a value indicating it is an antitoken). Antitokens flow upstream, e.g., so antitoken may delete (e.g., kill) all the data that it is targeted to (e.g., collides with). Certain embodiments herein provide for a buffer and control circuitry to support the flow and generation of antitokens at PEs. Antitokens may be stored in association with forward data flows, e.g., shown as an "A" next to each respective data item that antitoken may destroy. Tokens and antitokens may both annihilate when they collide.

One antitoken might create a plurality of antitokens that flow upstream to stop that dataflow, e.g., as in FIG. 21. Antitokens may be an energy saving mechanism. In one embodiment, antitokens may be sent upstream (e.g., on flow control network), for example, with one bit for flow control and one bit for antitoken).

FIG. 20 shows the system-level architecture of an embodiment of an antitoken mechanism. PEs may be configured to receive antitokens, e.g., which flow in reverse of the normal dataflow (e.g., dataflow tokens). In one embodiment, a PE is to inject antitoken(s) when certain control-related operations are executed. For example, select, which may be used to implement "if" statements, among other uses, may inject an antitoken in the path of the leg not selected, as shown in FIG. 21. Antitokens may flow backwards through the dataflow graph and annihilate (e.g., exactly one) input token. PEs may be configured to fork (e.g., fan out) the antitoken(s) in the case the implemented operator at the PE has multiple (e.g., unconditional) inputs. In certain embodiments (e.g., when a fork is not possible), the antitoken may not be back propagated, e.g., and will wait for a data value to appear to then annihilate it. Antitokens may be implemented as auxiliary one-bit (e.g., backward) channels which are associated with forward data channels. Within PEs, a scheduler may be augmented to recognize the equivalence of the presence of antitokens and tokens, that is, operations may be performed if either tokens or antitokens are present, with slightly different physical behavior and equivalent logical behavior. For example, a scheduler may detect (e.g., on line 2001) antitoken 2005 at a certain data item (e.g., data 2007) and thus may then destroy (e.g., delete) both antitoken 2005 and data 2007. Antitoken 2003 may cause the destruction of data 2009. In one embodiment, new signals are utilized for antitoken(s) in the (e.g., circuit-switched) network, e.g., such that corresponding antitoken and token paths are always paired. The data format for an antitoken may be empty (e.g., not used) and full (e.g., destroy the corresponding token(s)). Scheduler may include circuitry to dequeue inputs if antitokens and tokens are available at a particular PE, e.g., to results in the destruction of those token(s) and antitoken(s). In one embodiment, when only antitoken(s) are available, the antitoken(s) would be back-propagated to prior PEs using the (e.g., circuit switched) network. Antitokens may flow on a network in parallel with flow-control signals travelling in reverse direction to the (e.g., main) data networks. One implementation is a zero-bit data item that just has the valid bit (e.g., which serves as the antitoken). At each point on the path back up (e.g., of the dataflow graph), the downstream data path may be checked to see if a valid data value is live (e.g., downstream valid bit that may be referred to as a token). When a valid (e.g., data) token is found, then both the antitoken and the (e.g., data) token are cleared. If a fork in the dataflow graph is encountered (e.g., and it is not determined whether both paths or only one will have data), then the antitoken may stop travelling backwards and wait for a data (e.g., a token) to arrive to have its valid bit cleared (e.g., the token and antitoken are cleared).

In one embodiment, operation configuration register 2019 is loaded during configuration (e.g., mapping) and specifies the particular operation (or operations) this processing (e.g., compute) element is to perform. Register 2020 activity may be controlled by that operation (an output of mux 2016, e.g., controlled by the scheduler 2014). Scheduler 2014 may schedule an operation or operations of processing element 2000, for example, when input data and control input arrives. Control input buffer 2022 is connected to local network 2002 (e.g., and local network 2002 may include a data path network as in FIG. 41A and a flow control path network as in FIG. 41B) and is loaded with a value when it arrives (e.g., the network has a data bit(s) and valid bit(s)). Control output buffer 2032, data output buffer 2034, and/or data output buffer 2036 may receive an output of processing element 2000, e.g., as controlled by the operation (an output of mux 2016). Status register 2038 may be loaded whenever the ALU 2018 executes (also controlled by output of mux 2016). Data in control input buffer 2022 and control output buffer 2032 may be a single bit. Mux 2021 (e.g., operand A) and mux 2023 (e.g., operand B) may source inputs.

For example, suppose the operation of this processing (e.g., compute) element is (or includes) what is called call a pick in FIG. 42. The processing element 2000 then is to select data from either data input buffer 2024 or data input buffer 2026, e.g., to go to data output buffer 2034 (e.g., default) or data output buffer 2036. The control bit in 2022 may thus indicate a 0 if selecting from data input buffer 2024 or a 1 if selecting from data input buffer 2026.

For example, suppose the operation of this processing (e.g., compute) element is (or includes) what is called call a switch in FIG. 42. The processing element 2000 is to output data to data output buffer 2034 or data output buffer 2036, e.g., from data input buffer 2024 (e.g., default) or data input buffer 2026. The control bit in 2022 may thus indicate a 0 if outputting to data output buffer 2034 or a 1 if outputting to data output buffer 2036.

Multiple networks (e.g., interconnects) may be connected to a processing element, e.g., (input) networks 2002, 2004, 2006 and (output) networks 2008, 2010, 2012. The connections may be switches, e.g., as discussed in reference to FIGS. 41A and 41B. In one embodiment, each network includes two sub-networks (or two channels on the network), e.g., one for the data path network in FIG. 41A and one for the flow control (e.g., backpressure) path network in FIG. 41B. As one example, local network 2002 (e.g., set up as a control interconnect) is depicted as being switched (e.g., connected) to control input buffer 2022. In this embodiment, a data path (e.g., network as in FIG. 41A) may carry the control input value (e.g., bit or bits) (e.g., a control token) and the flow control path (e.g., network) may carry the backpressure signal (e.g., backpressure or no-backpressure token) from control input buffer 2022, e.g., to indicate to the upstream producer (e.g., PE) that a new control input value is not to be loaded into (e.g., sent to) control input buffer 2022 until the backpressure signal indicates there is room in the control input buffer 2022 for the new control input value (e.g., from a control output buffer of the upstream producer). In one embodiment, the new control input value may not enter control input buffer 2022 until both (i) the upstream producer receives the "space available" backpressure signal from "control input" buffer 2022 and (ii) the new control input value is sent from the upstream producer, e.g., and this may stall the processing element 2000 until that happens (and space in the target, output buffer(s) is available).

Data input buffer 2024 and data input buffer 2026 may perform similarly, e.g., local network 2004 (e.g., set up as a data (as opposed to control) interconnect) is depicted as being switched (e.g., connected) to data input buffer 2024. In this embodiment, a data path (e.g., network as in FIG. 41A) may carry the data input value (e.g., bit or bits) (e.g., a dataflow token) and the flow control path (e.g., network) may carry the backpressure signal (e.g., backpressure or no-backpressure token) from data input buffer 2024, e.g., to indicate to the upstream producer (e.g., PE) that a new data input value is not to be loaded into (e.g., sent to) data input buffer 2024 until the backpressure signal indicates there is room in the data input buffer 2024 for the new data input value (e.g., from a data output buffer of the upstream producer). In one embodiment, the new data input value may not enter data input buffer 2024 until both (i) the upstream producer receives the "space available" backpressure signal from "data input" buffer 2024 and (ii) the new data input value is sent from the upstream producer, e.g., and this may stall the processing element 2000 until that happens (and space in the target, output buffer(s) is available). A control output value and/or data output value may be stalled in their respective output buffers (e.g., 2032, 2034, 2036) until a backpressure signal indicates there is available space in the input buffer for the downstream processing element(s).

A processing element 2000 may be stalled from execution until its operands (e.g., a control input value and its corresponding data input value or values) are received and/or until there is room in the output buffer(s) of the processing element 2000 for the data that is to be produced by the execution of the operation on those operands.

FIG. 21 illustrates an antitoken flow 2100 according to embodiments of the disclosure. The solid lines and arrows represent the normal forward data (e.g., token) flow in FIG. 21, while the dotted lines (2102, 2104, 2106, 2108) represent an antitoken flow 2100. Here, circuitry (for example, a scheduler, e.g., scheduler 2014 in FIG. 20) has generated a series of antitokens for the unused leg of the computation of the select operator 2010. Antitoken(s) may flow backward (e.g., on their own data channels) from computation, e.g., dynamically pruning portions of a dataflow graph. The thinner arrows and lines may be the network (e.g., circuit switched network) and the thicker/bolder arrows and lines may a representation of data flow.

FIG. 21 shows a program-level representation of how an antitoken may remove a computation(s). Antitokens (e.g., four antitokens) are injected on the non-selected leg of the select operator when one leg of a control flow statement is taken, e.g., if value(s) on the the non-selected leg have not arrived. In one embodiment, had the value(s) previously arrived, they may have been consumed. In one embodiment as the antitoken flows to an output, the inputs used to create the output may generate antitokens which flow backward to their sources. Antitokens may be removed when they collide with forward-flowing data tokens.

In certain spatial architectures, communications may often occurs over statically configured paths. If the paths are circuit switched, in one embodiment, both sides must agree on how often to sample the signals. If the communicators are nearby, they may sample every cycle. If they are far, they may sample less often. Certain embodiments herein provide a configurable microarchitecture for achieving distributed agreement on when to sample a communications signal. Certain embodiments herein define an architecture and microarchitecture for the implementation of configurable multi-cycle paths. Certain embodiments herein use a shift register to implement rendezvous cycles in the spatial array (e.g., fabric) domain. Rendezvous cycles may be multiple cycles apart, e.g., enabling signals to travel long distances. Certain embodiments herein provide that (e.g., all) circuit switched communications do not have to occur within a single cycle. Certain embodiments herein provide for long-distance transfers to help map a larger set of programs to a spatial fabric, e.g., while preserving high performance in programs dominated by local communication.

Figure 22:
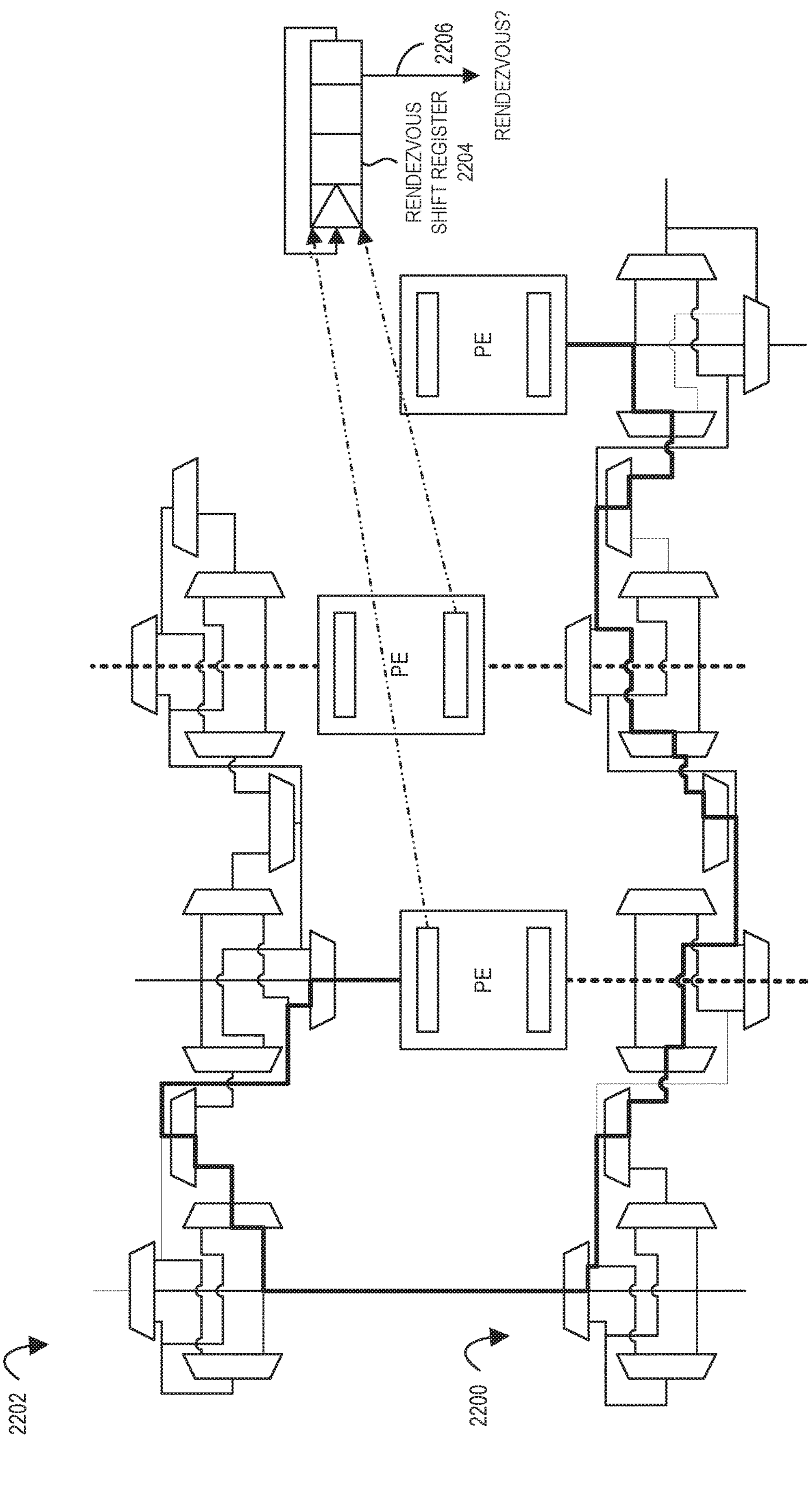
FIG. 22 illustrates circuitry for distributed rendezvous according to embodiments of the disclosure.

FIG. 22 illustrates circuitry 2200 for distributed rendezvous according to embodiments of the disclosure. Circuitry 2200 includes multiple processing elements (PEs) coupled together by a circuit-switched network 2202, for example, configured in FIG. 22 to follow the bold path as set by the plurality of multiplexers, e.g., as discussed herein (e.g., in reference to FIG. 41A). FIG. 22 shows the system-level architecture of a multicycle communication interface. Rendezvous shift register 2204 may be used to determine when to sample communications signals from the circuit switched network. For example, when the low order bit of the rendezvous shift register 2204 is a logical high, communications protocol signals (e.g., the ready and/or valid signals of the local network) may be sampled. For example, when the low order bit of the shift register is a logical low, communications protocol signals are not sampled. The rendezvous shift register 2204 may also participate in scheduling, e.g., since the transmitter may not change signals during zeroed shift register cycles. Adding latching to the transmitter protocol may eliminate this problem, and allow data to be computed prior to making it visible downstream. Both transmitter and receiver (for example, the transmitting PE(s) and the receiving PE(s), e.g., forming the endpoints of the channel) may be configured with the same initial rendezvous shift register value, e.g., ensuring that they remain synchronized during operation. For more refined control, a counter with configurable overflow may be used. Here, signals may be sampled on counter zero.

Distributed rendezvous may add state elements that permit the rendezvous of signals, e.g., to construct multicycle paths without a special clock. For example, counters (e.g., shift register) may be placed at each PE that determine when the PE is to sample input data (e.g., not every clock cycle). For example, physically, a long path might take several cycles for the signal to propagate through and have to wait to send a signal, e.g., both sides (sender and receiver) are to agree (e.g., via signals coming from rendezvous shift register 2204) before a new signal is sent. So rendezvous shift register 2204 may accomplish the scheduling here. In one embodiment, a transmission by a first PE and reception by a second PE may take a plurality of (e.g., 5) cycles (e.g., to propagate through the (e.g., circuit switched) network), so the rendezvous shift register 2204 may be set such that a transmitting PE holds its output for the appropriate (for example, the plurality of transmission cycles or the plurality of cycles plus one, e.g., 5 or 6) number of cycles to arrive at (and be received into) the receiving PE (e.g., and the receiving PE may also receive during that time). For example, the shift register may shift a plurality of high (e.g., binary 1) elements for the number of appropriate cycles, and both PEs perform their respective transmission and receiving actions then, e.g., followed by that signal from the shift register returning to low (e.g., binary 0) and stopping that transmission/reception operation.

Spatial arrays, such as the spatial array of processing elements 101 in FIG. 1, may use (e.g., packet switched) networks for communications. Certain embodiments herein provide circuitry to overlay high-radix dataflow operations on these networks for communications. For example, certain embodiments herein utilize the existing network for communications (e.g., interconnect network 104 described in reference to FIG. 1) to provide data routing capabilities between processing elements and other components of the spatial array, but also augment the network (e.g., network endpoints) to support the performance and/or control of some (e.g., less than all) of dataflow operations (e.g., without utilizing the processing elements to perform those dataflow operations). In one embodiment, (e.g., high radix) dataflow operations are supported with special hardware structures (e.g. network dataflow endpoint circuits) within a spatial array, for example, without consuming processing resources or degrading performance (e.g., of the processing elements).

In one embodiment, a circuit switched network between two points (e.g., between a producer and consumer of data) includes a dedicated communication line between those two points, for example, with (e.g., physical) switches between the two points set to create a (e.g., exclusive) physical circuit between the two points. In one embodiment, a circuit switched network between two points is set up at the beginning of use of the connection between the two points and maintained throughout the use of the connection. In another embodiment, a packet switched network includes a shared communication line (e.g., channel) between two (e.g., or more) points, for example, where packets from different connections share that communication line (for example, routed according to data of each packet, e.g., in the header of a packet including a header and a payload). An example of a packet switched network is discussed below, e.g., in reference to a mezzanine network.

Figure 23:
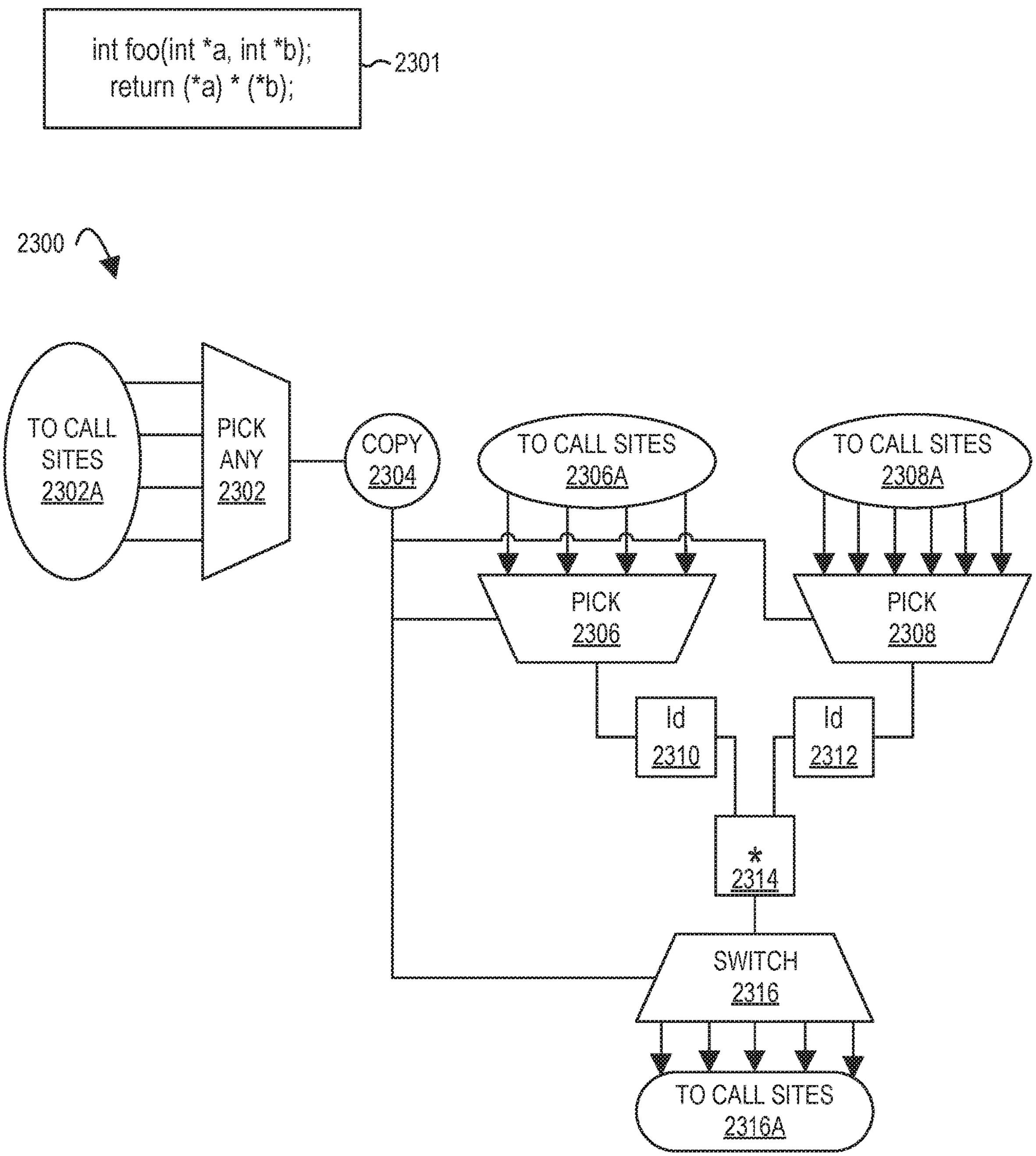
FIG. 23 illustrates a data flow graph of a pseudocode function call according to embodiments of the disclosure.

FIG. 23 illustrates a data flow graph 2300 of a pseudocode function call 2301 according to embodiments of the disclosure. Function call 2301 is to load two input data operands (e.g., indicated by pointers *a and *b, respectively), and multiply them together, and return the resultant data. This or other functions may be performed multiple times (e.g., in a dataflow graph). The dataflow graph in FIG. 23 illustrates a PickAny dataflow operator 2302 to perform the operation of selecting a control data (e.g., an index) (for example, from call sites 2302A) and copying with copy dataflow operator 2304 that control data (e.g., index) to each of the first Pick dataflow operator 2306, second Pick dataflow operator 2306, and Switch dataflow operator 2316. In one embodiment, an index (e.g., from the PickAny thus inputs and outputs data to the same index position, e.g., of [0, 1 . . . M], where M is an integer. First Pick dataflow operator 2306 may then pull one input data element of a plurality of input data elements 2306A according to the control data, and use the one input data element as (*a) to then load the input data value stored at *a with load dataflow operator 2310. Second Pick dataflow operator 2308 may then pull one input data element of a plurality of input data elements 2308A according to the control data, and use the one input data element as (*b) to then load the input data value stored at *b with load dataflow operator 2312. Those two input data values may then be multiplied by multiplication dataflow operator 2314 (e.g., as a part of a processing element). The resultant data of the multiplication may then be routed (e.g., to a downstream processing element or other component) by Switch dataflow operator 2316, e.g., to call sites 2316A, for example, according to the control data (e.g., index) to Switch dataflow operator 2316.

FIG. 23 is an example of a function call where the number of dataflow operators used to manage the steering of data (e.g., tokens) may be significant, for example, to steer the data to and/or from call sites. In one example, one or more of PickAny dataflow operator 2302, first Pick dataflow operator 2306, second Pick dataflow operator 2306, and Switch dataflow operator 2316 may be utilized to route (e.g., steer) data, for example, when there are multiple (e.g., many) call sites. In an embodiment where a (e.g., main) goal of introducing a multiplexed and/or demultiplexed function call is to reduce the implementation area of a particular dataflow graph, certain embodiments herein (e.g., of micro-architecture) reduce the area overhead of such multiplexed and/or demultiplexed (e.g., portions) of dataflow graphs.

FIG. 24 illustrates a spatial array 2401 of processing elements (PEs) with a plurality of network dataflow endpoint circuits (2402, 2404, 2406) according to embodiments of the disclosure. Spatial array 2401 of processing elements may include a communications (e.g., interconnect) network in between components, for example, as discussed herein. In one embodiment, communications network is one or more (e.g., channels of a) packet switched communications network. In one embodiment, communications network is one or more circuit switched, statically configured communications channels. For example, a set of channels coupled together by a switch (e.g., switch 2410 in a first network and switch 2411 in a second network). The first network and second network may be separate or coupled together. For example, switch 2410 may couple one or more of a plurality (e.g., four) data paths therein together, e.g., as configured to perform an operation according to a dataflow graph. In one embodiment, the number of data paths is any plurality. Processing element (e.g., processing element 2408) may be as disclosed herein, for example, as in FIG. 47 Accelerator tile 2400 includes a memory/cache hierarchy interface 2412, e.g., to interface the accelerator tile 2400 with a memory and/or cache. A data path may extend to another tile or terminate, e.g., at the edge of a tile. A processing element may include an input buffer (e.g., buffer 2409) and an output buffer.

Figure 47:
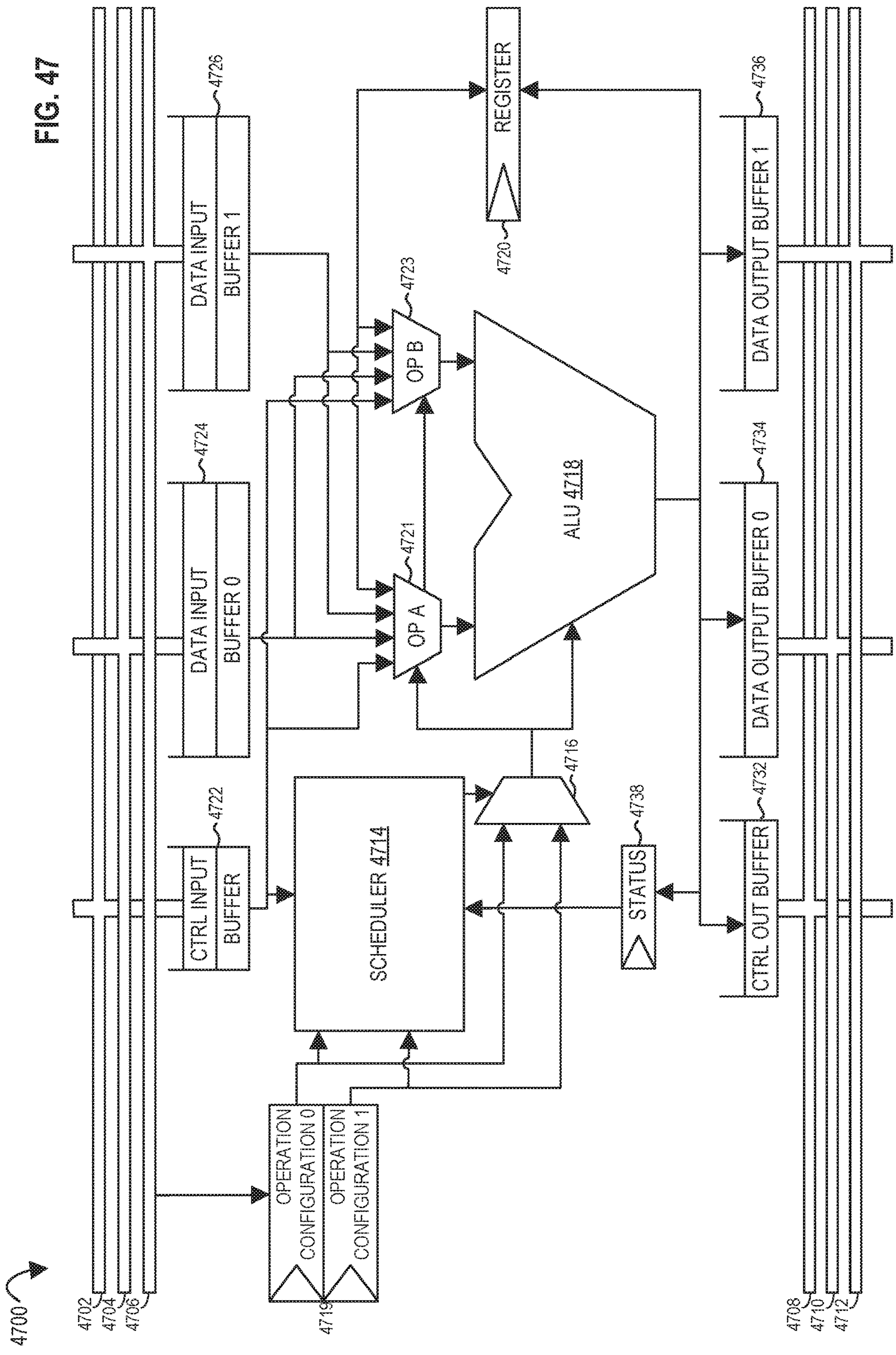
FIG. 47 illustrates a processing element according to embodiments of the disclosure.

Operations may be executed based on the availability of their inputs and the status of the PE. A PE may obtain operands from input channels and write results to output channels, although internal register state may also be used. Certain embodiments herein include a configurable dataflow-friendly PE. FIG. 47 shows a detailed block diagram of one such PE: the integer PE. This PE consists of several I/O buffers, an ALU, a storage register, some instruction registers, and a scheduler. Each cycle, the scheduler may select an instruction for execution based on the availability of the input and output buffers and the status of the PE. The result of the operation may then be written to either an output buffer or to a (e.g., local to the PE) register. Data written to an output buffer may be transported to a downstream PE for further processing. This style of PE may be extremely energy efficient, for example, rather than reading data from a complex, multi-ported register file, a PE reads the data from a register. Similarly, instructions may be stored directly in a register, rather than in a virtualized instruction cache.

Instruction registers may be set during a special configuration step. During this step, auxiliary control wires and state, in addition to the inter-PE network, may be used to stream in configuration across the several PEs comprising the fabric. As result of parallelism, certain embodiments of such a network may provide for rapid reconfiguration, e.g., a tile sized fabric may be configured in less than about 10 microseconds.

Further, depicted accelerator tile 2400 includes packet switched communications network 2414, for example, as part of a mezzanine network, e.g., as described below. Certain embodiments herein allow for (e.g., a distributed) dataflow operations (e.g., operations that only route data) to be performed on (e.g., within) the communications network (e.g., and not in the processing element(s)). As an example, a distributed Pick dataflow operation of a dataflow graph is depicted in FIG. 24. Particularly, distributed pick is implemented using three separate configurations on three separate network (e.g., global) endpoints (e.g., network dataflow endpoint circuits (2402, 2404, 2406)). Dataflow operations may be distributed, e.g., with several endpoints to be configured in a coordinated manner. For example, a compilation tool may understand the need for coordination. Endpoints (e.g., network dataflow endpoint circuits) may be shared among several distributed operations, for example, a dataflow operation (e.g., pick) endpoint may be collated with several sends related to the dataflow operation (e.g., pick). A distributed dataflow operation (e.g., pick) may generate the same result the same as a non-distributed dataflow operation (e.g., pick). In certain embodiment, a difference between distributed and non-distributed dataflow operations is that in the distributed dataflow operations have their data (e.g., data to be routed, but which may not include control data) over a packet switched communications network, e.g., with associated flow control and distributed coordination. Although different sized processing elements (PE) are shown, in one embodiment, each processing element is of the same size (e.g., silicon area). In one embodiment, a buffer element to buffer data may also be included, e.g., separate from a processing element.

As one example, a pick dataflow operation may have a plurality of inputs and steer (e.g., route) one of them as an output, e.g., as in FIG. 23. Instead of utilizing a processing element to perform the pick dataflow operation, it may be achieved with one or more of network communication resources (e.g., network dataflow endpoint circuits). Additionally or alternatively, the network dataflow endpoint circuits may route data between processing elements, e.g., for the processing elements to perform processing operations on the data. Embodiments herein may thus utilize to the communications network to perform (e.g., steering) dataflow operations. Additionally or alternatively, the network dataflow endpoint circuits may perform as a mezzanine network discussed below.

In the depicted embodiment, packet switched communications network 2414 may handle certain (e.g., configuration) communications, for example, to program the processing elements and/or circuit switched network (e.g., network 2413, which may include switches). In one embodiment, a circuit switched network is configured (e.g., programmed) to perform one or more operations (e.g., dataflow operations of a dataflow graph).

Packet switched communications network 2414 includes a plurality of endpoints (e.g., network dataflow endpoint circuits (2402, 2404, 2406). In one embodiment, each endpoint includes an address or other indicator value to allow data to be routed to and/or from that endpoint, e.g., according to (e.g., a header of) a data packet.

Additionally or alternatively to performing one or more of the above, packet switched communications network 2414 may perform dataflow operations. Network dataflow endpoint circuits (2402, 2404, 2406) may be configured (e.g., programmed) to perform a (e.g., distributed pick) operation of a dataflow graph. Programming of components (e.g., a circuit) are described herein. An embodiment of configuring a network dataflow endpoint circuit (e.g., an operation configuration register thereof) is discussed in reference to FIG. 25.

As an example of a distributed pick dataflow operation, network dataflow endpoint circuits (2402, 2404, 2406) in FIG. 24 may be configured (e.g., programmed) to perform a distributed pick operation of a dataflow graph. An embodiment of configuring a network dataflow endpoint circuit (e.g., an operation configuration register thereof) is discussed in reference to FIG. 25.

Network dataflow endpoint circuit 2402 may be configured to receive input data from a plurality of sources (e.g., network dataflow endpoint circuit 2404 and network dataflow endpoint circuit 2406), and to output resultant data, e.g., as in FIG. 23), for example, according to control data. Network dataflow endpoint circuit 2404 may be configured to provide (e.g., send) input data to network dataflow endpoint circuit 2402, e.g., on receipt of the input data from processing element 2422. This may be referred to as Input 0 in FIG. 24. In one embodiment, circuit switched network is configured (e.g., programmed) to provide a dedicated communication line between processing element 2422 and network dataflow endpoint circuit 2404 along path 2424. Network dataflow endpoint circuit 2406 may be configured to provide (e.g., send) input data to network dataflow endpoint circuit 2402, e.g., on receipt of the input data from processing element 2420. This may be referred to as Input 1 in FIG. 24. In one embodiment, circuit switched network is configured (e.g., programmed) to provide a dedicated communication line between processing element 2420 and network dataflow endpoint circuit 2406 along path 2416.

When network dataflow endpoint circuit 2404 is to transmit input data to network dataflow endpoint circuit 2402 (e.g., when network dataflow endpoint circuit 2402 has available storage room for the data and/or network dataflow endpoint circuit 2404 has its input data), network dataflow endpoint circuit 2404 may generate a packet (e.g., including the input data and a header to steer that data to network dataflow endpoint circuit 2402 on the packet switched communications network 2414 (e.g., as a stop on that (e.g., ring) network 2414). This is illustrated schematically with dashed line 2426 in FIG. 24.

When network dataflow endpoint circuit 2406 is to transmit input data to network dataflow endpoint circuit 2402 (e.g., when network dataflow endpoint circuit 2402 has available storage room for the data and/or network dataflow endpoint circuit 2406 has its input data), network dataflow endpoint circuit 2404 may generate a packet (e.g., including the input data and a header to steer that data to network dataflow endpoint circuit 2402 on the packet switched communications network 2414 (e.g., as a stop on that (e.g., ring) network 2414). This is illustrated schematically with dashed line 2418 in FIG. 24.

Network dataflow endpoint circuit 2402 (e.g., on receipt of the Input 0 from network dataflow endpoint circuit 2404, Input 1 from network dataflow endpoint circuit 2406, and/or control data) may then perform the programmed dataflow operation (e.g., a Pick operation in this example). The network dataflow endpoint circuit 2402 may then output the according resultant data from the operation, e.g., to processing element 2408 in FIG. 24. In one embodiment, circuit switched network is configured (e.g., programmed) to provide a dedicated communication line between processing element 2408 (e.g., a buffer thereof) and network dataflow endpoint circuit 2402 along path 2428. A further example of a distributed Pick operation is discussed below in reference to FIG. 37-39.

In one embodiment, the control data to perform an operation (e.g., pick operation) comes from other components of the spatial array, e.g., a processing element. An example of this is discussed below in reference to FIG. 25. Note that Pick operator is shown schematically in endpoint 2402, and may not be a multiplexer circuit, for example, see the discussion below of network dataflow endpoint circuit 2500 in FIG. 25.

In certain embodiments, a dataflow graph may have certain operations performed by a processing element and certain operations performed by a communication network (e.g., network dataflow endpoint circuit or circuits).

Figure 25:
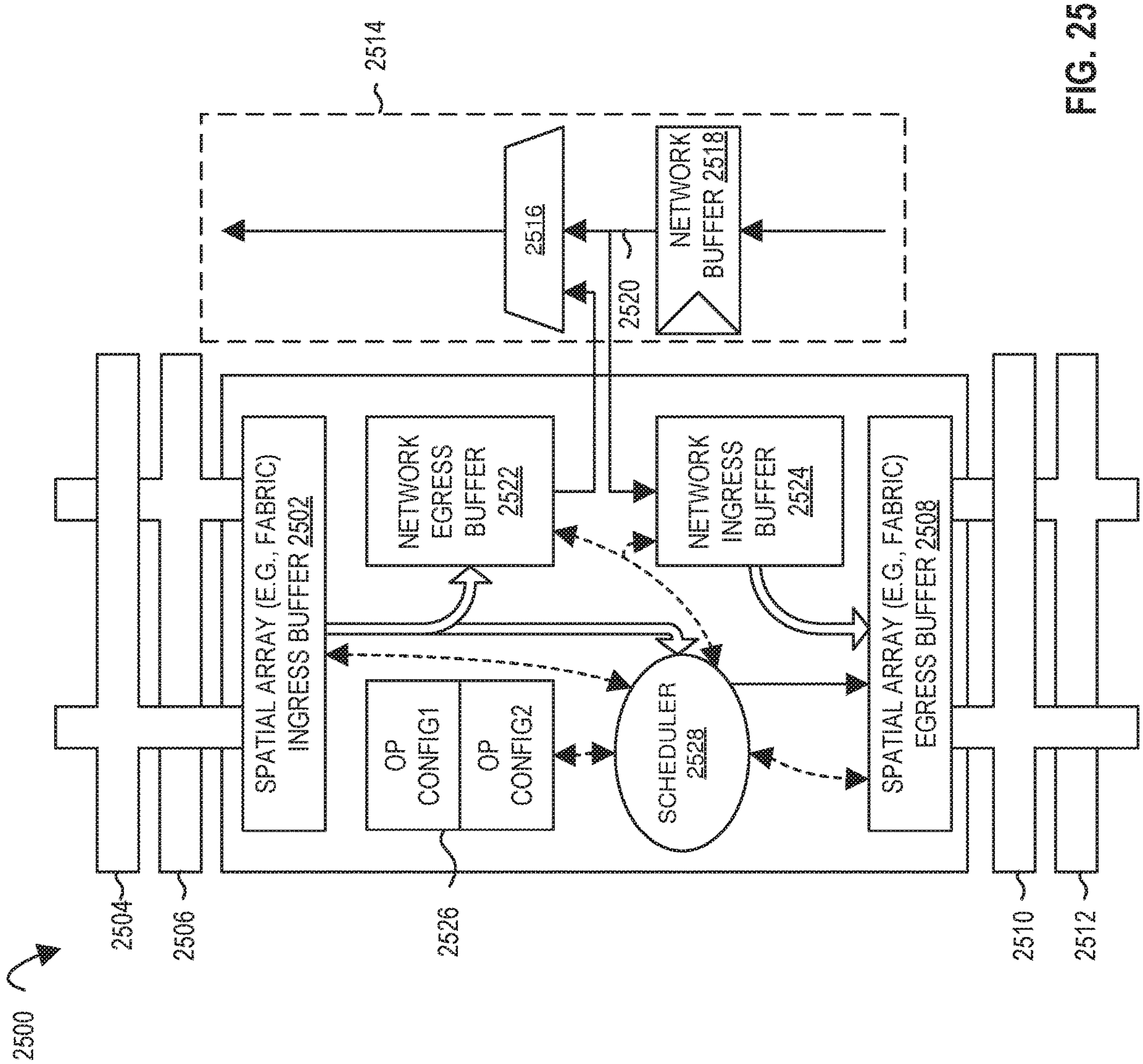
FIG. 25 illustrates a network dataflow endpoint circuit according to embodiments of the disclosure.

FIG. 25 illustrates a network dataflow endpoint circuit 2500 according to embodiments of the disclosure. Although multiple components are illustrated in network dataflow endpoint circuit 2500, one or more instances of each component may be utilized in a single network dataflow endpoint circuit. An embodiment of a network dataflow endpoint circuit may include any (e.g., not all) of the components in FIG. 25.

FIG. 25 depicts the microarchitecture of a (e.g., mezzanine) network interface showing embodiments of main data (solid line) and control data (dotted) paths. This microarchitecture provides a configuration storage and scheduler to enable (e.g., high-radix) dataflow operators. Certain embodiments herein include data paths to the scheduler to enable leg selection and description. FIG. 25 shows a high-level microarchitecture of a network (e.g., mezzanine) endpoint (e.g., stop), which may be a member of a ring network for context. To support (e.g., high-radix) dataflow operations, the configuration of the endpoint (e.g., operation configuration storage 2526) to include configurations that examine multiple network (e.g., virtual) channels (e.g., as opposed to single virtual channels in a baseline implementation). Certain embodiments of network dataflow endpoint circuit 2500 include data paths from ingress and to egress to control the selection of (e.g., pick and switch types of operations), and/or to describe the choice made by the scheduler in the case of PickAny dataflow operators or SwitchAny dataflow operators. Flow control and backpressure behavior may be utilized in each communication channel, e.g., in a (e.g., packet switched communications) network and (e.g., circuit switched) network (e.g., fabric of a spatial array of processing elements).

As one description of an embodiment of the microarchitecture, a pick dataflow operator may function to pick one output of resultant data from a plurality of inputs of input data, e.g., based on control data. A network dataflow endpoint circuit 2500 may be configured to consider one of the spatial array ingress buffer(s) 2502 of the circuit 2500 (e.g., data from the fabric being control data) as selecting among multiple input data elements stored in network ingress buffer(s) 2524 of the circuit 2500 to steer the resultant data to the spatial array egress buffer 2508 of the circuit 2500. Thus, the network ingress buffer(s) 2524 may be thought of as inputs to a virtual mux, the spatial array ingress buffer 2502 as the multiplexer select, and the spatial array egress buffer 2508 as the multiplexer output. In one embodiment, when a (e.g., control data) value is detected and/or arrives in the spatial array ingress buffer 2502, the scheduler 2528 (e.g., as programmed by an operation configuration in storage 2526) is sensitized to examine the corresponding network ingress channel. When data is available in that channel, it is removed from the network ingress buffer 2524 and moved to the spatial array egress buffer 2508. The control bits of both ingresses and egress may then be updated to reflect the transfer of data. This may result in control flow tokens or credits being propagated in the associated network.

Initially, it may seem that the use of packet switched networks to implement the (e.g., high-radix staging) operators of multiplexed and/or demultiplexed codes hampers performance. For example, in one embodiment, a packet-switched network is generally shared and the caller and callee dataflow graphs may be distant from one another.

Recall, however, that in certain embodiments, the intention of supporting multiplexing and/or demultiplexing is to reduce the area consumed by infrequent code paths within a dataflow operator (e.g., by the spatial array). Thus, certain embodiments herein reduce area and avoid the consumption of more expensive fabric resources, for example, like PEs, e.g., without (substantially) affecting the area and efficiency of individual PEs to supporting those (e.g., infrequent) operations.

Turning now to further detail of FIG. 5, depicted network dataflow endpoint circuit 2500 includes a spatial array (e.g., fabric) ingress buffer 2502, for example, to input data (e.g., control data) from a (e.g., circuit switched) network. As noted above, although a single spatial array (e.g., fabric) ingress buffer 2502 is depicted, a plurality of spatial array (e.g., fabric) ingress buffers may be in a network dataflow endpoint circuit. In one embodiment, spatial array (e.g., fabric) ingress buffer 2502 is to receive data (e.g., control data) from a communications network of a spatial array (e.g., a spatial array of processing elements), for example, from one or more of network 2504 and network 2506. In one embodiment, network 2504 is part of network 2413 in FIG. 24.

Depicted network dataflow endpoint circuit 2500 includes a spatial array (e.g., fabric) egress buffer 2508, for example, to output data (e.g., control data) to a (e.g., circuit switched) network. As noted above, although a single spatial array (e.g., fabric) egress buffer 2508 is depicted, a plurality of spatial array (e.g., fabric) egress buffers may be in a network dataflow endpoint circuit. In one embodiment, spatial array (e.g., fabric) egress buffer 2508 is to send (e.g., transmit) data (e.g., control data) onto a communications network of a spatial array (e.g., a spatial array of processing elements), for example, onto one or more of network 2510 and network 2512. In one embodiment, network 2510 is part of network 2413 in FIG. 5.

Additionally or alternatively, network dataflow endpoint circuit 2500 may be coupled to another network 2514, e.g., a packet switched network. Another network 2514, e.g., a packet switched network, may be used to transmit (e.g., send or receive) (e.g., input and/or resultant) data to processing elements or other components of a spatial array and/or to transmit one or more of input data or resultant data. In one embodiment, network 2514 is part of the packet switched communications network 2414 in FIG. 24, e.g., a time multiplexed network.

Network buffer 2518 (e.g., register(s)) may be a stop on (e.g., ring) network 2514, for example, to receive data from network 2514.

Depicted network dataflow endpoint circuit 2500 includes a network egress buffer 2522, for example, to output data (e.g., resultant data) to a (e.g., packet switched) network. As noted above, although a single network egress buffer 2522 is depicted, a plurality of network egress buffers may be in a network dataflow endpoint circuit. In one embodiment, network egress buffer 2522 is to send (e.g., transmit) data (e.g., resultant data) onto a communications network of a spatial array (e.g., a spatial array of processing elements), for example, onto network 2514. In one embodiment, network 2514 is part of packet switched network 2414 in FIG. 24. In certain embodiments, network egress buffer 2522 is to output data (e.g., from spatial array ingress buffer 2502) to (e.g., packet switched) network 2514, for example, to be routed (e.g., steered) to other components (e.g., other network dataflow endpoint circuit(s)).

Depicted network dataflow endpoint circuit 2500 includes a network ingress buffer 2522, for example, to input data (e.g., inputted data) from a (e.g., packet switched) network. As noted above, although a single network ingress buffer 2524 is depicted, a plurality of network ingress buffers may be in a network dataflow endpoint circuit. In one embodiment, network ingress buffer 2524 is to receive (e.g., transmit) data (e.g., input data) from a communications network of a spatial array (e.g., a spatial array of processing elements), for example, from network 2514. In one embodiment, network 2514 is part of packet switched network 2414 in FIG. 24. In certain embodiments, network ingress buffer 2524 is to input data (e.g., from spatial array ingress buffer 2502) from (e.g., packet switched) network 2514, for example, to be routed (e.g., steered) there (e.g., into spatial array egress buffer 2508) from other components (e.g., other network dataflow endpoint circuit(s)).

In one embodiment, the data format (e.g., of the data on network 2514) includes a packet having data and a header (e.g., with the destination of that data). In one embodiment, the data format (e.g., of the data on network 2504 and/or 2506) includes only the data (e.g., not a packet having data and a header (e.g., with the destination of that data)). Network dataflow endpoint circuit 2500 may add (e.g., data output from circuit 2500) or remove (e.g., data input into circuit 2500) a header (or other data) to or from a packet. Coupling 2520 (e.g., wire) may send data received from network 2514 (e.g., from network buffer 2518) to network ingress buffer 2524 and/or multiplexer 2516. Multiplexer 2516 may (e.g., via a control signal from the scheduler 2528) output data from network buffer 2518 or from network egress buffer 2522. In one embodiment, one or more of multiplexer 2526 or network buffer 2518 are separate components from network dataflow endpoint circuit 2500. A buffer may include a plurality of (e.g., discrete) entries, for example, a plurality of registers.

In one embodiment, operation configuration storage 2526 (e.g., register or registers) is loaded during configuration (e.g., mapping) and specifies the particular operation (or operations) this network dataflow endpoint circuit 2500 (e.g., not a processing element of a spatial array) is to perform (e.g., data steering operations in contrast to logic and/or arithmetic operations). Buffer(s) (e.g., 2502, 2508, 2522, and/or 2524) activity may be controlled by that operation (e.g., controlled by the scheduler 2528). Scheduler 2528 may schedule an operation or operations of network dataflow endpoint circuit 2500, for example, when (e.g., all) input (e.g., payload) data and/or control data arrives. Dotted lines to and from scheduler 2528 indicate paths that may be utilized for control data, e.g., to and/or from scheduler 2528. Scheduler may also control multiplexer 2516, e.g., to steer data to and/or from network dataflow endpoint circuit 2500 and network 2514.

In reference to the distributed pick operation in FIG. 24 above, network dataflow endpoint circuit 2402 may be configured (e.g., as an operation in its operation configuration register 2526 as in FIG. 25) to receive (e.g., in (two storage locations in) its network ingress buffer 2524 as in FIG. 25) input data from each of network dataflow endpoint circuit 2404 and network dataflow endpoint circuit 2406, and to output resultant data (e.g., from its spatial array egress buffer 2508 as in FIG. 25), for example, according to control data (e.g., in its spatial array ingress buffer 2502 as in FIG. 25). Network dataflow endpoint circuit 2404 may be configured (e.g., as an operation in its operation configuration register 2526 as in FIG. 25) to provide (e.g., send via circuit 2404's network egress buffer 2522 as in FIG. 25) input data to network dataflow endpoint circuit 2402, e.g., on receipt (e.g., in circuit 2404's spatial array ingress buffer 2502 as in FIG. 25) of the input data from processing element 2422. This may be referred to as Input 0 in FIG. 24. In one embodiment, circuit switched network is configured (e.g., programmed) to provide a dedicated communication line between processing element 2422 and network dataflow endpoint circuit 2404 along path 2424. Network dataflow endpoint circuit 2404 may include (e.g., add) a header packet with the received data (e.g., in its network egress buffer 2522 as in FIG. 25) to steer the packet (e.g., input data) to network dataflow endpoint circuit 2402. Network dataflow endpoint circuit 2406 may be configured (e.g., as an operation in its operation configuration register 2526 as in FIG. 25) to provide (e.g., send via circuit 2406's network egress buffer 2522 as in FIG. 25) input data to network dataflow endpoint circuit 2402, e.g., on receipt (e.g., in circuit 2406's spatial array ingress buffer 2502 as in FIG. 25) of the input data from processing element 2420. This may be referred to as Input 1 in FIG. 24. In one embodiment, circuit switched network is configured (e.g., programmed) to provide a dedicated communication line between processing element 2420 and network dataflow endpoint circuit 2406 along path 2416. Network dataflow endpoint circuit 2406 may include (e.g., add) a header packet with the received data (e.g., in its network egress buffer 2522 as in FIG. 25) to steer the packet (e.g., input data) to network dataflow endpoint circuit 2402.

When network dataflow endpoint circuit 2404 is to transmit input data to network dataflow endpoint circuit 2402 (e.g., when network dataflow endpoint circuit 2402 has available storage room for the data and/or network dataflow endpoint circuit 2404 has its input data), network dataflow endpoint circuit 2404 may generate a packet (e.g., including the input data and a header to steer that data to network dataflow endpoint circuit 2402 on the packet switched communications network 2414 (e.g., as a stop on that (e.g., ring) network). This is illustrated schematically with dashed line 2426 in FIG. 24. Network 2414 is shown schematically with multiple dotted boxes in FIG. 24. Network 2414 may include a network controller 2414A, e.g., to manage the ingress and/or egress of data on network 2414A.

When network dataflow endpoint circuit 2406 is to transmit input data to network dataflow endpoint circuit 2402 (e.g., when network dataflow endpoint circuit 2402 has available storage room for the data and/or network dataflow endpoint circuit 2406 has its input data), network dataflow endpoint circuit 2404 may generate a packet (e.g., including the input data and a header to steer that data to network dataflow endpoint circuit 2402 on the packet switched communications network 2414 (e.g., as a stop on that (e.g., ring) network). This is illustrated schematically with dashed line 2418 in FIG. 24.

Network dataflow endpoint circuit 2402 (e.g., on receipt of the Input 0 from network dataflow endpoint circuit 2404 in circuit 2402's network ingress buffer(s), Input 1 from network dataflow endpoint circuit 2406 in circuit 2402's network ingress buffer(s), and/or control data from processing element 2408 in circuit 2402's spatial array ingress buffer) may then perform the programmed dataflow operation (e.g., a Pick operation in this example). The network dataflow endpoint circuit 2402 may then output the according resultant data from the operation, e.g., to processing element 2408 in FIG. 24. In one embodiment, circuit switched network is configured (e.g., programmed) to provide a dedicated communication line between processing element 2408 (e.g., a buffer thereof) and network dataflow endpoint circuit 2402 along path 2428. A further example of a distributed Pick operation is discussed below in reference to FIG. 37-39. Buffers in FIG. 24 may be the small, unlabeled boxes in each PE.

Figure 26:
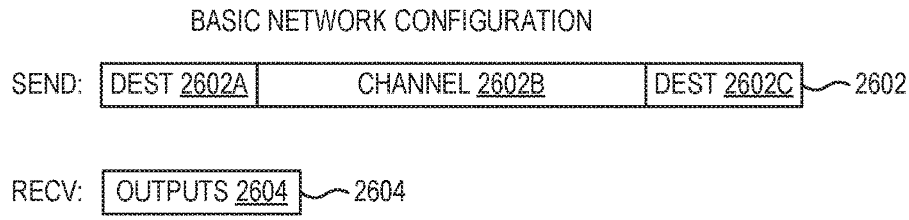
FIG. 26 illustrates data formats for a send operation and a receive operation according to embodiments of the disclosure.
Figure 27:
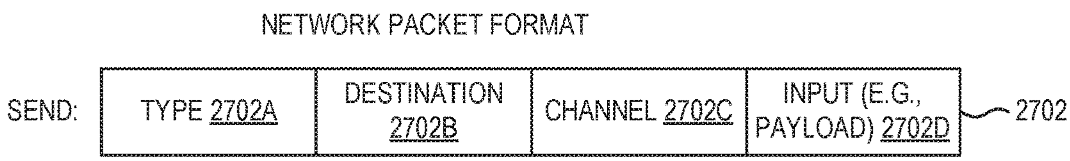
FIG. 27 illustrates another data format for a send operation according to embodiments of the disclosure.
Figure 28:
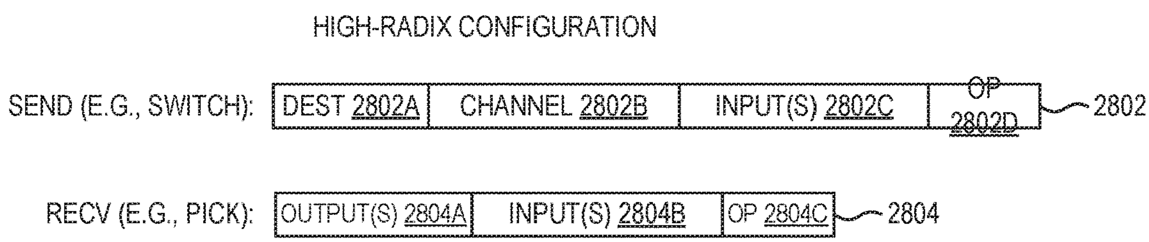
FIG. 28 illustrates to configure a circuit element (e.g., network dataflow endpoint circuit) data formats to configure a circuit element (e.g., network dataflow endpoint circuit) for a send (e.g., switch) operation and a receive (e.g., pick) operation according to embodiments of the disclosure.

FIGS. 26-28 below include example data formats, but other data formats may be utilized. One or more fields may be included in a data format (e.g., in a packet). Data format may be used by network dataflow endpoint circuits, e.g., to transmit (e.g., send and/or receive) data between a first component (e.g., between a first network dataflow endpoint circuit and a second network dataflow endpoint circuit, component of a spatial array, etc.).

FIG. 26 illustrates data formats for a send operation 2602 and a receive operation 2604 according to embodiments of the disclosure. In one embodiment, send operation 2602 and receive operation 2604 are data formats of data transmitted on a packed switched communication network. Depicted send operation 2602 data format includes a destination field 2602A (e.g., indicating which component in a network the data is to be sent to), a channel field 2602B (e.g. indicating which channel on the network the data is to be sent on), and an input field 2602C (e.g., the payload or input data that is to be sent). Depicted receive operation 2604 includes an output field, e.g., which may also include a destination field (not depicted). These data formats may be used (e.g., for packet(s)) to handle moving data in and out of components. These configurations may be separable and/or happen in parallel. These configurations may use separate resources. The term channel may generally refer to the communication resources (e.g., in management hardware) associated with the request. Association of configuration and queue management hardware may be explicit.

FIG. 27 illustrates another data format for a send operation 2702 according to embodiments of the disclosure. In one embodiment, send operation 2702 is a data format of data transmitted on a packed switched communication network. Depicted send operation 2702 data format includes a type field (e.g., used to annotate special control packets, such as, but not limited to, configuration, extraction, or exception packets), destination field 2702B (e.g., indicating which component in a network the data is to be sent to), a channel field 2702C (e.g. indicating which channel on the network the data is to be sent on), and an input field (e.g., the payload or input data that is to be sent).

FIG. 28 illustrates configuration word for a send (e.g., switch) operation 2802 and a receive (e.g., pick) operation 2804 according to embodiments of the disclosure. In one embodiment, send operation 2802 and receive operation 2804 are data formats of data transmitted on a packed switched communication network, for example, between network dataflow endpoint circuits. Depicted send operation 2802 data format includes a destination field 2802A (e.g., indicating which component(s) in a network the (input) data is to be sent to), a channel field 2802B (e.g. indicating which channel on the network the (input) data is to be sent on), an input field 2802C (e.g., the payload or input data that is to be sent or an identifier of the component that is to send the input data), and an operation field 2802D (e.g., indicating which of a plurality of operations are to be performed). In one embodiment, the (e.g., outbound) operation is one of a Switch or SwitchAny dataflow operation, e.g., corresponding to a (e.g., same) dataflow operator of a dataflow graph.

Depicted receive operation 2804 field includes an output field 2804A (e.g., indicating which component(s) in a network the (resultant) data is to be sent to), an input field 2804B (e.g., the payload or input data that is to be sent or an identifier of the component that is to send the input data), and an operation field 2804C (e.g., indicating which of a plurality of operations are to be performed). In one embodiment, the (e.g., inbound) operation is one of a Pick, PickSingleLeg, PickAny, or Merge dataflow operation, e.g., corresponding to a (e.g., same) dataflow operator of a dataflow graph.

A data format utilized herein may include one or more of the fields described herein, e.g., in any order.

Figure 29:
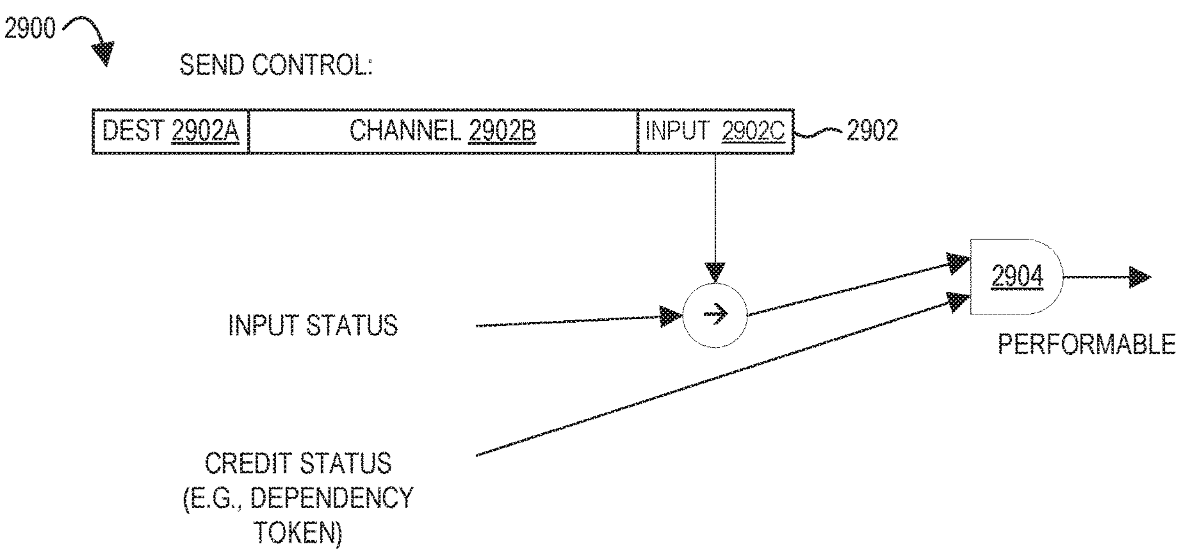
FIG. 29 illustrates a configuration data format to configure a circuit element (e.g., network dataflow endpoint circuit) for a send operation with its input, output, and control data annotated on a circuit according to embodiments of the disclosure.

FIG. 29 illustrates a data format for a send operation 2902 with its input, output, and control data annotated on a circuit 2900 according to embodiments of the disclosure. Depicted send operation 2902 data format includes a destination field 2902A (e.g., indicating which component in a network the data is to be sent to), a channel field 2902B (e.g. indicating which channel on the (packet switched) network the data is to be sent on), and an input field 2602C (e.g., the payload or input data that is to be sent or an identifier of the component that is to send the input data). In one embodiment, circuit 2900 (e.g., network dataflow endpoint circuit) is to receive packet of data in the data format of send operation 2902, for example, with the destination indicating which circuit of a plurality of circuits the resultant is to be sent to, the channel indicating which channel of the (packet switched) network the data is to be sent on, and the input being the payload (e.g., input data). The AND gate 2904 is to allow the operation to be performed when both the input data is available and the credit status is a yes (for example, the dependency token indicates) indicating there is room for the output data to be stored, e.g., in a buffer of the destination. In certain embodiments, each operation is annotated with its requirements (e.g., inputs, outputs, and control) and if all requirements are met, the configuration is 'performable' by the circuit (e.g., network dataflow endpoint circuit).

Figure 30:
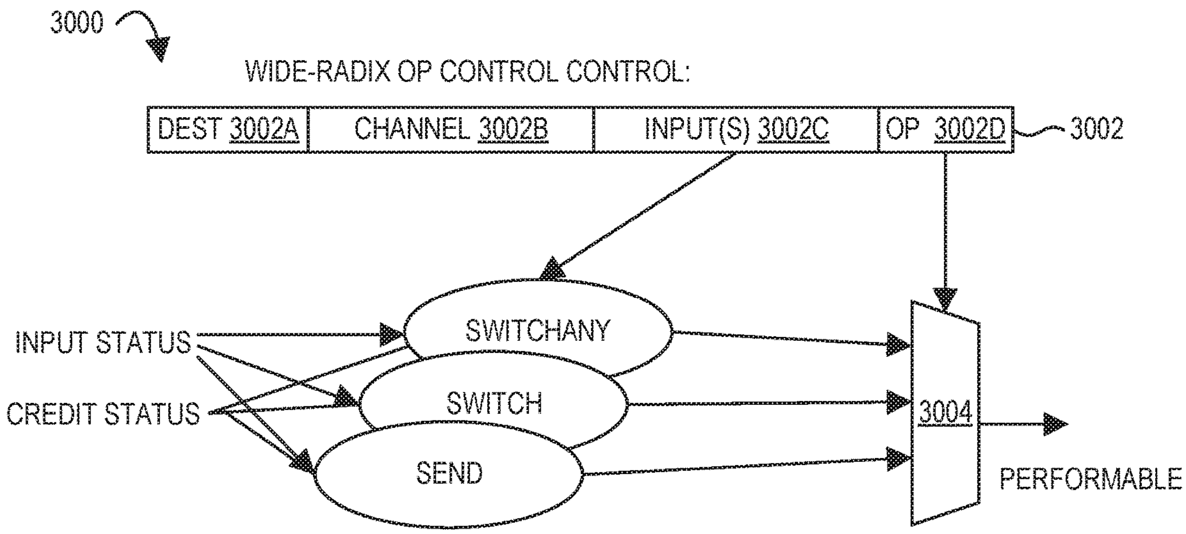
FIG. 30 illustrates a configuration data format to configure a circuit element (e.g., network dataflow endpoint circuit) for a selected operation with its input, output, and control data annotated on a circuit according to embodiments of the disclosure.

FIG. 30 illustrates a data format for a selected (e.g., send) operation 1002 with its input, output, and control data annotated on a circuit 3000 according to embodiments of the disclosure. Depicted (e.g., send) operation 3002 data format includes a destination field 3002A (e.g., indicating which component(s) in a network the (input) data is to be sent to), a channel field 3002B (e.g. indicating which channel on the network the (input) data is to be sent on), an input field 3002C (e.g., the payload or input data that is to be sent or an identifier of the component that is to send the input data), and an operation field 3002D (e.g., indicating which of a plurality of operations are to be performed and/or the source of the control data for that operation). In one embodiment, the (e.g., outbound) operation is one of a send, Switch, or SwitchAny dataflow operation, e.g., corresponding to a (e.g., same) dataflow operator of a dataflow graph.

In one embodiment, circuit 3000 (e.g., network dataflow endpoint circuit) is to receive packet of data in the data format of (e.g., send) operation 3002, for example, with the input being the payload (e.g., input data) and the operation field indicating which operation is to be performed (e.g., shown schematically as Switch or SwitchAny). Decpicted multiplexer 3004 may select the operation to be performed from a plurality of available operations, e.g., based on the value in operation field 3002D. In one embodiment, circuit 3000 is to perform that operation when both the input data is available and the credit status is a yes (for example, the dependency token indicates) indicating there is room for the output data to be stored, e.g., in a buffer of the destination.

In one embodiment, the send operation does not utilize control beyond checking its input(s) are available for sending. This may enable switch to perform the operation without credit on all legs. In one embodiment, the Switch and/or SwitchAny operation includes a multiplexer controlled by the value stored in the operation field 3002D to select the correct queue management circuitry.

Value stored in operation field 3002D may selects among control options, e.g., with different control (e.g., logic) circuitry for each operation, for example, as in FIGS. 31-34.

Figure 31:
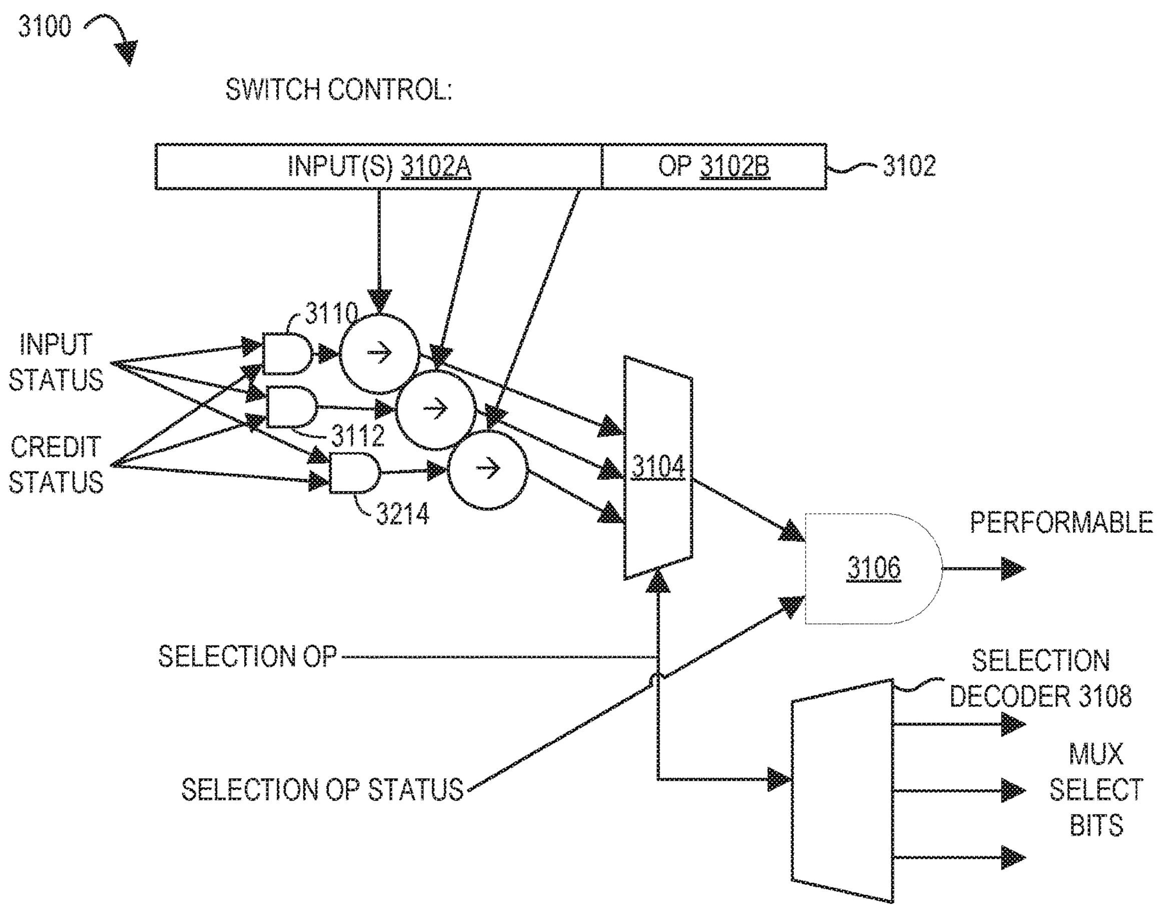
FIG. 31 illustrates a configuration data format to configure a circuit element (e.g., network dataflow endpoint circuit) for a Switch operation with its input, output, and control data annotated on a circuit according to embodiments of the disclosure.

FIG. 31 illustrates a data format for a Switch operation 3102 with its input, output, and control data annotated on a circuit 3100 according to embodiments of the disclosure. In one embodiment, the (e.g., outbound) operation value stored in the operation field 3002D is for a Switch operation, e.g., corresponding to a Switch dataflow operator of a dataflow graph. In one embodiment, circuit 3100 (e.g., network dataflow endpoint circuit) is to receive a packet of data in the data format of Switch operation 3102, for example, with the input in input field 3102A being what component(s) are to send the input data and the operation field 3102B indicating which operation is to be performed (e.g., shown schematically as Switch). Depicted circuit 3100 may select the operation to be executed from a plurality of available operations based on the operation field 3102B. In one embodiment, circuit 3000 is to perform that operation when both the input data (for example, according to the input status, e.g., the data has arrived) is available and the credit status (e.g., selection operation (OP) status) is a yes (for example, the dependency token indicates) indicating there is room for the output data to be stored, e.g., in a buffer of the destination. In certain embodiments, AND gate 3106 is to allow the operation to be performed when both the input data is available (e.g., as output from multiplexer 3104) and the selection operation (e.g., control data) status is a yes, for example, indicating the selection operation (e.g., which of a plurality of outputs an input is to be sent to, see., e.g., FIG. 30). In certain embodiments, the performance of the operation with the control data (e.g., selection op) is to cause input data from one of the inputs to be output on one or more (e.g., a plurality of) outputs (e.g., as indicated by the control data), e.g., according to the multiplexer selection bits from multiplexer 3108. In one embodiment, selection op chooses which leg of the switch output will be used and/or selection decoder creates multiplexer selection bits.

Figure 32:
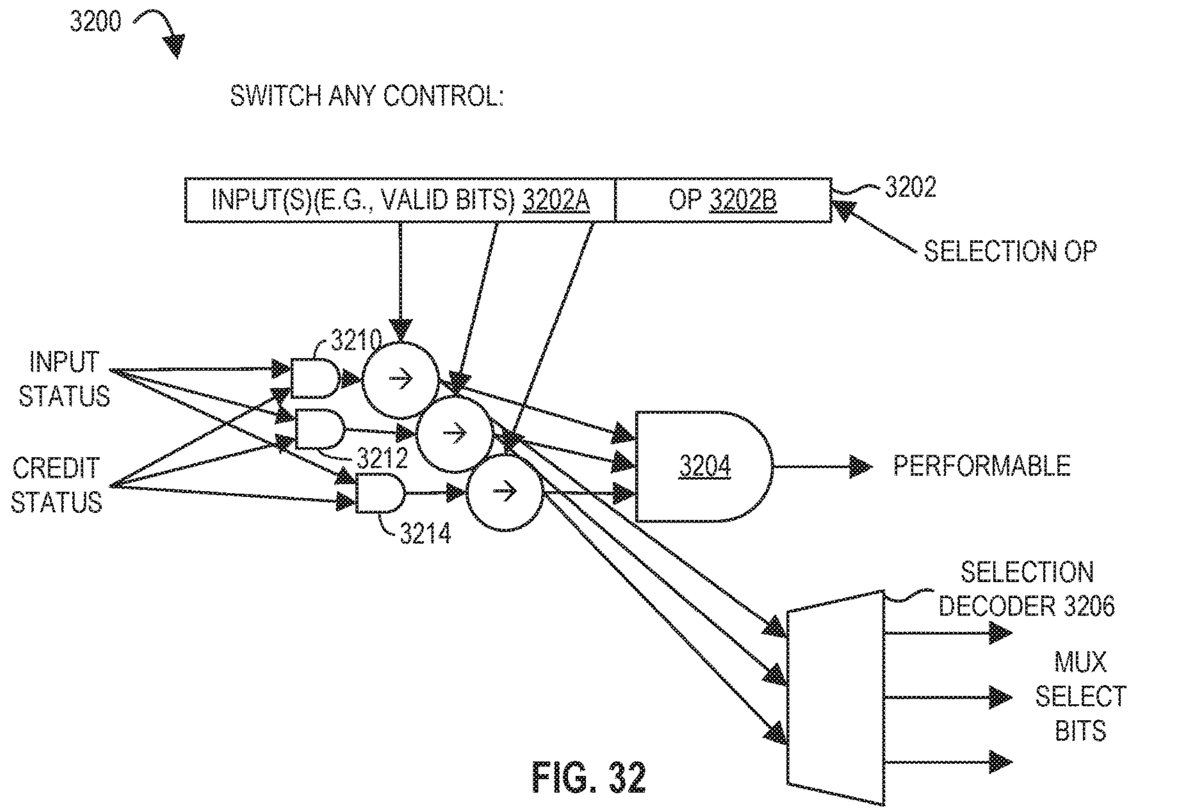
FIG. 32 illustrates a configuration data format to configure a circuit element (e.g., network dataflow endpoint circuit) for a SwitchAny operation with its input, output, and control data annotated on a circuit according to embodiments of the disclosure.

FIG. 32 illustrates a data format for a SwitchAny operation 3202 with its input, output, and control data annotated on a circuit 3200 according to embodiments of the disclosure. In one embodiment, the (e.g., outbound) operation value stored in the operation field 3002D is for a SwitchAny operation, e.g., corresponding to a SwitchAny dataflow operator of a dataflow graph. In one embodiment, circuit 3200 (e.g., network dataflow endpoint circuit) is to receive a packet of data in the data format of SwitchAny operation 3202, for example, with the input in input field 3202A being what component(s) are to send the input data and the operation field 3202B indicating which operation is to be performed (e.g., shown schematically as SwitchAny) and/or the source of the control data for that operation. In one embodiment, circuit 3000 is to perform that operation when any of the input data (for example, according to the input status, e.g., the data has arrived) is available and the credit status is a yes (for example, the dependency token indicates) indicating there is room for the output data to be stored, e.g., in a buffer of the destination. In certain embodiments, OR gate 3204 is to allow the operation to be performed when any one of the input data elements is available. In certain embodiments, the performance of the operation is to cause the first available input data from one of the inputs to be output on one or more (e.g., a plurality of) outputs, e.g., according to the multiplexer selection bits from multiplexer 3206. In one embodiment, SwitchAny occurs as soon as any input data is available (e.g., as opposed to a Switch that utilizes a selection op). Multiplexer select bits may be used to steer an input to an (e.g., network) egress buffer of a network dataflow endpoint circuit.

Figure 33:
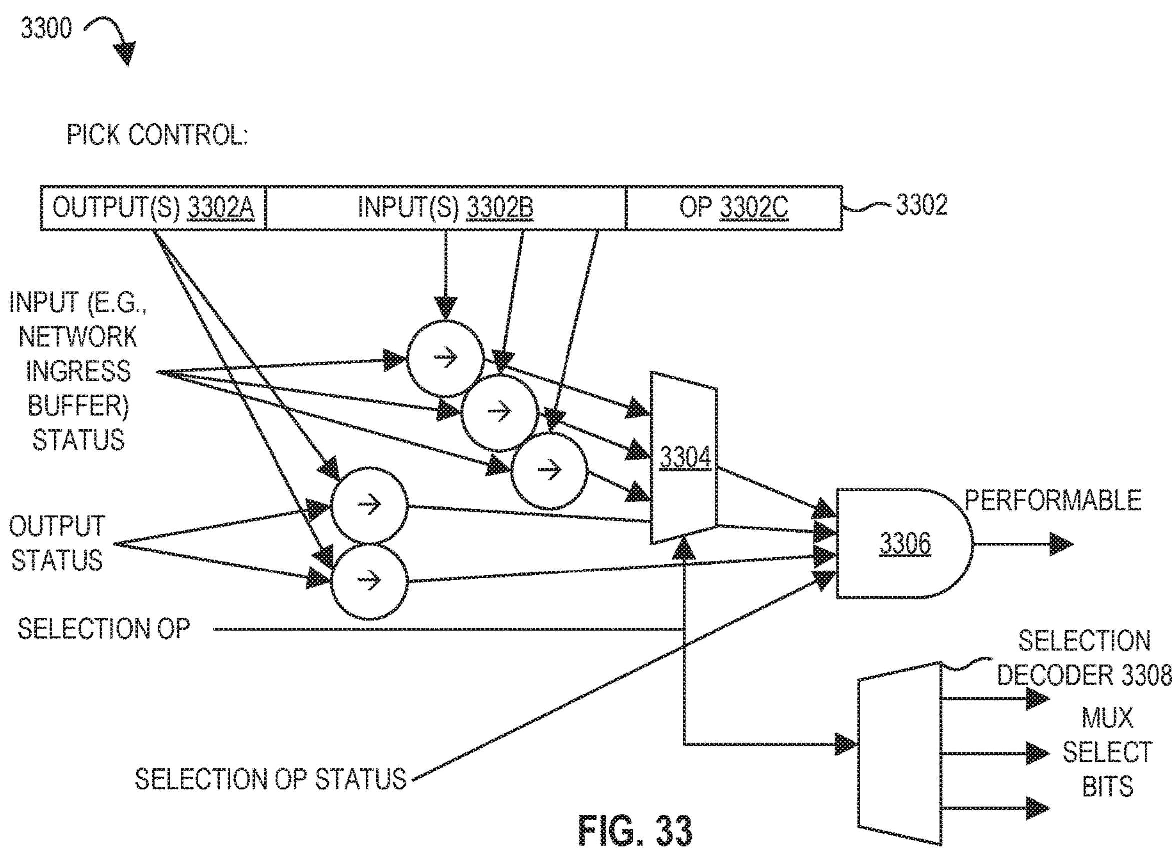
FIG. 33 illustrates a configuration data format to configure a circuit element (e.g., network dataflow endpoint circuit) for a Pick operation with its input, output, and control data annotated on a circuit according to embodiments of the disclosure.

FIG. 33 illustrates a data format for a Pick operation 3302 with its input, output, and control data annotated on a circuit 3300 according to embodiments of the disclosure. In one embodiment, the (e.g., inbound) operation value stored in the operation field 3302C is for a Pick operation, e.g., corresponding to a Pick dataflow operator of a dataflow graph. In one embodiment, circuit 3300 (e.g., network dataflow endpoint circuit) is to receive a packet of data in the data format of Pick operation 3302, for example, with the data in input field 3302B being what component(s) are to send the input data, the data in output field 3302A being what component(s) are to be sent the input data, and the operation field 3302C indicating which operation is to be performed (e.g., shown schematically as Pick) and/or the source of the control data for that operation. Depicted circuit 3300 may select the operation to be executed from a plurality of available operations based on the operation field 3302C. In one embodiment, circuit 3300 is to perform that operation when both the input data (for example, according to the input (e.g., network ingress buffer) status, e.g., all the input data has arrived) is available, the credit status (e.g., output status) is a yes (for example, the dependency token indicates) indicating there is room for the output data to be stored, e.g., in a buffer of the destination(s), and the selection operation (e.g., control data) status is a yes. In certain embodiments, AND gate 3306 is to allow the operation to be performed when both the input data is available (e.g., as output from multiplexer 3304), an output space is available, and the selection operation (e.g., control data) status is a yes, for example, indicating the selection operation (e.g., which of a plurality of outputs an input is to be sent to, see., e.g., FIG. 3). In certain embodiments, the performance of the operation with the control data (e.g., selection op) is to cause input data from one of a plurality of inputs (e.g., indicated by the control data) to be output on one or more (e.g., a plurality of) outputs, e.g., according to the multiplexer selection bits from multiplexer 3308. In one embodiment, selection op chooses which leg of the pick will be used and/or selection decoder creates multiplexer selection bits.

Figure 34:
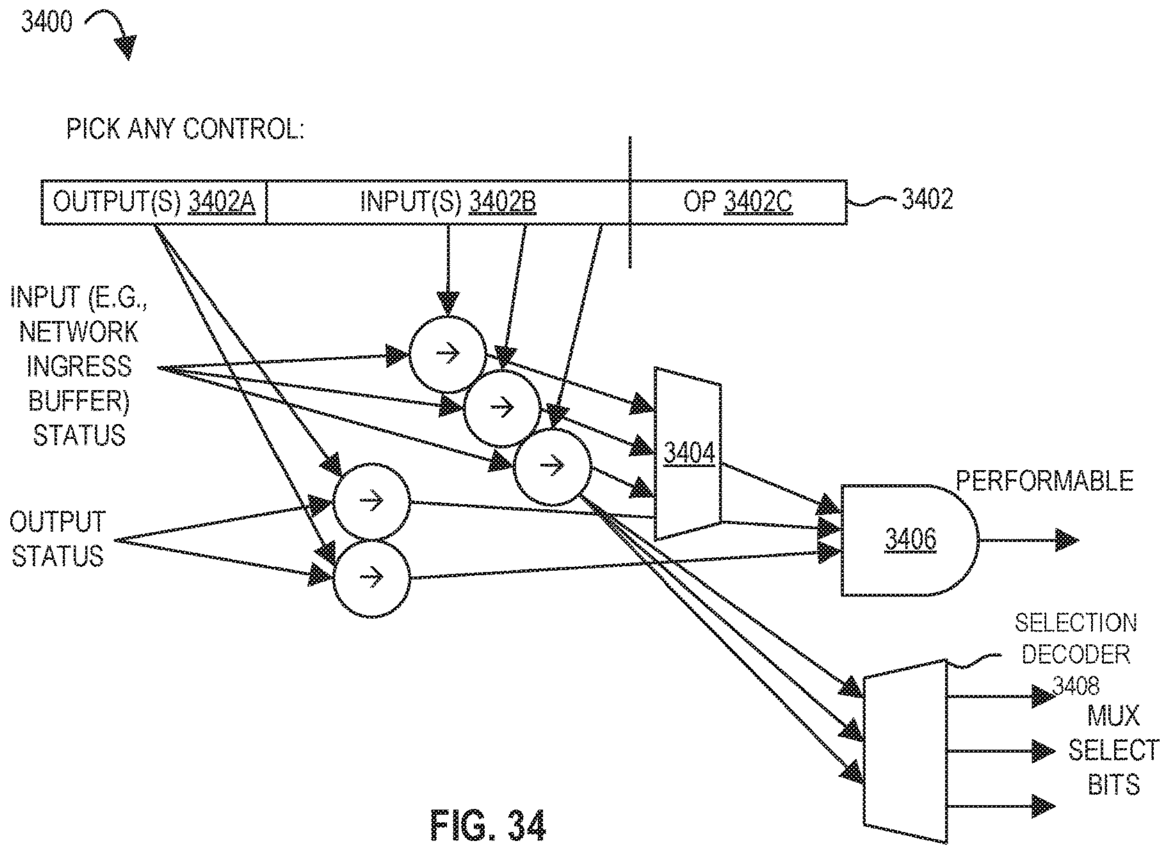
FIG. 34 illustrates a configuration data format to configure a circuit element (e.g., network dataflow endpoint circuit) for a PickAny operation with its input, output, and control data annotated on a circuit according to embodiments of the disclosure.

FIG. 34 illustrates a data format for a PickAny operation 3402 with its input, output, and control data annotated on a circuit 3400 according to embodiments of the disclosure. In one embodiment, the (e.g., inbound) operation value stored in the operation field 3402C is for a PickAny operation, e.g., corresponding to a PickAny dataflow operator of a dataflow graph. In one embodiment, circuit 3400 (e.g., network dataflow endpoint circuit) is to receive a packet of data in the data format of PickAny operation 3402, for example, with the data in input field 3402B being what component(s) are to send the input data, the data in output field 3402A being what component(s) are to be sent the input data, and the operation field 3402C indicating which operation is to be performed (e.g., shown schematically as PickAny). Depicted circuit 3400 may select the operation to be executed from a plurality of available operations based on the operation field 3402C. In one embodiment, circuit 3400 is to perform that operation when any (e.g., a first arriving of) the input data (for example, according to the input (e.g., network ingress buffer) status, e.g., any of the input data has arrived) is available and the credit status (e.g., output status) is a yes (for example, the dependency token indicates) indicating there is room for the output data to be stored, e.g., in a buffer of the destination(s). In certain embodiments, AND gate 3406 is to allow the operation to be performed when any of the input data is available (e.g., as output from multiplexer 3404) and an output space is available. In certain embodiments, the performance of the operation is to cause the (e.g., first arriving) input data from one of a plurality of inputs to be output on one or more (e.g., a plurality of) outputs, e.g., according to the multiplexer selection bits from multiplexer 3408.

In one embodiment, PickAny executes on the presence of any data and/or selection decoder creates multiplexer selection bits.

Figure 35:
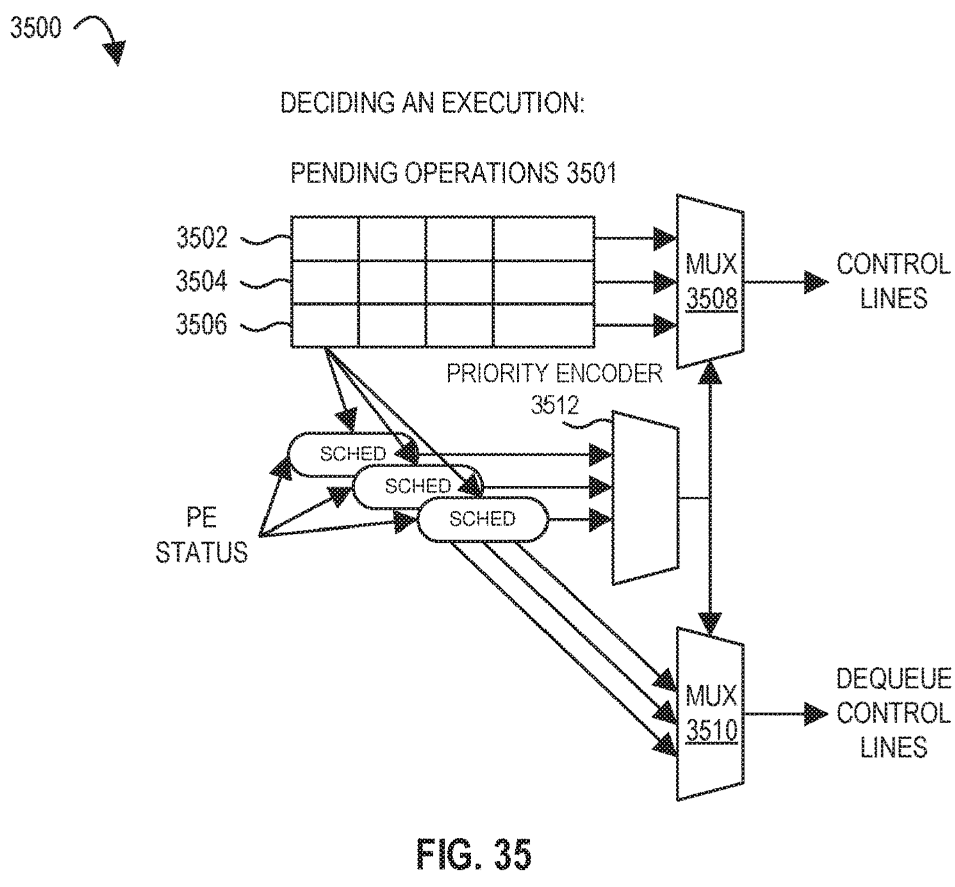
FIG. 35 illustrates selection of an operation by a network dataflow endpoint circuit for performance according to embodiments of the disclosure.

FIG. 35 illustrates selection of an operation (3502, 3504, 3506) by a network dataflow endpoint circuit 3500 for performance according to embodiments of the disclosure. Pending operations storage 3501 (e.g., in scheduler 2528 in FIG. 25) may store one or more dataflow operations, e.g., according to the format(s) discussed herein. Scheduler (for example, based on the oldest of the operations, e.g., that have all of their operands) may schedule an operation for performance. For example, scheduler may select operation 3502, and according to a value stored in operation field, send the corresponding control signals from multiplexer 3508 and/or multiplexer 3510. As an example, several operations may be simultaneously executeable in a single network dataflow endpoint circuit. Assuming all data is there, the "performable" signal (e.g., as shown in FIGS. 29-34) may be input as a signal into multiplexer 3512. Multiplexer 3512 may send as an output control signals for a selected operation (e.g., one of operation 3502, 3504, and 3506) that cause multiplexer 3508 to configure the connections in a network dataflow endpoint circuit to perform the selected operation (e.g., to source from or send data to buffer(s)). Multiplexer 3512 may send as an output control signals for a selected operation (e.g., one of operation 3502, 3504, and 3506) that cause multiplexer 3510 to configure the connections in a network dataflow endpoint circuit to remove data from the queue(s), e.g., consumed data. As an example, see the discussion herein about having data (e.g., token) removed. The "PE status" in FIG. 35 may be the control data coming from a PE, for example, the empty indicator and full indicators of the queues (e.g., backpressure signals). In one embodiment, the PE status may include the empty or full bits for all the buffers and/or datapaths, e.g., in FIG. 25 herein.

In one embodiment, (e.g., as with scheduling) the choice of dequeue is determined by the operation and its dynamic behavior, e.g., to dequeue the operation after performance. In one embodiment, a circuit is to use the operand selection bits to dequeue data (e.g., input, output and/or control data).

Figure 36:
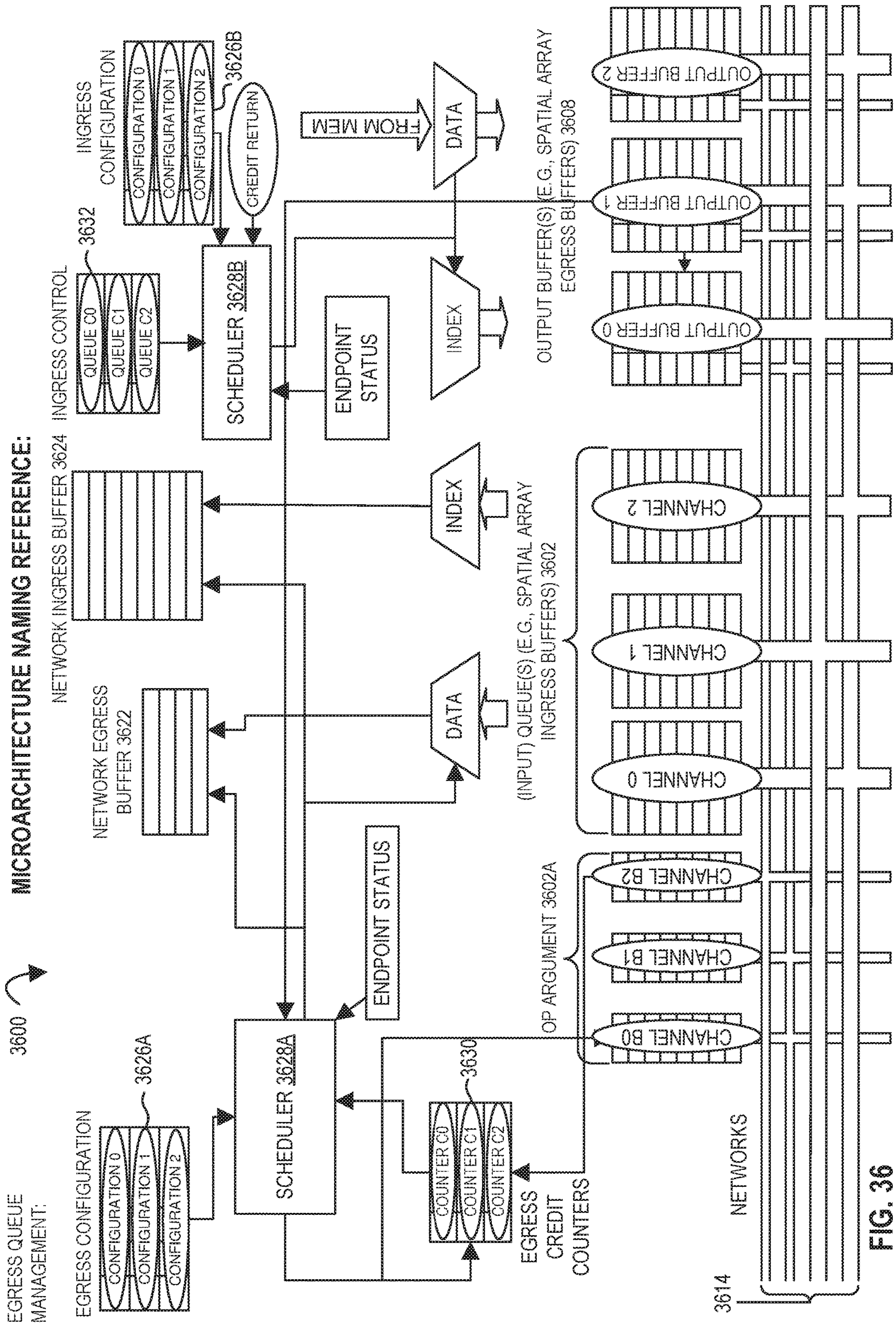
FIG. 36 illustrates a network dataflow endpoint circuit according to embodiments of the disclosure.

FIG. 36 illustrates a network dataflow endpoint circuit 3600 according to embodiments of the disclosure. In comparison to FIG. 25, network dataflow endpoint circuit 3600 has spit the configuration and control into two separate schedulers. In one embodiment, egress scheduler 3628A is to schedule an operation on data that is to enter (e.g., from a circuit switched communication network coupled to) the dataflow endpoint circuit 3600 (e.g., at argument queue 3602, for example, spatial array ingress buffer 2502 as in FIG. 25) and output (e.g., from a packet switched communication network coupled to) the dataflow endpoint circuit 3600 (e.g., at network egress buffer 3622, for example, network egress buffer 2522 as in FIG. 25). In one embodiment, ingress scheduler 3628B is to schedule an operation on data that is to enter (e.g., from a packet switched communication network coupled to) the dataflow endpoint circuit 3600 (e.g., at network ingress buffer 3624, for example, network ingress buffer 3524 as in FIG. 25) and output (e.g., from a circuit switched communication network coupled to) the dataflow endpoint circuit 3600 (e.g., at output buffer 3608, for example, spatial array egress buffer 3508 as in FIG. 25).

Figure 37:
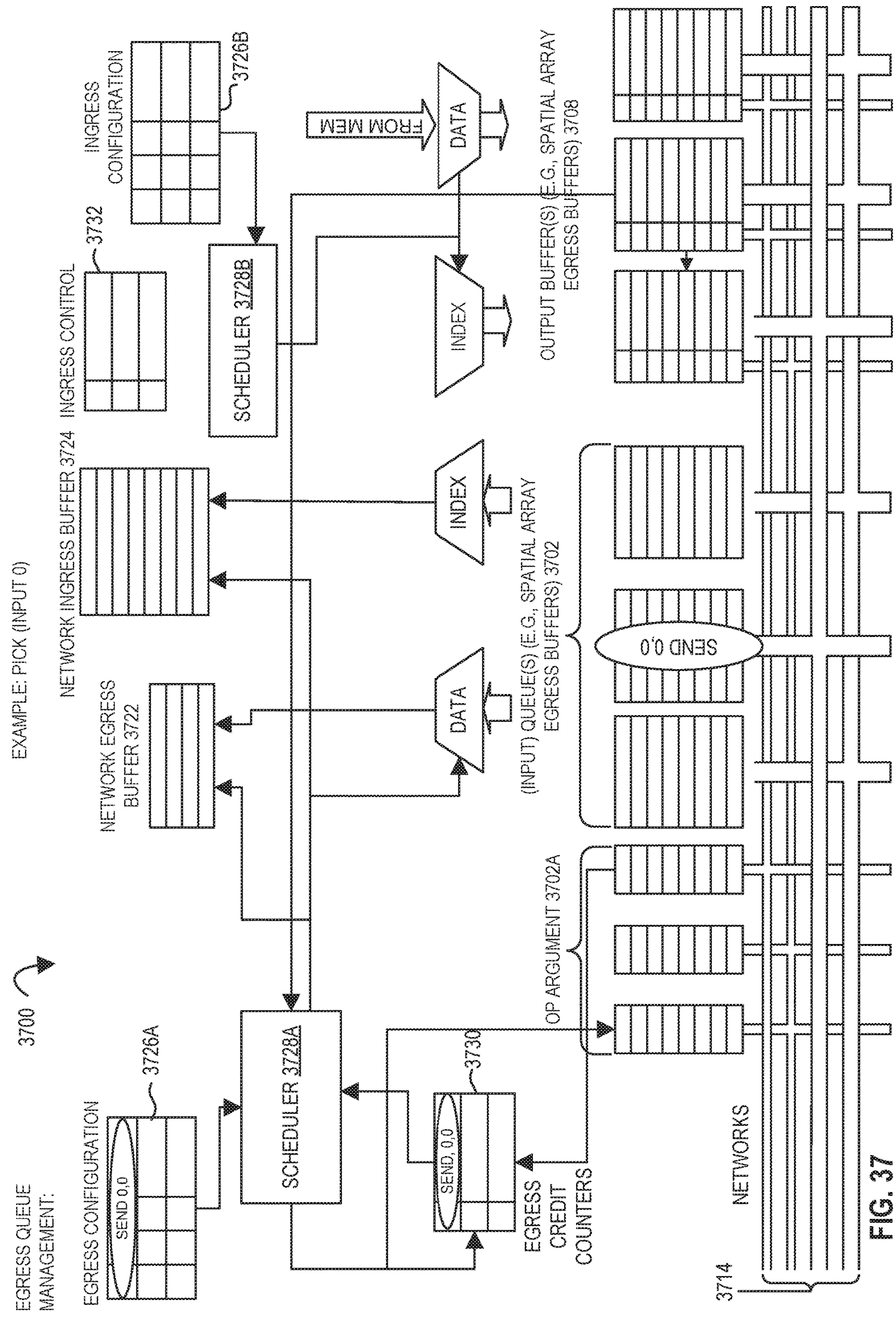
FIG. 37 illustrates a network dataflow endpoint circuit receiving input zero (0) while performing a pick operation according to embodiments of the disclosure.
Figure 38:
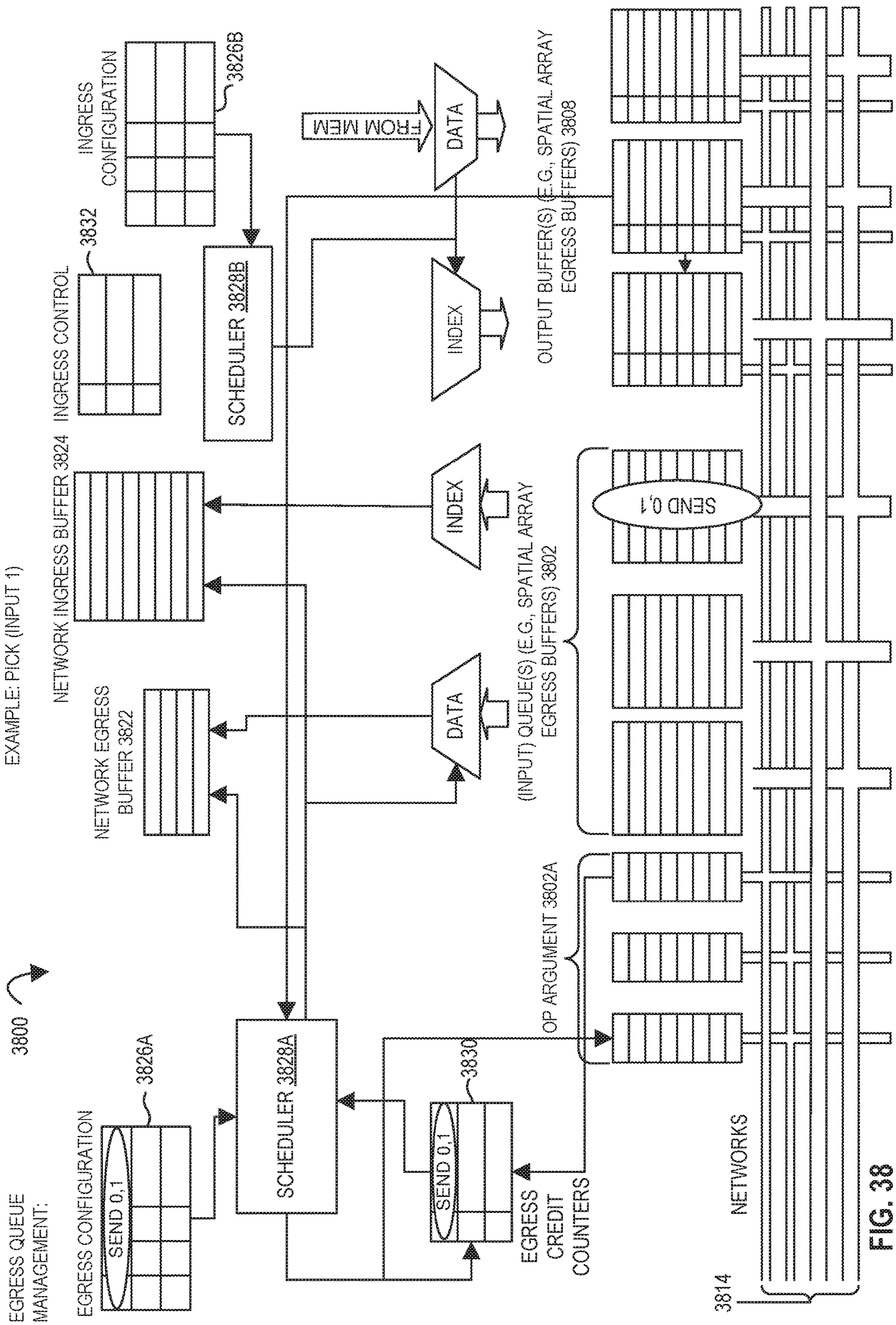
FIG. 38 illustrates a network dataflow endpoint circuit receiving input one (1) while performing a pick operation according to embodiments of the disclosure.
Figure 39:
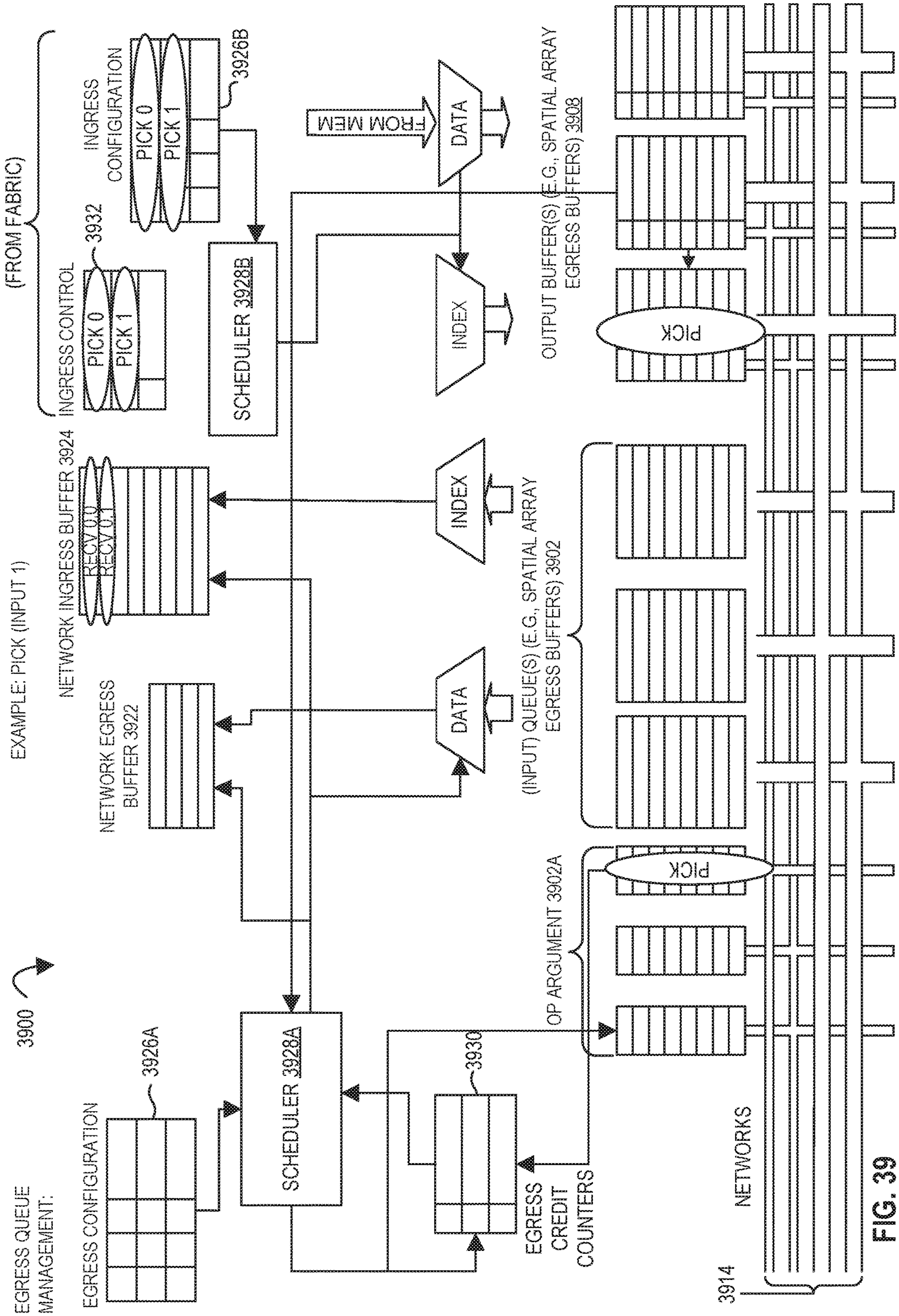
FIG. 39 illustrates a network dataflow endpoint circuit outputting the selected input while performing a pick operation according to embodiments of the disclosure.

Network 3614 may be a circuit switched network, e.g., as discussed herein. Additionally or alternatively, a packet switched network (e.g., as discussed herein) may also be utilized, for example, coupled to network egress buffer 3622, network ingress buffer 3624, or other components herein. Argument queue 3602 may include a control buffer 3602A, for example, to indicate when a respective input queue (e.g., buffer) includes a (new) item of data, e.g., as a single bit. Turning now to FIGS. 37-39, in one embodiment, these cumulatively show the configurations to create a distributed pick.

FIG. 37 illustrates a network dataflow endpoint circuit 3700 receiving input zero (0) while performing a pick operation according to embodiments of the disclosure, for example, as discussed above in reference to FIG. 24. In one embodiment, egress configuration 3726A is loaded (e.g., during a configuration step) with a portion of a pick operation that is to send data to a different network dataflow endpoint circuit (e.g., circuit 3900 in FIG. 39). In one embodiment, egress scheduler 3728A is to monitor the argument queue 3702 (e.g., data queue) for input data (e.g., from a processing element). According to an embodiment of the depicted data format, the "send" (e.g., a binary value therefor) indicates data is to be sent according to fields X, Y, with X being the value indicating a particular target network dataflow endpoint circuit (e.g., 0 being network dataflow endpoint circuit 3900 in FIG. 39) and Y being the value indicating which network ingress buffer (e.g., buffer 3924) location the value is to be stored. In one embodiment, Y is the value indicating a particular channel of a multiple channel (e.g., packet switched) network (e.g., 0 being channel 0 and/or buffer element 0 of network dataflow endpoint circuit 3900 in FIG. 39). When the input data arrives, it is then to be sent (e.g., from network egress buffer 3722) by network dataflow endpoint circuit 3700 to a different network dataflow endpoint circuit (e.g., network dataflow endpoint circuit 3900 in FIG. 39).

FIG. 38 illustrates a network dataflow endpoint circuit 3800 receiving input one (1) while performing a pick operation according to embodiments of the disclosure, for example, as discussed above in reference to FIG. 24. In one embodiment, egress configuration 3826A is loaded (e.g., during a configuration step) with a portion of a pick operation that is to send data to a different network dataflow endpoint circuit (e.g., circuit 3900 in FIG. 39). In one embodiment, egress scheduler 3828A is to monitor the argument queue 3820 (e.g., data queue 3802B) for input data (e.g., from a processing element). According to an embodiment of the depicted data format, the "send" (e.g., a binary value therefor) indicates data is to be sent according to fields X, Y, with X being the value indicating a particular target network dataflow endpoint circuit (e.g., 0 being network dataflow endpoint circuit 3900 in FIG. 39) and Y being the value indicating which network ingress buffer (e.g., buffer 3924) location the value is to be stored. In one embodiment, Y is the value indicating a particular channel of a multiple channel (e.g., packet switched) network (e.g., 1 being channel 1 and/or buffer element 1 of network dataflow endpoint circuit 3900 in FIG. 39). When the input data arrives, it is then to be sent (e.g., from network egress buffer 3722) by network dataflow endpoint circuit 3800 to a different network dataflow endpoint circuit (e.g., network dataflow endpoint circuit 3900 in FIG. 39).

FIG. 39 illustrates a network dataflow endpoint circuit 3900 outputting the selected input while performing a pick operation according to embodiments of the disclosure, for example, as discussed above in reference to FIG. 24. In one embodiment, other network dataflow endpoint circuits (e.g., circuit 3700 and circuit 3800) are to send their input data to network ingress buffer 3924 of circuit 3900. In one embodiment, ingress configuration 3926B is loaded (e.g., during a configuration step) with a portion of a pick operation that is to pick the data sent to network dataflow endpoint circuit 3900, e.g., according to a control value. In one embodiment, control value is to received in ingress control 3932 (e.g., buffer). In one embodiment, ingress scheduler 3828A is to monitor the receipt of the control value and the input values (e.g., in network ingress buffer 3924). For example, if the control value says pick from buffer element A (e.g., 0 or 1 in this example) (e.g., from channel A) of network ingress buffer 3924, the value stored in that buffer element A is then output as a resultant of the operation by circuit 3900, for example, into an output buffer 3908, e.g., when output buffer has storage space (e.g., as indicated by a backpressure signal). In one embodiment, circuit 3900's output data is sent out when the egress buffer has a token (e.g., input data and control data) and the receiver asserts that it has buffer (e.g., indicating storage is available).

Figure 40:
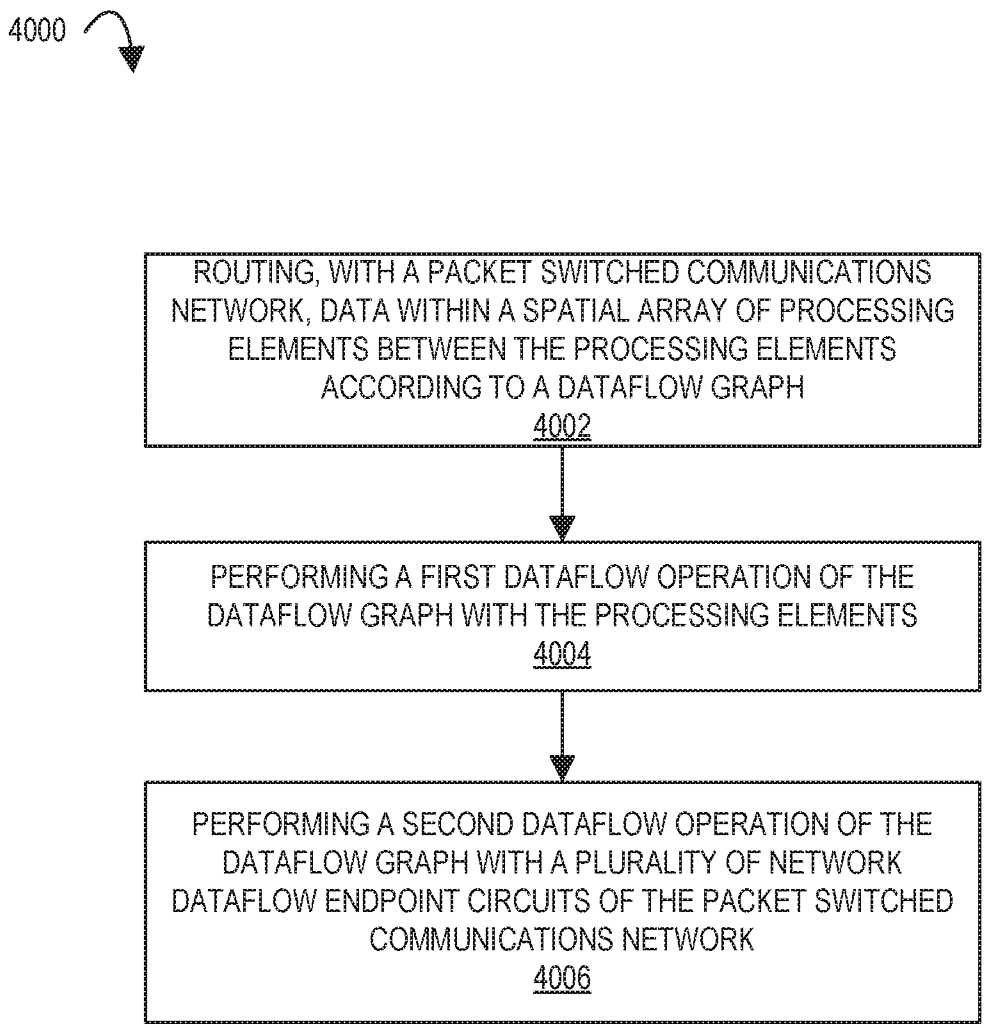
FIG. 40 illustrates a flow diagram according to embodiments of the disclosure.

FIG. 40 illustrates a flow diagram 4000 according to embodiments of the disclosure. Depicted flow 4000 includes providing a spatial array of processing elements 4002; routing, with a packet switched communications network, data within the spatial array between processing elements according to a dataflow graph 4004; performing a first dataflow operation of the dataflow graph with the processing elements 4006; and performing a second dataflow operation of the dataflow graph with a plurality of network dataflow endpoint circuits of the packet switched communications network 4008.

2. CSA Architecture

The goal of certain embodiments of a CSA is to rapidly and efficiently execute programs, e.g., programs produced by compilers. Certain embodiments of the CSA architecture provide programming abstractions that support the needs of compiler technologies and programming paradigms. Embodiments of the CSA execute dataflow graphs, e.g., a program manifestation that closely resembles the compiler's own internal representation (IR) of compiled programs. In this model, a program is represented as a dataflow graph comprised of nodes (e.g., vertices) drawn from a set of architecturally-defined dataflow operators (e.g., that encompass both computation and control operations) and edges which represent the transfer of data between dataflow operators. Execution may proceed by injecting dataflow tokens (e.g., that are or represent data values) into the dataflow graph. Tokens may flow between and be transformed at each node (e.g., vertex), for example, forming a complete computation. A sample dataflow graph and its derivation from high-level source code is shown in FIGS. 41A-41C, and FIG. 43 shows an example of the execution of a dataflow graph.

Embodiments of the CSA are configured for dataflow graph execution by providing exactly those dataflow-graph-execution supports required by compilers. In one embodiment, the CSA is an accelerator (e.g., an accelerator in FIG. 22) and it does not seek to provide some of the necessary but infrequently used mechanisms available on general purpose processing cores (e.g., a core in FIG. 22), such as system calls. Therefore, in this embodiment, the CSA can execute many codes, but not all codes. In exchange, the CSA gains significant performance and energy advantages. To enable the acceleration of code written in commonly used sequential languages, embodiments herein also introduce several novel architectural features to assist the compiler. One particular novelty is CSA's treatment of memory, a subject which has been ignored or poorly addressed previously. Embodiments of the CSA are also unique in the use of dataflow operators, e.g., as opposed to lookup tables (LUTs), as their fundamental architectural interface.

Turning back to embodiments of the CSA, dataflow operators are discussed next.

2.1 Dataflow Operators

The key architectural interface of embodiments of the accelerator (e.g., CSA) is the dataflow operator, e.g., as a direct representation of a node in a dataflow graph. From an operational perspective, dataflow operators behave in a streaming or data-driven fashion. Dataflow operators may execute as soon as their incoming operands become available. CSA dataflow execution may depend (e.g., only) on highly localized status, for example, resulting in a highly scalable architecture with a distributed, asynchronous execution model. Dataflow operators may include arithmetic dataflow operators, for example, one or more of floating point addition and multiplication, integer addition, subtraction, and multiplication, various forms of comparison, logical operators, and shift. However, embodiments of the CSA may also include a rich set of control operators which assist in the management of dataflow tokens in the program graph. Examples of these include a "pick" operator, e.g., which multiplexes two or more logical input channels into a single output channel, and a "switch" operator, e.g., which operates as a channel demultiplexor (e.g., outputting a single channel from two or more logical input channels). These operators may enable a compiler to implement control paradigms such as conditional expressions. Certain embodiments of a CSA may include a limited dataflow operator set (e.g., to relatively small number of operations) to yield dense and energy efficient PE microarchitectures. Certain embodiments may include dataflow operators for complex operations that are common in HPC code. The CSA dataflow operator architecture is highly amenable to deployment-specific extensions. For example, more complex mathematical dataflow operators, e.g., trigonometry functions, may be included in certain embodiments to accelerate certain mathematics-intensive HPC workloads. Similarly, a neural-network tuned extension may include dataflow operators for vectorized, low precision arithmetic.

FIG. 41A illustrates a program source according to embodiments of the disclosure. Program source code includes a multiplication function (func). FIG. 41B illustrates a dataflow graph 4100 for the program source of FIG. 41A according to embodiments of the disclosure. Dataflow graph 4100 includes a pick node 4104, switch node 4106, and multiplication node 4108. A buffer may optionally be included along one or more of the communication paths. Depicted dataflow graph 4100 may perform an operation of selecting input X with pick node 4104, multiplying X by Y (e.g., multiplication node 4108), and then outputting the result from the left output of the switch node 4106. FIG. 41C illustrates an accelerator (e.g., CSA) with a plurality of processing elements 4101 configured to execute the dataflow graph of FIG. 41B according to embodiments of the disclosure. More particularly, the dataflow graph 4100 is overlaid into the array of processing elements 4101 (e.g., and the (e.g., interconnect) network(s) therebetween), for example, such that each node of the dataflow graph 4100 is represented as a dataflow operator in the array of processing elements 4101. For example, certain dataflow operations may be achieved with a processing element and/or certain dataflow operations may be achieved with a communications network (e.g., a network dataflow endpoint circuit thereof). For example, a Pick, PickSingleLeg, PickAny, Switch, and/or SwitchAny operation may be achieved with one or more components of a communications network (e.g., a network dataflow endpoint circuit thereof), e.g., in contrast to a processing element.

In one embodiment, one or more of the processing elements in the array of processing elements 4101 is to access memory through memory interface 4102. In one embodiment, pick node 4104 of dataflow graph 4100 thus corresponds (e.g., is represented by) to pick operator 4104A, switch node 4106 of dataflow graph 4100 thus corresponds (e.g., is represented by) to switch operator 4106A, and multiplier node 4108 of dataflow graph 4100 thus corresponds (e.g., is represented by) to multiplier operator 4108A. Another processing element and/or a flow control path network may provide the control signals (e.g., control tokens) to the pick operator 4104A and switch operator 4106A to perform the operation in FIG. 41A. In one embodiment, array of processing elements 4101 is configured to execute the dataflow graph 4100 of FIG. 41B before execution begins. In one embodiment, compiler performs the conversion from FIG. 41A-41B. In one embodiment, the input of the dataflow graph nodes into the array of processing elements logically embeds the dataflow graph into the array of processing elements, e.g., as discussed further below, such that the input/output paths are configured to produce the desired result.

2.2 Latency Insensitive Channels

Communications arcs are the second major component of the dataflow graph. Certain embodiments of a CSA describes these arcs as latency insensitive channels, for example, in-order, back-pressured (e.g., not producing or sending output until there is a place to store the output), point-to-point communications channels. As with dataflow operators, latency insensitive channels are fundamentally asynchronous, giving the freedom to compose many types of networks to implement the channels of a particular graph. Latency insensitive channels may have arbitrarily long latencies and still faithfully implement the CSA architecture. However, in certain embodiments there is strong incentive in terms of performance and energy to make latencies as small as possible. Section 3.2 herein discloses a network microarchitecture in which dataflow graph channels are implemented in a pipelined fashion with no more than one cycle of latency. Embodiments of latency-insensitive channels provide a critical abstraction layer which may be leveraged with the CSA architecture to provide a number of runtime services to the applications programmer. For example, a CSA may leverage latency-insensitive channels in the implementation of the CSA configuration (the loading of a program onto the CSA array).

FIG. 42 illustrates an example execution of a dataflow graph 4200 according to embodiments of the disclosure. At step 1, input values (e.g., 1 for X in FIG. 41B and 2 for Y in FIG. 41B) may be loaded in dataflow graph 4200 to perform a 1*2 multiplication operation. One or more of the data input values may be static (e.g., constant) in the operation (e.g., 1 for X and 2 for Y in reference to FIG. 41B) or updated during the operation. At step 2, a processing element (e.g., on a flow control path network) or other circuit outputs a zero to control input (e.g., multiplexer control signal) of pick node 4204 (e.g., to source a one from port "0" to its output) and outputs a zero to control input (e.g., multiplexer control signal) of switch node 4206 (e.g., to provide its input out of port "0" to a destination (e.g., a downstream processing element). At step 3, the data value of 1 is output from pick node 4204 (e.g., and consumes its control signal "0" at the pick node 4204) to multiplier node 4208 to be multiplied with the data value of 2 at step 4. At step 4, the output of multiplier node 4208 arrives at switch node 4206, e.g., which causes switch node 4206 to consume a control signal "0" to output the value of 2 from port "0" of switch node 4206 at step 5. The operation is then complete. A CSA may thus be programmed accordingly such that a corresponding dataflow operator for each node performs the operations in FIG. 42. Although execution is serialized in this example, in principle all dataflow operations may execute in parallel. Steps are used in FIG. 42 to differentiate dataflow execution from any physical microarchitectural manifestation. In one embodiment a downstream processing element is to send a signal (or not send a ready signal) (for example, on a flow control path network) to the switch 4206 to stall the output from the switch 4206, e.g., until the downstream processing element is ready (e.g., has storage room) for the output.

2.3 Memory

Dataflow architectures generally focus on communication and data manipulation with less attention paid to state. However, enabling real software, especially programs written in legacy sequential languages, requires significant attention to interfacing with memory. Certain embodiments of a CSA use architectural memory operations as their primary interface to (e.g., large) stateful storage. From the perspective of the dataflow graph, memory operations are similar to other dataflow operations, except that they have the side effect of updating a shared store. In particular, memory operations of certain embodiments herein have the same semantics as every other dataflow operator, for example, they "execute" when their operands, e.g., an address, are available and, after some latency, a response is produced. Certain embodiments herein explicitly decouple the operand input and result output such that memory operators are naturally pipelined and have the potential to produce many simultaneous outstanding requests, e.g., making them exceptionally well suited to the latency and bandwidth characteristics of a memory subsystem. Embodiments of a CSA provide basic memory operations such as load, which takes an address channel and populates a response channel with the values corresponding to the addresses, and a store. Embodiments of a CSA may also provide more advanced operations such as in-memory atomics and consistency operators. These operations may have similar semantics to their von Neumann counterparts. Embodiments of a CSA may accelerate existing programs described using sequential languages such as C and Fortran. A consequence of supporting these language models is addressing program memory order, e.g., the serial ordering of memory operations typically prescribed by these languages.

FIG. 43 illustrates a program source (e.g., C code) 4300 according to embodiments of the disclosure. According to the memory semantics of the C programming language, memory copy (memcpy) should be serialized. However, memcpy may be parallelized with an embodiment of the CSA if arrays A and B are known to be disjoint. FIG. 43 further illustrates the problem of program order. In general, compilers cannot prove that array A is different from array B, e.g., either for the same value of index or different values of index across loop bodies. This is known as pointer or memory aliasing. Since compilers are to generate statically correct code, they are usually forced to serialize memory accesses. Typically, compilers targeting sequential von Neumann architectures use instruction ordering as a natural means of enforcing program order. However, embodiments of the CSA have no notion of instruction or instruction-based program ordering as defined by a program counter. In certain embodiments, incoming dependency tokens, e.g., which contain no architecturally visible information, are like all other dataflow tokens and memory operations may not execute until they have received a dependency token. In certain embodiments, memory operations produce an outgoing dependency token once their operation is visible to all logically subsequent, dependent memory operations. In certain embodiments, dependency tokens are similar to other dataflow tokens in a dataflow graph. For example, since memory operations occur in conditional contexts, dependency tokens may also be manipulated using control operators described in Section 2.1, e.g., like any other tokens. Dependency tokens may have the effect of serializing memory accesses, e.g., providing the compiler a means of architecturally defining the order of memory accesses.

2.4 Runtime Services

A primary architectural considerations of embodiments of the CSA involve the actual execution of user-level programs, but it may also be desirable to provide several support mechanisms which underpin this execution. Chief among these are configuration (in which a dataflow graph is loaded into the CSA), extraction (in which the state of an executing graph is moved to memory), and exceptions (in which mathematical, soft, and other types of errors in the fabric are detected and handled, possibly by an external entity). Section 3.6 below discusses the properties of a latency-insensitive dataflow architecture of an embodiment of a CSA to yield efficient, largely pipelined implementations of these functions. Conceptually, configuration may load the state of a dataflow graph into the interconnect (and/or communications network (e.g., a network dataflow endpoint circuit thereof)) and processing elements (e.g., fabric), e.g., generally from memory. During this step, all structures in the CSA may be loaded with a new dataflow graph and any dataflow tokens live in that graph, for example, as a consequence of a context switch. The latency-insensitive semantics of a CSA may permit a distributed, asynchronous initialization of the fabric, e.g., as soon as PEs are configured, they may begin execution immediately. Unconfigured PEs may backpressure their channels until they are configured, e.g., preventing communications between configured and unconfigured elements. The CSA configuration may be partitioned into privileged and user-level state. Such a two-level partitioning may enable primary configuration of the fabric to occur without invoking the operating system. During one embodiment of extraction, a logical view of the dataflow graph is captured and committed into memory, e.g., including all live control and dataflow tokens and state in the graph.

Extraction may also play a role in providing reliability guarantees through the creation of fabric checkpoints. Exceptions in a CSA may generally be caused by the same events that cause exceptions in processors, such as illegal operator arguments or reliability, availability, and serviceability (RAS) events. In certain embodiments, exceptions are detected at the level of dataflow operators, for example, checking argument values or through modular arithmetic schemes. Upon detecting an exception, a dataflow operator (e.g., circuit) may halt and emit an exception message, e.g., which contains both an operation identifier and some details of the nature of the problem that has occurred. In one embodiment, the dataflow operator will remain halted until it has been reconfigured. The exception message may then be communicated to an associated processor (e.g., core) for service, e.g., which may include extracting the graph for software analysis.

2.5 Tile-Level Architecture

Figure 44:
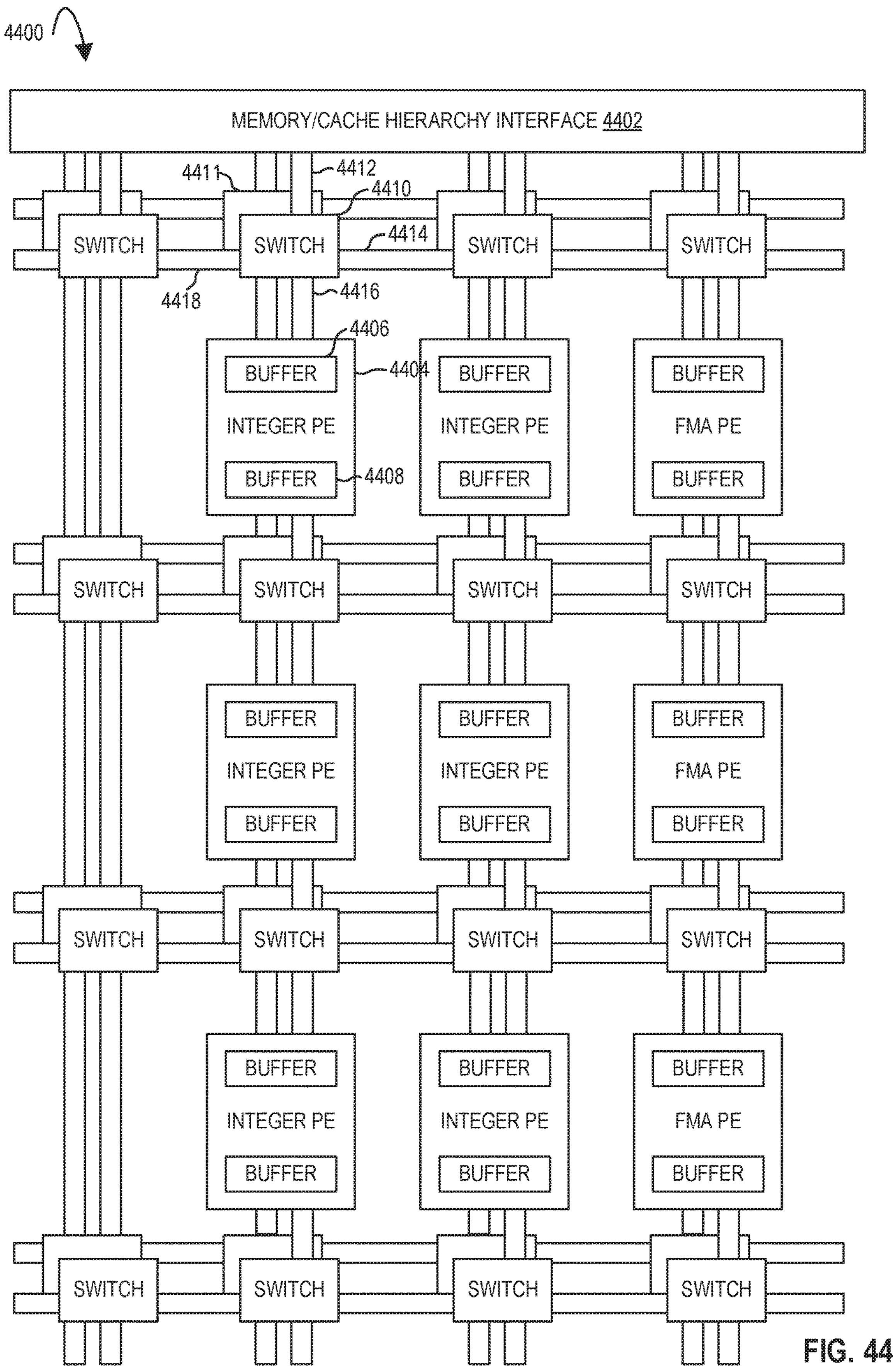
FIG. 44 illustrates an accelerator tile comprising an array of processing elements according to embodiments of the disclosure.
Figure 46:
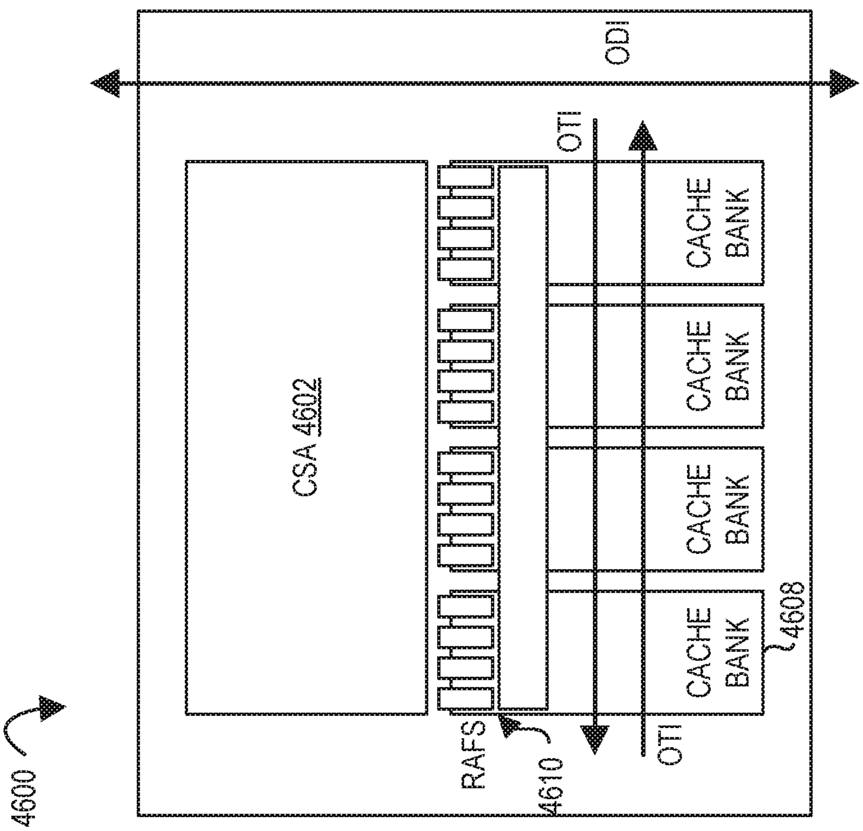
FIG. 46 illustrates a hardware processor tile comprising an accelerator according to embodiments of the disclosure.

Embodiments of the CSA computer architectures (e.g., targeting HPC and datacenter uses) are tiled. FIGS. 44 and 46 show tile-level deployments of a CSA. FIG. 46 shows a full-tile implementation of a CSA, e.g., which may be an accelerator of a processor with a core. A main advantage of this architecture is may be reduced design risk, e.g., such that the CSA and core are completely decoupled in manufacturing. In addition to allowing better component reuse, this may allow the design of components like the CSA Cache to consider only the CSA, e.g., rather than needing to incorporate the stricter latency requirements of the core. Finally, separate tiles may allow for the integration of CSA with small or large cores. One embodiment of the CSA captures most vector-parallel workloads such that most vector-style workloads run directly on the CSA, but in certain embodiments vector-style instructions in the core may be included, e.g., to support legacy binaries.

3. Microarchitecture

In one embodiment, the goal of the CSA microarchitecture is to provide a high quality implementation of each dataflow operator specified by the CSA architecture. Embodiments of the CSA microarchitecture provide that each processing element (and/or communications network (e.g., a network dataflow endpoint circuit thereof)) of the microarchitecture corresponds to approximately one node (e.g., entity) in the architectural dataflow graph. In one embodiment, a node in the dataflow graph is distributed in multiple network dataflow endpoint circuits. In certain embodiments, this results in microarchitectural elements that are not only compact, resulting in a dense computation array, but also energy efficient, for example, where processing elements (PEs) are both simple and largely unmultiplexed, e.g., executing a single dataflow operator for a configuration (e.g., programming) of the CSA. To further reduce energy and implementation area, a CSA may include a configurable, heterogeneous fabric style in which each PE thereof implements only a subset of dataflow operators (e.g., with a separate subset of dataflow operators implemented with network dataflow endpoint circuit(s)). Peripheral and support subsystems, such as the CSA cache, may be provisioned to support the distributed parallelism incumbent in the main CSA processing fabric itself. Implementation of CSA microarchitectures may utilize dataflow and latency-insensitive communications abstractions present in the architecture. In certain embodiments, there is (e.g., substantially) a one-to-one correspondence between nodes in the compiler generated graph and the dataflow operators (e.g., dataflow operator compute elements) in a CSA.

Below is a discussion of an example CSA, followed by a more detailed discussion of the microarchitecture. Certain embodiments herein provide a CSA that allows for easy compilation, e.g., in contrast to an existing FPGA compilers that handle a small subset of a programming language (e.g., C or C++) and require many hours to compile even small programs.

Certain embodiments of a CSA architecture admits of heterogeneous coarse-grained operations, like double precision floating point. Programs may be expressed in fewer coarse grained operations, e.g., such that the disclosed compiler runs faster than traditional spatial compilers. Certain embodiments include a fabric with new processing elements to support sequential concepts like program ordered memory accesses. Certain embodiments implement hardware to support coarse-grained dataflow-style communication channels. This communication model is abstract, and very close to the control-dataflow representation used by the compiler. Certain embodiments herein include a network implementation that supports single-cycle latency communications, e.g., utilizing (e.g., small) PEs which support single control-dataflow operations. In certain embodiments, not only does this improve energy efficiency and performance, it simplifies compilation because the compiler makes a one-to-one mapping between high-level dataflow constructs and the fabric. Certain embodiments herein thus simplify the task of compiling existing (e.g., C, C++, or Fortran) programs to a CSA (e.g., fabric).

Energy efficiency may be a first order concern in modern computer systems. Certain embodiments herein provide a new schema of energy-efficient spatial architectures. In certain embodiments, these architectures form a fabric with a unique composition of a heterogeneous mix of small, energy-efficient, data-flow oriented processing elements (PEs) (and/or a packet switched communications network (e.g., a network dataflow endpoint circuit thereof)) with a lightweight circuit switched communications network (e.g., interconnect), e.g., with hardened support for flow control. Due to the energy advantages of each, the combination of these components may form a spatial accelerator (e.g., as part of a computer) suitable for executing compiler-generated parallel programs in an extremely energy efficient manner. Since this fabric is heterogeneous, certain embodiments may be customized for different application domains by introducing new domain-specific PEs. For example, a fabric for high-performance computing might include some customization for double-precision, fused multiply-add, while a fabric targeting deep neural networks might include low-precision floating point operations.

An embodiment of a spatial architecture schema, e.g., as exemplified in FIG. 24, is the composition of light-weight processing elements (PE) connected by an inter-PE network. Generally, PEs may comprise dataflow operators, e.g., where once (e.g., all) input operands arrive at the dataflow operator, some operation (e.g., micro-instruction or set of micro-instructions) is executed, and the results are forwarded to downstream operators. Control, scheduling, and data storage may therefore be distributed amongst the PEs, e.g., removing the overhead of the centralized structures that dominate classical processors.

Programs may be converted to dataflow graphs that are mapped onto the architecture by configuring PEs and the network to express the control-dataflow graph of the program. Communication channels may be flow-controlled and fully back-pressured, e.g., such that PEs will stall if either source communication channels have no data or destination communication channels are full. In one embodiment, at runtime, data flow through the PEs and channels that have been configured to implement the operation (e.g., an accelerated algorithm). For example, data may be streamed in from memory, through the fabric, and then back out to memory.

Embodiments of such an architecture may achieve remarkable performance efficiency relative to traditional multicore processors: compute (e.g., in the form of PEs) may be simpler, more energy efficient, and more plentiful than in larger cores, and communications may be direct and mostly short-haul, e.g., as opposed to occurring over a wide, full-chip network as in typical multicore processors. Moreover, because embodiments of the architecture are extremely parallel, a number of powerful circuit and device level optimizations are possible without seriously impacting throughput, e.g., low leakage devices and low operating voltage. These lower-level optimizations may enable even greater performance advantages relative to traditional cores. The combination of efficiency at the architectural, circuit, and device levels yields of these embodiments are compelling. Embodiments of this architecture may enable larger active areas as transistor density continues to increase.

Embodiments herein offer a unique combination of dataflow support and circuit switching to enable the fabric to be smaller, more energy-efficient, and provide higher aggregate performance as compared to previous architectures. FPGAs are generally tuned towards fine-grained bit manipulation, whereas embodiments herein are tuned toward the double-precision floating point operations found in HPC applications. Certain embodiments herein may include a FPGA in addition to a CSA according to this disclosure.

Certain embodiments herein combine a light-weight network with energy efficient dataflow processing elements (and/or communications network (e.g., a network dataflow endpoint circuit thereof)) to form a high-throughput, low-latency, energy-efficient HPC fabric. This low-latency network may enable the building of processing elements (and/or communications network (e.g., a network dataflow endpoint circuit thereof)) with fewer functionalities, for example, only one or two instructions and perhaps one architecturally visible register, since it is efficient to gang multiple PEs together to form a complete program.

Relative to a processor core, CSA embodiments herein may provide for more computational density and energy efficiency. For example, when PEs are very small (e.g., compared to a core), the CSA may perform many more operations and have much more computational parallelism than a core, e.g., perhaps as many as 16 times the number of FMAs as a vector processing unit (VPU). To utilize all of these computational elements, the energy per operation is very low in certain embodiments.

The energy advantages our embodiments of this dataflow architecture are many. Parallelism is explicit in dataflow graphs and embodiments of the CSA architecture spend no or minimal energy to extract it, e.g., unlike out-of-order processors which must re-discover parallelism each time an instruction is executed. Since each PE is responsible for a single operation in one embodiment, the register files and ports counts may be small, e.g., often only one, and therefore use less energy than their counterparts in core. Certain CSAs include many PEs, each of which holds live program values, giving the aggregate effect of a huge register file in a traditional architecture, which dramatically reduces memory accesses. In embodiments where the memory is multi-ported and distributed, a CSA may sustain many more outstanding memory requests and utilize more bandwidth than a core. These advantages may combine to yield an energy level per watt that is only a small percentage over the cost of the bare arithmetic circuitry. For example, in the case of an integer multiply, a CSA may consume no more than 25% more energy than the underlying multiplication circuit. Relative to one embodiment of a core, an integer operation in that CSA fabric consumes less than 1/30th of the energy per integer operation.

From a programming perspective, the application-specific malleability of embodiments of the CSA architecture yields significant advantages over a vector processing unit (VPU). In traditional, inflexible architectures, the number of functional units, like floating divide or the various transcendental mathematical functions, must be chosen at design time based on some expected use case. In embodiments of the CSA architecture, such functions may be configured (e.g., by a user and not a manufacturer) into the fabric based on the requirement of each application. Application throughput may thereby be further increased. Simultaneously, the compute density of embodiments of the CSA improves by avoiding hardening such functions, and instead provision more instances of primitive functions like floating multiplication. These advantages may be significant in HPC workloads, some of which spend 75% of floating execution time in transcendental functions.

Certain embodiments of the CSA represents a significant advance as a dataflow-oriented spatial architectures, e.g., the PEs of this disclosure may be smaller, but also more energy-efficient. These improvements may directly result from the combination of dataflow-oriented PEs with a lightweight, circuit switched interconnect, for example, which has single-cycle latency, e.g., in contrast to a packet switched network (e.g., with, at a minimum, a 300% higher latency). Certain embodiments of PEs support 32-bit or 64-bit operation. Certain embodiments herein permit the introduction of new application-specific PEs, for example, for machine learning or security, and not merely a homogeneous combination. Certain embodiments herein combine lightweight dataflow-oriented processing elements with a lightweight, low-latency network to form an energy efficient computational fabric.

In order for certain spatial architectures to be successful, programmers are to configure them with relatively little effort, e.g., while obtaining significant power and performance superiority over sequential cores. Certain embodiments herein provide for a CSA (e.g., spatial fabric) that is easily programmed (e.g., by a compiler), power efficient, and highly parallel. Certain embodiments herein provide for a (e.g., interconnect) network that achieves these three goals. From a programmability perspective, certain embodiments of the network provide flow controlled channels, e.g., which correspond to the control-dataflow graph (CDFG) model of execution used in compilers. Certain network embodiments utilize dedicated, circuit switched links, such that program performance is easier to reason about, both by a human and a compiler, because performance is predictable. Certain network embodiments offer both high bandwidth and low latency. Certain network embodiments (e.g., static, circuit switching) provides a latency of 0 to 1 cycle (e.g., depending on the transmission distance.) Certain network embodiments provide for a high bandwidth by laying out several networks in parallel, e.g., and in low-level metals. Certain network embodiments communicate in low-level metals and over short distances, and thus are very power efficient.

Certain embodiments of networks include architectural support for flow control. For example, in spatial accelerators composed of small processing elements (PEs), communications latency and bandwidth may be critical to overall program performance. Certain embodiments herein provide for a light-weight, circuit switched network which facilitates communication between PEs in spatial processing arrays, such as the spatial array shown in FIG. 44, and the micro-architectural control features necessary to support this network. Certain embodiments of a network enable the construction of point-to-point, flow controlled communications channels which support the communications of the dataflow oriented processing elements (PEs). In addition to point-to-point communications, certain networks herein also support multicast communications. Communications channels may be formed by statically configuring the network to from virtual circuits between PEs. Circuit switching techniques herein may decrease communications latency and commensurately minimize network buffering, e.g., resulting in both high performance and high energy efficiency. In certain embodiments of a network, inter-PE latency may be as low as a zero cycles, meaning that the downstream PE may operate on data in the cycle after it is produced. To obtain even higher bandwidth, and to admit more programs, multiple networks may be laid out in parallel, e.g., as shown in FIG. 24.

Spatial architectures, such as the one shown in FIG. 24, may be the composition of lightweight processing elements connected by an inter-PE network (and/or communications network (e.g., a network dataflow endpoint circuit thereof)). Programs, viewed as dataflow graphs, may be mapped onto the architecture by configuring PEs and the network. Generally, PEs may be configured as dataflow operators, and once (e.g., all) input operands arrive at the PE, some operation may then occur, and the result are forwarded to the desired downstream PEs. PEs may communicate over dedicated virtual circuits which are formed by statically configuring a circuit switched communications network. These virtual circuits may be flow controlled and fully back-pressured, e.g., such that PEs will stall if either the source has no data or the destination is full. At runtime, data may flow through the PEs implementing the mapped algorithm. For example, data may be streamed in from memory, through the fabric, and then back out to memory. Embodiments of this architecture may achieve remarkable performance efficiency relative to traditional multicore processors: for example, where compute, in the form of PEs, is simpler and more numerous than larger cores and communication are direct, e.g., as opposed to an extension of the memory system.

FIG. 44 illustrates an accelerator tile 4400 comprising an array of processing elements (PEs) according to embodiments of the disclosure. The interconnect network is depicted as circuit switched, statically configured communications channels. For example, a set of channels coupled together by a switch (e.g., switch 4410 in a first network and switch 4411 in a second network). The first network and second network may be separate or coupled together. For example, switch 4410 may couple one or more of the four data paths (4412, 4414, 4416, 4418) together, e.g., as configured to perform an operation according to a dataflow graph. In one embodiment, the number of data paths is any plurality. Processing element (e.g., processing element 4404) may be as disclosed herein, for example, as in FIG. 47. Accelerator tile 4400 includes a memory/cache hierarchy interface 4402, e.g., to interface the accelerator tile 4400 with a memory and/or cache. A data path (e.g., 4418) may extend to another tile or terminate, e.g., at the edge of a tile. A processing element may include an input buffer (e.g., buffer 4406) and an output buffer (e.g., buffer 4408).

Operations may be executed based on the availability of their inputs and the status of the PE. A PE may obtain operands from input channels and write results to output channels, although internal register state may also be used. Certain embodiments herein include a configurable dataflow-friendly PE. FIG. 47 shows a detailed block diagram of one such PE: the integer PE. This PE consists of several I/O buffers, an ALU, a storage register, some instruction registers, and a scheduler. Each cycle, the scheduler may select an instruction for execution based on the availability of the input and output buffers and the status of the PE. The result of the operation may then be written to either an output buffer or to a (e.g., local to the PE) register. Data written to an output buffer may be transported to a downstream PE for further processing. This style of PE may be extremely energy efficient, for example, rather than reading data from a complex, multi-ported register file, a PE reads the data from a register. Similarly, instructions may be stored directly in a register, rather than in a virtualized instruction cache.

Instruction registers may be set during a special configuration step. During this step, auxiliary control wires and state, in addition to the inter-PE network, may be used to stream in configuration across the several PEs comprising the fabric. As result of parallelism, certain embodiments of such a network may provide for rapid reconfiguration, e.g., a tile sized fabric may be configured in less than about 10 microseconds.

FIG. 47 represents one example configuration of a processing element, e.g., in which all architectural elements are minimally sized. In other embodiments, each of the components of a processing element is independently scaled to produce new PEs. For example, to handle more complicated programs, a larger number of instructions that are executable by a PE may be introduced. A second dimension of configurability is in the function of the PE arithmetic logic unit (ALU). In FIG. 47, an integer PE is depicted which may support addition, subtraction, and various logic operations. Other kinds of PEs may be created by substituting different kinds of functional units into the PE. An integer multiplication PE, for example, might have no registers, a single instruction, and a single output buffer. Certain embodiments of a PE decompose a fused multiply add (FMA) into separate, but tightly coupled floating multiply and floating add units to improve support for multiply-add-heavy workloads. PEs are discussed further below.

Figure 45A:
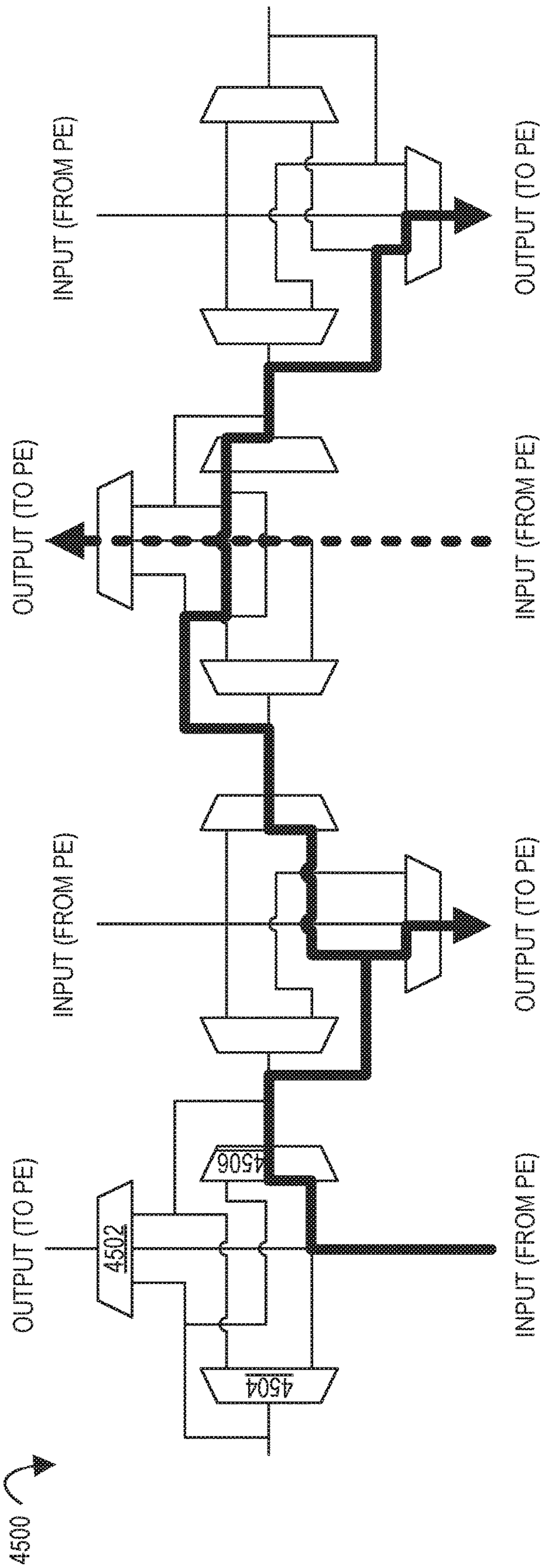
FIG. 45A illustrates a configurable data path network according to embodiments of the disclosure.
Figure 45B:
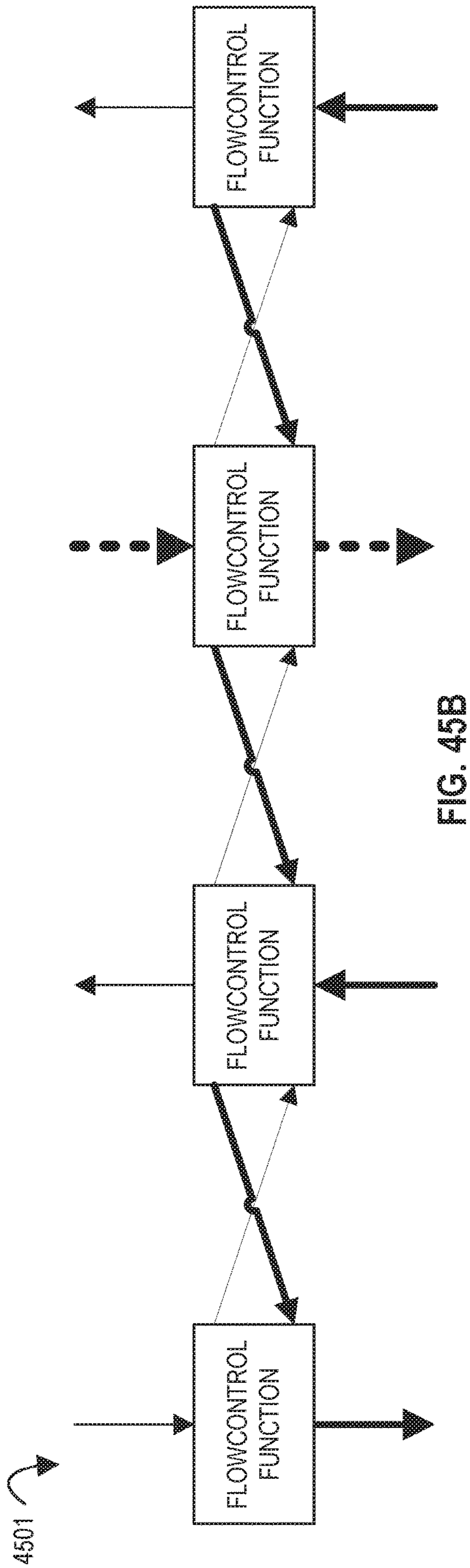
FIG. 45B illustrates a configurable flow control path network according to embodiments of the disclosure.

FIG. 45A illustrates a configurable data path network 4500 (e.g., of network one or network two discussed in reference to FIG. 44) according to embodiments of the disclosure. Network 4500 includes a plurality of multiplexers (e.g., multiplexers 4502, 4504, 4506) that may be configured (e.g., via their respective control signals) to connect one or more data paths (e.g., from PEs) together. FIG. 45B illustrates a configurable flow control path network 4501 (e.g., network one or network two discussed in reference to FIG. 44) according to embodiments of the disclosure. A network may be a light-weight PE-to-PE network. Certain embodiments of a network may be thought of as a set of composable primitives for the construction of distributed, point-to-point data channels. FIG. 45A shows a network that has two channels enabled, the bold black line and the dotted black line. The bold black line channel is multicast, e.g., a single input is sent to two outputs. Note that channels may cross at some points within a single network, even though dedicated circuit switched paths are formed between channel endpoints. Furthermore, this crossing may not introduce a structural hazard between the two channels, so that each operates independently and at full bandwidth.

Implementing distributed data channels may include two paths, illustrated in FIGS. 45A-45B. The forward, or data path, carries data from a producer to a consumer. Multiplexors may be configured to steer data and valid bits from the producer to the consumer, e.g., as in FIG. 45A. In the case of multicast, the data will be steered to multiple consumer endpoints. The second portion of this embodiment of a network is the flow control or backpressure path, which flows in reverse of the forward data path, e.g., as in FIG. 45B. Consumer endpoints may assert when they are ready to accept new data. These signals may then be steered back to the producer using configurable logical conjunctions, labelled as (e.g., backflow) flowcontrol function in FIG. 45B. In one embodiment, each flowcontrol function circuit may be a plurality of switches (e.g., muxes), for example, similar to FIG. 45A. The flow control path may handle returning control data from consumer to producer. Conjunctions may enable multicast, e.g., where each consumer is ready to receive data before the producer assumes that it has been received. In one embodiment, a PE is a PE that has a dataflow operator as its architectural interface. Additionally or alternatively, in one embodiment a PE may be any kind of PE (e.g., in the fabric), for example, but not limited to, a PE that has an instruction pointer, triggered instruction, or state machine based architectural interface.

The network may be statically configured, e.g., in addition to PEs being statically configured. During the configuration step, configuration bits may be set at each network component. These bits control, for example, the multiplexer selections and flow control functions. A network may comprise a plurality of networks, e.g., a data path network and a flow control path network. A network or plurality of networks may utilize paths of different widths (e.g., a first width, and a narrower or wider width). In one embodiment, a data path network has a wider (e.g., bit transport) width than the width of a flow control path network. In one embodiment, each of a first network and a second network includes their own data path network and flow control path network, e.g., data path network A and flow control path network A and wider data path network B and flow control path network B.

Certain embodiments of a network are bufferless, and data is to move between producer and consumer in a single cycle. Certain embodiments of a network are also boundless, that is, the network spans the entire fabric. In one embodiment, one PE is to communicate with any other PE in a single cycle. In one embodiment, to improve routing bandwidth, several networks may be laid out in parallel between rows of PEs.

Relative to FPGAs, certain embodiments of networks herein have three advantages: area, frequency, and program expression. Certain embodiments of networks herein operate at a coarse grain, e.g., which reduces the number configuration bits, and thereby the area of the network. Certain embodiments of networks also obtain area reduction by implementing flow control logic directly in circuitry (e.g., silicon). Certain embodiments of hardened network implementations also enjoys a frequency advantage over FPGA. Because of an area and frequency advantage, a power advantage may exist where a lower voltage is used at throughput parity. Finally, certain embodiments of networks provide better high-level semantics than FPGA wires, especially with respect to variable timing, and thus those certain embodiments are more easily targeted by compilers. Certain embodiments of networks herein may be thought of as a set of composable primitives for the construction of distributed, point-to-point data channels.

In certain embodiments, a multicast source may not assert its data valid unless it receives a ready signal from each sink. Therefore, an extra conjunction and control bit may be utilized in the multicast case.

Like certain PEs, the network may be statically configured. During this step, configuration bits are set at each network component. These bits control, for example, the multiplexer selection and flow control function. The forward path of our network requires some bits to swing its muxes. In the example shown in FIG. 45A, four bits per hop are required: the east and west muxes utilize one bit each, while the southbound multiplexer utilize two bits. In this embodiment, four bits may be utilized for the data path, but 7 bits may be utilized for the flow control function (e.g., in the flow control path network). Other embodiments may utilize more bits, for example, if a CSA further utilizes a north-south direction. The flow control function may utilize a control bit for each direction from which flow control can come. This may enables the setting of the sensitivity of the flow control function statically. The table 1 below summarizes the Boolean algebraic implementation of the flow control function for the network in FIG. 45B, with configuration bits capitalized. In this example, seven bits are utilized.

TABLE 1

| Flow Implementation | |
|---|---|
| readyToEast | (EAST_WEST_SENSITIVE + readyFromWest) * (EAST_SOUTH_SENSITIVE + readyFromSouth) |
| readyToWest | (WEST_EAST_SENSITIVE + readyFromEast) * (WEST_SOUTH_SENSITIVE + readyFromSouth) |
| readyToNorth | (NORTH_WEST_SENSITIVE + readyFromWest) * (NORTH_EAST_SENSITIVE + readyFromEast) * (NORTH_SOUTH_SENSITIVE + readyFromSouth) |

For the third flow control box from the left in FIG. 45B, EAST_WEST_SENSITIVE and NORTH_SOUTH_SENSITIVE are depicted as set to implement the flow control for the bold line and dotted line channels, respectively.

FIG. 46 illustrates a hardware processor tile 4600 comprising an accelerator 4602 according to embodiments of the disclosure. Accelerator 4602 may be a CSA according to this disclosure. Tile 4600 includes a plurality of cache banks (e.g., cache bank 4608). Request address file (RAF) circuits 4610 may be included, e.g., as discussed below in Section 3.2. ODI may refer to an On Die Interconnect, e.g., an interconnect stretching across an entire die connecting up all the tiles. OTI may refer to an On Tile Interconnect, for example, stretching across a tile, e.g., connecting cache banks on the tile together.

3.1 Processing Elements

In certain embodiments, a CSA includes an array of heterogeneous PEs, in which the fabric is composed of several types of PEs each of which implement only a subset of the dataflow operators. By way of example, FIG. 47 shows a provisional implementation of a PE capable of implementing a broad set of the integer and control operations. Other PEs, including those supporting floating point addition, floating point multiplication, buffering, and certain control operations may have a similar implementation style, e.g., with the appropriate (dataflow operator) circuitry substituted for the ALU. PEs (e.g., dataflow operators) of a CSA may be configured (e.g., programmed) before the beginning of execution to implement a particular dataflow operation from among the set that the PE supports. A configuration may include one or two control words which specify an opcode controlling the ALU, steer the various multiplexors within the PE, and actuate dataflow into and out of the PE channels. Dataflow operators may be implemented by microcoding these configurations bits. The depicted integer PE 4700 in FIG. 47 is organized as a single-stage logical pipeline flowing from top to bottom. Data enters PE 4700 from one of set of local networks, where it is registered in an input buffer for subsequent operation. Each PE may support a number of wide, data-oriented and narrow, control-oriented channels. The number of provisioned channels may vary based on PE functionality, but one embodiment of an integer-oriented PE has 2 wide and 1-2 narrow input and output channels. Although the integer PE is implemented as a single-cycle pipeline, other pipelining choices may be utilized. For example, multiplication PEs may have multiple pipeline stages.

PE execution may proceed in a dataflow style. Based on the configuration microcode, the scheduler may examine the status of the PE ingress and egress buffers, and, when all the inputs for the configured operation have arrived and the egress buffer of the operation is available, orchestrates the actual execution of the operation by a dataflow operator (e.g., on the ALU). The resulting value may be placed in the configured egress buffer. Transfers between the egress buffer of one PE and the ingress buffer of another PE may occur asynchronously as buffering becomes available. In certain embodiments, PEs are provisioned such that at least one dataflow operation completes per cycle. Section 2 discussed dataflow operator encompassing primitive operations, such as add, xor, or pick. Certain embodiments may provide advantages in energy, area, performance, and latency. In one embodiment, with an extension to a PE control path, more fused combinations may be enabled. In one embodiment, the width of the processing elements is 64 bits, e.g., for the heavy utilization of double-precision floating point computation in HPC and to support 64-bit memory addressing.

3.2 Communications Networks

Embodiments of the CSA microarchitecture provide a hierarchy of networks which together provide an implementation of the architectural abstraction of latency-insensitive channels across multiple communications scales. The lowest level of CSA communications hierarchy may be the local network. The local network may be statically circuit switched, e.g., using configuration registers to swing multiplexor(s) in the local network data-path to form fixed electrical paths between communicating PEs. In one embodiment, the configuration of the local network is set once per dataflow graph, e.g., at the same time as the PE configuration. In one embodiment, static, circuit switching optimizes for energy, e.g., where a large majority (perhaps greater than 95%) of CSA communications traffic will cross the local network. A program may include terms which are used in multiple expressions. To optimize for this case, embodiments herein provide for hardware support for multicast within the local network. Several local networks may be ganged together to form routing channels, e.g., which are interspersed (as a grid) between rows and columns of PEs. As an optimization, several local networks may be included to carry control tokens. In comparison to a FPGA interconnect, a CSA local network may be routed at the granularity of the data-path, and another difference may be a CSA's treatment of control. One embodiment of a CSA local network is explicitly flow controlled (e.g., back-pressured). For example, for each forward data-path and multiplexor set, a CSA is to provide a backward-flowing flow control path that is physically paired with the forward data-path. The combination of the two microarchitectural paths may provide a low-latency, low-energy, low-area, point-to-point implementation of the latency-insensitive channel abstraction. In one embodiment, a CSA's flow control lines are not visible to the user program, but they may be manipulated by the architecture in service of the user program. For example, the exception handling mechanisms described in Section 2.2 may be achieved by pulling flow control lines to a "not present" state upon the detection of an exceptional condition. This action may not only gracefully stalls those parts of the pipeline which are involved in the offending computation, but may also preserve the machine state leading up the exception, e.g., for diagnostic analysis. The second network layer, e.g., the mezzanine network, may be a shared, packet switched network. Mezzanine network may include a plurality of distributed network controllers, network dataflow endpoint circuits. The mezzanine network (e.g., the network schematically indicated by the dotted box in FIG. 40) may provide more general, long range communications, e.g., at the cost of latency, bandwidth, and energy. In some programs, most communications may occur on the local network, and thus mezzanine network provisioning will be considerably reduced in comparison, for example, each PE may connects to multiple local networks, but the CSA will provision only one mezzanine endpoint per logical neighborhood of PEs. Since the mezzanine is effectively a shared network, each mezzanine network may carry multiple logically independent channels, e.g., and be provisioned with multiple virtual channels. In one embodiment, the main function of the mezzanine network is to provide wide-range communications in-between PEs and between PEs and memory. In addition to this capability, the mezzanine may also include network dataflow endpoint circuit(s), for example, to perform certain dataflow operations. In addition to this capability, the mezzanine may also operate as a runtime support network, e.g., by which various services may access the complete fabric in a user-program-transparent manner. In this capacity, the mezzanine endpoint may function as a controller for its local neighborhood, for example, during CSA configuration. To form channels spanning a CSA tile, three subchannels and two local network channels (which carry traffic to and from a single channel in the mezzanine network) may be utilized. In one embodiment, one mezzanine channel is utilized, e.g., one mezzanine and two local=3 total network hops.

The composability of channels across network layers may be extended to higher level network layers at the inter-tile, inter-die, and fabric granularities.

FIG. 47 illustrates a processing element 4700 according to embodiments of the disclosure. In one embodiment, operation configuration register 4719 is loaded during configuration (e.g., mapping) and specifies the particular operation (or operations) this processing (e.g., compute) element is to perform. Register 4720 activity may be controlled by that operation (an output of multiplexer 4716, e.g., controlled by the scheduler 4714). Scheduler 4714 may schedule an operation or operations of processing element 4700, for example, when input data and control input arrives. Control input buffer 4722 is connected to local network 4702 (e.g., and local network 4702 may include a data path network as in FIG. 45A and a flow control path network as in FIG. 45B) and is loaded with a value when it arrives (e.g., the network has a data bit(s) and valid bit(s)). Control output buffer 4732, data output buffer 4734, and/or data output buffer 4736 may receive an output of processing element 4700, e.g., as controlled by the operation (an output of multiplexer 4716). Status register 4738 may be loaded whenever the ALU 4718 executes (also controlled by output of multiplexer 4716). Data in control input buffer 4722 and control output buffer 4732 may be a single bit. Multiplexer 4721 (e.g., operand A) and multiplexer 4723 (e.g., operand B) may source inputs.

For example, suppose the operation of this processing (e.g., compute) element is (or includes) what is called call a pick in FIG. 41B. The processing element 4700 then is to select data from either data input buffer 4724 or data input buffer 4726, e.g., to go to data output buffer 4734 (e.g., default) or data output buffer 4736. The control bit in 4722 may thus indicate a 0 if selecting from data input buffer 4724 or a 1 if selecting from data input buffer 4726.

For example, suppose the operation of this processing (e.g., compute) element is (or includes) what is called call a switch in FIG. 41B. The processing element 4700 is to output data to data output buffer 4734 or data output buffer 4736, e.g., from data input buffer 4724 (e.g., default) or data input buffer 4726. The control bit in 4722 may thus indicate a 0 if outputting to data output buffer 4734 or a 1 if outputting to data output buffer 4736.

Multiple networks (e.g., interconnects) may be connected to a processing element, e.g., (input) networks 4702, 4704, 4706 and (output) networks 4708, 4710, 4712. The connections may be switches, e.g., as discussed in reference to FIGS. 45A and 45B. In one embodiment, each network includes two sub-networks (or two channels on the network), e.g., one for the data path network in FIG. 45A and one for the flow control (e.g., backpressure) path network in FIG. 45B. As one example, local network 4702 (e.g., set up as a control interconnect) is depicted as being switched (e.g., connected) to control input buffer 4722. In this embodiment, a data path (e.g., network as in FIG. 45A) may carry the control input value (e.g., bit or bits) (e.g., a control token) and the flow control path (e.g., network) may carry the backpressure signal (e.g., backpressure or no-backpressure token) from control input buffer 4722, e.g., to indicate to the upstream producer (e.g., PE) that a new control input value is not to be loaded into (e.g., sent to) control input buffer 4722 until the backpressure signal indicates there is room in the control input buffer 4722 for the new control input value (e.g., from a control output buffer of the upstream producer). In one embodiment, the new control input value may not enter control input buffer 4722 until both (i) the upstream producer receives the "space available" backpressure signal from "control input" buffer 4722 and (ii) the new control input value is sent from the upstream producer, e.g., and this may stall the processing element 4700 until that happens (and space in the target, output buffer(s) is available).

Data input buffer 4724 and data input buffer 4726 may perform similarly, e.g., local network 4704 (e.g., set up as a data (as opposed to control) interconnect) is depicted as being switched (e.g., connected) to data input buffer 4724. In this embodiment, a data path (e.g., network as in FIG. 45A) may carry the data input value (e.g., bit or bits) (e.g., a dataflow token) and the flow control path (e.g., network) may carry the backpressure signal (e.g., backpressure or no-backpressure token) from data input buffer 4724, e.g., to indicate to the upstream producer (e.g., PE) that a new data input value is not to be loaded into (e.g., sent to) data input buffer 4724 until the backpressure signal indicates there is room in the data input buffer 4724 for the new data input value (e.g., from a data output buffer of the upstream producer). In one embodiment, the new data input value may not enter data input buffer 4724 until both (i) the upstream producer receives the "space available" backpressure signal from "data input" buffer 4724 and (ii) the new data input value is sent from the upstream producer, e.g., and this may stall the processing element 4700 until that happens (and space in the target, output buffer(s) is available). A control output value and/or data output value may be stalled in their respective output buffers (e.g., 4732, 4734, 4736) until a backpressure signal indicates there is available space in the input buffer for the downstream processing element(s).

A processing element 4700 may be stalled from execution until its operands (e.g., a control input value and its corresponding data input value or values) are received and/or until there is room in the output buffer(s) of the processing element 4700 for the data that is to be produced by the execution of the operation on those operands.

3.3 Memory Interface

Figure 48:
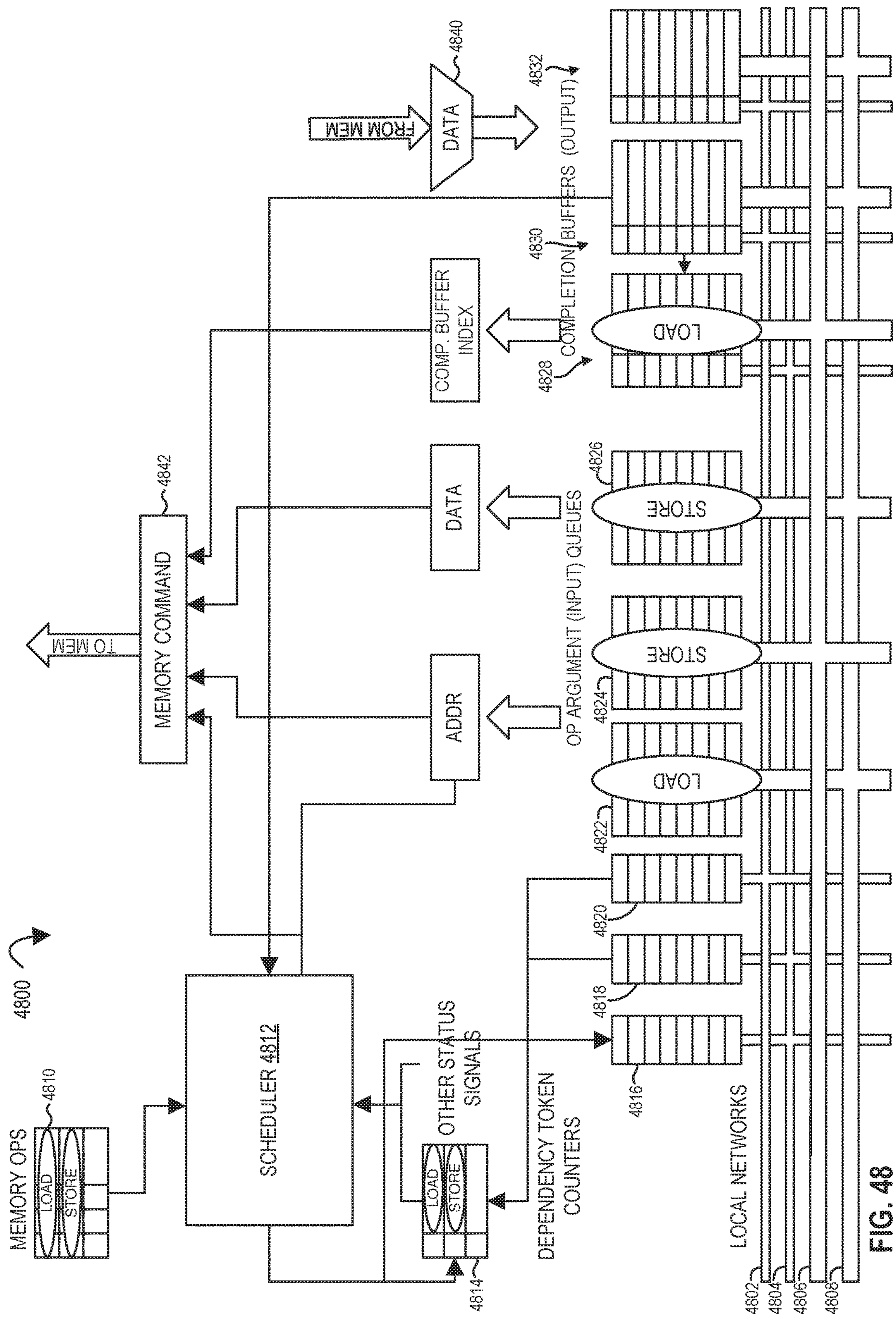
FIG. 48 illustrates a request address file (RAF) circuit according to embodiments of the disclosure.

The request address file (RAF) circuit, a simplified version of which is shown in FIG. 48, may be responsible for executing memory operations and serves as an intermediary between the CSA fabric and the memory hierarchy. As such, the main microarchitectural task of the RAF may be to rationalize the out-of-order memory subsystem with the in-order semantics of CSA fabric. In this capacity, the RAF circuit may be provisioned with completion buffers, e.g., queue-like structures that re-order memory responses and return them to the fabric in the request order. The second major functionality of the RAF circuit may be to provide support in the form of address translation and a page walker. Incoming virtual addresses may be translated to physical addresses using a channel-associative translation lookaside buffer (TLB). To provide ample memory bandwidth, each CSA tile may include multiple RAF circuits. Like the various PEs of the fabric, the RAF circuits may operate in a dataflow-style by checking for the availability of input arguments and output buffering, if required, before selecting a memory operation to execute. Unlike some PEs, however, the RAF circuit is multiplexed among several co-located memory operations. A multiplexed RAF circuit may be used to minimize the area overhead of its various subcomponents, e.g., to share the Accelerator Cache Interface (ACI) port (described in more detail in Section 3.4), shared virtual memory (SVM) support hardware, mezzanine network interface, and other hardware management facilities. However, there are some program characteristics that may also motivate this choice. In one embodiment, a (e.g., valid) dataflow graph is to poll memory in a shared virtual memory system. Memory-latency-bound programs, like graph traversals, may utilize many separate memory operations to saturate memory bandwidth due to memory-dependent control flow. Although each RAF may be multiplexed, a CSA may include multiple (e.g., between 8 and 32) RAFs at a tile granularity to ensure adequate cache bandwidth. RAFs may communicate with the rest of the fabric via both the local network and the mezzanine network. Where RAFs are multiplexed, each RAF may be provisioned with several ports into the local network. These ports may serve as a minimum-latency, highly-deterministic path to memory for use by latency-sensitive or high-bandwidth memory operations. In addition, a RAF may be provisioned with a mezzanine network endpoint, e.g., which provides memory access to runtime services and distant user-level memory accessors.

FIG. 48 illustrates a request address file (RAF) circuit 4800 according to embodiments of the disclosure. In one embodiment, at configuration time, the memory load and store operations that were in a dataflow graph are specified in registers 4810. The arcs to those memory operations in the dataflow graphs may then be connected to the input queues 4822, 4824, and 4826. The arcs from those memory operations are thus to leave completion buffers 4828, 4830, or 4832. Dependency tokens (which may be single bits) arrive into queues 4818 and 4820. Dependency tokens are to leave from queue 4816. Dependency token counter 4814 may be a compact representation of a queue and track a number of dependency tokens used for any given input queue. If the dependency token counters 4814 saturate, no additional dependency tokens may be generated for new memory operations. Accordingly, a memory ordering circuit (e.g., a RAF in FIG. 49) may stall scheduling new memory operations until the dependency token counters 4814 becomes unsaturated.

As an example for a load, an address arrives into queue 4822 which the scheduler 4812 matches up with a load in 4810. A completion buffer slot for this load is assigned in the order the address arrived. Assuming this particular load in the graph has no dependencies specified, the address and completion buffer slot are sent off to the memory system by the scheduler (e.g., via memory command 4842). When the result returns to multiplexer 4840 (shown schematically), it is stored into the completion buffer slot it specifies (e.g., as it carried the target slot all along though the memory system). The completion buffer sends results back into local network (e.g., local network 4802, 4804, 4806, or 4808) in the order the addresses arrived.

Stores may be similar except both address and data have to arrive before any operation is sent off to the memory system.

3.4 Cache

Figure 49:
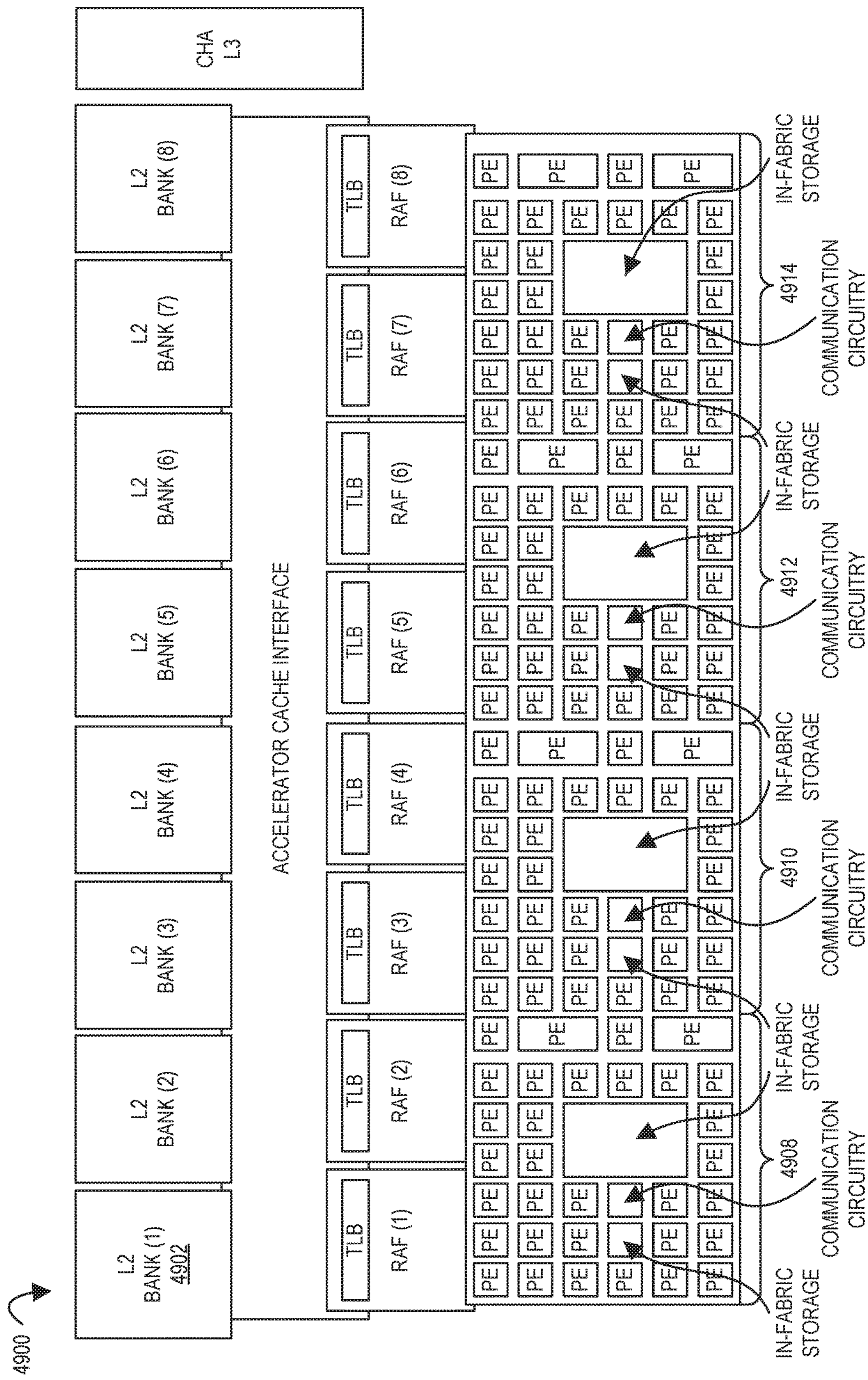
FIG. 49 illustrates a plurality of request address file (RAF) circuits coupled between a plurality of accelerator tiles and a plurality of cache banks according to embodiments of the disclosure.

Dataflow graphs may be capable of generating a profusion of (e.g., word granularity) requests in parallel. Thus, certain embodiments of the CSA provide a cache subsystem with sufficient bandwidth to service the CSA. A heavily banked cache microarchitecture, e.g., as shown in FIG. 49 may be utilized. FIG. 49 illustrates a circuit 4900 with a plurality of request address file (RAF) circuits (e.g., RAF circuit (1)) coupled between a plurality of accelerator tiles (4908, 4910, 4912, 4914) and a plurality of cache banks (e.g., cache bank 4902) according to embodiments of the disclosure. In one embodiment, the number of RAFs and cache banks may be in a ratio of either 1:1 or 1:2. Cache banks may contain full cache lines (e.g., as opposed to sharding by word), with each line having exactly one home in the cache. Cache lines may be mapped to cache banks via a pseudo-random function. The CSA may adopts the SVM model to integrate with other tiled architectures. Certain embodiments include an Accelerator Cache Interconnect (ACI) network connecting the RAFs to the cache banks. This network may carry address and data between the RAFs and the cache. The topology of the ACI may be a cascaded crossbar, e.g., as a compromise between latency and implementation complexity.

3.5 Floating Point Support

Figure 50:
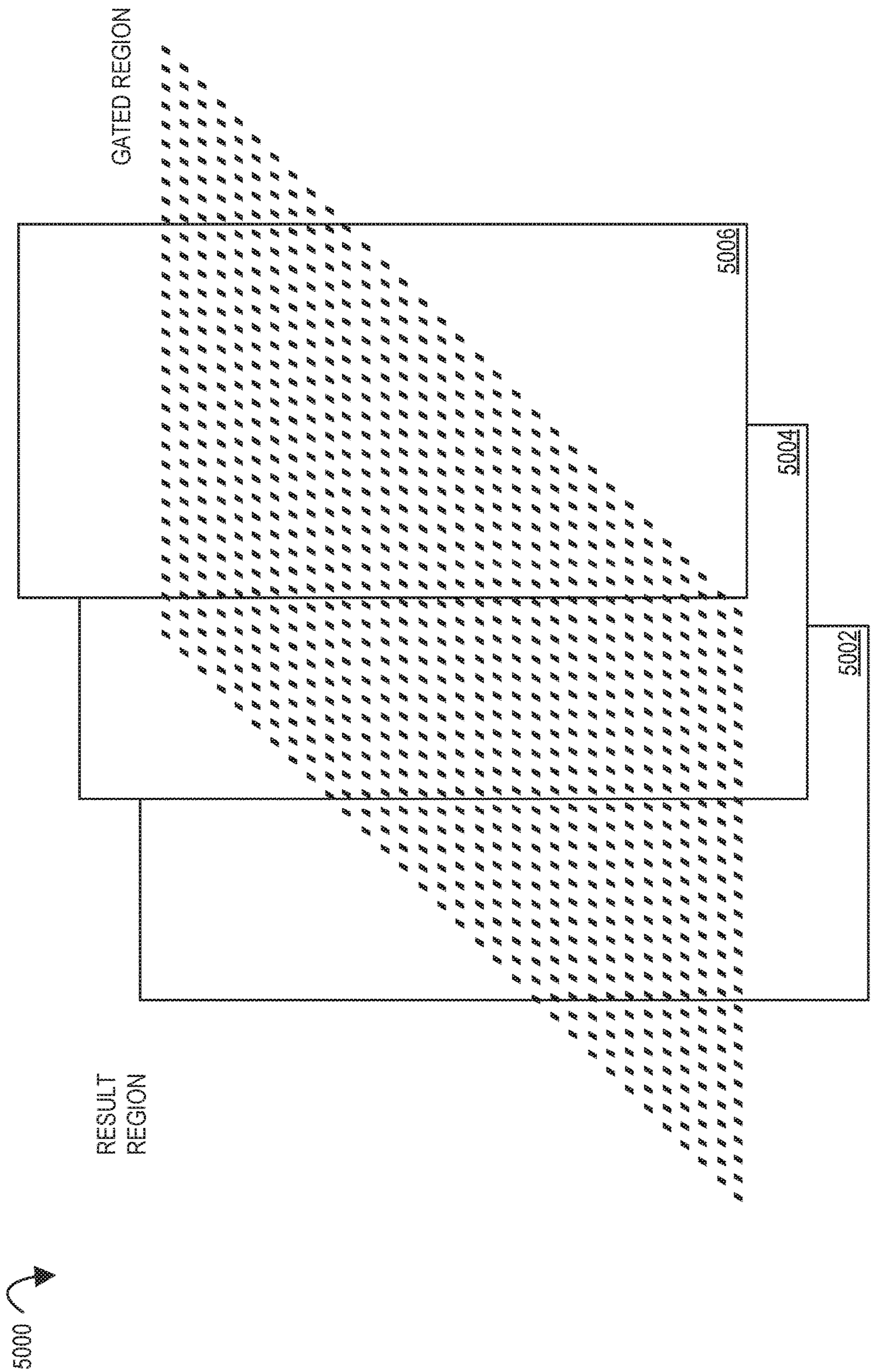
FIG. 50 illustrates a floating point multiplier partitioned into three regions (the result region, three potential carry regions, and the gated region) according to embodiments of the disclosure.

Certain HPC applications are characterized by their need for significant floating point bandwidth. To meet this need, embodiments of a CSA may be provisioned with multiple (e.g., between 128 and 256 each) of floating add and multiplication PEs, e.g., depending on tile configuration. A CSA may provide a few other extended precision modes, e.g., to simplify math library implementation. CSA floating point PEs may support both single and double precision, but lower precision PEs may support machine learning workloads. A CSA may provide an order of magnitude more floating point performance than a processor core. In one embodiment, in addition to increasing floating point bandwidth, in order to power all of the floating point units, the energy consumed in floating point operations is reduced. For example, to reduce energy, a CSA may selectively gate the low-order bits of the floating point multiplier array. In examining the behavior of floating point arithmetic, the low order bits of the multiplication array may often not influence the final, rounded product. FIG. 50 illustrates a floating point multiplier 5000 partitioned into three regions (the result region, three potential carry regions (5002, 5004, 5006), and the gated region) according to embodiments of the disclosure. In certain embodiments, the carry region is likely to influence the result region and the gated region is unlikely to influence the result region. Considering a gated region of g bits, the maximum carry may be:

$$\text{carry}_g \leq \frac{1}{2^g}\sum_{1}^{g} i2^{i-1} \leq \sum_{1}^{g}\frac{i}{2^g} - \sum_{1}^{g}\frac{1}{2^g} + 1 \leq g-1$$

Given this maximum carry, if the result of the carry region is less than 2'-g, where the carry region is c bits wide, then the gated region may be ignored since it does not influence the result region. Increasing g means that it is more likely the gated region will be needed, while increasing c means that, under random assumption, the gated region will be unused and may be disabled to avoid energy consumption. In embodiments of a CSA floating multiplication PE, a two stage pipelined approach is utilized in which first the carry region is determined and then the gated region is determined if it is found to influence the result. If more information about the context of the multiplication is known, a CSA more aggressively tune the size of the gated region. In FMA, the multiplication result may be added to an accumulator, which is often much larger than either of the multiplicands. In this case, the addend exponent may be observed in advance of multiplication and the CSDA may adjust the gated region accordingly. One embodiment of the CSA includes a scheme in which a context value, which bounds the minimum result of a computation, is provided to related multipliers, in order to select minimum energy gating configurations.

3.6 Runtime Services

Figure 51:
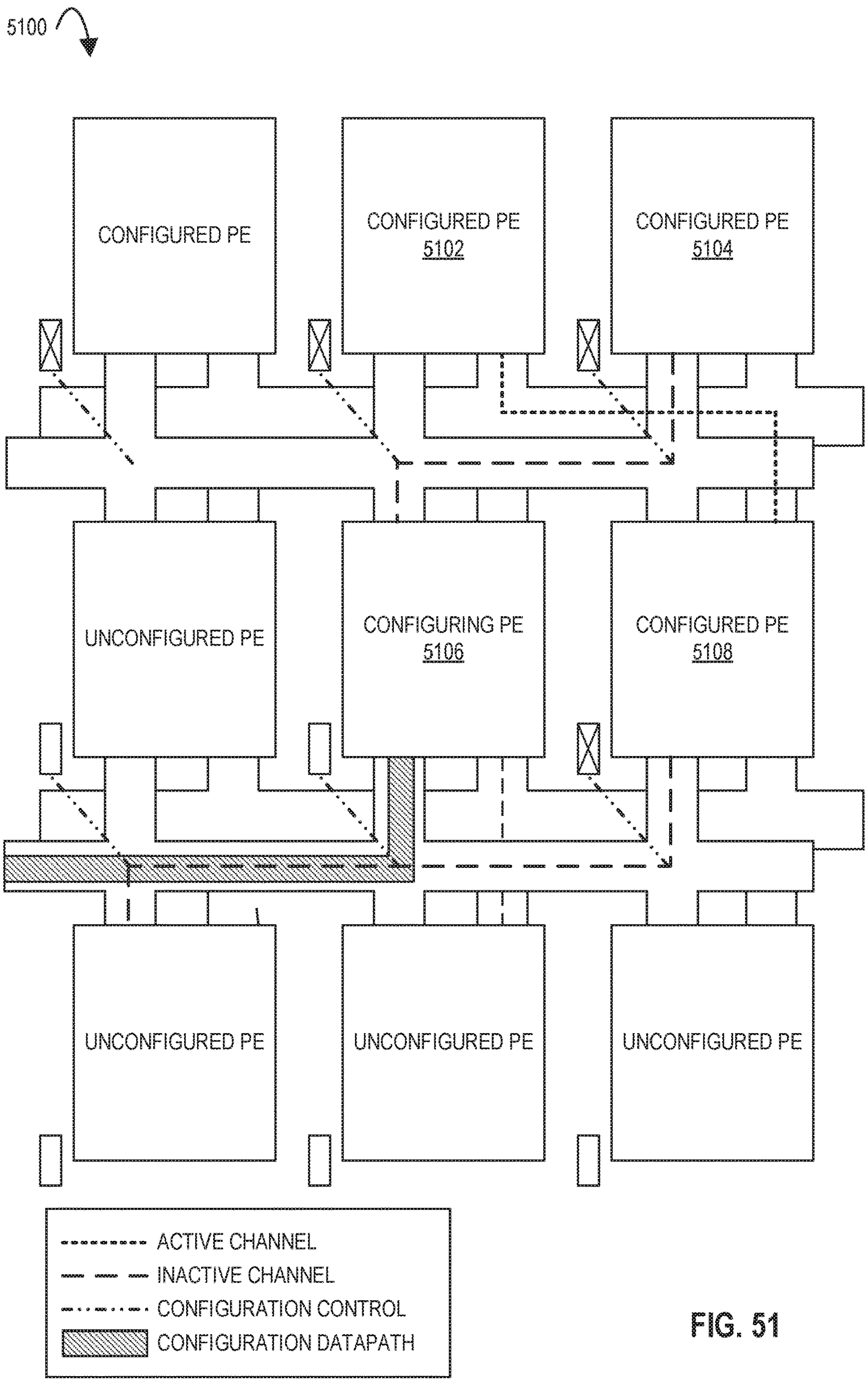
FIG. 51 illustrates an in-flight configuration of an accelerator with a plurality of processing elements according to embodiments of the disclosure.

In certain embodiment, a CSA includes a heterogeneous and distributed fabric, and consequently, runtime service implementations are to accommodate several kinds of PEs in a parallel and distributed fashion. Although runtime services in a CSA may be critical, they may be infrequent relative to user-level computation. Certain implementations, therefore, focus on overlaying services on hardware resources. To meet these goals, CSA runtime services may be cast as a hierarchy, e.g., with each layer corresponding to a CSA network. At the tile level, a single external-facing controller may accepts or sends service commands to an associated core with the CSA tile. A tile-level controller may serve to coordinate regional controllers at the RAFs, e.g., using the ACI network. In turn, regional controllers may coordinate local controllers at certain mezzanine network stops (e.g., network dataflow endpoint circuits). At the lowest level, service specific micro-protocols may execute over the local network, e.g., during a special mode controlled through the mezzanine controllers. The micro-protocols may permit each PE (e.g., PE class by type) to interact with the runtime service according to its own needs. Parallelism is thus implicit in this hierarchical organization, and operations at the lowest levels may occur simultaneously. This parallelism may enables the configuration of a CSA tile in between hundreds of nanoseconds to a few microseconds, e.g., depending on the configuration size and its location in the memory hierarchy. Embodiments of the CSA thus leverage properties of dataflow graphs to improve implementation of each runtime service. One key observation is that runtime services may need only to preserve a legal logical view of the dataflow graph, e.g., a state that can be produced through some ordering of dataflow operator executions. Services may generally not need to guarantee a temporal view of the dataflow graph, e.g., the state of a dataflow graph in a CSA at a specific point in time. This may permit the CSA to conduct most runtime services in a distributed, pipelined, and parallel fashion, e.g., provided that the service is orchestrated to preserve the logical view of the dataflow graph. The local configuration micro-protocol may be a packet-based protocol overlaid on the local network. Configuration targets may be organized into a configuration chain, e.g., which is fixed in the microarchitecture. Fabric (e.g., PE) targets may be configured one at a time, e.g., using a single extra register per target to achieve distributed coordination. To start configuration, a controller may drive an out-of-band signal which places all fabric targets in its neighborhood into an unconfigured, paused state and swings multiplexors in the local network to a pre-defined conformation. As the fabric (e.g., PE) targets are configured, that is they completely receive their configuration packet, they may set their configuration microprotocol registers, notifying the immediately succeeding target (e.g., PE) that it may proceed to configure using the subsequent packet. There is no limitation to the size of a configuration packet, and packets may have dynamically variable length. For example, PEs configuring constant operands may have a configuration packet that is lengthened to include the constant field (e.g., X and Y in FIGS. 41B-41C). FIG. 51 illustrates an in-flight configuration of an accelerator 5100 with a plurality of processing elements (e.g., PEs 5102, 5104, 5106, 5108) according to embodiments of the disclosure. Once configured, PEs may execute subject to dataflow constraints. However, channels involving unconfigured PEs may be disabled by the microarchitecture, e.g., preventing any undefined operations from occurring. These properties allow embodiments of a CSA to initialize and execute in a distributed fashion with no centralized control whatsoever. From an unconfigured state, configuration may occur completely in parallel, e.g., in perhaps as few as 200 nanoseconds. However, due to the distributed initialization of embodiments of a CSA, PEs may become active, for example sending requests to memory, well before the entire fabric is configured. Extraction may proceed in much the same way as configuration. The local network may be conformed to extract data from one target at a time, and state bits used to achieve distributed coordination. A CSA may orchestrate extraction to be non-destructive, that is, at the completion of extraction each extractable target has returned to its starting state. In this implementation, all state in the target may be circulated to an egress register tied to the local network in a scan-like fashion. Although in-place extraction may be achieved by introducing new paths at the register-transfer level (RTL), or using existing lines to provide the same functionalities with lower overhead. Like configuration, hierarchical extraction is achieved in parallel.

Figure 52:
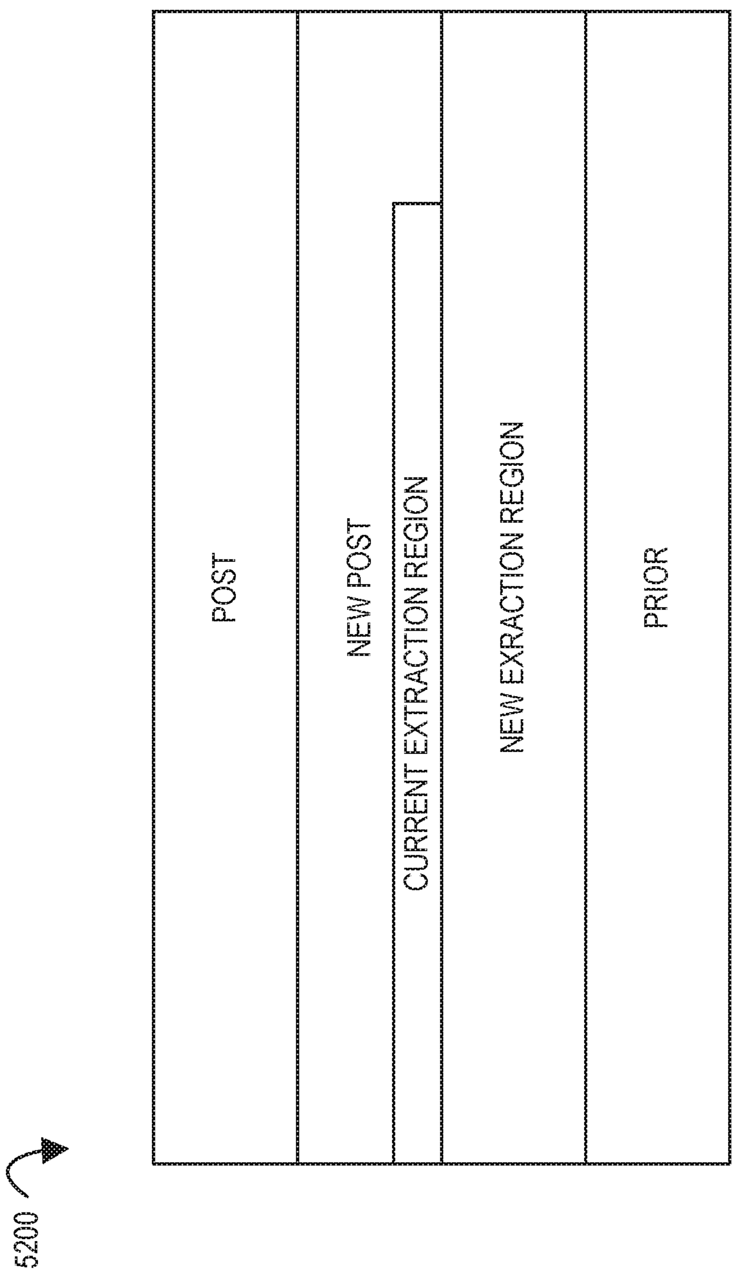
FIG. 52 illustrates a snapshot of an in-flight, pipelined extraction according to embodiments of the disclosure.

FIG. 52 illustrates a snapshot 5200 of an in-flight, pipelined extraction according to embodiments of the disclosure. In some use cases of extraction, such as checkpointing, latency may not be a concern so long as fabric throughput is maintained. In these cases, extraction may be orchestrated in a pipelined fashion. This arrangement, shown in FIG. 52, permits most of the fabric to continue executing, while a narrow region is disabled for extraction. Configuration and extraction may be coordinated and composed to achieve a pipelined context switch. Exceptions may differ qualitatively from configuration and extraction in that, rather than occurring at a specified time, they arise anywhere in the fabric at any point during runtime. Thus, in one embodiment, the exception micro-protocol may not be overlaid on the local network, which is occupied by the user program at runtime, and utilizes its own network. However, by nature, exceptions are rare and insensitive to latency and bandwidth. Thus certain embodiments of CSA utilize a packet switched network to carry exceptions to the local mezzanine stop, e.g., where they are forwarded up the service hierarchy (e.g., as in FIG. 67). Packets in the local exception network may be extremely small. In many cases, a PE identification (ID) of only two to eight bits suffices as a complete packet, e.g., since the CSA may create a unique exception identifier as the packet traverses the exception service hierarchy. Such a scheme may be desirable because it also reduces the area overhead of producing exceptions at each PE.

4. Compilation

The ability to compile programs written in high-level languages onto a CSA may be essential for industry adoption. This section gives a high-level overview of compilation strategies for embodiments of a CSA. First is a proposal for a CSA software framework that illustrates the desired properties of an ideal production-quality toolchain. Next, a prototype compiler framework is discussed. A "control-to-dataflow conversion" is then discussed, e.g., to converts ordinary sequential control-flow code into CSA dataflow assembly code.

4.1 Example Production Framework

Figure 53:
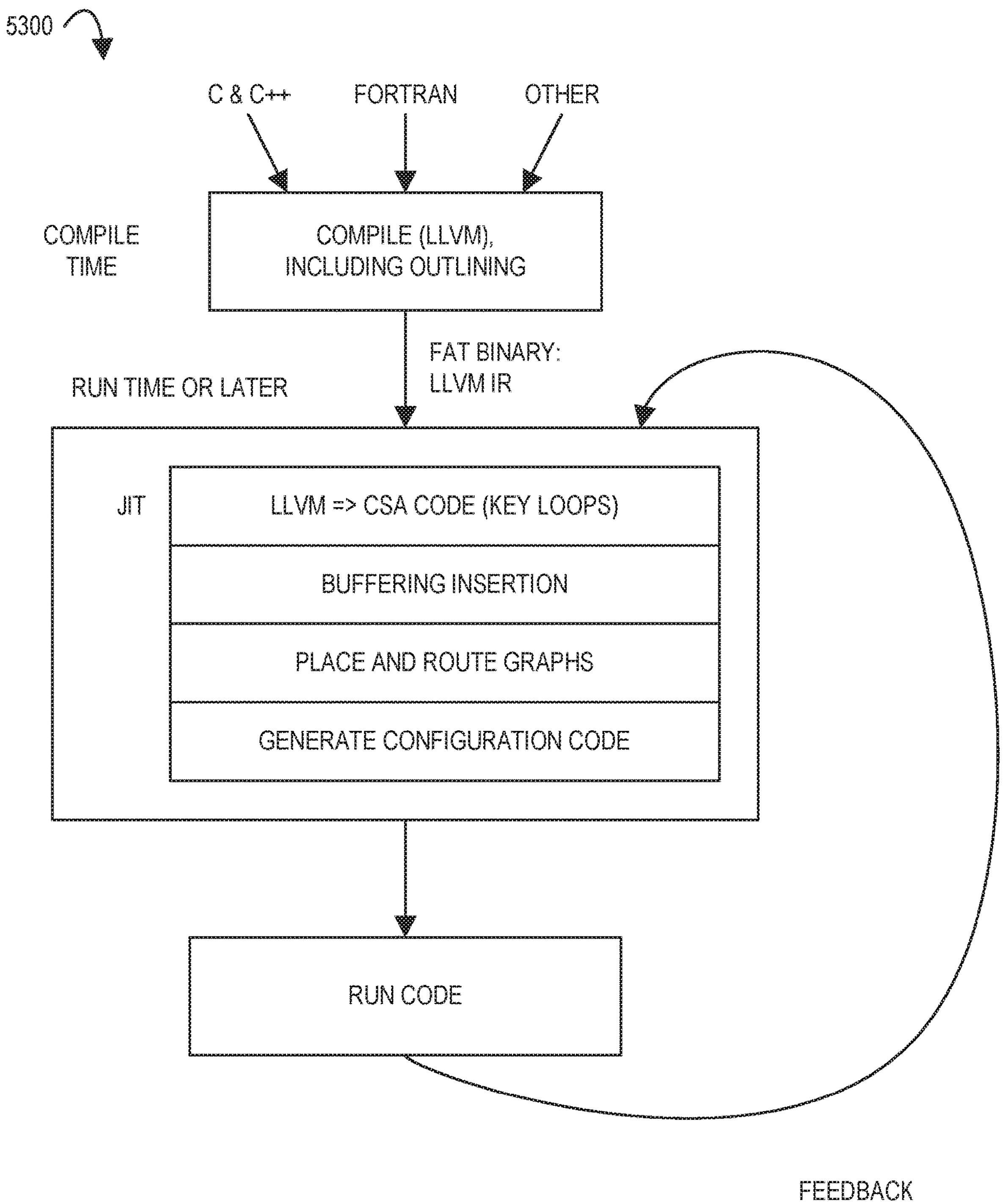
FIG. 53 illustrates a compilation toolchain for an accelerator according to embodiments of the disclosure.

FIG. 53 illustrates a compilation toolchain 5300 for an accelerator according to embodiments of the disclosure. This toolchain compiles high-level languages (such as C, C++, and Fortran) into a combination of host code (LLVM) intermediate representation (IR) for the specific regions to be accelerated. The CSA-specific portion of this compilation toolchain takes LLVM IR as its input, optimizes and compiles this IR into a CSA assembly, e.g., adding appropriate buffering on latency-insensitive channels for performance. It then places and routes the CSA assembly on the hardware fabric, and configures the PEs and network for execution. In one embodiment, the toolchain supports the CSA-specific compilation as a just-in-time (JIT), incorporating potential runtime feedback from actual executions. One of the key design characteristics of the framework is compilation of (LLVM) IR for the CSA, rather than using a higher-level language as input. While a program written in a high-level programming language designed specifically for the CSA might achieve maximal performance and/or energy efficiency, the adoption of new high-level languages or programming frameworks may be slow and limited in practice because of the difficulty of converting existing code bases. Using (LLVM) IR as input enables a wide range of existing programs to potentially execute on a CSA, e.g., without the need to create a new language or significantly modify the front-end of new languages that want to run on the CSA.

4.2 Prototype Compiler

Figure 54:
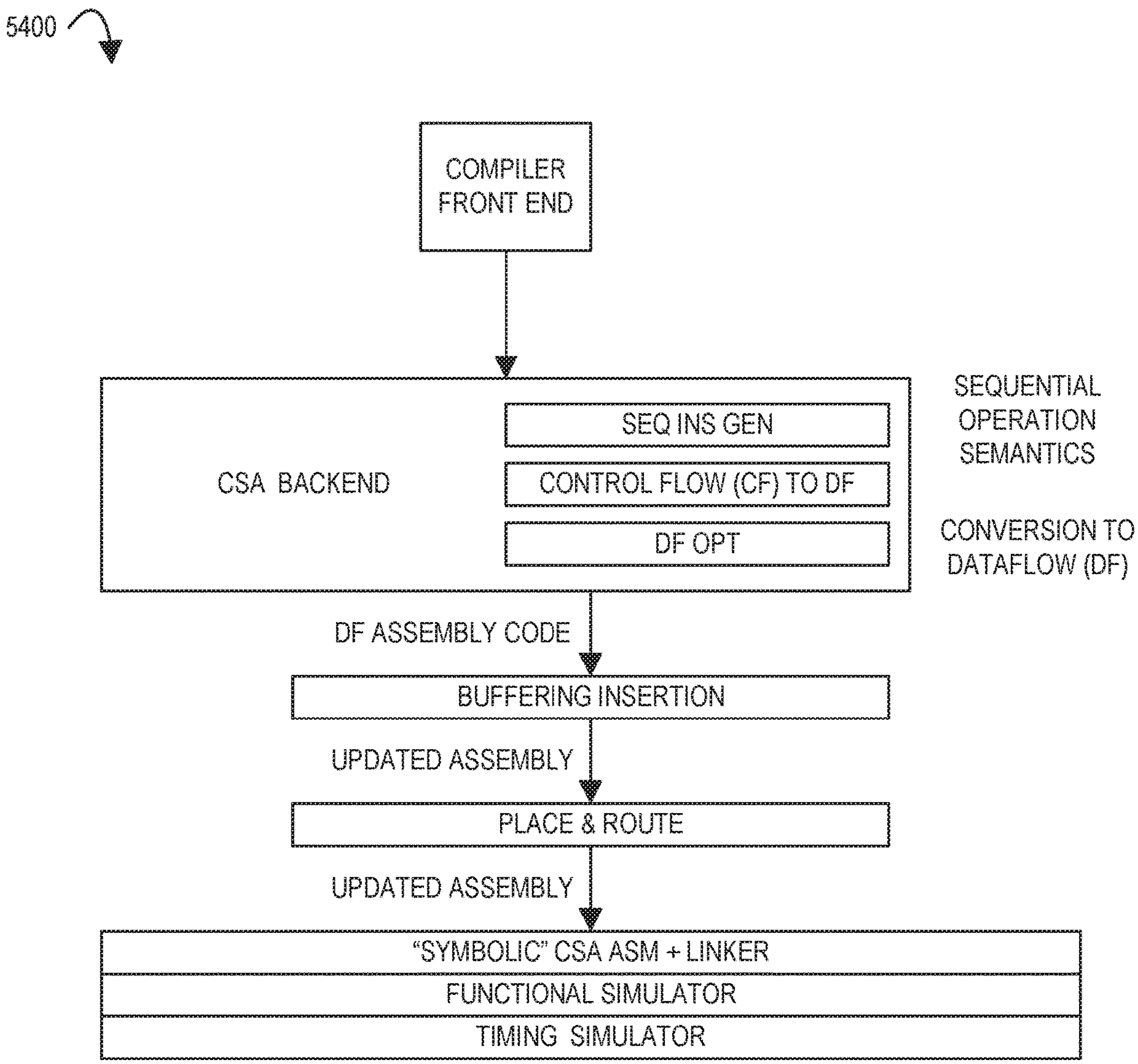
FIG. 54 illustrates a compiler for an accelerator according to embodiments of the disclosure.

FIG. 54 illustrates a compiler 5400 for an accelerator according to embodiments of the disclosure. Compiler 5400 initially focuses on ahead-of-time compilation of C and C++ through the (e.g., Clang) front-end. To compile (LLVM) IR, the compiler implements a CSA back-end target within LLVM with three main stages. First, the CSA back-end lowers LLVM IR into a target-specific machine instructions for the sequential unit, which implements most CSA operations combined with a traditional RISC-like control-flow architecture (e.g., with branches and a program counter). The sequential unit in the toolchain may serve as a useful aid for both compiler and application developers, since it enables an incremental transformation of a program from control flow (CF) to dataflow (DF), e.g., converting one section of code at a time from control-flow to dataflow and validating program correctness. The sequential unit may also provide a model for handling code that does not fit in the spatial array. Next, the compiler converts these control-flow instructions into dataflow operators (e.g., code) for the CSA. This phase is described later in Section 4.3. Then, the CSA back-end may run its own optimization passes on the dataflow instructions. Finally, the compiler may dump the instructions in a CSA assembly format. This assembly format is taken as input to late-stage tools which place and route the dataflow instructions on the actual CSA hardware.

4.3 Control to Dataflow Conversion

A key portion of the compiler may be implemented in the control-to-dataflow conversion pass, or dataflow conversion pass for short. This pass takes in a function represented in control flow form, e.g., a control-flow graph (CFG) with sequential machine instructions operating on virtual registers, and converts it into a dataflow function that is conceptually a graph of dataflow operations (instructions) connected by latency-insensitive channels (LICs). This section gives a high-level description of this pass, describing how it conceptually deals with memory operations, branches, and loops in certain embodiments.

Straight-Line Code

Figure 55C:
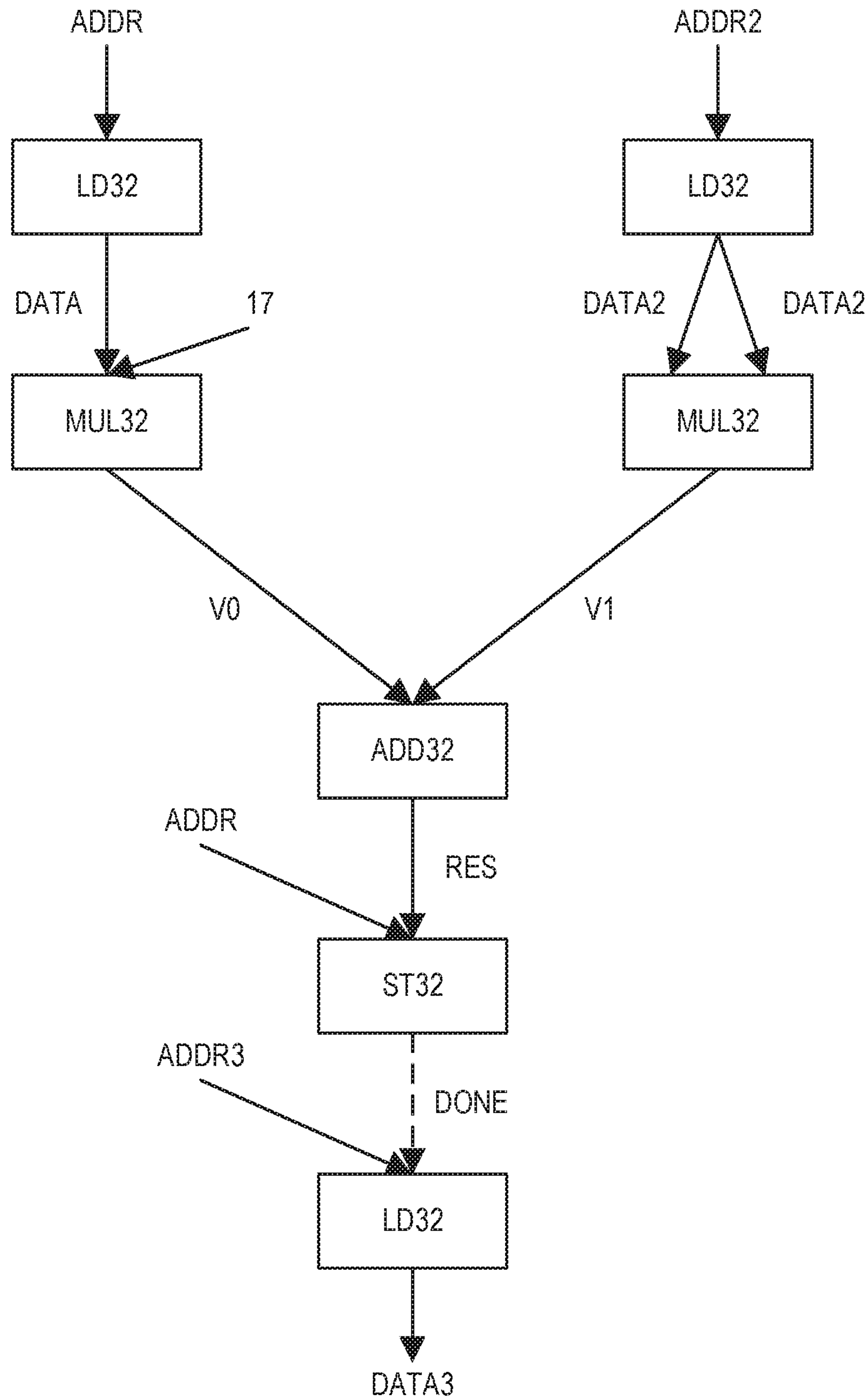
FIG. 55C illustrates a dataflow graph for the dataflow assembly code of FIG. 35B for an accelerator according to embodiments of the disclosure.

FIG. 55A illustrates sequential assembly code 5502 according to embodiments of the disclosure. FIG. 55B illustrates dataflow assembly code 5504 for the sequential assembly code 5502 of FIG. 55A according to embodiments of the disclosure. FIG. 55C illustrates a dataflow graph 5506 for the dataflow assembly code 5504 of FIG. 55B for an accelerator according to embodiments of the disclosure.

First, consider the simple case of converting straight-line sequential code to dataflow. The dataflow conversion pass may convert a basic block of sequential code, such as the code shown in FIG. 55A into CSA assembly code, shown in FIG. 55B. Conceptually, the CSA assembly in FIG. 55B represents the dataflow graph shown in FIG. 55C. In this example, each sequential instruction is translated into a matching CSA assembly. The .lic statements (e.g., for data) declare latency-insensitive channels which correspond to the virtual registers in the sequential code (e.g., Rdata). In practice, the input to the dataflow conversion pass may be in numbered virtual registers. For clarity, however, this section uses descriptive register names. Note that load and store operations are supported in the CSA architecture in this embodiment, allowing for many more programs to run than an architecture supporting only pure dataflow. Since the sequential code input to the compiler is in SSA (singlestatic assignment) form, for a simple basic block, the control-to-dataflow pass may convert each virtual register definition into the production of a single value on a latency-insensitive channel. The SSA form allows multiple uses of a single definition of a virtual register, such as in Rdata2). To support this model, the CSA assembly code supports multiple uses of the same LIC (e.g., data2), with the simulator implicitly creating the necessary copies of the LICs. One key difference between sequential code and dataflow code is in the treatment of memory operations. The code in FIG. 55A is conceptually serial, which means that the load32 (ld32) of addr3 should appear to happen after the st32 of addr, in case that addr and addr3 addresses overlap.

Branches

To convert programs with multiple basic blocks and conditionals to dataflow, the compiler generates special dataflow operators to replace the branches. More specifically, the compiler uses switch operators to steer outgoing data at the end of a basic block in the original CFG, and pick operators to select values from the appropriate incoming channel at the beginning of a basic block. As a concrete example, consider the code and corresponding dataflow graph in FIGS. 56A-56C, which conditionally computes a value of y based on several inputs: a i, x, and n. After computing the branch condition test, the dataflow code uses a switch operator (e.g., see FIGS. 41B-41C) steers the value in channel x to channel xF if test is 0, or channel xT if test is 1. Similarly, a pick operator (e.g., see FIGS. 41B-41C) is used to send channel yF toy if test is 0, or send channel yT to y if test is 1. In this example, it turns out that even though the value of a is only used in the true branch of the conditional, the CSA is to include a switch operator which steers it to channel aT when test is 1, and consumes (eats) the value when test is 0. This latter case is expressed by setting the false output of the switch to % ign. It may not be correct to simply connect channel a directly to the true path, because in the cases where execution actually takes the false path, this value of "a" will be left over in the graph, leading to incorrect value of a for the next execution of the function. This example highlights the property of control equivalence, a key property in embodiments of correct dataflow conversion.

Control Equivalence:

Consider a single-entry-single-exit control flow graph G with two basic blocks A and B. A and B are control-equivalent if all complete control flow paths through G visit A and B the same number of times.

Figure 56C:
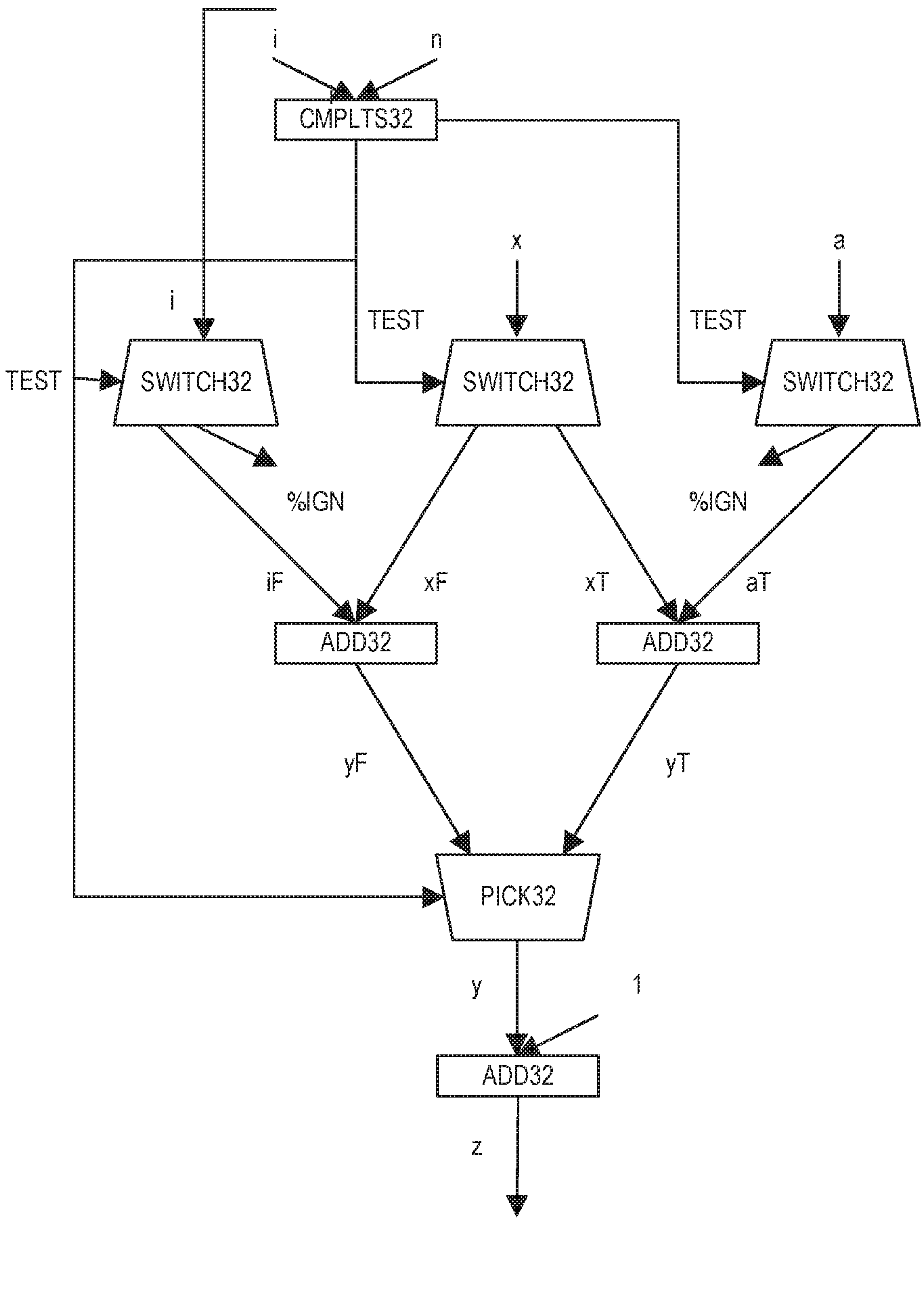
FIG. 56C illustrates a dataflow graph for the dataflow assembly code of FIG. 36B for an accelerator according to embodiments of the disclosure.

LIC Replacement:

In a control flow graph G, suppose an operation in basic block A defines a virtual register x, and an operation in basic block B that uses x. Then a correct control-to-dataflow transformation can replace x with a latency-insensitive channel only if A and B are control equivalent. The control-equivalence relation partitions the basic blocks of a CFG into strong control-dependence regions. FIG. 56A illustrates C source code 5602 according to embodiments of the disclosure. FIG. 56B illustrates dataflow assembly code 5604 for the C source code 5602 of FIG. 56A according to embodiments of the disclosure. FIG. 56C illustrates a dataflow graph 5606 for the dataflow assembly code 5604 of FIG. 56B for an accelerator according to embodiments of the disclosure. In the example in FIGS. 56A-56C, the basic block before and after the conditionals are control-equivalent to each other, but the basic blocks in the true and false paths are each in their own control dependence region. One correct algorithm for converting a CFG to dataflow is to have the compiler insert (1) switches to compensate for the mismatch in execution frequency for any values that flow between basic blocks which are not control equivalent, and (2) picks at the beginning of basic blocks to choose correctly from any incoming values to a basic block. Generating the appropriate control signals for these picks and switches may be the key part of dataflow conversion.

Loops

Figure 57C:
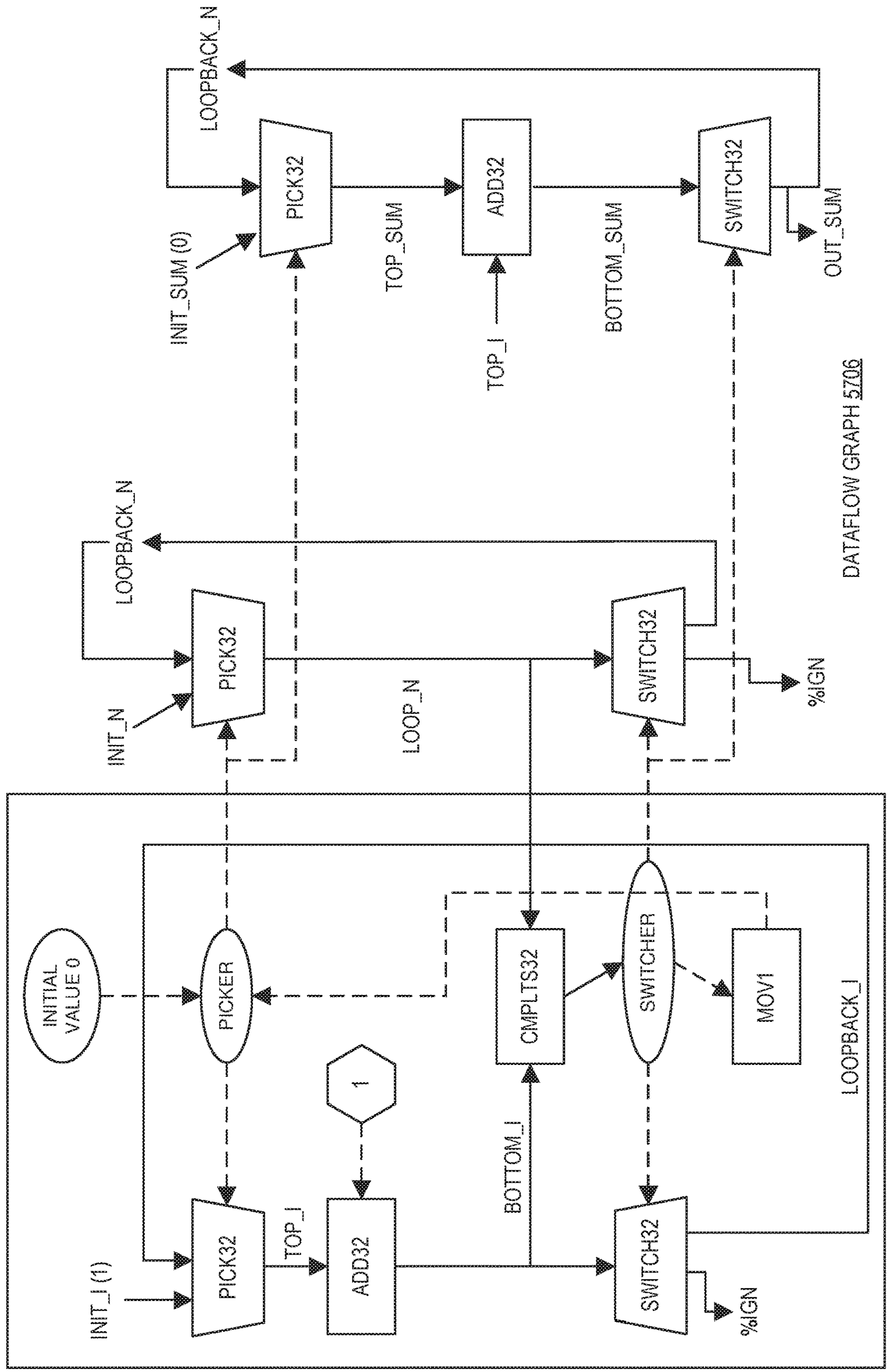
FIG. 57C illustrates a dataflow graph for the dataflow assembly code of FIG. 37B for an accelerator according to embodiments of the disclosure.

Another important class of CFGs in dataflow conversion are CFGs for single-entry-single-exit loops, a common form of loop generated in (LLVM) IR. These loops may be almost acyclic, except for a single back edge from the end of the loop back to a loop header block. The dataflow conversion pass may use same high-level strategy to convert loops as for branches, e.g., it inserts switches at the end of the loop to direct values out of the loop (either out the loop exit or around the back-edge to the beginning of the loop), and inserts picks at the beginning of the loop to choose between initial values entering the loop and values coming through the back edge. FIG. 57A illustrates C source code 5702 according to embodiments of the disclosure. FIG. 57B illustrates dataflow assembly code 5704 for the C source code 5702 of FIG. 57A according to embodiments of the disclosure. FIG. 57C illustrates a dataflow graph 5706 for the dataflow assembly code 5704 of FIG. 57B for an accelerator according to embodiments of the disclosure. FIGS. 57A-57C shows C and CSA assembly code for an example do-while loop that adds up values of a loop induction variable i, as well as the corresponding dataflow graph. For each variable that conceptually cycles around the loop (i and sum), this graph has a corresponding pick/switch pair that controls the flow of these values. Note that this example also uses a pick/switch pair to cycle the value of n around the loop, even though n is loop-invariant. This repetition of n enables conversion of n's virtual register into a LIC, since it matches the execution frequencies between a conceptual definition of n outside the loop and the one or more uses of n inside the loop. In general, for a correct dataflow conversion, registers that are live-in into a loop are to be repeated once for each iteration inside the loop body when the register is converted into a LIC. Similarly, registers that are updated inside a loop and are live-out from the loop are to be consumed, e.g., with a single final value sent out of the loop. Loops introduce a wrinkle into the dataflow conversion process, namely that the control for a pick at the top of the loop and the switch for the bottom of the loop are offset. For example, if the loop in FIG. 56A executes three iterations and exits, the control to picker should be 0, 1, 1, while the control to switcher should be 1, 1, 0. This control is implemented by starting the picker channel with an initial extra 0 when the function begins on cycle 0 (which is specified in the assembly by the directives .value 0 and .avail 0), and then copying the output switcher into picker. Note that the last 0 in switcher restores a final 0 into picker, ensuring that the final state of the dataflow graph matches its initial state.

Figure 58A:
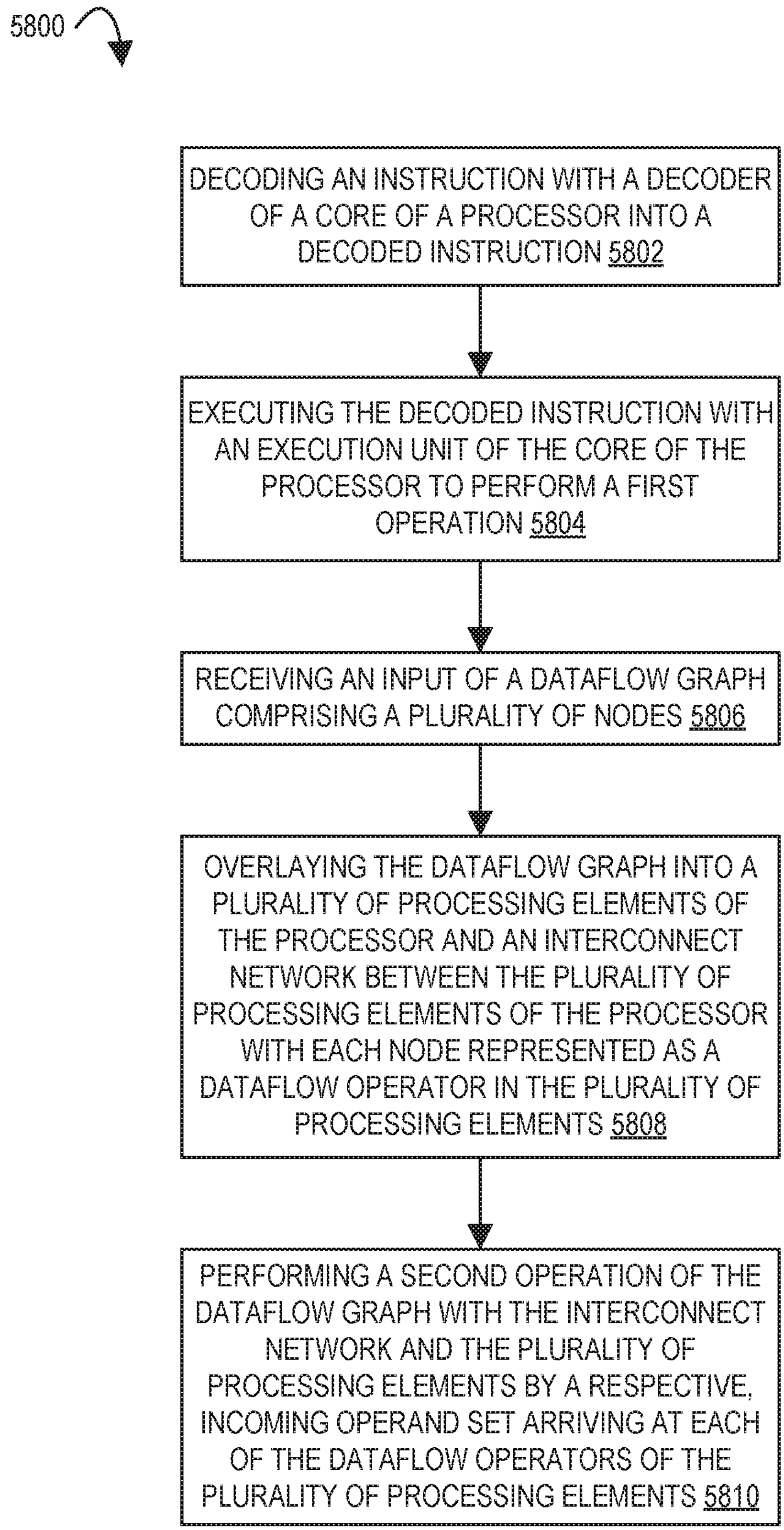
FIG. 58A illustrates a flow diagram according to embodiments of the disclosure.

FIG. 58A illustrates a flow diagram 5800 according to embodiments of the disclosure. Depicted flow 5800 includes decoding an instruction with a decoder of a core of a processor into a decoded instruction 5802; executing the decoded instruction with an execution unit of the core of the processor to perform a first operation 5804; receiving an input of a dataflow graph comprising a plurality of nodes 5806; overlaying the dataflow graph into a plurality of processing elements of the processor and an interconnect network between the plurality of processing elements of the processor with each node represented as a dataflow operator in the plurality of processing elements 5808; and performing a second operation of the dataflow graph with the interconnect network and the plurality of processing elements by a respective, incoming operand set arriving at each of the dataflow operators of the plurality of processing elements 5810.

Figure 58B:
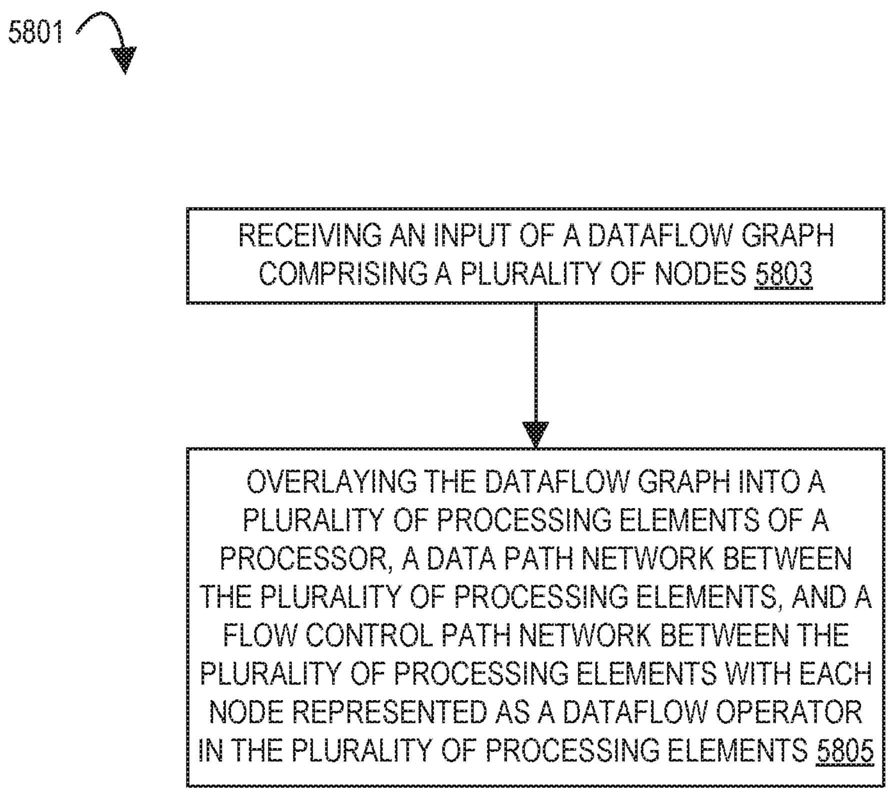
FIG. 58B illustrates a flow diagram according to embodiments of the disclosure.

FIG. 58B illustrates a flow diagram 5801 according to embodiments of the disclosure. Depicted flow 5801 includes receiving an input of a dataflow graph comprising a plurality of nodes 5803; and overlaying the dataflow graph into a plurality of processing elements of a processor, a data path network between the plurality of processing elements, and a flow control path network between the plurality of processing elements with each node represented as a dataflow operator in the plurality of processing elements 5805.

In one embodiment, the core writes a command into a memory queue and a CSA (e.g., the plurality of processing elements) monitors the memory queue and begins executing when the command is read. In one embodiment, the core executes a first part of a program and a CSA (e.g., the plurality of processing elements) executes a second part of the program. In one embodiment, the core does other work while the CSA is executing its operations.

5. CSA Advantages

In certain embodiments, the CSA architecture and microarchitecture provides profound energy, performance, and usability advantages over roadmap processor architectures and FPGAs. In this section, these architectures are compared to embodiments of the CSA and highlights the superiority of CSA in accelerating parallel dataflow graphs relative to each.

5.1 Processors

Figure 59:
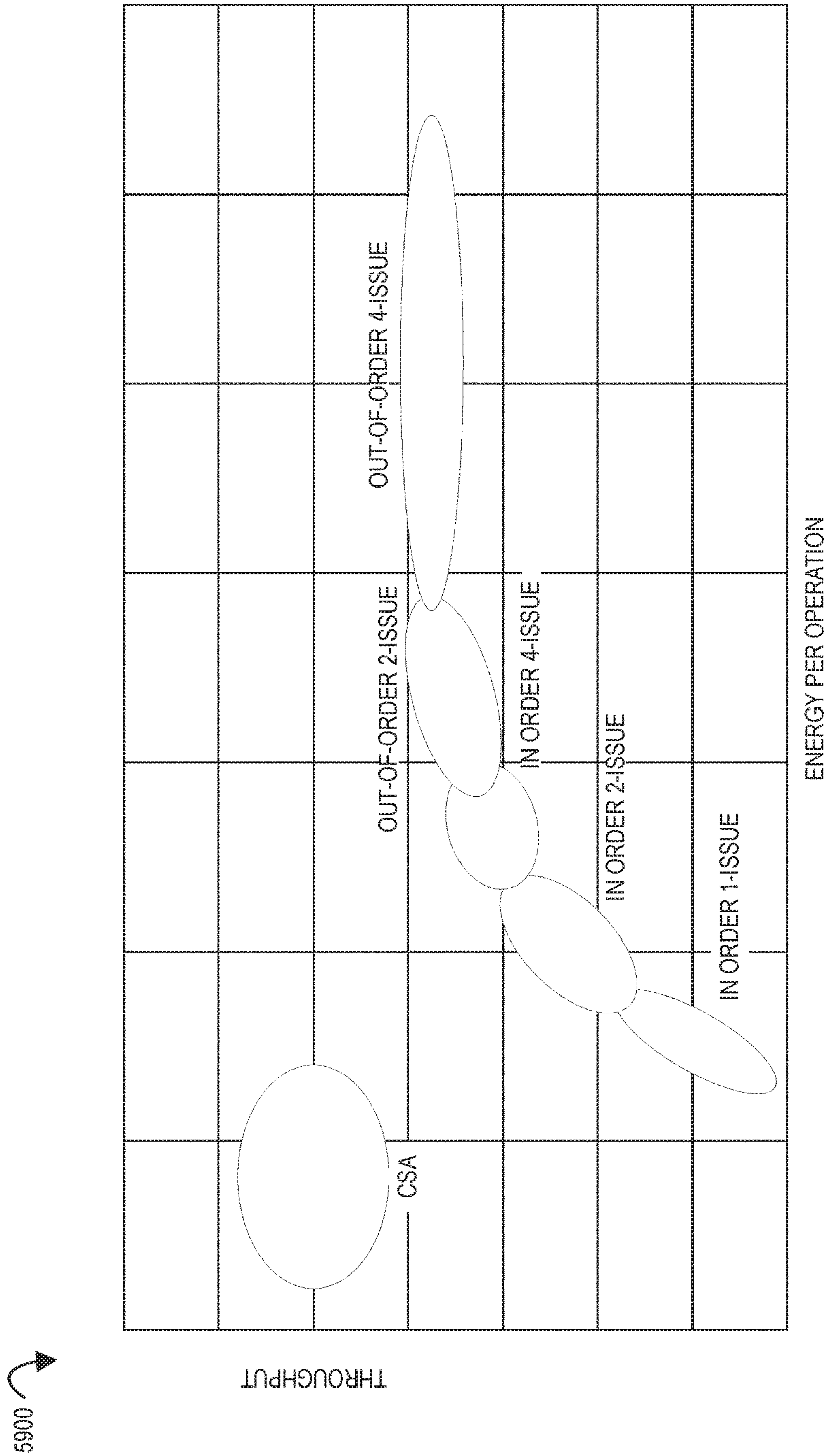
FIG. 59 illustrates a throughput versus energy per operation graph according to embodiments of the disclosure.

FIG. 59 illustrates a throughput versus energy per operation graph 3900 according to embodiments of the disclosure. As shown in FIG. 59, small cores are generally more energy efficient than large cores, and, in some workloads, this advantage may be translated to absolute performance through higher core counts. The CSA microarchitecture follows these observations to their conclusion and removes (e.g., most) energy-hungry control structures associated with von Neumann architectures, including most of the instruction-side microarchitecture. By removing these overheads and implementing simple, single operation PEs, embodiments of a CSA obtains a dense, efficient spatial array. Unlike small cores, which are usually quite serial, a CSA may gang its PEs together, e.g., via the circuit switched local network, to form explicitly parallel aggregate dataflow graphs. The result is performance in not only parallel applications, but also serial applications as well. Unlike cores, which may pay dearly for performance in terms area and energy, a CSA is already parallel in its native execution model. In certain embodiments, a CSA neither requires speculation to increase performance nor does it need to repeatedly re-extract parallelism from a sequential program representation, thereby avoiding two of the main energy taxes in von Neumann architectures. Most structures in embodiments of a CSA are distributed, small, and energy efficient, as opposed to the centralized, bulky, energy hungry structures found in cores. Consider the case of registers in the CSA: each PE may have a few (e.g., 10 or less) storage registers. Taken individually, these registers may be more efficient that traditional register files. In aggregate, these registers may provide the effect of a large, in-fabric register file. As a result, embodiments of a CSA avoids most of stack spills and fills incurred by classical architectures, while using much less energy per state access. Of course, applications may still access memory. In embodiments of a CSA, memory access request and response are architecturally decoupled, enabling workloads to sustain many more outstanding memory accesses per unit of area and energy. This property yields substantially higher performance for cache-bound workloads and reduces the area and energy needed to saturate main memory in memory-bound workloads. Embodiments of a CSA expose new forms of energy efficiency which are unique to non-von Neumann architectures. One consequence of executing a single operation (e.g., instruction) at a (e.g., most) PEs is reduced operand entropy. In the case of an increment operation, each execution may result in a handful of circuit-level toggles and little energy consumption, a case examined in detail in Section 6.2. In contrast, von Neumann architectures are multiplexed, resulting in large numbers of bit transitions. The asynchronous style of embodiments of a CSA also enables microarchitectural optimizations, such as the floating point optimizations described in Section 3.5 that are difficult to realize in tightly scheduled core pipelines. Because PEs may be relatively simple and their behavior in a particular dataflow graph be statically known, clock gating and power gating techniques may be applied more effectively than in coarser architectures. The graph-execution style, small size, and malleability of embodiments of CSA PEs and the network together enable the expression many kinds of parallelism: instruction, data, pipeline, vector, memory, thread, and task parallelism may all be implemented. For example, in embodiments of a CSA, one application may use arithmetic units to provide a high degree of address bandwidth, while another application may use those same units for computation. In many cases, multiple kinds of parallelism may be combined to achieve even more performance. Many key HPC operations may be both replicated and pipelined, resulting in orders-of-magnitude performance gains. In contrast, von Neumann-style cores typically optimize for one style of parallelism, carefully chosen by the architects, resulting in a failure to capture all important application kernels. Just as embodiments of a CSA expose and facilitates many forms of parallelism, it does not mandate a particular form of parallelism, or, worse, a particular subroutine be present in an application in order to benefit from the CSA. Many applications, including single-stream applications, may obtain both performance and energy benefits from embodiments of a CSA, e.g., even when compiled without modification. This reverses the long trend of requiring significant programmer effort to obtain a substantial performance gain in singlestream applications. Indeed, in some applications, embodiments of a CSA obtain more performance from functionally equivalent, but less "modern" codes than from their convoluted, contemporary cousins which have been tortured to target vector instructions.

5.2 Comparison of CSA Embodiments and FGPAs

The choice of dataflow operators as the fundamental architecture of embodiments of a CSA differentiates those CSAs from a FGPA, and particularly the CSA is as superior accelerator for HPC dataflow graphs arising from traditional programming languages. Dataflow operators are fundamentally asynchronous. This enables embodiments of a CSA not only to have great freedom of implementation in the microarchitecture, but it also enables them to simply and succinctly accommodate abstract architectural concepts. For example, embodiments of a CSA naturally accommodate many memory microarchitectures, which are essentially asynchronous, with a simple load-store interface. One need only examine an FPGA DRAM controller to appreciate the difference in complexity. Embodiments of a CSA also leverage asynchrony to provide faster and more-fully-featured runtime services like configuration and extraction, which are believed to be four to six orders of magnitude faster than an FPGA. By narrowing the architectural interface, embodiments of a CSA provide control over most timing paths at the microarchitectural level. This allows embodiments of a CSA to operate at a much higher frequency than the more general control mechanism offered in a FPGA. Similarly, clock and reset, which may be architecturally fundamental to FPGAs, are microarchitectural in the CSA, e.g., obviating the need to support them as programmable entities. Dataflow operators may be, for the most part, coarse-grained. By only dealing in coarse operators, embodiments of a CSA improve both the density of the fabric and its energy consumption: CSA executes operations directly rather than emulating them with look-up tables. A second consequence of coarseness is a simplification of the place and route problem. CSA dataflow graphs are many orders of magnitude smaller than FPGA net-lists and place and route time are commensurately reduced in embodiments of a CSA. The significant differences between embodiments of a CSA and a FPGA make the CSA superior as an accelerator, e.g., for dataflow graphs arising from traditional programming languages.

6. Evaluation

The CSA is a novel computer architecture with the potential to provide enormous performance and energy advantages relative to roadmap processors. Consider the case of computing a single strided address for walking across an array. This case may be important in HPC applications, e.g., which spend significant integer effort in computing address offsets. In address computation, and especially strided address computation, one argument is constant and the other varies only slightly per computation. Thus, only a handful of bits per cycle toggle in the majority of cases. Indeed, it may be shown, using a derivation similar to the bound on floating point carry bits described in Section 3.5, that less than two bits of input toggle per computation in average for a stride calculation, reducing energy by 50% over a random toggle distribution. Were a time-multiplexed approach used, much of this energy savings may be lost. In one embodiment, the CSA achieves approximately 3× energy efficiency over a core while delivering an 8× performance gain. The parallelism gains achieved by embodiments of a CSA may result in reduced program run times, yielding a proportionate, substantial reduction in leakage energy. At the PE level, embodiments of a CSA are extremely energy efficient. A second important question for the CSA is whether the CSA consumes a reasonable amount of energy at the tile level. Since embodiments of a CSA are capable of exercising every floating point PE in the fabric at every cycle, it serves as a reasonable upper bound for energy and power consumption, e.g., such that most of the energy goes into floating point multiply and add.

7. Further CSA Details

This section discusses further details for configuration and exception handling.

7.1 Microarchitecture for Configuring a CSA

This section discloses examples of how to configure a CSA (e.g., fabric), how to achieve this configuration quickly, and how to minimize the resource overhead of configuration. Configuring the fabric quickly may be of preeminent importance in accelerating small portions of a larger algorithm, and consequently in broadening the applicability of a CSA. The section further discloses features that allow embodiments of a CSA to be programmed with configurations of different length.

Embodiments of a CSA (e.g., fabric) may differ from traditional cores in that they make use of a configuration step in which (e.g., large) parts of the fabric are loaded with program configuration in advance of program execution. An advantage of static configuration may be that very little energy is spent at runtime on the configuration, e.g., as opposed to sequential cores which spend energy fetching configuration information (an instruction) nearly every cycle. The previous disadvantage of configuration is that it was a coarse-grained step with a potentially large latency, which places an under-bound on the size of program that can be accelerated in the fabric due to the cost of context switching. This disclosure describes a scalable microarchitecture for rapidly configuring a spatial array in a distributed fashion, e.g., that avoids the previous disadvantages.

As discussed above, a CSA may include light-weight processing elements connected by an inter-PE network. Programs, viewed as control-dataflow graphs, are then mapped onto the architecture by configuring the configurable fabric elements (CFEs), for example PEs and the interconnect (fabric) networks. Generally, PEs may be configured as dataflow operators and once all input operands arrive at the PE, some operation occurs, and the results are forwarded to another PE or PEs for consumption or output. PEs may communicate over dedicated virtual circuits which are formed by statically configuring the circuit switched communications network. These virtual circuits may be flow controlled and fully back-pressured, e.g., such that PEs will stall if either the source has no data or destination is full. At runtime, data may flow through the PEs implementing the mapped algorithm. For example, data may be streamed in from memory, through the fabric, and then back out to memory. Such a spatial architecture may achieve remarkable performance efficiency relative to traditional multicore processors: compute, in the form of PEs, may be simpler and more numerous than larger cores and communications may be direct, as opposed to an extension of the memory system.

Embodiments of a CSA may not utilize (e.g., software controlled) packet switching, e.g., packet switching that requires significant software assistance to realize, which slows configuration. Embodiments of a CSA include out-of-band signaling in the network (e.g., of only 2-3 bits, depending on the feature set supported) and a fixed configuration topology to avoid the need for significant software support.

One key difference between embodiments of a CSA and the approach used in FPGAs is that a CSA approach may use a wide data word, is distributed, and includes mechanisms to fetch program data directly from memory. Embodiments of a CSA may not utilize JTAG-style single bit communications in the interest of area efficiency, e.g., as that may require milliseconds to completely configure a large FPGA fabric.

Embodiments of a CSA include a distributed configuration protocol and microarchitecture to support this protocol. Initially, configuration state may reside in memory. Multiple (e.g., distributed) local configuration controllers (boxes) (LCCs) may stream portions of the overall program into their local region of the spatial fabric, e.g., using a combination of a small set of control signals and the fabric-provided network. State elements may be used at each CFE to form configuration chains, e.g., allowing individual CFEs to self-program without global addressing.

Embodiments of a CSA include specific hardware support for the formation of configuration chains, e.g., not software establishing these chains dynamically at the cost of increasing configuration time. Embodiments of a CSA are not purely packet switched and do include extra out-of-band control wires (e.g., control is not sent through the data path requiring extra cycles to strobe this information and reserialize this information). Embodiments of a CSA decreases configuration latency by fixing the configuration ordering and by providing explicit out-of-band control (e.g., by at least a factor of two), while not significantly increasing network complexity.

Embodiments of a CSA do not use a serial mechanism for configuration in which data is streamed bit by bit into the fabric using a JTAG-like protocol. Embodiments of a CSA utilize a coarse-grained fabric approach. In certain embodiments, adding a few control wires or state elements to a 64 or 32-bit-oriented CSA fabric has a lower cost relative to adding those same control mechanisms to a 4 or 6 bit fabric.

FIG. 40 illustrates an accelerator tile 6000 comprising an array of processing elements (PE) and a local configuration controller (6002, 6006) according to embodiments of the disclosure. Each PE, each network controller (e.g., network dataflow endpoint circuit), and each switch may be a configurable fabric elements (CFEs), e.g., which are configured (e.g., programmed) by embodiments of the CSA architecture.

Embodiments of a CSA include hardware that provides for efficient, distributed, low-latency configuration of a heterogeneous spatial fabric. This may be achieved according to four techniques. First, a hardware entity, the local configuration controller (LCC) is utilized, for example, as in FIGS. 60-62. An LCC may fetch a stream of configuration information from (e.g., virtual) memory. Second, a configuration data path may be included, e.g., that is as wide as the native width of the PE fabric and which may be overlaid on top of the PE fabric. Third, new control signals may be received into the PE fabric which orchestrate the configuration process. Fourth, state elements may be located (e.g., in a register) at each configurable endpoint which track the status of adjacent CFEs, allowing each CFE to unambiguously self-configure without extra control signals. These four microarchitectural features may allow a CSA to configure chains of its CFEs. To obtain low configuration latency, the configuration may be partitioned by building many LCCs and CFE chains. At configuration time, these may operate independently to load the fabric in parallel, e.g., dramatically reducing latency. As a result of these combinations, fabrics configured using embodiments of a CSA architecture, may be completely configured (e.g., in hundreds of nanoseconds). In the following, the detailed the operation of the various components of embodiments of a CSA configuration network are disclosed.

Figure 61A:
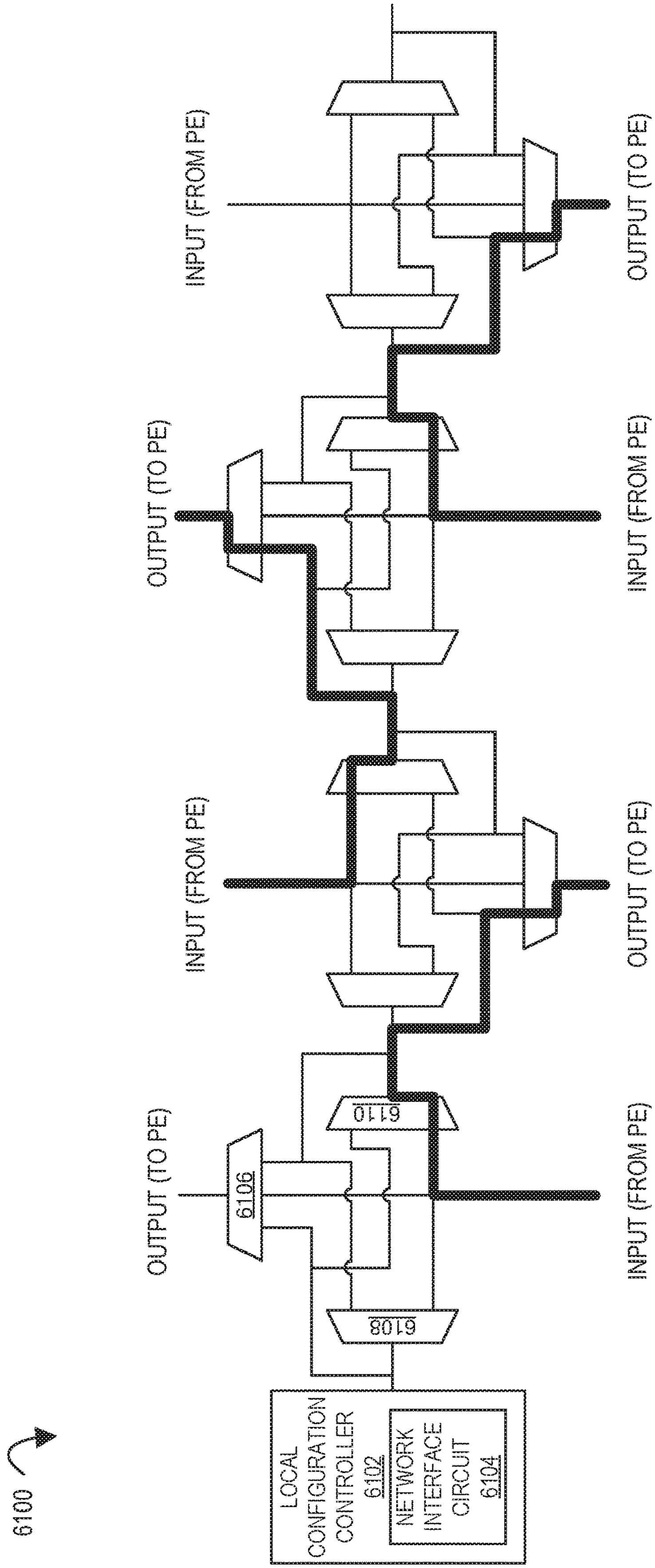
FIGS. 61A-61C illustrate a local configuration controller configuring a data path network according to embodiments of the disclosure.
Figure 61B:
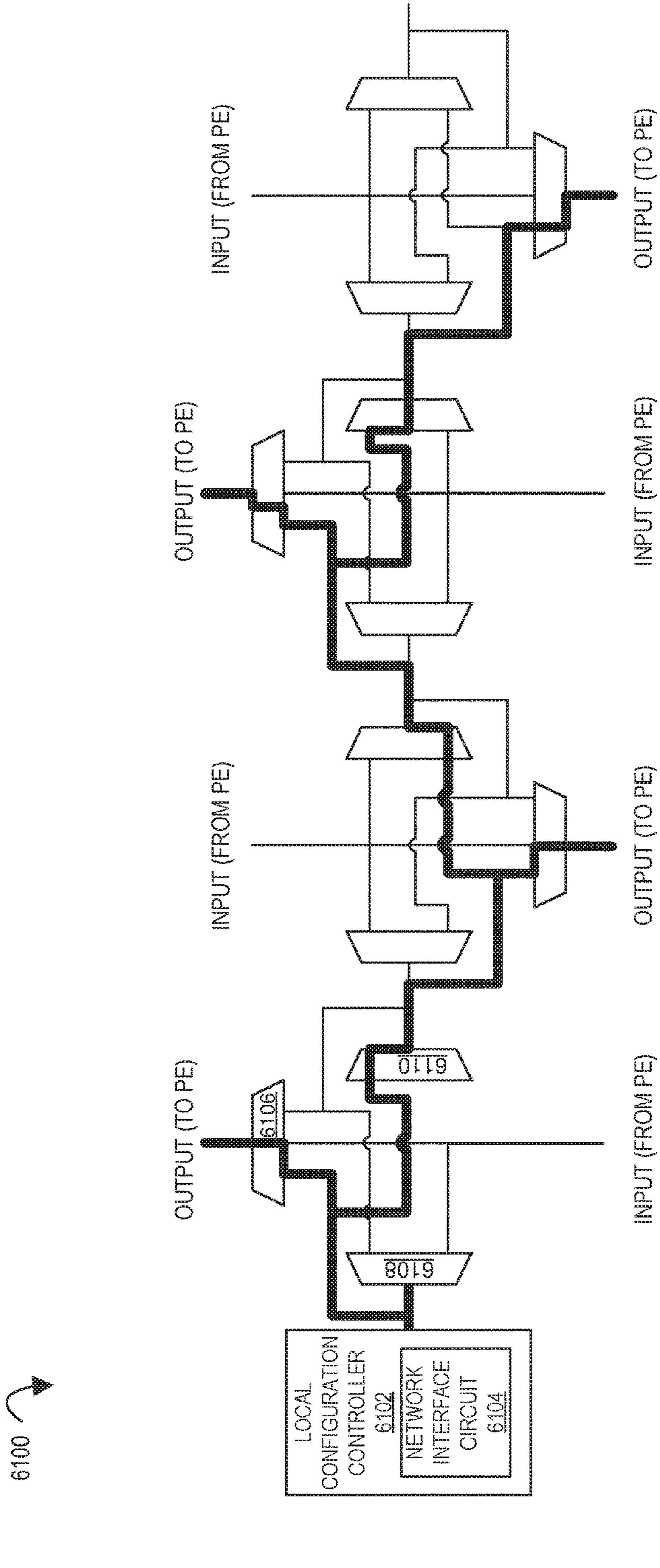
Figure 61C:
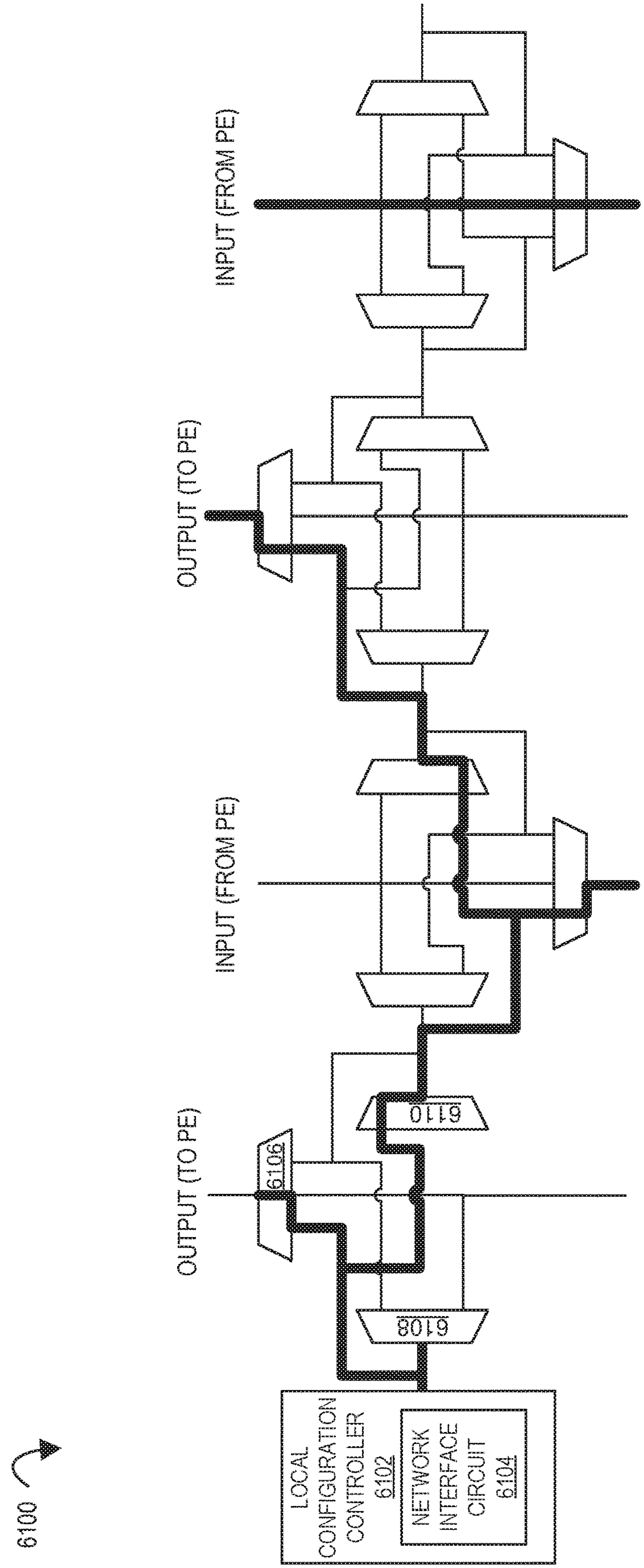

FIGS. 61A-61C illustrate a local configuration controller 6102 configuring a data path network according to embodiments of the disclosure. Depicted network includes a plurality of multiplexers (e.g., multiplexers 6106, 6108, 6110) that may be configured (e.g., via their respective control signals) to connect one or more data paths (e.g., from PEs) together. FIG. 61A illustrates the network 6100 (e.g., fabric) configured (e.g., set) for some previous operation or program. FIG. 61B illustrates the local configuration controller 6102 (e.g., including a network interface circuit 6104 to send and/or receive signals) strobing a configuration signal and the local network is set to a default configuration (e.g., as depicted) that allows the LCC to send configuration data to all configurable fabric elements (CFEs), e.g., muxes. FIG. 61C illustrates the LCC strobing configuration information across the network, configuring CFEs in a predetermined (e.g., silicon-defined) sequence. In one embodiment, when CFEs are configured they may begin operation immediately. In another embodiments, the CFEs wait to begin operation until the fabric has been completely configured (e.g., as signaled by configuration terminator (e.g., configuration terminator 6304 and configuration terminator 6308 in FIG. 63) for each local configuration controller). In one embodiment, the LCC obtains control over the network fabric by sending a special message, or driving a signal. It then strobes configuration data (e.g., over a period of many cycles) to the CFEs in the fabric. In these figures, the multiplexor networks are analogues of the "Switch" shown in certain Figures (e.g., FIG. 44).

Local Configuration Controller

Figure 62:
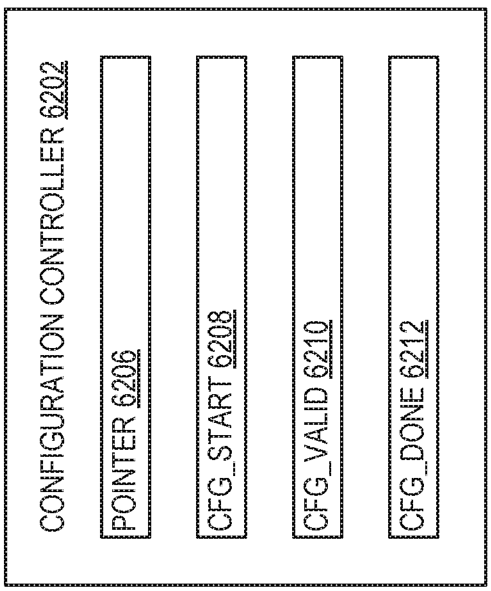
FIG. 62 illustrates a configuration controller according to embodiments of the disclosure.

FIG. 62 illustrates a (e.g., local) configuration controller 6202 according to embodiments of the disclosure. A local configuration controller (LCC) may be the hardware entity which is responsible for loading the local portions (e.g., in a subset of a tile or otherwise) of the fabric program, interpreting these program portions, and then loading these program portions into the fabric by driving the appropriate protocol on the various configuration wires. In this capacity, the LCC may be a special-purpose, sequential microcontroller.

LCC operation may begin when it receives a pointer to a code segment. Depending on the LCB microarchitecture, this pointer (e.g., stored in pointer register) may come either over a network (e.g., from within the CSA (fabric) itself) or through a memory system access to the LCC. When it receives such a pointer, the LCC optionally drains relevant state from its portion of the fabric for context storage, and then proceeds to immediately reconfigure the portion of the fabric for which it is responsible. The program loaded by the LCC may be a combination of configuration data for the fabric and control commands for the LCC, e.g., which are lightly encoded. As the LCC streams in the program portion, it may interprets the program as a command stream and perform the appropriate encoded action to configure (e.g., load) the fabric.

Figure 60:
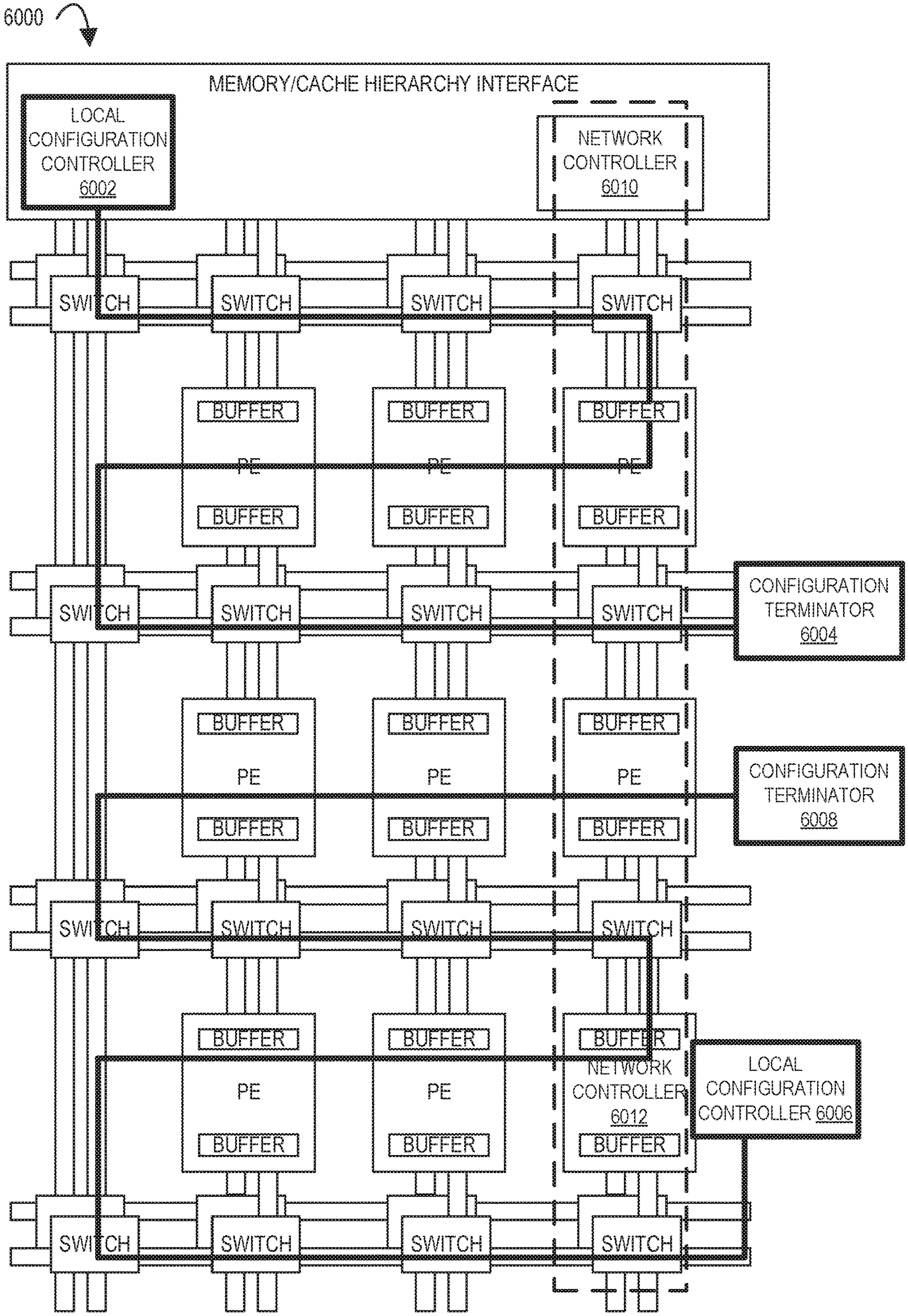
FIG. 60 illustrates an accelerator tile comprising an array of processing elements and a local configuration controller according to embodiments of the disclosure.

Two different microarchitectures for the LCC are shown in FIG. 60, e.g., with one or both being utilized in a CSA. The first places the LCC 6002 at the memory interface. In this case, the LCC may make direct requests to the memory system to load data. In the second case the LCC 6006 is placed on a memory network, in which it may make requests to the memory only indirectly. In both cases, the logical operation of the LCB is unchanged. In one embodiment, an LCCs is informed of the program to load, for example, by a set of (e.g., OS-visible) control-status-registers which will be used to inform individual LCCs of new program pointers, etc.

Extra Out-of-Band Control Channels (e.g., Wires)

In certain embodiments, configuration relies on 2-8 extra, out-of-band control channels to improve configuration speed, as defined below. For example, configuration controller 6202 may include the following control channels, e.g., CFG_START control channel 6208, CFG_VALID control channel 6210, and CFG_DONE control channel 6212, with examples of each discussed in Table 2 below.

TABLE 2

| Control Channels | |
|---|---|
| CFG_START | Asserted at beginning of configuration. Sets configuration state at each CFE and sets the configuration bus. |
| CFG_VALID | Denotes validity of values on configuration bus. |
| CFG_DONE | Optional. Denotes completion of the configuration of a particular CFE. This allows configuration to be short circuited in case a CFE does not require additional configuration |

Generally, the handling of configuration information may be left to the implementer of a particular CFE. For example, a selectable function CFE may have a provision for setting registers using an existing data path, while a fixed function CFE might simply set a configuration register.

Due to long wire delays when programming a large set of CFEs, the CFG_VALID signal may be treated as a clock/latch enable for CFE components. Since this signal is used as a clock, in one embodiment the duty cycle of the line is at most 50%. As a result, configuration throughput is approximately halved. Optionally, a second CFG_VALID signal may be added to enable continuous programming.

In one embodiment, only CFG_START is strictly communicated on an independent coupling (e.g., wire), for example, CFG_VALID and CFG_DONE may be overlaid on top of other network couplings.

Reuse of Network Resources

To reduce the overhead of configuration, certain embodiments of a CSA make use of existing network infrastructure to communicate configuration data. A LCC may make use of both a chip-level memory hierarchy and a fabric-level communications networks to move data from storage into the fabric. As a result, in certain embodiments of a CSA, the configuration infrastructure adds no more than 2% to the overall fabric area and power.

Reuse of network resources in certain embodiments of a CSA may cause a network to have some hardware support for a configuration mechanism. Circuit switched networks of embodiments of a CSA cause an LCC to set their multiplexors in a specific way for configuration when the 'CFG_START' signal is asserted. Packet switched networks do not require extension, although LCC endpoints (e.g., configuration terminators) use a specific address in the packet switched network. Network reuse is optional, and some embodiments may find dedicated configuration buses to be more convenient.

Per CFE State

Each CFE may maintain a bit denoting whether or not it has been configured (see, e.g., FIG. 51). This bit may be de-asserted when the configuration start signal is driven, and then asserted once the particular CFE has been configured. In one configuration protocol, CFEs are arranged to form chains with the CFE configuration state bit determining the topology of the chain. A CFE may read the configuration state bit of the immediately adjacent CFE. If this adjacent CFE is configured and the current CFE is not configured, the CFE may determine that any current configuration data is targeted at the current CFE. When the 'CFG_DONE' signal is asserted, the CFE may set its configuration bit, e.g., enabling upstream CFEs to configure. As a base case to the configuration process, a configuration terminator (e.g., configuration terminator 6004 for LCC 6002 or configuration terminator 6008 for LCC 6006 in FIG. 60) which asserts that it is configured may be included at the end of a chain.

Internal to the CFE, this bit may be used to drive flow control ready signals. For example, when the configuration bit is de-asserted, network control signals may automatically be clamped to a values that prevent data from flowing, while, within PEs, no operations or other actions will be scheduled.

Dealing with High-delay Configuration Paths

One embodiment of an LCC may drive a signal over a long distance, e.g., through many multiplexors and with many loads. Thus, it may be difficult for a signal to arrive at a distant CFE within a short clock cycle. In certain embodiments, configuration signals are at some division (e.g., fraction of) of the main (e.g., CSA) clock frequency to ensure digital timing discipline at configuration. Clock division may be utilized in an out-of-band signaling protocol, and does not require any modification of the main clock tree.

Ensuring Consistent Fabric Behavior During Configuration

Since certain configuration schemes are distributed and have non-deterministic timing due to program and memory effects, different portions of the fabric may be configured at different times. As a result, certain embodiments of a CSA provide mechanisms to prevent inconsistent operation among configured and unconfigured CFEs. Generally, consistency is viewed as a property required of and maintained by CFEs themselves, e.g., using the internal CFE state. For example, when a CFE is in an unconfigured state, it may claim that its input buffers are full, and that its output is invalid. When configured, these values will be set to the true state of the buffers. As enough of the fabric comes out of configuration, these techniques may permit it to begin operation. This has the effect of further reducing context switching latency, e.g., if long-latency memory requests are issued early.

Variable-Width Configuration

Different CFEs may have different configuration word widths. For smaller CFE configuration words, implementers may balance delay by equitably assigning CFE configuration loads across the network wires. To balance loading on network wires, one option is to assign configuration bits to different portions of network wires to limit the net delay on any one wire. Wide data words may be handled by using serialization/deserialization techniques. These decisions may be taken on a per-fabric basis to optimize the behavior of a specific CSA (e.g., fabric). Network controller (e.g., one or more of network controller 6010 and network controller 6012 may communicate with each domain (e.g., subset) of the CSA (e.g., fabric), for example, to send configuration information to one or more LCCs. Network controller may be part of a communications network (e.g., separate from circuit switched network). Network controller may include a network dataflow endpoint circuit.

7.2 Microarchitecture for Low Latency Configuration of a CSA and for Timely Fetching of Configuration Data for a CSA Embodiments of a CSA may be an energy-efficient and high-performance means of accelerating user applications. When considering whether a program (e.g., a dataflow graph thereof) may be successfully accelerated by an accelerator, both the time to configure the accelerator and the time to run the program may be considered. If the run time is short, then the configuration time may play a large role in determining successful acceleration. Therefore, to maximize the domain of accelerable programs, in some embodiments the configuration time is made as short as possible. One or more configuration caches may be includes in a CSA, e.g., such that the high bandwidth, low-latency store enables rapid reconfiguration. Next is a description of several embodiments of a configuration cache.

In one embodiment, during configuration, the configuration hardware (e.g., LCC) optionally accesses the configuration cache to obtain new configuration information. The configuration cache may operate either as a traditional address based cache, or in an OS managed mode, in which configurations are stored in the local address space and addressed by reference to that address space. If configuration state is located in the cache, then no requests to the backing store are to be made in certain embodiments. In certain embodiments, this configuration cache is separate from any (e.g., lower level) shared cache in the memory hierarchy.

Figure 63:
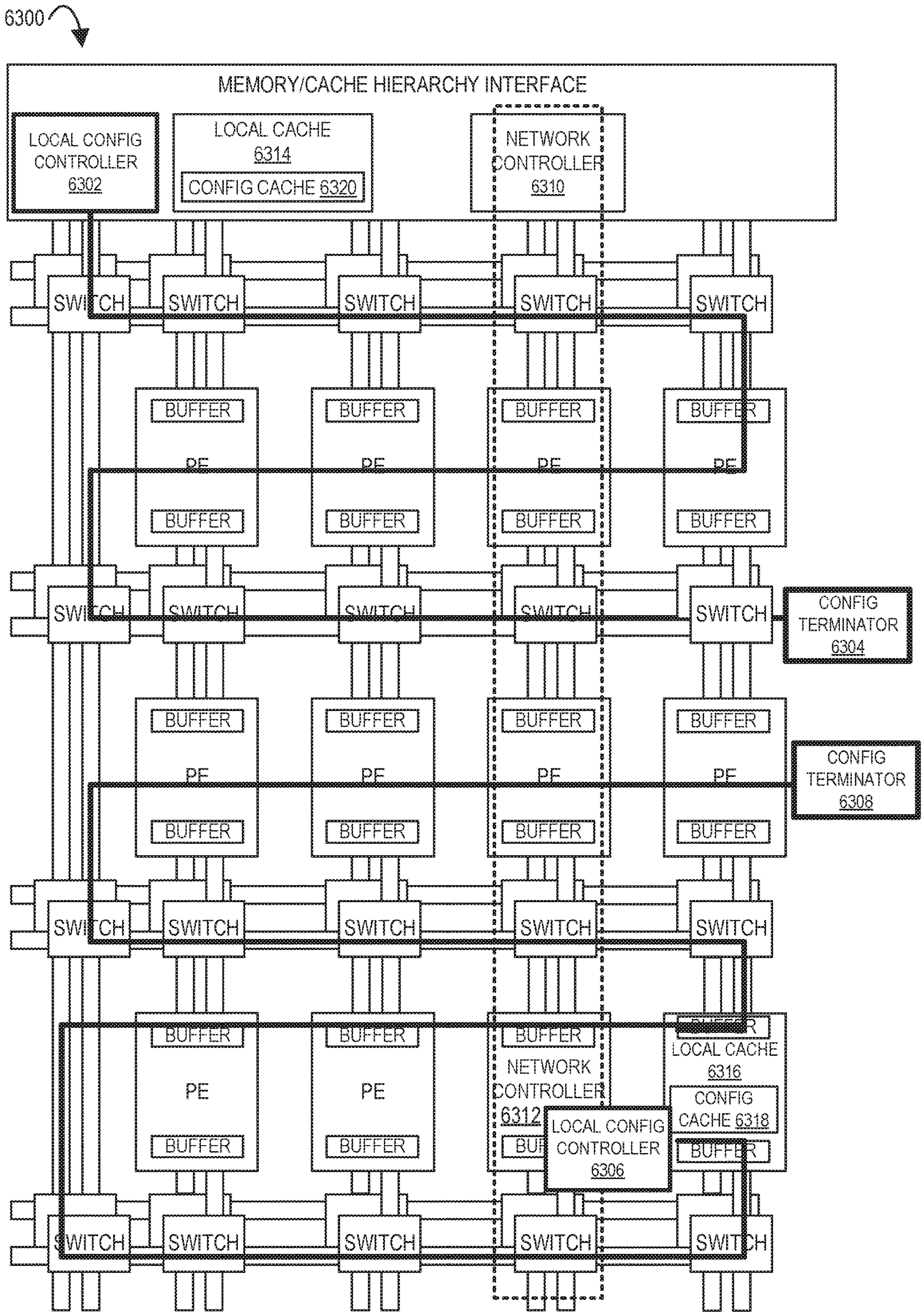
FIG. 63 illustrates an accelerator tile comprising an array of processing elements, a configuration cache, and a local configuration controller according to embodiments of the disclosure.

FIG. 63 illustrates an accelerator tile 6300 comprising an array of processing elements, a configuration cache (e.g., 6318 or 6320), and a local configuration controller (e.g., 6302 or 6306) according to embodiments of the disclosure. In one embodiment, configuration cache 6314 is co-located with local configuration controller 6302. In one embodiment, configuration cache 6318 is located in the configuration domain of local configuration controller 6306, e.g., with a first domain ending at configuration terminator 6304 and a second domain ending at configuration terminator 6308). A configuration cache may allow a local configuration controller may refer to the configuration cache during configuration, e.g., in the hope of obtaining configuration state with lower latency than a reference to memory. A configuration cache (storage) may either be dedicated or may be accessed as a configuration mode of an in-fabric storage element, e.g., local cache 6316.

Caching Modes

1. Demand Caching—In this mode, the configuration cache operates as a true cache. The configuration controller issues address-based requests, which are checked against tags in the cache. Misses are loaded into the cache and then may be re-referenced during future reprogramming.
2. In-Fabric Storage (Scratchpad) Caching—In this mode the configuration cache receives a reference to a configuration sequence in its own, small address space, rather than the larger address space of the host. This may improve memory density since the portion of cache used to store tags may instead be used to store configuration.

In certain embodiments, a configuration cache may have the configuration data pre-loaded into it, e.g., either by external direction or internal direction. This may allow reduction in the latency to load programs. Certain embodiments herein provide for an interface to a configuration cache which permits the loading of new configuration state into the cache, e.g., even if a configuration is running in the fabric already. The initiation of this load may occur from either an internal or external source. Embodiments of a pre-loading mechanism further reduce latency by removing the latency of cache loading from the configuration path.

Pre Fetching Modes

1. Explicit Prefetching—A configuration path is augmented with a new command, ConfigurationCachePrefetch. Instead of programming the fabric, this command simply cause a load of the relevant program configuration into a configuration cache, without programming the fabric. Since this mechanism piggybacks on the existing configuration infrastructure, it is exposed both within the fabric and externally, e.g., to cores and other entities accessing the memory space.
2. Implicit prefetching—A global configuration controller may maintain a prefetch predictor, and use this to initiate the explicit prefetching to a configuration cache, e.g., in an automated fashion.

7.3 Hardware for Rapid Reconfiguration of a CSA in Response to an Exception

Certain embodiments of a CSA (e.g., a spatial fabric) include large amounts of instruction and configuration state, e.g., which is largely static during the operation of the CSA. Thus, the configuration state may be vulnerable to soft errors. Rapid and error-free recovery of these soft errors may be critical to the long-term reliability and performance of spatial systems.

Certain embodiments herein provide for a rapid configuration recovery loop, e.g., in which configuration errors are detected and portions of the fabric immediately reconfigured. Certain embodiments herein include a configuration controller, e.g., with reliability, availability, and serviceability (RAS) reprogramming features. Certain embodiments of CSA include circuitry for high-speed configuration, error reporting, and parity checking within the spatial fabric. Using a combination of these three features, and optionally, a configuration cache, a configuration/exception handling circuit may recover from soft errors in configuration. When detected, soft errors may be conveyed to a configuration cache which initiates an immediate reconfiguration of (e.g., that portion of) the fabric. Certain embodiments provide for a dedicated reconfiguration circuit, e.g., which is faster than any solution that would be indirectly implemented in the fabric. In certain embodiments, co-located exception and configuration circuit cooperates to reload the fabric on configuration error detection.

Figure 64:
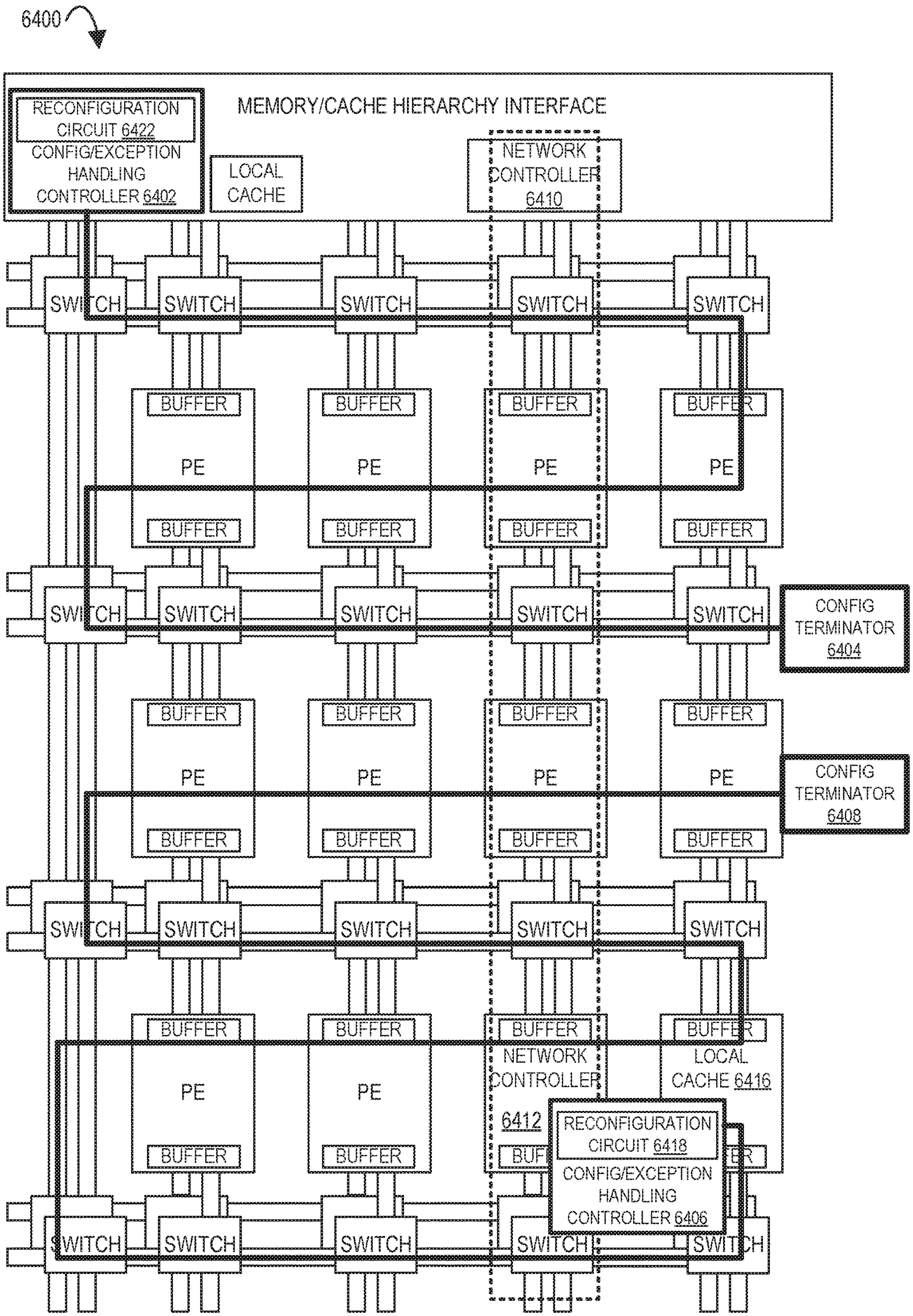
FIG. 64 illustrates an accelerator tile comprising an array of processing elements and a configuration and exception handling controller with a reconfiguration circuit according to embodiments of the disclosure.

FIG. 64 illustrates an accelerator tile 6400 comprising an array of processing elements and a configuration and exception handling controller (6402, 6406) with a reconfiguration circuit (6418, 6422) according to embodiments of the disclosure. In one embodiment, when a PE detects a configuration error through its local RAS features, it sends a (e.g., configuration error or reconfiguration error) message by its exception generator to the configuration and exception handling controller (e.g., 6402 or 6406). On receipt of this message, the configuration and exception handling controller (e.g., 6402 or 6406) initiates the co-located reconfiguration circuit (e.g., 6418 or 6422, respectively) to reload configuration state. The configuration microarchitecture proceeds and reloads (e.g., only) configurations state, and in certain embodiments, only the configuration state for the PE reporting the RAS error. Upon completion of reconfiguration, the fabric may resume normal operation. To decrease latency, the configuration state used by the configuration and exception handling controller (e.g., 6402 or 6406) may be sourced from a configuration cache. As a base case to the configuration or reconfiguration process, a configuration terminator (e.g., configuration terminator 6404 for configuration and exception handling controller 6402 or configuration terminator 6408 for configuration and exception handling controller 6406) in FIG. 64) which asserts that it is configured (or reconfigures) may be included at the end of a chain.

Figure 65:
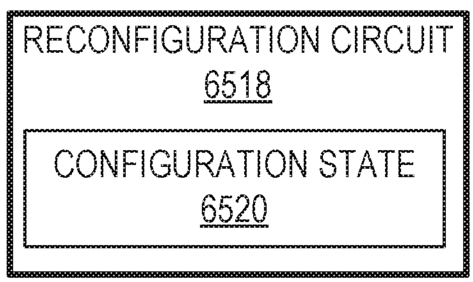
FIG. 65 illustrates a reconfiguration circuit according to embodiments of the disclosure.

FIG. 65 illustrates a reconfiguration circuit 6518 according to embodiments of the disclosure. Reconfiguration circuit 6518 includes a configuration state register 6520 to store the configuration state (or a pointer thereto).

7.4 Hardware for Fabric-Initiated Reconfiguration of a CSA

Some portions of an application targeting a CSA (e.g., spatial array) may be run infrequently or may be mutually exclusive with other parts of the program. To save area, to improve performance, and/or reduce power, it may be useful to time multiplex portions of the spatial fabric among several different parts of the program dataflow graph. Certain embodiments herein include an interface by which a CSA (e.g., via the spatial program) may request that part of the fabric be reprogrammed. This may enable the CSA to dynamically change itself according to dynamic control flow. Certain embodiments herein allow for fabric initiated reconfiguration (e.g., reprogramming). Certain embodiments herein provide for a set of interfaces for triggering configuration from within the fabric. In some embodiments, a PE issues a reconfiguration request based on some decision in the program dataflow graph. This request may travel a network to our new configuration interface, where it triggers reconfiguration. Once reconfiguration is completed, a message may optionally be returned notifying of the completion. Certain embodiments of a CSA thus provide for a program (e.g., dataflow graph) directed reconfiguration capability.

Figure 66:
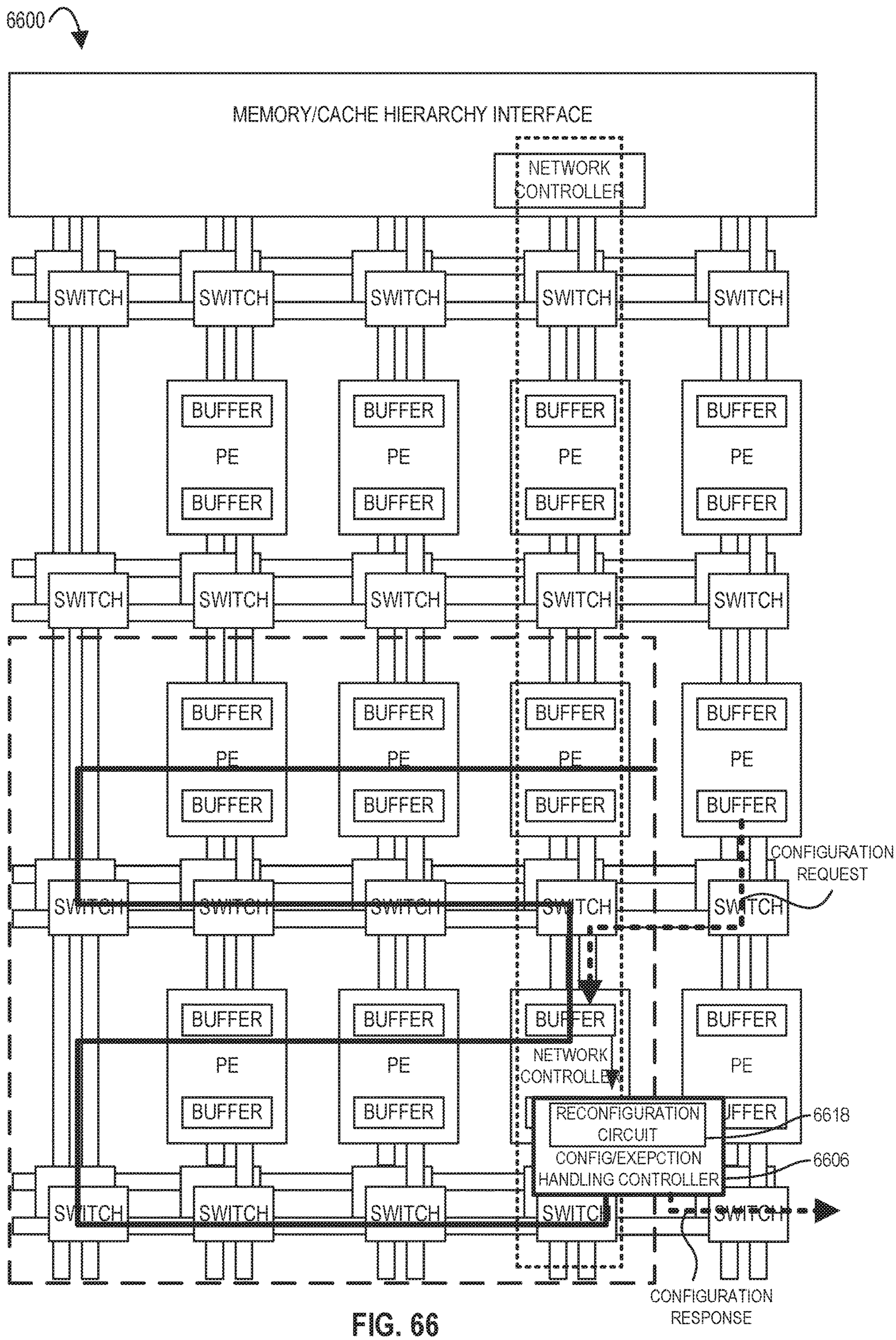
FIG. 66 illustrates an accelerator tile comprising an array of processing elements and a configuration and exception handling controller with a reconfiguration circuit according to embodiments of the disclosure.

FIG. 66 illustrates an accelerator tile 6600 comprising an array of processing elements and a configuration and exception handling controller 6606 with a reconfiguration circuit 6618 according to embodiments of the disclosure. Here, a portion of the fabric issues a request for (re)configuration to a configuration domain, e.g., of configuration and exception handling controller 6606 and/or reconfiguration circuit 6618. The domain (re)configures itself, and when the request has been satisfied, the configuration and exception handling controller 6606 and/or reconfiguration circuit 6618 issues a response to the fabric, to notify the fabric that (re)configuration is complete. In one embodiment, configuration and exception handling controller 6606 and/or reconfiguration circuit 6618 disables communication during the time that (re)configuration is ongoing, so the program has no consistency issues during operation.

Configuration Modes

Configure-by-address—In this mode, the fabric makes a direct request to load configuration data from a particular address.

Configure-by-reference—In this mode the fabric makes a request to load a new configuration, e.g., by a pre-determined reference ID. This may simplify the determination of the code to load, since the location of the code has been abstracted.

Configuring Multiple Domains

A CSA may include a higher level configuration controller to support a multicast mechanism to cast (e.g., via network indicated by the dotted box) configuration requests to multiple (e.g., distributed or local) configuration controllers. This may enable a single configuration request to be replicated across larger portions of the fabric, e.g., triggering a broad reconfiguration.

7.5 Exception Aggregators

Certain embodiments of a CSA may also experience an exception (e.g., exceptional condition), for example, floating point underflow. When these conditions occur, a special handlers may be invoked to either correct the program or to terminate it. Certain embodiments herein provide for a system-level architecture for handling exceptions in spatial fabrics. Since certain spatial fabrics emphasize area efficiency, embodiments herein minimize total area while providing a general exception mechanism. Certain embodiments herein provides a low area means of signaling exceptional conditions occurring in within a CSA (e.g., a spatial array). Certain embodiments herein provide an interface and signaling protocol for conveying such exceptions, as well as a PE-level exception semantics. Certain embodiments herein are dedicated exception handling capabilities, e.g., and do not require explicit handling by the programmer.

Figure 67:
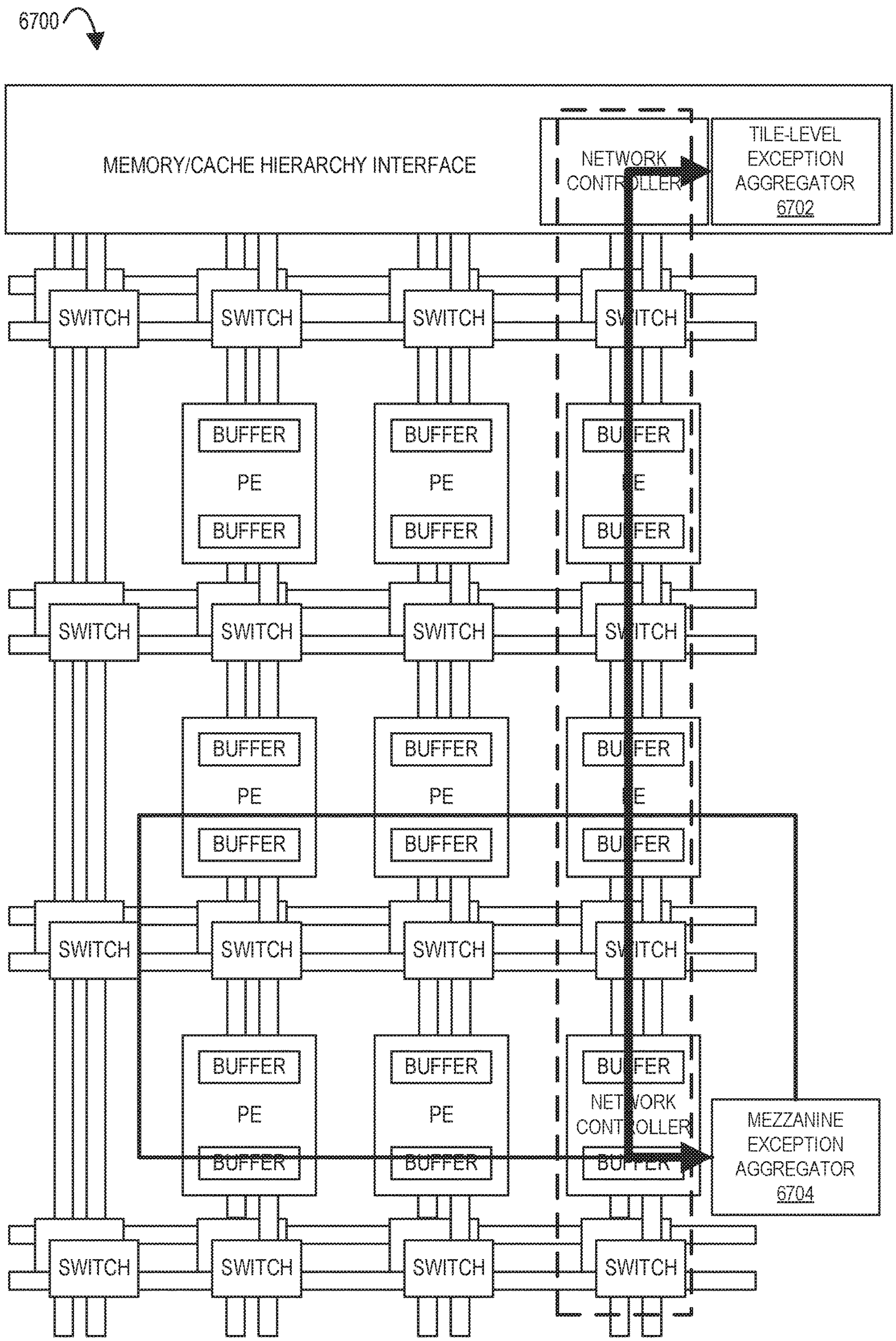
FIG. 67 illustrates an accelerator tile comprising an array of processing elements and a mezzanine exception aggregator coupled to a tile-level exception aggregator according to embodiments of the disclosure.
Figure 68:
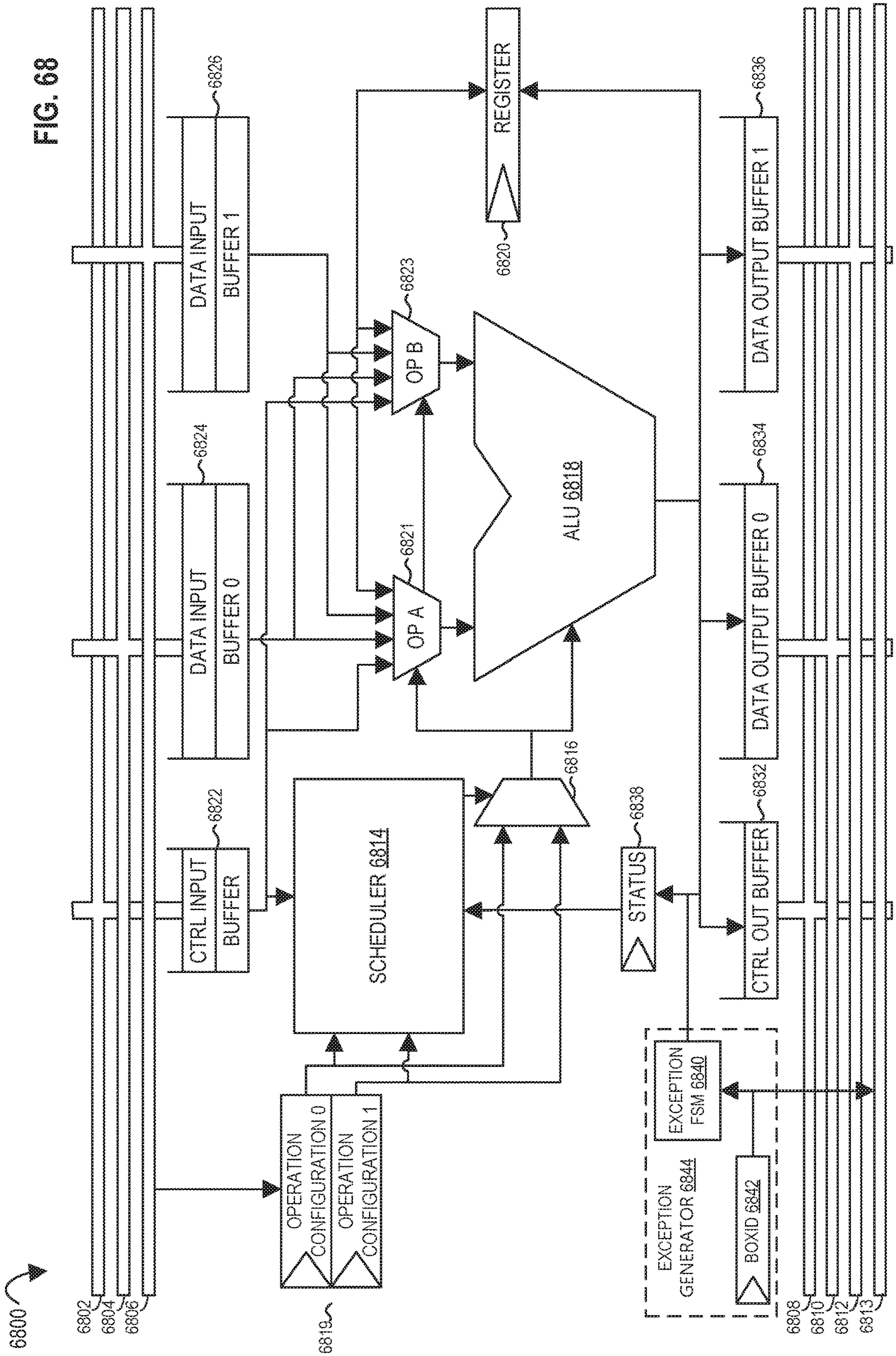
FIG. 68 illustrates a processing element with an exception generator according to embodiments of the disclosure.

One embodiments of a CSA exception architecture consists of four portions, e.g., shown in FIGS. 67-68. These portions may be arranged in a hierarchy, in which exceptions flow from the producer, and eventually up to the tile-level exception aggregator (e.g., handler), which may rendezvous with an exception servicer, e.g., of a core. The four portions may be:

1. PE Exception Generator
2. Local Exception Network
3. Mezzanine Exception Aggregator
4. Tile-Level Exception Aggregator FIG. 67 illustrates an accelerator tile 6700 comprising an array of processing elements and a mezzanine exception aggregator 6702 coupled to a tile-level exception aggregator 6704 according to embodiments of the disclosure. FIG. 68 illustrates a processing element 6800 with an exception generator 6844 according to embodiments of the disclosure.

PE Exception Generator

Processing element 6800 may include processing element 4700 from FIG. 47, for example, with similar numbers being similar components, e.g., local network 4702 and local network 6802. Additional network 6813 (e.g., channel) may be an exception network. A PE may implement an interface to an exception network (e.g., exception network 6813 (e.g., channel) on FIG. 68). For example, FIG. 68 shows the microarchitecture of such an interface, wherein the PE has an exception generator 6844 (e.g., initiate an exception finite state machine (FSM) 6840 to strobe an exception packet (e.g., BOXID 6842) out on to the exception network. BOXID 6842 may be a unique identifier for an exception producing entity (e.g., a PE or box) within a local exception network. When an exception is detected, exception generator 6844 senses the exception network and strobes out the BOXID when the network is found to be free. Exceptions may be caused by many conditions, for example, but not limited to, arithmetic error, failed ECC check on state, etc. however, it may also be that an exception dataflow operation is introduced, with the idea of support constructs like breakpoints.

The initiation of the exception may either occur explicitly, by the execution of a programmer supplied instruction, or implicitly when a hardened error condition (e.g., a floating point underflow) is detected. Upon an exception, the PE 6800 may enter a waiting state, in which it waits to be serviced by the eventual exception handler, e.g., external to the PE 6800. The contents of the exception packet depend on the implementation of the particular PE, as described below.

Local Exception Network

A (e.g., local) exception network steers exception packets from PE 6800 to the mezzanine exception network. Exception network (e.g., 6813) may be a serial, packet switched network consisting of a (e.g., single) control wire and one or more data wires, e.g., organized in a ring or tree topology, e.g., for a subset of PEs. Each PE may have a (e.g., ring) stop in the (e.g., local) exception network, e.g., where it can arbitrate to inject messages into the exception network.

PE endpoints needing to inject an exception packet may observe their local exception network egress point. If the control signal indicates busy, the PE is to wait to commence inject its packet. If the network is not busy, that is, the downstream stop has no packet to forward, then the PE will proceed commence injection.

Network packets may be of variable or fixed length. Each packet may begin with a fixed length header field identifying the source PE of the packet. This may be followed by a variable number of PE-specific field containing information, for example, including error codes, data values, or other useful status information.

Mezzanine Exception Aggregator

The mezzanine exception aggregator 6704 is responsible for assembling local exception network into larger packets and sending them to the tile-level exception aggregator 6702. The mezzanine exception aggregator 6704 may prepend the local exception packet with its own unique ID, e.g., ensuring that exception messages are unambiguous. The mezzanine exception aggregator 6704 may interface to a special exception-only virtual channel in the mezzanine network, e.g., ensuring the deadlock-freedom of exceptions.

The mezzanine exception aggregator 6704 may also be able to directly service certain classes of exception. For example, a configuration request from the fabric may be served out of the mezzanine network using caches local to the mezzanine network stop.

Tile-Level Exception Aggregator

The final stage of the exception system is the tile-level exception aggregator 6702. The tile-level exception aggregator 6702 is responsible for collecting exceptions from the various mezzanine-level exception aggregators (e.g., 6704) and forwarding them to the appropriate servicing hardware (e.g., core). As such, the tile-level exception aggregator 6702 may include some internal tables and controller to associate particular messages with handler routines. These tables may be indexed either directly or with a small state machine in order to steer particular exceptions.

Like the mezzanine exception aggregator, the tile-level exception aggregator may service some exception requests. For example, it may initiate the reprogramming of a large portion of the PE fabric in response to a specific exception.

7.6 Extraction Controllers

Certain embodiments of a CSA include an extraction controller(s) to extract data from the fabric. The below discusses embodiments of how to achieve this extraction quickly and how to minimize the resource overhead of data extraction. Data extraction may be utilized for such critical tasks as exception handling and context switching. Certain embodiments herein extract data from a heterogeneous spatial fabric by introducing features that allow extractable fabric elements (EFEs) (for example, PEs, network controllers, and/or switches) with variable and dynamically variable amounts of state to be extracted.

Embodiments of a CSA include a distributed data extraction protocol and microarchitecture to support this protocol. Certain embodiments of a CSA include multiple local extraction controllers (LECs) which stream program data out of their local region of the spatial fabric using a combination of a (e.g., small) set of control signals and the fabric-provided network. State elements may be used at each extractable fabric element (EFE) to form extraction chains, e.g., allowing individual EFEs to self-extract without global addressing.

Embodiments of a CSA do not use a local network to extract program data. Embodiments of a CSA include specific hardware support (e.g., an extraction controller) for the formation of extraction chains, for example, and do not rely on software to establish these chains dynamically, e.g., at the cost of increasing extraction time. Embodiments of a CSA are not purely packet switched and do include extra out-of-band control wires (e.g., control is not sent through the data path requiring extra cycles to strobe and reserialize this information). Embodiments of a CSA decrease extraction latency by fixing the extraction ordering and by providing explicit out-of-band control (e.g., by at least a factor of two), while not significantly increasing network complexity.

Embodiments of a CSA do not use a serial mechanism for data extraction, in which data is streamed bit by bit from the fabric using a JTAG-like protocol. Embodiments of a CSA utilize a coarse-grained fabric approach. In certain embodiments, adding a few control wires or state elements to a 64 or 32-bit-oriented CSA fabric has a lower cost relative to adding those same control mechanisms to a 4 or 6 bit fabric.

Figure 69:
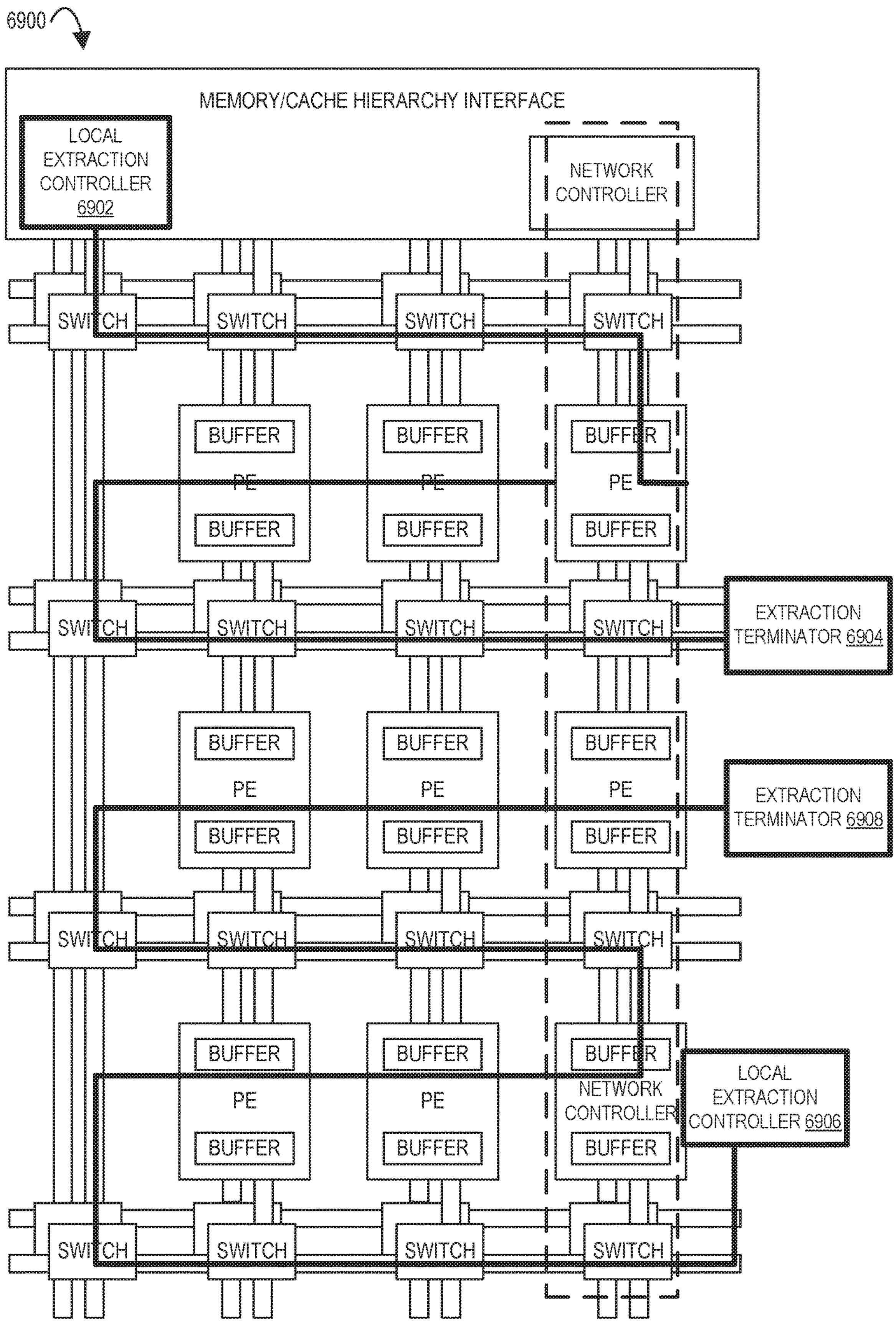
FIG. 69 illustrates an accelerator tile comprising an array of processing elements and a local extraction controller according to embodiments of the disclosure.

FIG. 69 illustrates an accelerator tile 6900 comprising an array of processing elements and a local extraction controller (6902, 6906) according to embodiments of the disclosure. Each PE, each network controller, and each switch may be an extractable fabric elements (EFEs), e.g., which are configured (e.g., programmed) by embodiments of the CSA architecture.

Embodiments of a CSA include hardware that provides for efficient, distributed, low-latency extraction from a heterogeneous spatial fabric. This may be achieved according to four techniques. First, a hardware entity, the local extraction controller (LEC) is utilized, for example, as in FIGS. 69-71. A LEC may accept commands from a host (for example, a processor core), e.g., extracting a stream of data from the spatial array, and writing this data back to virtual memory for inspection by the host. Second, a extraction data path may be included, e.g., that is as wide as the native width of the PE fabric and which may be overlaid on top of the PE fabric. Third, new control signals may be received into the PE fabric which orchestrate the extraction process. Fourth, state elements may be located (e.g., in a register) at each configurable endpoint which track the status of adjacent EFEs, allowing each EFE to unambiguously export its state without extra control signals. These four microarchitectural features may allow a CSA to extract data from chains of EFEs. To obtain low data extraction latency, certain embodiments may partition the extraction problem by including multiple (e.g., many) LECs and EFE chains in the fabric. At extraction time, these chains may operate independently to extract data from the fabric in parallel, e.g., dramatically reducing latency. As a result of these combinations, a CSA may perform a complete state dump (e.g., in hundreds of nanoseconds).

Figure 70A:
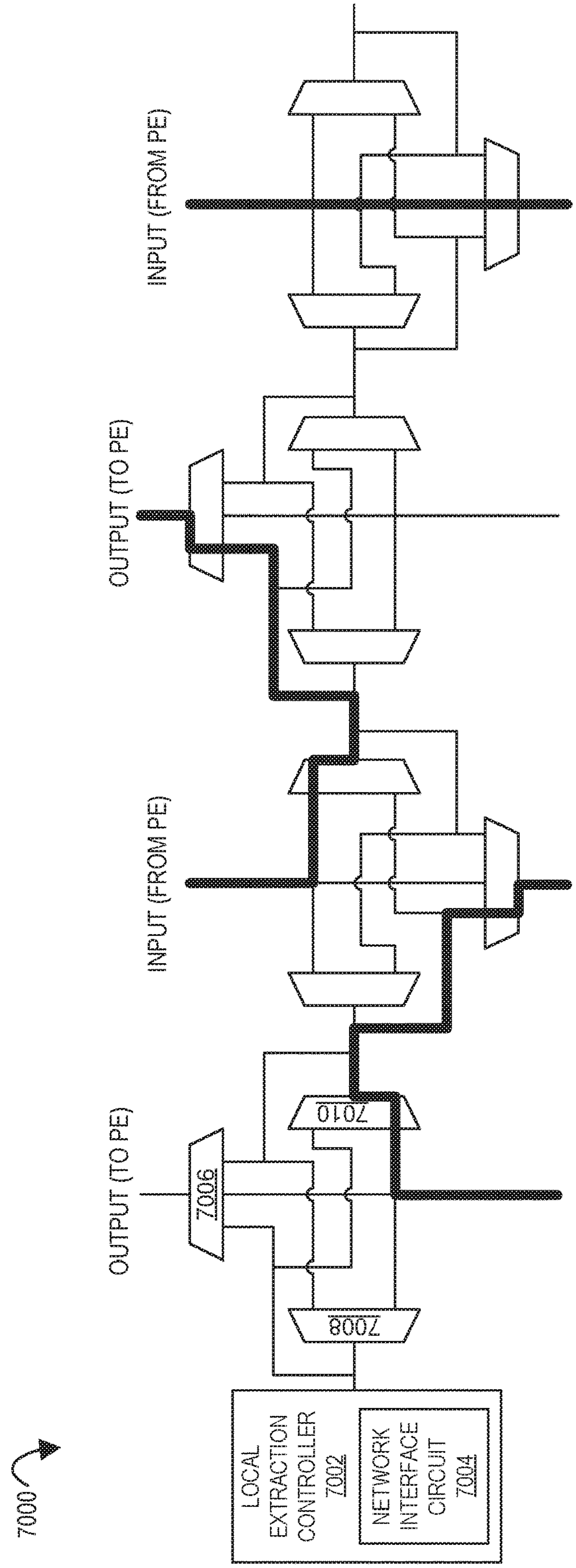
FIGS. 70A-70C illustrate a local extraction controller configuring a data path network according to embodiments of the disclosure.
Figure 70B:
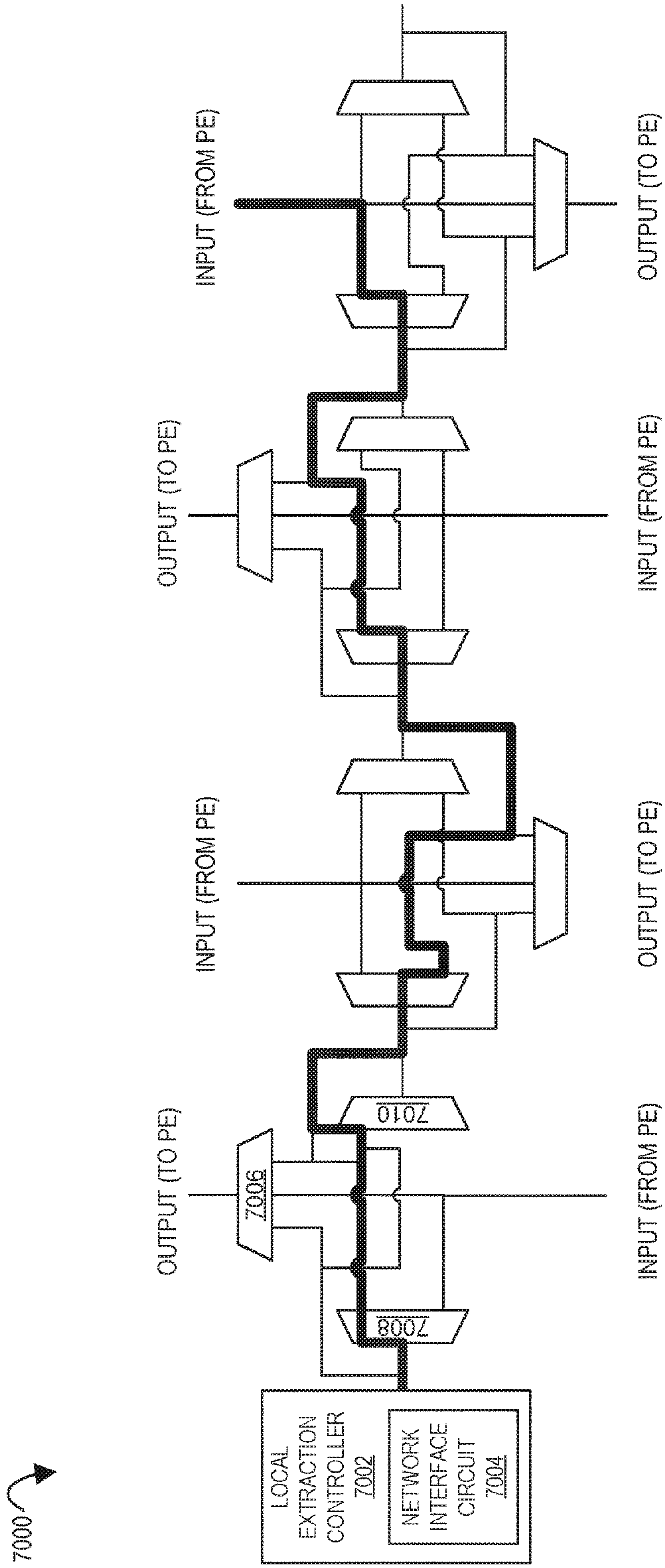
Figure 70C:
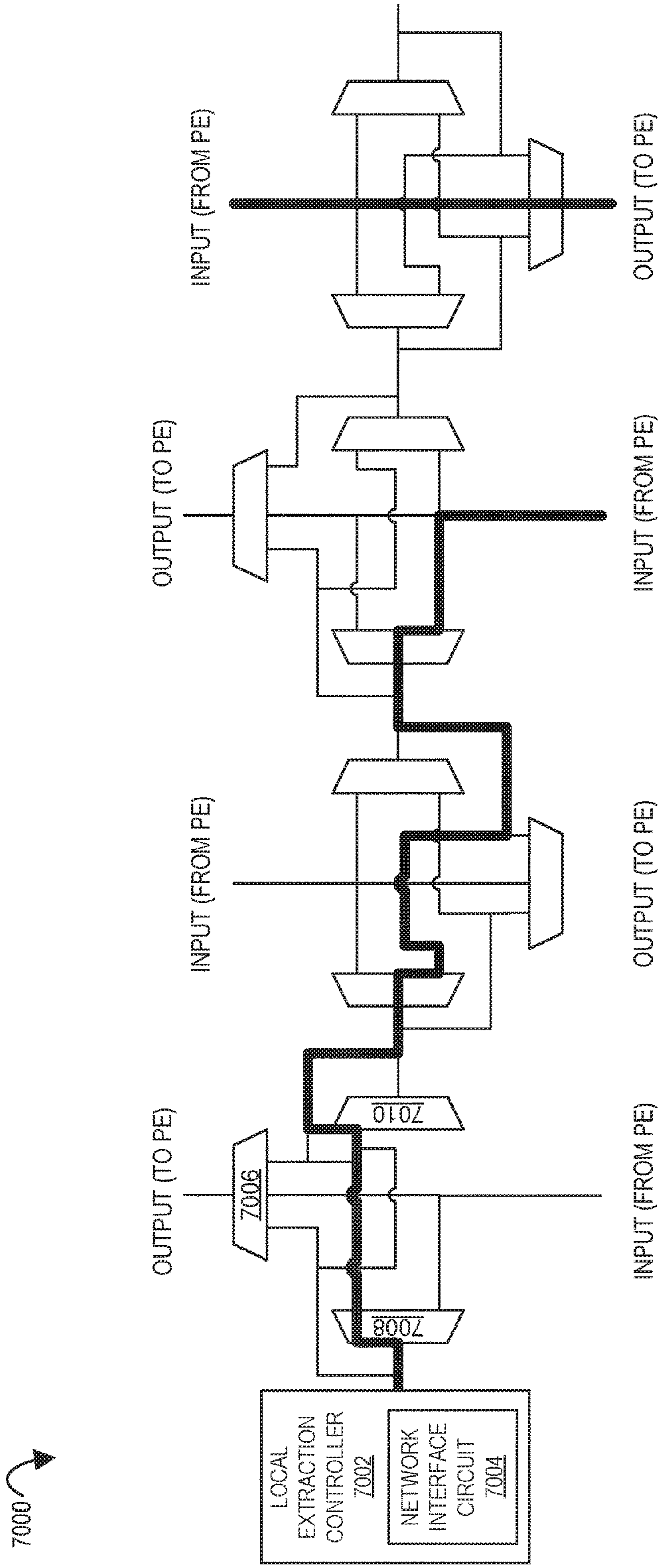

FIGS. 70A-70C illustrate a local extraction controller configuring a data path network according to embodiments of the disclosure. Depicted network includes a plurality of multiplexers (e.g., multiplexers 7006, 7008, 7010) that may be configured (e.g., via their respective control signals) to connect one or more data paths (e.g., from PEs) together.

FIG. 70A illustrates the network 7000 (e.g., fabric) configured (e.g., set) for some previous operation or program. FIG. 70B illustrates the local extraction controller 7002 (e.g., including a network interface circuit 7004 to send and/or receive signals) strobing an extraction signal and all PEs controlled by the LEC enter into extraction mode. The last PE in the extraction chain (or an extraction terminator) may master the extraction channels (e.g., bus) and being sending data according to either (1) signals from the LEC or (2) internally produced signals (e.g., from a PE). Once completed, a PE may set its completion flag, e.g., enabling the next PE to extract its data. FIG. 70C illustrates the most distant PE has completed the extraction process and as a result it has set its extraction state bit or bits, e.g., which swing the muxes into the adjacent network to enable the next PE to begin the extraction process. The extracted PE may resume normal operation. In some embodiments, the PE may remain disabled until other action is taken. In these figures, the multiplexor networks are analogues of the "Switch" shown in certain Figures (e.g., FIG. 44).

The following sections describe the operation of the various components of embodiments of an extraction network.

Local Extraction Controller

Figure 71:
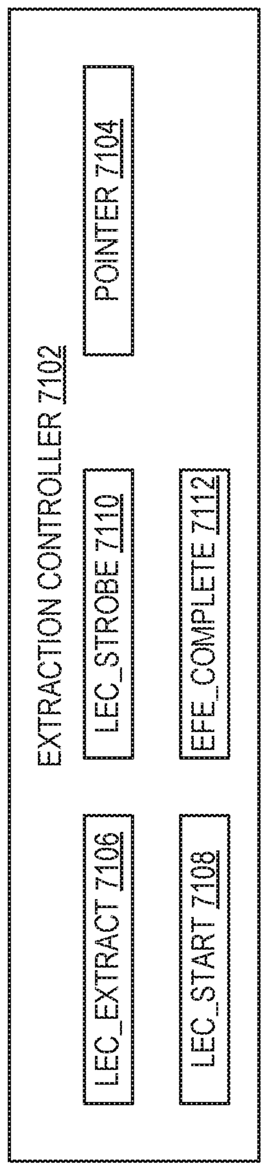
FIG. 71 illustrates an extraction controller according to embodiments of the disclosure.

FIG. 71 illustrates an extraction controller 7102 according to embodiments of the disclosure. A local extraction controller (LEC) may be the hardware entity which is responsible for accepting extraction commands, coordinating the extraction process with the EFEs, and/or storing extracted data, e.g., to virtual memory. In this capacity, the LEC may be a special-purpose, sequential microcontroller.

LEC operation may begin when it receives a pointer to a buffer (e.g., in virtual memory) where fabric state will be written, and, optionally, a command controlling how much of the fabric will be extracted. Depending on the LEC microarchitecture, this pointer (e.g., stored in pointer register 7104) may come either over a network or through a memory system access to the LEC. When it receives such a pointer (e.g., command), the LEC proceeds to extract state from the portion of the fabric for which it is responsible. The LEC may stream this extracted data out of the fabric into the buffer provided by the external caller.

Two different microarchitectures for the LEC are shown in FIG. 69. The first places the LEC 6902 at the memory interface. In this case, the LEC may make direct requests to the memory system to write extracted data. In the second case the LEC 6906 is placed on a memory network, in which it may make requests to the memory only indirectly. In both cases, the logical operation of the LEC may be unchanged. In one embodiment, LECs are informed of the desire to extract data from the fabric, for example, by a set of (e.g., OS-visible) control-status-registers which will be used to inform individual LECs of new commands.

Extra Out-of-band Control Channels (e.g., Wires)

In certain embodiments, extraction relies on 2-8 extra, out-of-band signals to improve configuration speed, as defined below. Signals driven by the LEC may be labelled LEC. Signals driven by the EFE (e.g., PE) may be labelled EFE. Configuration controller 7102 may include the following control channels, e.g., LEC_EXTRACT control channel 7206, LEC_START control channel 7108, LEC_STROBE control channel 7110, and EFE_COMPLETE control channel 7112, with examples of each discussed in Table 3 below.

TABLE 3

| Extraction Channels | |
|---|---|
| LEC_EXTRACT | Optional signal asserted by the LEC during extraction process. Lowering this signal causes normal operation to resume. |
| LEC_START | Signal denoting start of extraction, allowing setup of local EFE state |
| LEC_STROBE | Optional strobe signal for controlling extraction related state machines at EFEs. EFEs may generate this signal internally in some implementations. |
| EFE_COMPLETE | Optional signal strobed when EFE has completed dumping state. This helps LEC identify the completion of individual EFE dumps. |

Generally, the handling of extraction may be left to the implementer of a particular EFE. For example, selectable function EFE may have a provision for dumping registers using an existing data path, while a fixed function EFE might simply have a multiplexor.

Due to long wire delays when programming a large set of EFEs, the LEC_STROBE signal may be treated as a clock/latch enable for EFE components. Since this signal is used as a clock, in one embodiment the duty cycle of the line is at most 50%. As a result, extraction throughput is approximately halved. Optionally, a second LEC_STROBE signal may be added to enable continuous extraction.

In one embodiment, only LEC_START is strictly communicated on an independent coupling (e.g., wire), for example, other control channels may be overlayed on existing network (e.g., wires).

Reuse of Network Resources

To reduce the overhead of data extraction, certain embodiments of a CSA make use of existing network infrastructure to communicate extraction data. A LEC may make use of both a chip-level memory hierarchy and a fabric-level communications networks to move data from the fabric into storage. As a result, in certain embodiments of a CSA, the extraction infrastructure adds no more than 2% to the overall fabric area and power.

Reuse of network resources in certain embodiments of a CSA may cause a network to have some hardware support for an extraction protocol. Circuit switched networks require of certain embodiments of a CSA cause a LEC to set their multiplexors in a specific way for configuration when the TEC_START' signal is asserted. Packet switched networks do not require extension, although LEC endpoints (e.g., extraction terminators) use a specific address in the packet switched network. Network reuse is optional, and some embodiments may find dedicated configuration buses to be more convenient.

Per EFE State

Each EFE may maintain a bit denoting whether or not it has exported its state. This bit may de-asserted when the extraction start signal is driven, and then asserted once the particular EFE finished extraction. In one extraction protocol, EFEs are arranged to form chains with the EFE extraction state bit determining the topology of the chain. A EFE may read the extraction state bit of the immediately adjacent EFE. If this adjacent EFE has its extraction bit set and the current EFE does not, the EFE may determine that it owns the extraction bus. When an EFE dumps its last data value, it may drives the 'EFE_DONE' signal and sets its extraction bit, e.g., enabling upstream EFEs to configure for extraction. The network adjacent to the EFE may observe this signal and also adjust its state to handle the transition. As a base case to the extraction process, an extraction terminator (e.g., extraction terminator for LEC 6902 or extraction terminator 6908 for LEC 6906 in FIG. 60) which asserts that extraction is complete may be included at the end of a chain.

Internal to the EFE, this bit may be used to drive flow control ready signals. For example, when the extraction bit is de-asserted, network control signals may automatically be clamped to a values that prevent data from flowing, while, within PEs, no operations or actions will be scheduled.

Dealing with High-delay Paths

One embodiment of a LEC may drive a signal over a long distance, e.g., through many multiplexors and with many loads. Thus, it may be difficult for a signal to arrive at a distant EFE within a short clock cycle. In certain embodiments, extraction signals are at some division (e.g., fraction of) of the main (e.g., CSA) clock frequency to ensure digital timing discipline at extraction. Clock division may be utilized in an out-of-band signaling protocol, and does not require any modification of the main clock tree.

Ensuring Consistent Fabric Behavior During Extraction

Since certain extraction scheme are distributed and have non-deterministic timing due to program and memory effects, different members of the fabric may be under extraction at different times. While LEC_EXTRACT is driven, all network flow control signals may be driven logically low, e.g., thus freezing the operation of a particular segment of the fabric.

An extraction process may be non-destructive. Therefore a set of PEs may be considered operational once extraction has completed. An extension to an extraction protocol may allow PEs to optionally be disabled post extraction. Alternatively, beginning configuration during the extraction process will have similar effect in embodiments.

Single PE Extraction

In some cases, it may be expedient to extract a single PE. In this case, an optional address signal may be driven as part of the commencement of the extraction process. This may enable the PE targeted for extraction to be directly enabled. Once this PE has been extracted, the extraction process may cease with the lowering of the LEC_EXTRACT signal. In this way, a single PE may be selectively extracted, e.g., by the local extraction controller.

Handling Extraction Backpressure

In an embodiment where the LEC writes extracted data to memory (for example, for post-processing, e.g., in software), it may be subject to limitted memory bandwidth. In the case that the LEC exhausts its buffering capacity, or expects that it will exhaust its buffering capacity, it may stops strobing the LEC_STROBE signal until the buffering issue has resolved.

Note that in certain figures (e.g., FIGS. 60, 63, 64, 66, 67, and 69) communications are shown schematically. In certain embodiments, those communications may occur over the (e.g., interconnect) network.

7.7 Flow Diagrams

Figure 72:
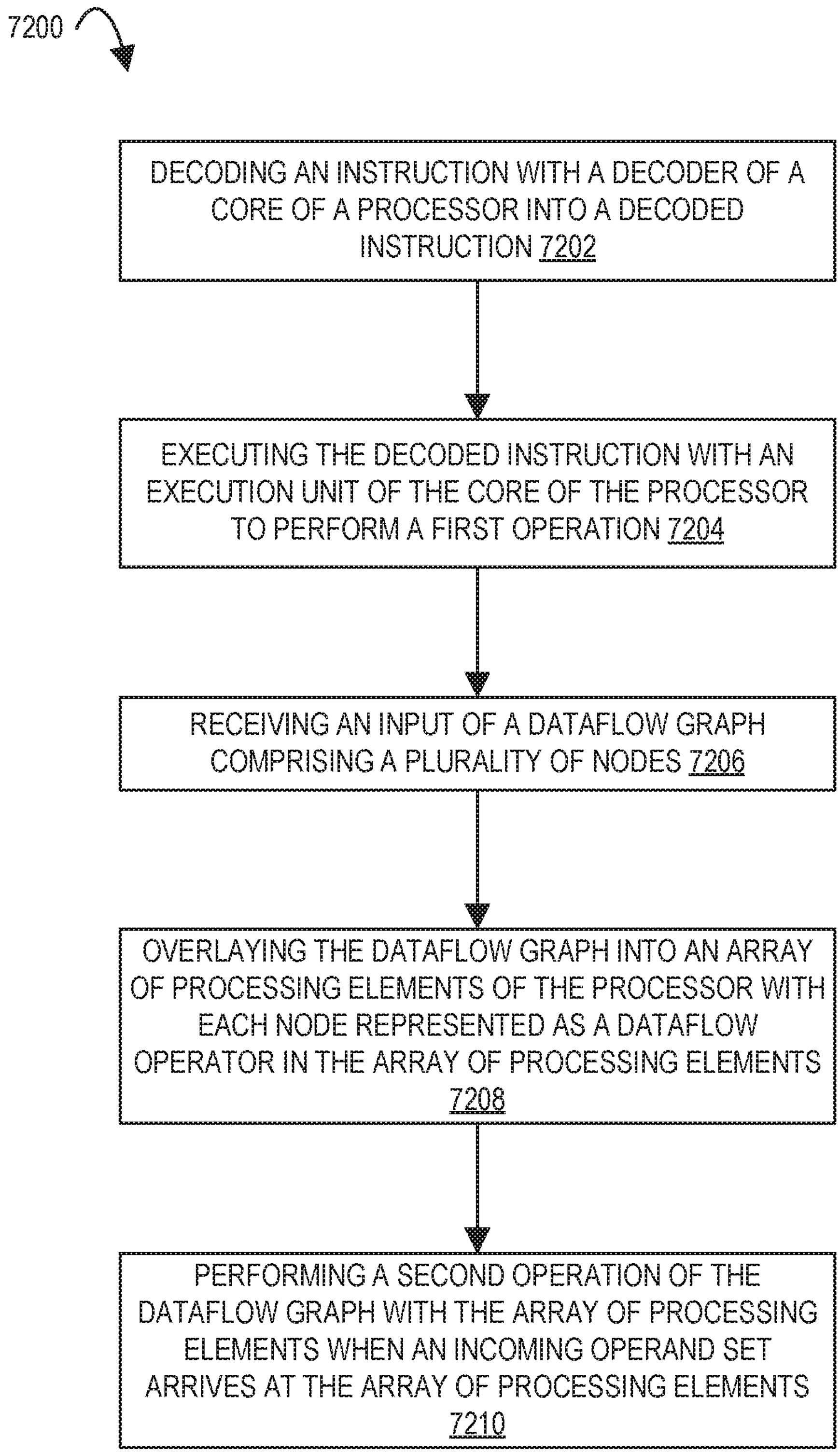
FIG. 72 illustrates a flow diagram according to embodiments of the disclosure.

FIG. 72 illustrates a flow diagram 7200 according to embodiments of the disclosure. Depicted flow 7200 includes decoding an instruction with a decoder of a core of a processor into a decoded instruction 7202; executing the decoded instruction with an execution unit of the core of the processor to perform a first operation 7204; receiving an input of a dataflow graph comprising a plurality of nodes 7206; overlaying the dataflow graph into an array of processing elements of the processor with each node represented as a dataflow operator in the array of processing elements 7208; and performing a second operation of the dataflow graph with the array of processing elements when an incoming operand set arrives at the array of processing elements 7210.

Figure 73:
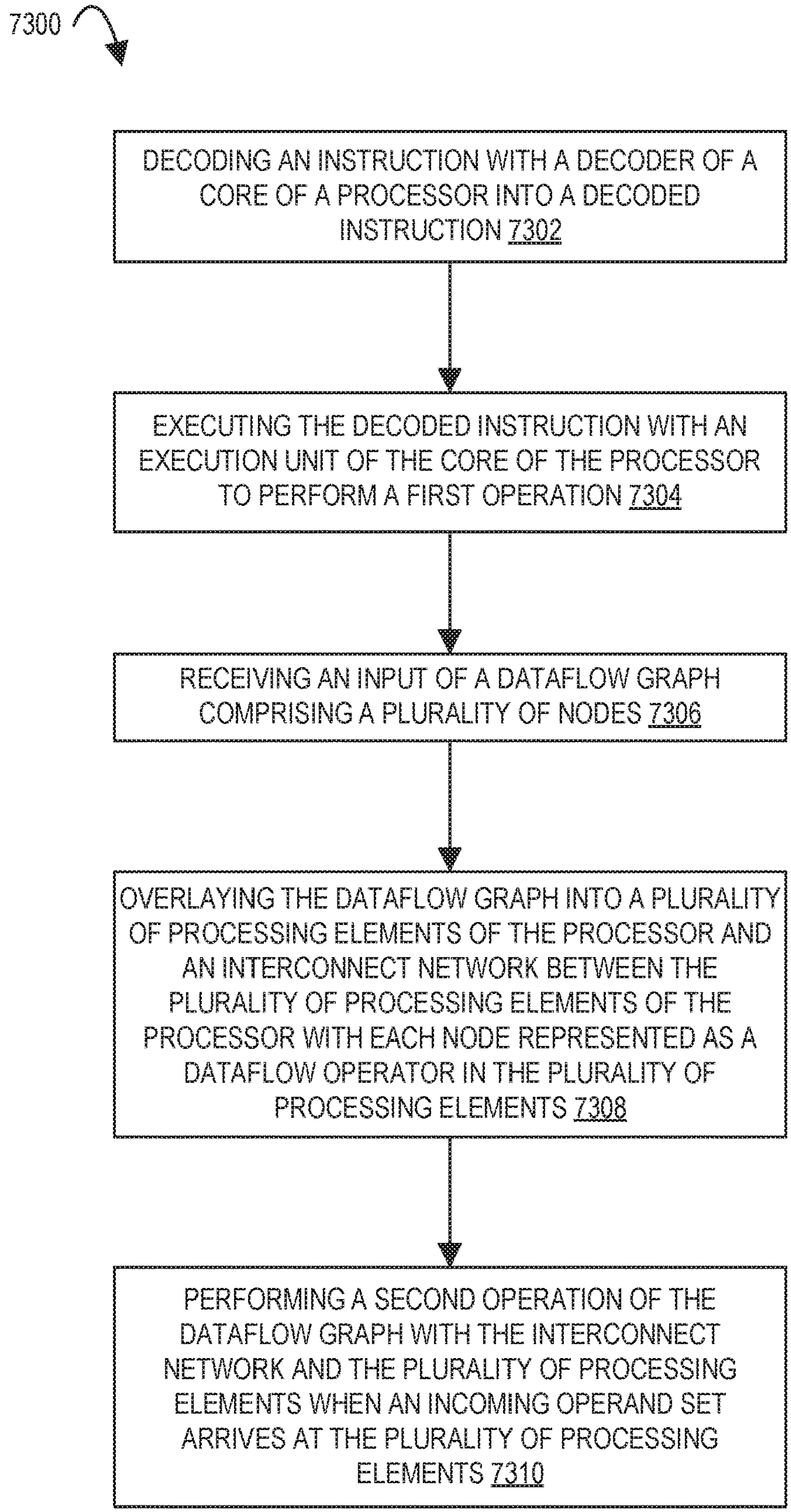
FIG. 73 illustrates a flow diagram according to embodiments of the disclosure.

FIG. 73 illustrates a flow diagram 7300 according to embodiments of the disclosure. Depicted flow 7300 includes decoding an instruction with a decoder of a core of a processor into a decoded instruction 7302; executing the decoded instruction with an execution unit of the core of the processor to perform a first operation 7304; receiving an input of a dataflow graph comprising a plurality of nodes 7306; overlaying the dataflow graph into a plurality of processing elements of the processor and an interconnect network between the plurality of processing elements of the processor with each node represented as a dataflow operator in the plurality of processing elements 7308; and performing a second operation of the dataflow graph with the interconnect network and the plurality of processing elements when an incoming operand set arrives at the plurality of processing elements 7310.

8. Summary

Supercomputing at the ExaFLOP scale may be a challenge in high-performance computing, a challenge which is not likely to be met by conventional von Neumann architectures. To achieve ExaFLOPs, embodiments of a CSA provide a heterogeneous spatial array that targets direct execution of (e.g., compiler-produced) dataflow graphs. In addition to laying out the architectural principles of embodiments of a CSA, the above also describes and evaluates embodiments of a CSA which showed performance and energy of larger than 10× over existing products. Compiler-generated code may have significant performance and energy gains over roadmap architectures. As a heterogeneous, parametric architecture, embodiments of a CSA may be readily adapted to all computing uses. For example, a mobile version of CSA might be tuned to 32-bits, while a machine-learning focused array might feature significant numbers of vectorized 8-bit multiplication units. The main advantages of embodiments of a CSA are high performance and extreme energy efficiency, characteristics relevant to all forms of computing ranging from supercomputing and datacenter to the internet-of-things.

In one embodiment, an apparatus includes a first tile and a second tile, each comprising a plurality of processing elements and an interconnect network between the plurality of processing elements to receive an input of a dataflow graph comprising a plurality of nodes, wherein the dataflow graph is to be overlaid into the interconnect network and the plurality of processing elements of the first tile and the second tile with each node represented as a dataflow operator in the interconnect network and the plurality of processing elements of the first tile and the second tile, and the plurality of processing elements of the first tile and the second tile are to perform an operation when an incoming operand set arrives at the plurality of processing elements of the first tile and the second tile; and a synchronizer circuit coupled between the interconnect network of the first tile and the interconnect network of the second tile and comprising storage to store data to be sent between the interconnect network of the first tile and the interconnect network of the second tile, the synchronizer circuit to convert the data from the storage between a first voltage or a first frequency of the first tile and a second voltage or a second frequency of the second tile to generate converted data, and send the converted data between the interconnect network of the first tile and the interconnect network of the second tile. The synchronizer circuit may include a privilege register that when set with a privilege value is to allow the converted data to be sent between the interconnect network of the first tile and the interconnect network of the second tile. The privilege value may be set in the privilege register when the dataflow graph is overlaid into the interconnect network and the plurality of processing elements of the first tile and the second tile. The privilege value may be set in the privilege register after (e.g., separately from) the dataflow graph is overlaid into the interconnect network and the plurality of processing elements of the first tile and the second tile. The apparatus may include second synchronizer circuit coupled between the interconnect network of the first tile and the interconnect network of the second tile and comprising storage to store second data to be sent from the interconnect network of the second tile into the interconnect network of the first tile, the second synchronizer circuit to convert the second data from the storage from a second voltage or a second frequency of the second tile to a first voltage or a first frequency of the first tile to generate second converted data, and send the second converted data into the interconnect network of the first tile, wherein the synchronizer circuit is coupled between the interconnect network of the first tile and the interconnect network of the second tile and comprises storage to store data to be sent from the interconnect network of the first tile into the interconnect network of the second tile, the synchronizer circuit to convert the data from the storage from a first voltage or a first frequency of the first tile to a second voltage or a second frequency of the second tile to generate the converted data, and send the converted data into the interconnect network of the second tile. The synchronizer circuit may include a metastability buffer for each of multiple data lanes between the interconnect network of the first tile and the interconnect network of the second tile, e.g., to store a data element to be sent on each of multiple data lanes. The synchronizer circuit may send a backpressure signal from a downstream processing element of the second tile to a processing element of the first tile to stall execution of the processing element of the first tile, wherein the backpressure signal indicates that storage in the downstream processing element is not available for an output of the processing element.

In another embodiment, a method includes receiving an input of a dataflow graph comprising a plurality of nodes; overlaying the dataflow graph into a first tile and a second tile, each comprising a plurality of processing elements and an interconnect network between the plurality of processing elements, with each node represented as a dataflow operator in the interconnect network and the plurality of processing elements of the first tile and the second tile; storing data to be sent between the interconnect network of the first tile and the interconnect network of the second tile in storage with a synchronizer circuit coupled between the interconnect network of the first tile and the interconnect network of the second tile; converting the data from the storage between a first voltage or a first frequency of the first tile and a second voltage or a second frequency of the second tile to generate converted data with the synchronizer circuit; and sending the converted data with the synchronizer circuit between the interconnect network of the first tile and the interconnect network of the second tile. The method may include performing an operation of the dataflow graph with a first dataflow operator of the first tile when an incoming operand set arrives at the first dataflow operator of the first tile, and an output for the respective, incoming operand set from the first tile to the second tile is the data in the storing and converting. The method may include setting a privilege value in a privilege register of the synchronizer circuit to allow the converted data to be sent between the interconnect network of the first tile and the interconnect network of the second tile. The method may include, wherein the setting of the privilege value in the privilege register occurs when the dataflow graph is overlaid into the interconnect network and the plurality of processing elements of the first tile and the second tile. The method may include providing a second synchronizer circuit coupled between the interconnect network of the first tile and the interconnect network of the second tile; storing second data to be sent from the interconnect network of the second tile into the interconnect network of the first tile in storage of the second synchronizer circuit, converting the second data from the storage from a second voltage or a second frequency of the second tile to a first voltage or a first frequency of the first tile to generate second converted data with the second synchronizer circuit; and sending the second converted data into the interconnect network of the first tile, wherein the synchronizer circuit is coupled between the interconnect network of the first tile and the interconnect network of the second tile and comprises storage to store data to be sent from the interconnect network of the first tile into the interconnect network of the second tile, the synchronizer circuit to convert the data from the storage from a first voltage or a first frequency of the first tile to a second voltage or a second frequency of the second tile to generate the converted data, and send the converted data into the interconnect network of the second tile. The method may include sending, with the synchronizer circuit, a backpressure signal from a downstream processing element of the second tile to a processing element of the first tile to stall execution of the processing element of the first tile, the backpressure signal indicating that storage in the downstream processing element is not available for an output of the processing element.

In yet another embodiment, an apparatus includes a first means and a second means to receive an input of a dataflow graph comprising a plurality of nodes, wherein the dataflow graph is to be overlaid into the first means and the second means with each node represented as a dataflow operator in the first means and the second means, and the first means and the second means are to perform an operation when an incoming operand set arrives; and means coupled between the first means and the second means and comprising storage to store data to be sent between the first means and the second means, the means to convert the data from the storage between a first voltage or a first frequency of the first means and a second voltage or a second frequency of the second means to generate converted data, and send the converted data between the first means and the second means.

In another embodiment, an apparatus includes a first data path network between a plurality of processing elements in a first tile; a second data path network between a plurality of processing elements in a second tile; a first flow control path network between the plurality of processing elements of the first tile; a second flow control path network between the plurality of processing elements of the second tile, the first data path network, the second data path network, the first flow control path network, and the second flow control path network are to receive an input of a dataflow graph comprising a plurality of nodes, the dataflow graph is to be overlaid into the first data path network, the second data path network, the first flow control path network, the second flow control path network, the plurality of processing elements of the first tile, and the plurality of processing elements of the second tile with each node represented as a dataflow operator in the plurality of processing elements of the first tile and the plurality of processing elements of the second tile to perform an operation by a respective, incoming operand set arriving at each of the dataflow operators of the plurality of processing elements of the first tile, and the plurality of processing elements of the second tile; and a synchronizer circuit coupled between the first data path network of the first tile and the second data path network of the second tile, and comprising storage to store data to be sent between the first data path network of the first tile and the second data path network of the second tile, the synchronizer circuit to convert the data from the storage between a first voltage or a first frequency of the first tile and a second voltage or a second frequency of the second tile to generate converted data, and send the converted data between the first data path network of the first tile and the second data path network of the second tile. The synchronizer circuit may include a privilege register that when set with a privilege value is to allow the converted data to be sent between the first data path network of the first tile and the second data path network of the second tile. The privilege value may be set in the privilege register when the dataflow graph is overlaid into the first data path network, the second data path network, the first flow control path network, the second flow control path network, the plurality of processing elements of the first tile, and the plurality of processing elements of the second tile. The privilege value may be set in the privilege register after (e.g., separately from) the dataflow graph is overlaid into the first data path network, the second data path network, the first flow control path network, the second flow control path network, the plurality of processing elements of the first tile, and the plurality of processing elements of the second tile. The apparatus may include a second synchronizer circuit coupled between the first flow control path network of the first tile and the second flow control path network of the second tile, and comprising storage to store control data to be sent from the second flow control path network of the second tile into the first flow control path network of the first tile, the second synchronizer circuit to convert the control data from the storage from a second voltage or a second frequency of the second tile to a first voltage or a first frequency of the first tile to generate converted control data, and send the converted control data into the first flow control path network of the first tile. The synchronizer circuit may send a backpressure control signal as the control data from a downstream processing element of the second tile to a processing element of the first tile to stall execution of the processing element of the first tile, wherein the backpressure (e.g., control) signal indicates that storage in the downstream processing element is not available for an output of the processing element. The synchronizer circuit may include a metastability buffer for each of multiple data lanes between the first data path network of the first tile and the second data path network of the second tile, e.g., to store a data element to be sent on each of multiple data lanes.

In yet another embodiment, a method includes receiving an input of a dataflow graph comprising a plurality of nodes; overlaying the dataflow graph into a first data path network between a plurality of processing elements in a first tile, a second data path network between a plurality of processing elements in a second tile, a first flow control path network between the plurality of processing elements of the first tile, a second flow control path network between the plurality of processing elements of the second tile, the plurality of processing elements of the first tile, and the plurality of processing elements of the second tile with each node represented as a dataflow operator in the plurality of processing elements of the first tile and the plurality of processing elements of the second tile; storing data to be sent between the first data path network of the first tile and the second data path network of the second tile in storage with a synchronizer circuit coupled between the first data path network of the first tile and the second data path network of the second tile; converting the data from the storage between a first voltage or a first frequency of the first tile and a second voltage or a second frequency of the second tile to generate converted data with the synchronizer circuit; and sending the converted data with the synchronizer circuit between the first data path network of the first tile and the second data path network of the second tile. The method may include performing an operation of the dataflow graph with a first dataflow operator of the first tile when an incoming operand set arrives at the first dataflow operator of the first tile, and an output for the respective, incoming operand set from the first tile to the second tile is the data in the storing and converting. The method may include setting a privilege value in a privilege register of the synchronizer circuit to allow the converted data to be sent between the first data path network of the first tile and the second data path network of the second tile. The method may include, wherein the setting of the privilege value in the privilege register occurs when the dataflow graph is overlaid into the first data path network, the second data path network, the first flow control path network, the second flow control path network, the plurality of processing elements of the first tile, and the plurality of processing elements of the second tile. The method may include providing a second synchronizer circuit coupled between the first flow control path network of the first tile and the second flow control path network of the second tile; storing control data to be sent from the second flow control path network of the second tile into the first flow control path network of the first tile in storage of the second synchronizer circuit; converting the control data from the storage from a second voltage or a second frequency of the second tile to a first voltage or a first frequency of the first tile to generate converted control data with the second synchronizer circuit; and sending the converted control data into the first flow control path network of the first tile. The method may include sending, with the synchronizer circuit, a backpressure control signal as the control data from a downstream processing element of the second tile to a processing element of the first tile to stall execution of the processing element of the first tile, wherein the backpressure (e.g., control) signal indicates that storage in the downstream processing element is not available for an output of the processing element.

In yet another embodiment, an apparatus includes a first data path means between a plurality of processing elements in a first tile; a second data path means between a plurality of processing elements in a second tile; a first flow control path means between the plurality of processing elements of the first tile; a second flow control path means between the plurality of processing elements of the second tile, the first data path means, the second data path means, the first flow control path means, and the second flow control path means are to receive an input of a dataflow graph comprising a plurality of nodes, the dataflow graph is to be overlaid into the first data path means, the second data path means, the first flow control path means, the second flow control path means, the plurality of processing elements of the first tile, and the plurality of processing elements of the second tile with each node represented as a dataflow operator in the plurality of processing elements of the first tile and the plurality of processing elements of the second tile to perform an operation by a respective, incoming operand set arriving at each of the dataflow operators of the plurality of processing elements of the first tile, and the plurality of processing elements of the second tile; and a synchronizer circuit coupled between the first data path means of the first tile and the second data path means of the second tile, and comprising storage to store data to be sent between the first data path means of the first tile and the second data path means of the second tile, the synchronizer circuit to convert the data from the storage between a first voltage or a first frequency of the first tile and a second voltage or a second frequency of the second tile to generate converted data, and send the converted data between the first data path means of the first tile and the second data path means of the second tile.

In one embodiment, a processor includes a core with a decoder to decode an instruction into a decoded instruction and an execution unit to execute the decoded instruction to perform a first operation; a plurality of processing elements; and an interconnect network between the plurality of processing elements to receive an input of a dataflow graph comprising a plurality of nodes, wherein the dataflow graph is to be overlaid into the interconnect network and the plurality of processing elements with each node represented as a dataflow operator in the plurality of processing elements, and the plurality of processing elements are to perform a second operation by a respective, incoming operand set arriving at each of the dataflow operators of the plurality of processing elements. A processing element of the plurality of processing elements may stall execution when a backpressure signal from a downstream processing element indicates that storage in the downstream processing element is not available for an output of the processing element. The processor may include a flow control path network to carry the backpressure signal according to the dataflow graph. A dataflow token may cause an output from a dataflow operator receiving the dataflow token to be sent to an input buffer of a particular processing element of the plurality of processing elements. The second operation may include a memory access and the plurality of processing elements comprises a memory-accessing dataflow operator that is not to perform the memory access until receiving a memory dependency token from a logically previous dataflow operator. The plurality of processing elements may include a first type of processing element and a second, different type of processing element.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements by a respective, incoming operand set arriving at each of the dataflow operators of the plurality of processing elements. The method may include stalling execution by a processing element of the plurality of processing elements when a backpressure signal from a downstream processing element indicates that storage in the downstream processing element is not available for an output of the processing element. The method may include sending the backpressure signal on a flow control path network according to the dataflow graph. A dataflow token may cause an output from a dataflow operator receiving the dataflow token to be sent to an input buffer of a particular processing element of the plurality of processing elements. The method may include not performing a memory access until receiving a memory dependency token from a logically previous dataflow operator, wherein the second operation comprises the memory access and the plurality of processing elements comprises a memory-accessing dataflow operator. The method may include providing a first type of processing element and a second, different type of processing element of the plurality of processing elements.

In yet another embodiment, an apparatus includes a data path network between a plurality of processing elements; and a flow control path network between the plurality of processing elements, wherein the data path network and the flow control path network are to receive an input of a dataflow graph comprising a plurality of nodes, the dataflow graph is to be overlaid into the data path network, the flow control path network, and the plurality of processing elements with each node represented as a dataflow operator in the plurality of processing elements, and the plurality of processing elements are to perform a second operation by a respective, incoming operand set arriving at each of the dataflow operators of the plurality of processing elements. The flow control path network may carry backpressure signals to a plurality of dataflow operators according to the dataflow graph. A dataflow token sent on the data path network to a dataflow operator may cause an output from the dataflow operator to be sent to an input buffer of a particular processing element of the plurality of processing elements on the data path network. The data path network may be a static, circuit switched network to carry the respective, input operand set to each of the dataflow operators according to the dataflow graph. The flow control path network may transmit a backpressure signal according to the dataflow graph from a downstream processing element to indicate that storage in the downstream processing element is not available for an output of the processing element. At least one data path of the data path network and at least one flow control path of the flow control path network may form a channelized circuit with backpressure control. The flow control path network may pipeline at least two of the plurality of processing elements in series.

In another embodiment, a method includes receiving an input of a dataflow graph comprising a plurality of nodes; and overlaying the dataflow graph into a plurality of processing elements of a processor, a data path network between the plurality of processing elements, and a flow control path network between the plurality of processing elements with each node represented as a dataflow operator in the plurality of processing elements. The method may include carrying backpressure signals with the flow control path network to a plurality of dataflow operators according to the dataflow graph. The method may include sending a dataflow token on the data path network to a dataflow operator to cause an output from the dataflow operator to be sent to an input buffer of a particular processing element of the plurality of processing elements on the data path network. The method may include setting a plurality of switches of the data path network and/or a plurality of switches of the flow control path network to carry the respective, input operand set to each of the dataflow operators according to the dataflow graph, wherein the data path network is a static, circuit switched network. The method may include transmitting a backpressure signal with the flow control path network according to the dataflow graph from a downstream processing element to indicate that storage in the downstream processing element is not available for an output of the processing element. The method may include forming a channelized circuit with backpressure control with at least one data path of the data path network and at least one flow control path of the flow control path network.

In yet another embodiment, a processor includes a core with a decoder to decode an instruction into a decoded instruction and an execution unit to execute the decoded instruction to perform a first operation; a plurality of processing elements; and a network means between the plurality of processing elements to receive an input of a dataflow graph comprising a plurality of nodes, wherein the dataflow graph is to be overlaid into the network means and the plurality of processing elements with each node represented as a dataflow operator in the plurality of processing elements, and the plurality of processing elements are to perform a second operation by a respective, incoming operand set arriving at each of the dataflow operators of the plurality of processing elements.

In another embodiment, an apparatus includes a data path means between a plurality of processing elements; and a flow control path means between the plurality of processing elements, wherein the data path means and the flow control path means are to receive an input of a dataflow graph comprising a plurality of nodes, the dataflow graph is to be overlaid into the data path means, the flow control path means, and the plurality of processing elements with each node represented as a dataflow operator in the plurality of processing elements, and the plurality of processing elements are to perform a second operation by a respective, incoming operand set arriving at each of the dataflow operators of the plurality of processing elements.

In one embodiment, a processor includes a core with a decoder to decode an instruction into a decoded instruction and an execution unit to execute the decoded instruction to perform a first operation; and an array of processing elements to receive an input of a dataflow graph comprising a plurality of nodes, wherein the dataflow graph is to be overlaid into the array of processing elements with each node represented as a dataflow operator in the array of processing elements, and the array of processing elements is to perform a second operation when an incoming operand set arrives at the array of processing elements. The array of processing element may not perform the second operation until the incoming operand set arrives at the array of processing elements and storage in the array of processing elements is available for output of the second operation. The array of processing elements may include a network (or channel(s)) to carry dataflow tokens and control tokens to a plurality of dataflow operators. The second operation may include a memory access and the array of processing elements may include a memory-accessing dataflow operator that is not to perform the memory access until receiving a memory dependency token from a logically previous dataflow operator. Each processing element may perform only one or two operations of the dataflow graph.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into an array of processing elements of the processor with each node represented as a dataflow operator in the array of processing elements; and performing a second operation of the dataflow graph with the array of processing elements when an incoming operand set arrives at the array of processing elements. The array of processing elements may not perform the second operation until the incoming operand set arrives at the array of processing elements and storage in the array of processing elements is available for output of the second operation. The array of processing elements may include a network carrying dataflow tokens and control tokens to a plurality of dataflow operators. The second operation may include a memory access and the array of processing elements comprises a memory-accessing dataflow operator that is not to perform the memory access until receiving a memory dependency token from a logically previous dataflow operator. Each processing element may performs only one or two operations of the dataflow graph.

In yet another embodiment, a non-transitory machine readable medium that stores code that when executed by a machine causes the machine to perform a method including decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into an array of processing elements of the processor with each node represented as a dataflow operator in the array of processing elements; and performing a second operation of the dataflow graph with the array of processing elements when an incoming operand set arrives at the array of processing elements. The array of processing element may not perform the second operation until the incoming operand set arrives at the array of processing elements and storage in the array of processing elements is available for output of the second operation. The array of processing elements may include a network carrying dataflow tokens and control tokens to a plurality of dataflow operators. The second operation may include a memory access and the array of processing elements comprises a memory-accessing dataflow operator that is not to perform the memory access until receiving a memory dependency token from a logically previous dataflow operator. Each processing element may performs only one or two operations of the dataflow graph.

In another embodiment, a processor includes a core with a decoder to decode an instruction into a decoded instruction and an execution unit to execute the decoded instruction to perform a first operation; and means to receive an input of a dataflow graph comprising a plurality of nodes, wherein the dataflow graph is to be overlaid into the means with each node represented as a dataflow operator in the means, and the means is to perform a second operation when an incoming operand set arrives at the means.

In one embodiment, a processor includes a core with a decoder to decode an instruction into a decoded instruction and an execution unit to execute the decoded instruction to perform a first operation; a plurality of processing elements; and an interconnect network between the plurality of processing elements to receive an input of a dataflow graph comprising a plurality of nodes, wherein the dataflow graph is to be overlaid into the interconnect network and the plurality of processing elements with each node represented as a dataflow operator in the plurality of processing elements, and the plurality of processing elements is to perform a second operation when an incoming operand set arrives at the plurality of processing elements. The processor may further comprise a plurality of configuration controllers, each configuration controller is coupled to a respective subset of the plurality of processing elements, and each configuration controller is to load configuration information from storage and cause coupling of the respective subset of the plurality of processing elements according to the configuration information. The processor may include a plurality of configuration caches, and each configuration controller is coupled to a respective configuration cache to fetch the configuration information for the respective subset of the plurality of processing elements. The first operation performed by the execution unit may prefetch configuration information into each of the plurality of configuration caches. Each of the plurality of configuration controllers may include a reconfiguration circuit to cause a reconfiguration for at least one processing element of the respective subset of the plurality of processing elements on receipt of a configuration error message from the at least one processing element. Each of the plurality of configuration controllers may a reconfiguration circuit to cause a reconfiguration for the respective subset of the plurality of processing elements on receipt of a reconfiguration request message, and disable communication with the respective subset of the plurality of processing elements until the reconfiguration is complete. The processor may include a plurality of exception aggregators, and each exception aggregator is coupled to a respective subset of the plurality of processing elements to collect exceptions from the respective subset of the plurality of processing elements and forward the exceptions to the core for servicing. The processor may include a plurality of extraction controllers, each extraction controller is coupled to a respective subset of the plurality of processing elements, and each extraction controller is to cause state data from the respective subset of the plurality of processing elements to be saved to memory.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements when an incoming operand set arrives at the plurality of processing elements. The method may include loading configuration information from storage for respective subsets of the plurality of processing elements and causing coupling for each respective subset of the plurality of processing elements according to the configuration information. The method may include fetching the configuration information for the respective subset of the plurality of processing elements from a respective configuration cache of a plurality of configuration caches. The first operation performed by the execution unit may be prefetching configuration information into each of the plurality of configuration caches. The method may include causing a reconfiguration for at least one processing element of the respective subset of the plurality of processing elements on receipt of a configuration error message from the at least one processing element. The method may include causing a reconfiguration for the respective subset of the plurality of processing elements on receipt of a reconfiguration request message; and disabling communication with the respective subset of the plurality of processing elements until the reconfiguration is complete. The method may include collecting exceptions from a respective subset of the plurality of processing elements; and forwarding the exceptions to the core for servicing. The method may include causing state data from a respective subset of the plurality of processing elements to be saved to memory.

In yet another embodiment, a non-transitory machine readable medium that stores code that when executed by a machine causes the machine to perform a method including decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements when an incoming operand set arrives at the plurality of processing elements. The method may include loading configuration information from storage for respective subsets of the plurality of processing elements and causing coupling for each respective subset of the plurality of processing elements according to the configuration information. The method may include fetching the configuration information for the respective subset of the plurality of processing elements from a respective configuration cache of a plurality of configuration caches. The first operation performed by the execution unit may be prefetching configuration information into each of the plurality of configuration caches. The method may include causing a reconfiguration for at least one processing element of the respective subset of the plurality of processing elements on receipt of a configuration error message from the at least one processing element. The method may include causing a reconfiguration for the respective subset of the plurality of processing elements on receipt of a reconfiguration request message; and disabling communication with the respective subset of the plurality of processing elements until the reconfiguration is complete. The method may include collecting exceptions from a respective subset of the plurality of processing elements; and forwarding the exceptions to the core for servicing. The method may include causing state data from a respective subset of the plurality of processing elements to be saved to memory.

In another embodiment, a processor includes a core with a decoder to decode an instruction into a decoded instruction and an execution unit to execute the decoded instruction to perform a first operation; a plurality of processing elements; and means between the plurality of processing elements to receive an input of a dataflow graph comprising a plurality of nodes, wherein the dataflow graph is to be overlaid into the m and the plurality of processing elements with each node represented as a dataflow operator in the plurality of processing elements, and the plurality of processing elements is to perform a second operation when an incoming operand set arrives at the plurality of processing elements.

In yet another embodiment, an apparatus comprises a data storage device that stores code that when executed by a hardware processor causes the hardware processor to perform any method disclosed herein. An apparatus may be as described in the detailed description. A method may be as described in the detailed description.

In another embodiment, a non-transitory machine readable medium that stores code that when executed by a machine causes the machine to perform a method comprising any method disclosed herein.

An instruction set (e.g., for execution by a core) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, June 2016; and see Intel® Architecture Instruction Set Extensions Programming Reference, February 2016).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 74A:
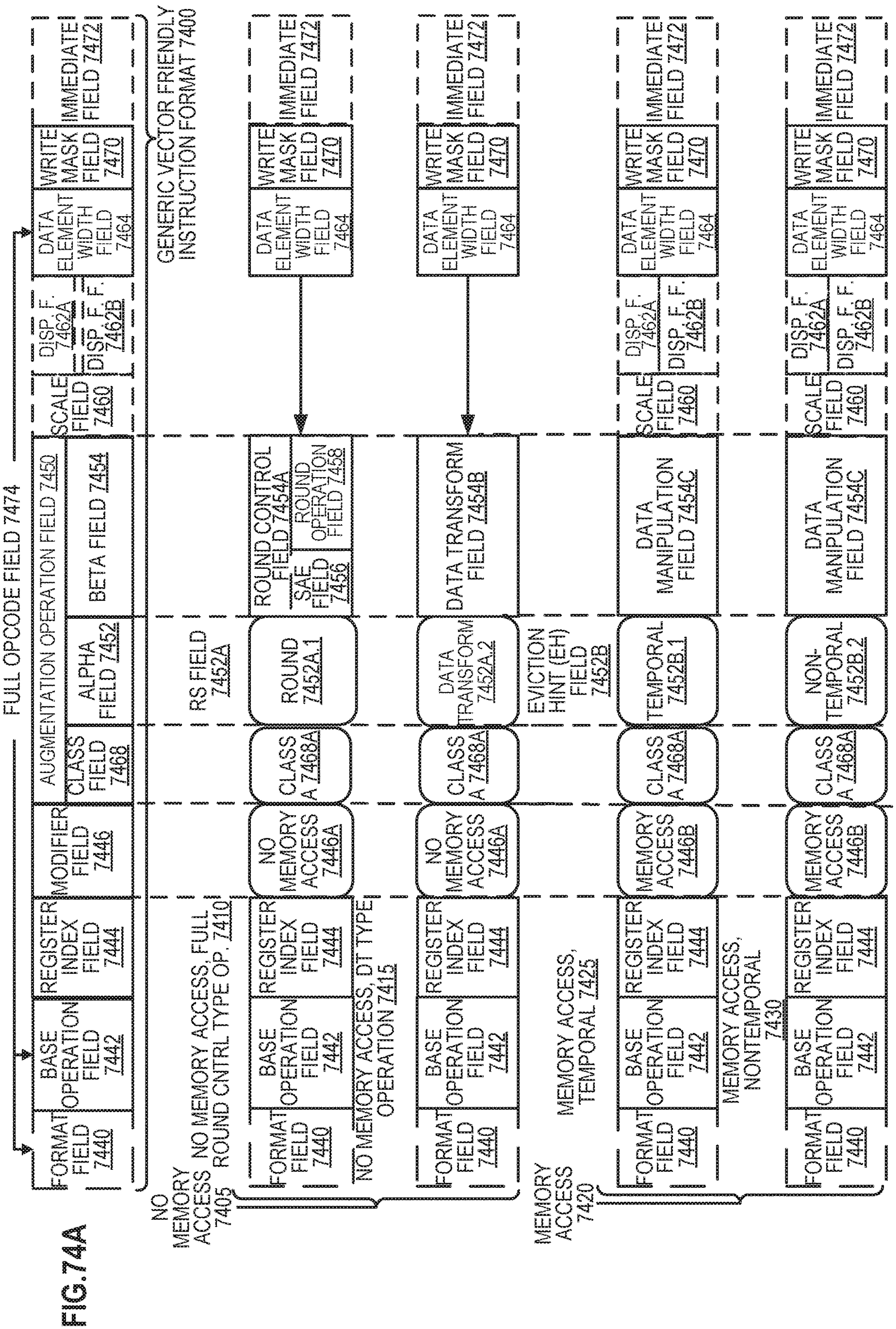
FIG. 74A is a block diagram illustrating a generic vector friendly instruction format and class A instruction templates thereof according to embodiments of the disclosure.
Figure 74B:
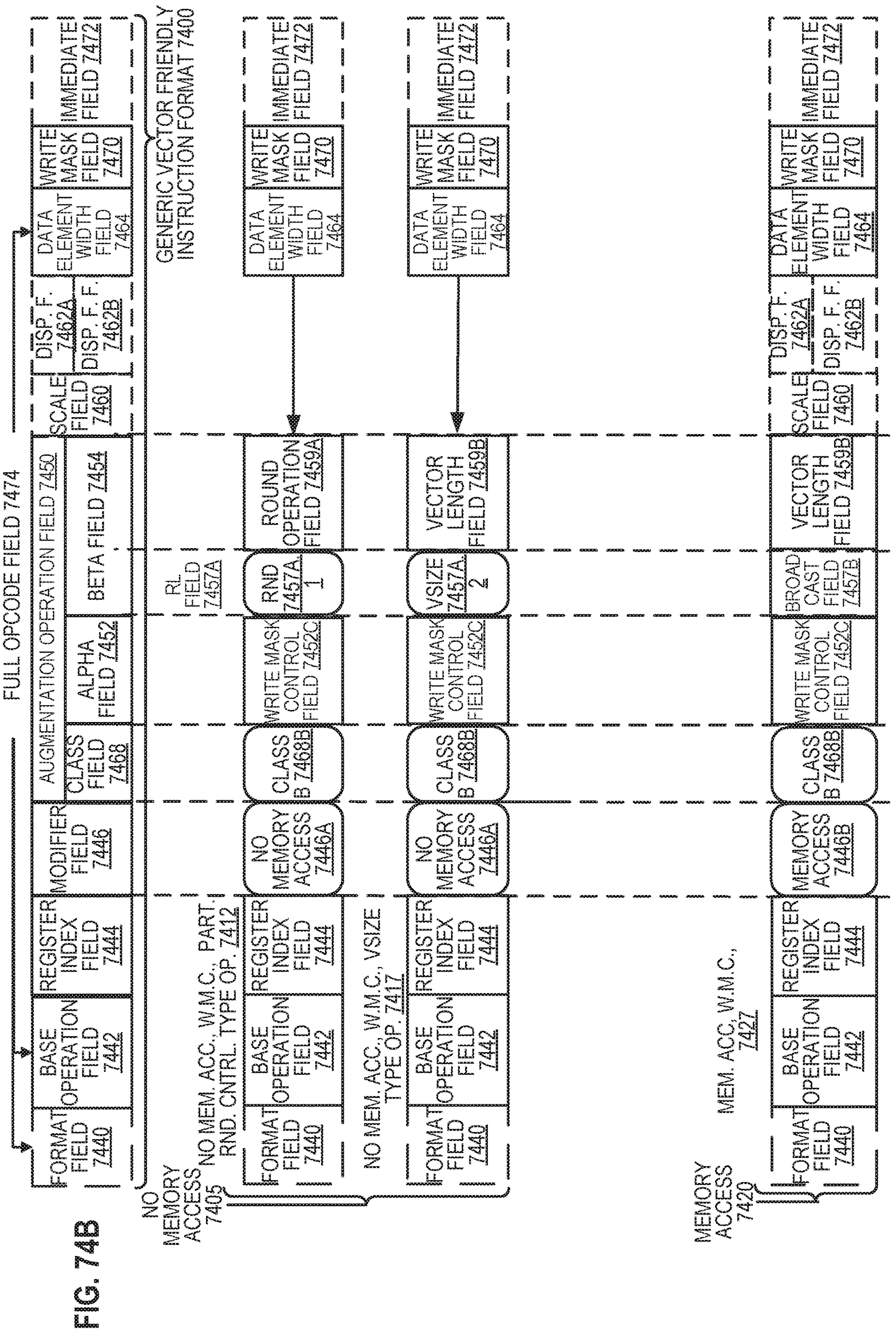
FIG. 74B is a block diagram illustrating the generic vector friendly instruction format and class B instruction templates thereof according to embodiments of the disclosure.

FIGS. 74A-74B are block diagrams illustrating a generic vector friendly instruction format and instruction templates thereof according to embodiments of the disclosure. FIG. 74A is a block diagram illustrating a generic vector friendly instruction format and class A instruction templates thereof according to embodiments of the disclosure; while FIG. 74B is a block diagram illustrating the generic vector friendly instruction format and class B instruction templates thereof according to embodiments of the disclosure. Specifically, a generic vector friendly instruction format 7400 for which are defined class A and class B instruction templates, both of which include no memory access 7405 instruction templates and memory access 7420 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 74A include: 1) within the no memory access 7405 instruction templates there is shown a no memory access, full round control type operation 7410 instruction template and a no memory access, data transform type operation 7415 instruction template; and 2) within the memory access 7420 instruction templates there is shown a memory access, temporal 7425 instruction template and a memory access, non-temporal 7430 instruction template. The class B instruction templates in FIG. 74B include: 1) within the no memory access 7405 instruction templates there is shown a no memory access, write mask control, partial round control type operation 7412 instruction template and a no memory access, write mask control, vsize type operation 7417 instruction template; and 2) within the memory access 7420 instruction templates there is shown a memory access, write mask control 7427 instruction template.

The generic vector friendly instruction format 7400 includes the following fields listed below in the order illustrated in FIGS. 74A-74B.

Format field 7440—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 7442—its content distinguishes different base operations.

Register index field 7444—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 7446—its content distinguishes occurrences of instructions in the generic vector instruction format that specify memory access from those that do not; that is, between no memory access 7405 instruction templates and memory access 7420 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 7450—its content distinguishes which one of a variety of different operations to be performed in addition to the base operation. This field is context specific. In one embodiment of the disclosure, this field is divided into a class field 7468, an alpha field 7452, and a beta field 7454. The augmentation operation field 7450 allows common groups of operations to be performed in a single instruction rather than 2, 3, or 4 instructions.

Scale field 7460—its content allows for the scaling of the index field's content for memory address generation (e.g., for address generation that uses $2^{scale}$*index+base).

Displacement Field 7462A—its content is used as part of memory address generation (e.g., for address generation that uses $2^{scale}$*index+base+displacement).

Displacement Factor Field 7462B (note that the juxtaposition of displacement field 7462A directly over displacement factor field 7462B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 7474 (described later herein) and the data manipulation field 7454C. The displacement field 7462A and the displacement factor field 7462B are optional in the sense that they are not used for the no memory access 7405 instruction templates and/or different embodiments may implement only one or none of the two.

Data element width field 7464—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 7470—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 7470 allows for partial vector operations, including loads, stores, arithmetic, logical, etc. While embodiments of the disclosure are described in which the write mask field's 7470 content selects one of a number of write mask registers that contains the write mask to be used (and thus the write mask field's 7470 content indirectly identifies that masking to be performed), alternative embodiments instead or additional allow the mask write field's 7470 content to directly specify the masking to be performed.

Immediate field 7472—its content allows for the specification of an immediate. This field is optional in the sense that is it not present in an implementation of the generic vector friendly format that does not support immediate and it is not present in instructions that do not use an immediate.

Class field 7468—its content distinguishes between different classes of instructions. With reference to FIGS. 74A-B, the contents of this field select between class A and class B instructions. In FIGS. 74A-B, rounded corner squares are used to indicate a specific value is present in a field (e.g., class A 7468A and class B 7468B for the class field 7468 respectively in FIGS. 74A-B).

Instruction Templates of Class A

In the case of the non-memory access 7408 instruction templates of class A, the alpha field 7452 is interpreted as an RS field 7452A, whose content distinguishes which one of the different augmentation operation types are to be performed (e.g., round 7452A.1 and data transform 7452A.2 are respectively specified for the no memory access, round type operation 7410 and the no memory access, data transform type operation 7415 instruction templates), while the beta field 7454 distinguishes which of the operations of the specified type is to be performed. In the no memory access 7405 instruction templates, the scale field 7460, the displacement field 7462A, and the displacement scale filed 7462B are not present.

No-Memory Access Instruction Templates—Full Round Control Type Operation

In the no memory access full round control type operation 7410 instruction template, the beta field 7454 is interpreted as a round control field 7454A, whose content(s) provide static rounding. While in the described embodiments of the disclosure the round control field 7454A includes a suppress all floating point exceptions (SAE) field 7456 and a round operation control field 7458, alternative embodiments may support may encode both these concepts into the same field or only have one or the other of these concepts/fields (e.g., may have only the round operation control field 7458).

SAE field 7456—its content distinguishes whether or not to disable the exception event reporting; when the SAE field's 7456 content indicates suppression is enabled, a given instruction does not report any kind of floating-point exception flag and does not raise any floating point exception handler.

Round operation control field 7458—its content distinguishes which one of a group of rounding operations to perform (e.g., Round-up, Round-down, Round-towards-zero and Round-to-nearest). Thus, the round operation control field 7458 allows for the changing of the rounding mode on a per instruction basis. In one embodiment of the disclosure where a processor includes a control register for specifying rounding modes, the round operation control field's 7450 content overrides that register value.

No Memory Access Instruction Templates—Data Transform Type Operation

In the no memory access data transform type operation 7415 instruction template, the beta field 7454 is interpreted as a data transform field 7454B, whose content distinguishes which one of a number of data transforms is to be performed (e.g., no data transform, swizzle, broadcast).

In the case of a memory access 7420 instruction template of class A, the alpha field 7452 is interpreted as an eviction hint field B, whose content distinguishes which one of the eviction hints is to be used (in FIG. 74A, temporal 7452B.1 and non-temporal 7452B.2 are respectively specified for the memory access, temporal 7425 instruction template and the memory access, non-temporal 7430 instruction template), while the beta field 7454 is interpreted as a data manipulation field 7454C, whose content distinguishes which one of a number of data manipulation operations (also known as primitives) is to be performed (e.g., no manipulation; broadcast; up conversion of a source; and down conversion of a destination). The memory access 7420 instruction templates include the scale field 7460, and optionally the displacement field 7462A or the displacement scale field 7462B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 7452 is interpreted as a write mask control (Z) field 7452C, whose content distinguishes whether the write masking controlled by the write mask field 7470 should be a merging or a zeroing.

In the case of the non-memory access 7405 instruction templates of class B, part of the beta field 7454 is interpreted as an RL field 7457A, whose content distinguishes which one of the different augmentation operation types are to be performed (e.g., round 7457A.1 and vector length (VSIZE) 7457A.2 are respectively specified for the no memory access, write mask control, partial round control type operation 7412 instruction template and the no memory access, write mask control, VSIZE type operation 7417 instruction template), while the rest of the beta field 7454 distinguishes which of the operations of the specified type is to be performed. In the no memory access 7405 instruction templates, the scale field 7460, the displacement field 7462A, and the displacement scale filed 7462B are not present.

In the no memory access, write mask control, partial round control type operation 7410 instruction template, the rest of the beta field 7454 is interpreted as a round operation field 7459A and exception event reporting is disabled (a given instruction does not report any kind of floating-point exception flag and does not raise any floating point exception handler).

Round operation control field 7459A—just as round operation control field 5458, its content distinguishes which one of a group of rounding operations to perform (e.g., Round-up, Round-down, Round-towards-zero and Round-to-nearest). Thus, the round operation control field 7459A allows for the changing of the rounding mode on a per instruction basis. In one embodiment of the disclosure where a processor includes a control register for specifying rounding modes, the round operation control field's 7450 content overrides that register value.

In the no memory access, write mask control, VSIZE type operation 7417 instruction template, the rest of the beta field 7454 is interpreted as a vector length field 7459B, whose content distinguishes which one of a number of data vector lengths is to be performed on (e.g., 128, 256, or 512 byte).

In the case of a memory access 7420 instruction template of class B, part of the beta field 7454 is interpreted as a broadcast field 7457B, whose content distinguishes whether or not the broadcast type data manipulation operation is to be performed, while the rest of the beta field 7454 is interpreted the vector length field 7459B. The memory access 7420 instruction templates include the scale field 7460, and optionally the displacement field 7462A or the displacement scale field 7462B.

With regard to the generic vector friendly instruction format 7400, a full opcode field 7474 is shown including the format field 7440, the base operation field 7442, and the data element width field 7464. While one embodiment is shown where the full opcode field 7474 includes all of these fields, the full opcode field 7474 includes less than all of these fields in embodiments that do not support all of them. The full opcode field 7474 provides the operation code (opcode).

The augmentation operation field 7450, the data element width field 7464, and the write mask field 7470 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 75 is a block diagram illustrating an exemplary specific vector friendly instruction format according to embodiments of the disclosure. FIG. 75 shows a specific vector friendly instruction format 7500 that is specific in the sense that it specifies the location, size, interpretation, and order of the fields, as well as values for some of those fields. The specific vector friendly instruction format 7500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 74 into which the fields from FIG. 75 map are illustrated.

It should be understood that, although embodiments of the disclosure are described with reference to the specific vector friendly instruction format 7500 in the context of the generic vector friendly instruction format 7400 for illustrative purposes, the disclosure is not limited to the specific vector friendly instruction format 7500 except where claimed. For example, the generic vector friendly instruction format 7400 contemplates a variety of possible sizes for the various fields, while the specific vector friendly instruction format 7500 is shown as having fields of specific sizes. By way of specific example, while the data element width field 7464 is illustrated as a one bit field in the specific vector friendly instruction format 7500, the disclosure is not so limited (that is, the generic vector friendly instruction format 7400 contemplates other sizes of the data element width field 7464).

The generic vector friendly instruction format 7400 includes the following fields listed below in the order illustrated in FIG. 75A.

EVEX Prefix (Bytes 0-3) 7502—is encoded in a four-byte form.

Format Field 7440 (EVEX Byte 0, bits [7:0])—the first byte (EVEX Byte 0) is the format field 7440 and it contains 0x62 (the unique value used for distinguishing the vector friendly instruction format in one embodiment of the disclosure).

The second-fourth bytes (EVEX Bytes 1-3) include a number of bit fields providing specific capability.

REX field 7505 (EVEX Byte 1, bits [7-5])—consists of a EVEX.R bit field (EVEX Byte 1, bit [7]-R), EVEX.X bit field (EVEX byte 1, bit [6]-X), and 5457BEX byte 1, bit[5]-B). The EVEX.R, EVEX.X, and EVEX.B bit fields provide the same functionality as the corresponding VEX bit fields, and are encoded using is complement form, i.e. ZMMO is encoded as 2911B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 5410—this is the first part of the REX' field 5410 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 7515 (EVEX byte 1, bits [3:0]-mmmm)—its content encodes an implied leading opcode byte (OF, OF 38, or OF 3).

Data element width field 7464 (EVEX byte 2, bit [7]-W)—is represented by the notation EVEX.W. EVEX.W is used to define the granularity (size) of the datatype (either 32-bit data elements or 64-bit data elements).

EVEX.vvvv 7520 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 2911b. Thus, EVEX.vvvv field 7520 encodes the 4 low-order bits of the first source register specifier stored in inverted (1s complement) form. Depending on the instruction, an extra different EVEX bit field is used to extend the specifier size to 32 registers.

EVEX.U 7468 Class field (EVEX byte 2, bit [2]-U)—If EVEX.0=0, it indicates class A or EVEX.U0; if EVEX.0=1, it indicates class B or EVEX.U1.

Prefix encoding field 7525 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 7452 (EVEX byte 3, bit [7]-EH; also known as EVEX.EH, EVEX.rs, EVEX.RL, EVEX.write mask control, and EVEX.N; also illustrated with a)—as previously described, this field is context specific.

Beta field 7454 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 7410—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 7470 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 7530 (Byte 4) is also known as the opcode byte. Part of the opcode is specified in this field.

MOD R/M Field 7540 (Byte 5) includes MOD field 7542, Reg field 7544, and R/M field 7546. As previously described, the MOD field's 7542 content distinguishes between memory access and non-memory access operations. The role of Reg field 7544 can be summarized to two situations: encoding either the destination register operand or a source register operand, or be treated as an opcode extension and not used to encode any instruction operand. The role of R/M field 7546 may include the following: encoding the instruction operand that references a memory address, or encoding either the destination register operand or a source register operand.

Scale, Index, Base (SIB) Byte (Byte 6)—As previously described, the scale field's 7450 content is used for memory address generation. SIB.xxx 7554 and SIB.bbb 7556—the contents of these fields have been previously referred to with regard to the register indexes Xxxx and Bbbb.

Displacement field 7462A (Bytes 7-10)—when MOD field 7542 contains 10, bytes 7-10 are the displacement field 7462A, and it works the same as the legacy 32-bit displacement (disp32) and works at byte granularity.

Displacement factor field 7462B (Byte 7)—when MOD field 7542 contains 01, byte 7 is the displacement factor field 7462B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 7462B is a reinterpretation of disp8; when using displacement factor field 7462B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 7462B substitutes the legacy x86 instruction set 8-bit displacement. Thus, the displacement factor field 7462B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 7472 operates as previously described.

Full Opcode Field

FIG. 75B is a block diagram illustrating the fields of the specific vector friendly instruction format 7500 that make up the full opcode field 7474 according to one embodiment of the disclosure. Specifically, the full opcode field 7474 includes the format field 7440, the base operation field 7442, and the data element width (W) field 7464. The base operation field 7442 includes the prefix encoding field 7525, the opcode map field 7515, and the real opcode field 7530.

Register Index Field

FIG. 75C is a block diagram illustrating the fields of the specific vector friendly instruction format 7500 that make up the register index field 7444 according to one embodiment of the disclosure. Specifically, the register index field 7444 includes the REX field 7505, the REX' field 7510, the MODR/M.reg field 7544, the MODR/M.r/m field 7546, the VVVV field 7520, xxx field 7554, and the bbb field 7556.

Augmentation Operation Field

Figure 75D:
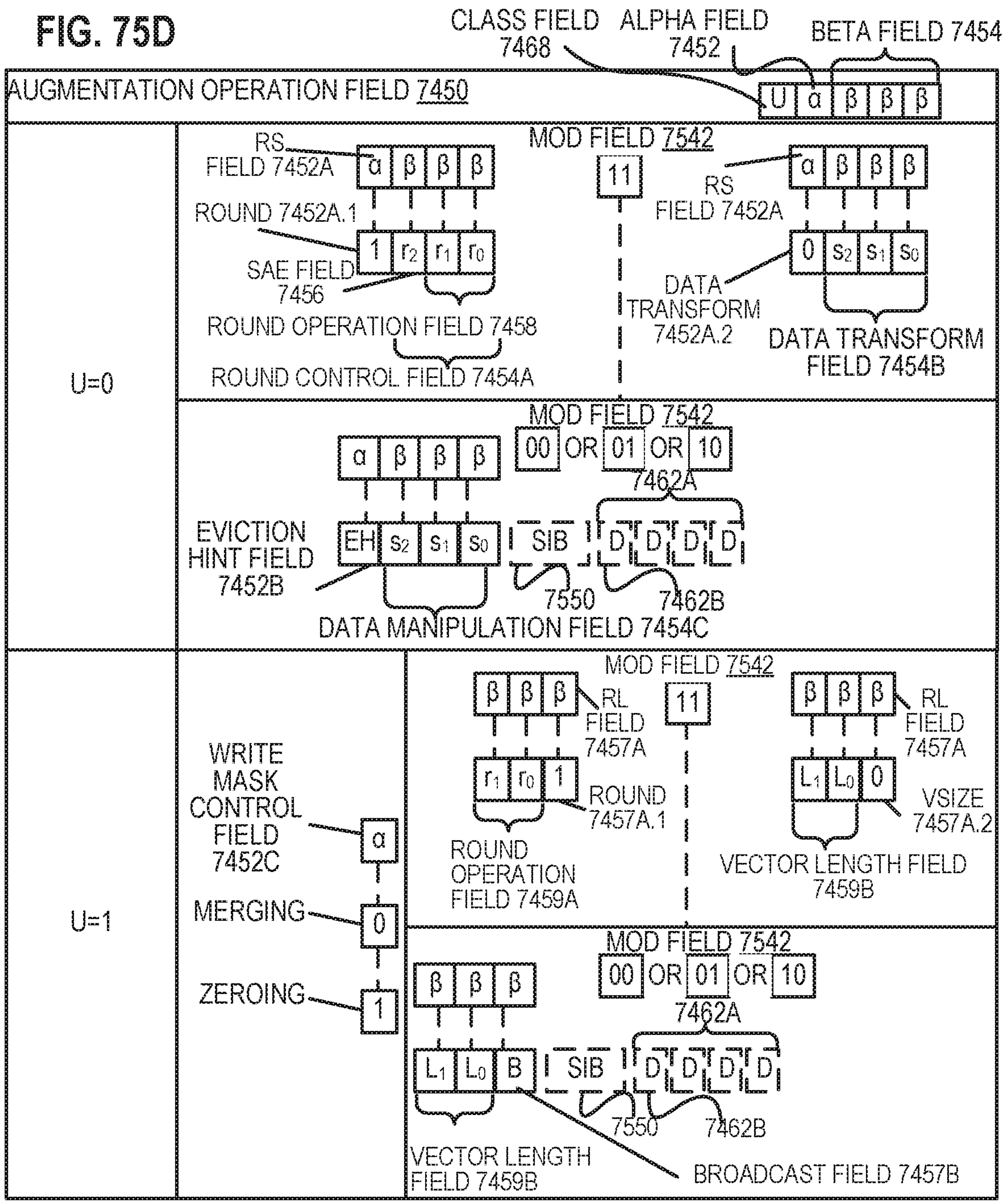
FIG. 75D is a block diagram illustrating the fields of the specific vector friendly instruction format in FIG. 55A that make up the augmentation operation field 5450 according to one embodiment of the disclosure.

FIG. 75D is a block diagram illustrating the fields of the specific vector friendly instruction format 7500 that make up the augmentation operation field 7450 according to one embodiment of the disclosure. When the class (U) field 7468 contains 0, it signifies EVEX.U0 (class A 7468A); when it contains 1, it signifies EVEX.U1 (class B 7468B). When U=0 and the MOD field 7542 contains 11 (signifying a no memory access operation), the alpha field 7452 (EVEX byte 3, bit [7]-EH) is interpreted as the rs field 7452A. When the rs field 7452A contains a 1 (round 7452A.1), the beta field 7454 (EVEX byte 3, bits [6:4]-SSS) is interpreted as the round control field 7454A. The round control field 7454A includes a one bit SAE field 7456 and a two bit round operation field 7458. When the rs field 7452A contains a 0 (data transform 7452A.2), the beta field 7454 (EVEX byte 3, bits [6:4]-SSS) is interpreted as a three bit data transform field 7454B. When U=0 and the MOD field 7542 contains 00, 01, or 10 (signifying a memory access operation), the alpha field 7452 (EVEX byte 3, bit [7]-EH) is interpreted as the eviction hint (EH) field 7452B and the beta field 7454 (EVEX byte 3, bits [6:4]-SSS) is interpreted as a three bit data manipulation field 7454C.

When U=1, the alpha field 7452 (EVEX byte 3, bit [7]-EH) is interpreted as the write mask control (Z) field 7452C. When U=1 and the MOD field 7542 contains 11 (signifying a no memory access operation), part of the beta field 7454 (EVEX byte 3, bit [4]-$S_0$) is interpreted as the RL field 7457A; when it contains a 1 (round 7457A.1) the rest of the beta field 7454 (EVEX byte 3, bit [6-5]-$S_{2-1}$) is interpreted as the round operation field 7459A, while when the RL field 7457A contains a 0 (VSIZE 7457.A2) the rest of the beta field 7454 (EVEX byte 3, bit [6-5]-$S_{2-1}$) is interpreted as the vector length field 7459B (EVEX byte 3, bit [6-5]-$L_{1-0}$). When U=1 and the MOD field 7542 contains 00, 01, or 10 (signifying a memory access operation), the beta field 7454 (EVEX byte 3, bits [6:4]-SSS) is interpreted as the vector length field 7459B (EVEX byte 3, bit [6-5]-$L_{1-0}$) and the broadcast field 7457B (EVEX byte 3, bit [4]-B).

Exemplary Register Architecture

Figure 76:
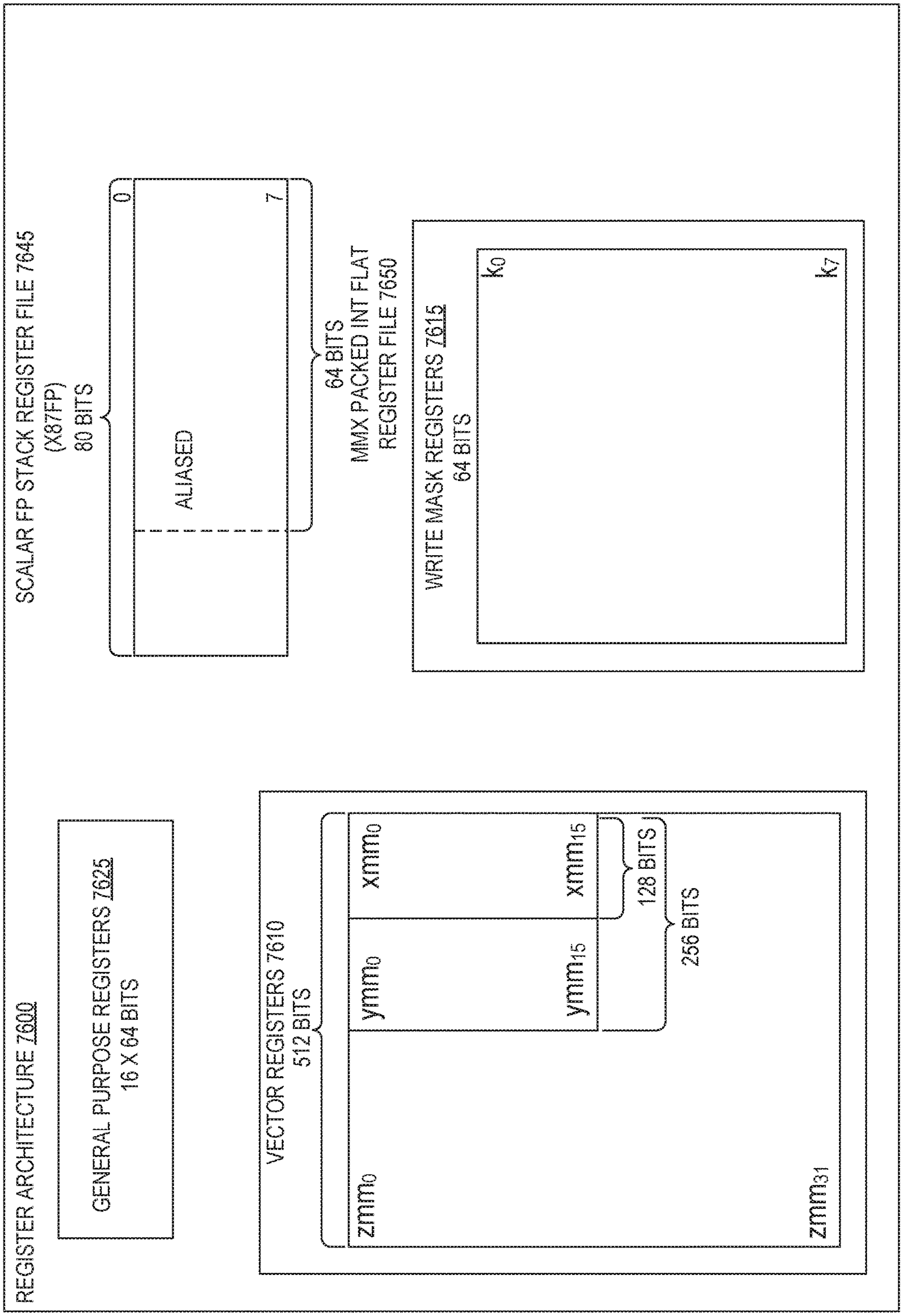
FIG. 76 is a block diagram of a register architecture according to one embodiment of the disclosure

FIG. 76 is a block diagram of a register architecture 7600 according to one embodiment of the disclosure. In the embodiment illustrated, there are 32 vector registers 7610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 7500 operates on these overlaid register file as illustrated in the below tables.

| Adjustable Vector Length | Class | Operations | Registers |
|---|---|---|---|
| Instruction Templates that do not include the vector length field 7459B | A (FIG. 74A; U = 0) | 7410, 7415, 7425, 7430 | zmm registers (the vector length is 64 byte) |
| | B (FIG. 74B; U = 1) | 7412 | zmm registers (the vector length is 64 byte) |
| Instruction templates that do include the vector length field 7459B | B (FIG. 74B; U = 1) | 7417, 7427 | zmm, ymm, or xmm registers (the vector length is 64 byte, 32 byte, or 16 byte) depending on the vector length field 7459B |

In other words, the vector length field 7459B selects between a maximum length and one or more other shorter lengths, where each such shorter length is half the length of the preceding length; and instructions templates without the vector length field 7459B operate on the maximum vector length. Further, in one embodiment, the class B instruction templates of the specific vector friendly instruction format 7500 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 7615—in the embodiment illustrated, there are 8 write mask registers (k0 through k7), each 64 bits in size. In an alternate embodiment, the write mask registers 7615 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 7625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 7645, on which is aliased the MMX packed integer flat register file 7650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 77A is a block diagram illustrating both an exemplary in-order pipeline and an exemplary register renaming, out-of-order issue/execution pipeline according to embodiments of the disclosure. FIG. 77B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 77A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 77A, a processor pipeline 7700 includes a fetch stage 7702, a length decode stage 7704, a decode stage 7706, an allocation stage 7708, a renaming stage 7710, a scheduling (also known as a dispatch or issue) stage 7712, a register read/memory read stage 7714, an execute stage 7716, a write back/memory write stage 7718, an exception handling stage 7722, and a commit stage 7724.

FIG. 77B shows processor core 7790 including a front end unit 7730 coupled to an execution engine unit 7750, and both are coupled to a memory unit 7770. The core 7790 may be a reduced instruction set computing (RISC) core, a complex instruction set computing (CISC) core, a very long instruction word (VLIW) core, or a hybrid or alternative core type. As yet another option, the core 7790 may be a special-purpose core, such as, for example, a network or communication core, compression engine, coprocessor core, general purpose computing graphics processing unit (GPGPU) core, graphics core, or the like.

The front end unit 7730 includes a branch prediction unit 7732 coupled to an instruction cache unit 7734, which is coupled to an instruction translation lookaside buffer (TLB) 7736, which is coupled to an instruction fetch unit 7738, which is coupled to a decode unit 7740. The decode unit 7740 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 7740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 7790 includes a microcode ROM or other medium that stores microcode for certain macro-instructions (e.g., in decode unit 7740 or otherwise within the front end unit 7730). The decode unit 7740 is coupled to a rename/allocator unit 7752 in the execution engine unit 7750.

The execution engine unit 7750 includes the rename/allocator unit 7752 coupled to a retirement unit 7754 and a set of one or more scheduler unit(s) 7756. The scheduler unit(s) 7756 represents any number of different schedulers, including reservations stations, central instruction window, etc. The scheduler unit(s) 7756 is coupled to the physical register file(s) unit(s) 7758. Each of the physical register file(s) units 7758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 7758 comprises a vector registers unit, a write mask registers unit, and a scalar registers unit. These register units may provide architectural vector registers, vector mask registers, and general purpose registers. The physical register file(s) unit(s) 7758 is overlapped by the retirement unit 7754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 7754 and the physical register file(s) unit(s) 7758 are coupled to the execution cluster(s) 7760. The execution cluster(s) 7760 includes a set of one or more execution units 7762 and a set of one or more memory access units 7764. The execution units 7762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 7756, physical register file(s) unit(s) 7758, and execution cluster(s) 7760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 7764). It should also be understood that where separate pipelines are used, one or more of these pipelines may be out-of-order issue/execution and the rest in-order.

The set of memory access units 7764 is coupled to the memory unit 7770, which includes a data TLB unit 7770 coupled to a data cache unit 7774 coupled to a level 2 (L2) cache unit 7776. In one exemplary embodiment, the memory access units 7764 may include a load unit, a store address unit, and a store data unit, each of which is coupled to the data TLB unit 7772 in the memory unit 7770. The instruction cache unit 7734 is further coupled to a level 2 (L2) cache unit 7776 in the memory unit 7770. The L2 cache unit 7776 is coupled to one or more other levels of cache and eventually to a main memory.

By way of example, the exemplary register renaming, out-of-order issue/execution core architecture may implement the pipeline 7700 as follows: 1) the instruction fetch 7738 performs the fetch and length decoding stages 7702 and 7704; 2) the decode unit 7740 performs the decode stage 7706; 3) the rename/allocator unit 7752 performs the allocation stage 7708 and renaming stage 7710; 4) the scheduler unit(s) 7756 performs the schedule stage 7712; 5) the physical register file(s) unit(s) 7758 and the memory unit 7770 perform the register read/memory read stage 7714; the execution cluster 7760 perform the execute stage 7716; 6) the memory unit 7770 and the physical register file(s) unit(s) 7758 perform the write back/memory write stage 7718; 7) various units may be involved in the exception handling stag 7722; and 8) the retirement unit 7754 and the physical register file(s) unit(s) 7758 perform the commit stage 7724.

The core 7790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 7790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 7734/7774 and a shared L2 cache unit 7776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 78B:
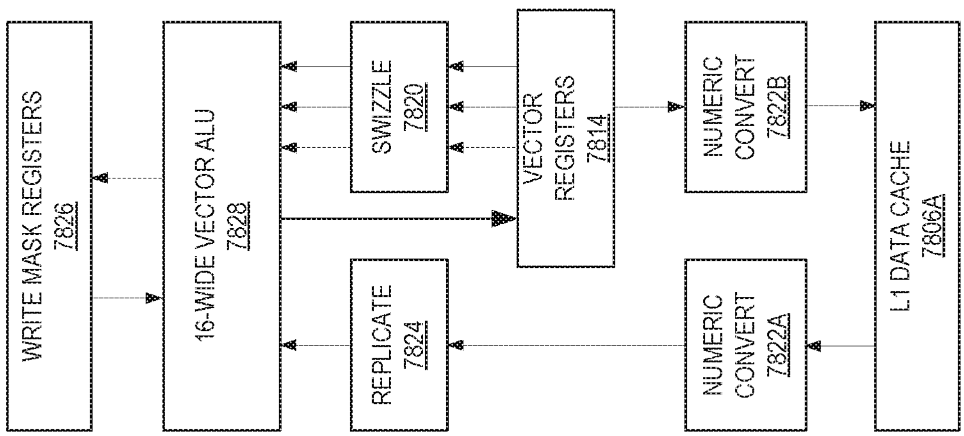
FIG. 78B is an expanded view of part of the processor core in FIG. 58A according to embodiments of the disclosure.
Figure 78A:
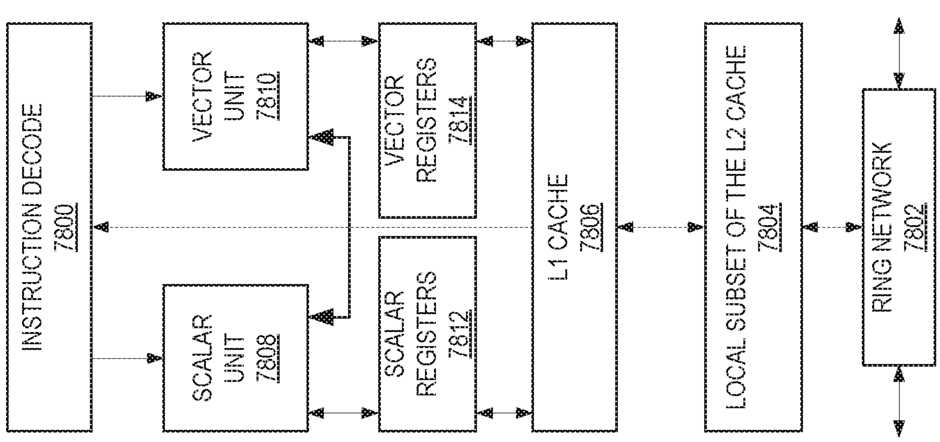
FIG. 78A is a block diagram of a single processor core, along with its connection to the on-die interconnect network and with its local subset of the Level 2 (L2) cache, according to embodiments of the disclosure.

FIGS. 78A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 78A is a block diagram of a single processor core, along with its connection to the on-die interconnect network 7802 and with its local subset of the Level 2 (L2) cache 7804, according to embodiments of the disclosure. In one embodiment, an instruction decode unit 7800 supports the x86 instruction set with a packed data instruction set extension. An L1 cache 7806 allows low-latency accesses to cache memory into the scalar and vector units. While in one embodiment (to simplify the design), a scalar unit 7808 and a vector unit 7810 use separate register sets (respectively, scalar registers 7812 and vector registers 7814) and data transferred between them is written to memory and then read back in from a level 1 (L1) cache 7806, alternative embodiments of the disclosure may use a different approach (e.g., use a single register set or include a communication path that allow data to be transferred between the two register files without being written and read back).

The local subset of the L2 cache 7804 is part of a global L2 cache that is divided into separate local subsets, one per processor core. Each processor core has a direct access path to its own local subset of the L2 cache 7804. Data read by a processor core is stored in its L2 cache subset 7804 and can be accessed quickly, in parallel with other processor cores accessing their own local L2 cache subsets. Data written by a processor core is stored in its own L2 cache subset 7804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 78B is an expanded view of part of the processor core in FIG. 78A according to embodiments of the disclosure. FIG. 78B includes an L1 data cache 7806A part of the L1 cache 7804, as well as more detail regarding the vector unit 7810 and the vector registers 7814. Specifically, the vector unit 7810 is a 16-wide vector processing unit (VPU) (see the 16-wide ALU 7828), which executes one or more of integer, single-precision float, and double-precision float instructions. The VPU supports swizzling the register inputs with swizzle unit 7820, numeric conversion with numeric convert units 7822A-B, and replication with replication unit 7824 on the memory input. Write mask registers 7826 allow predicating resulting vector writes.

Figure 79:
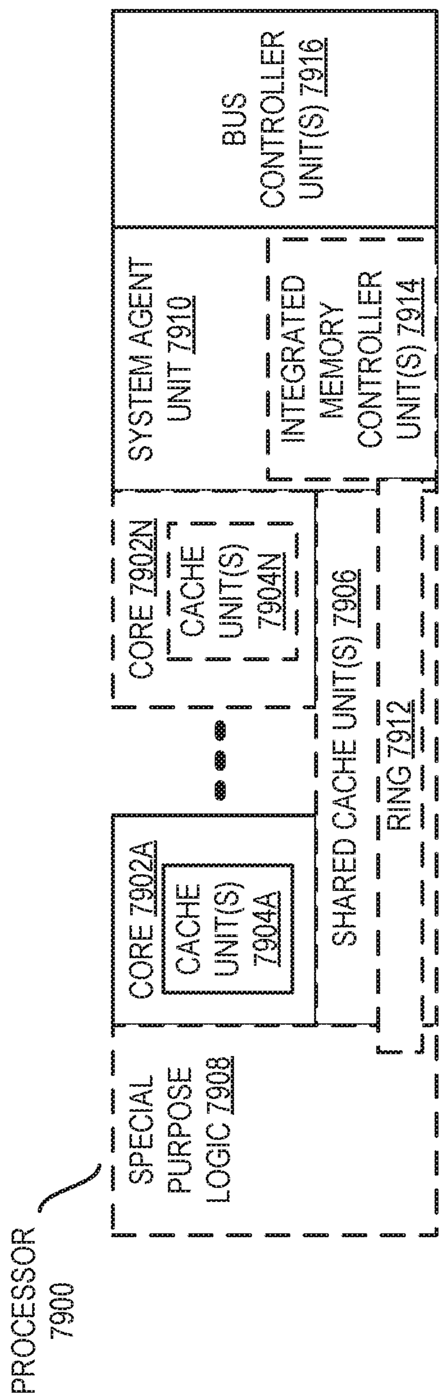
FIG. 79 is a block diagram of a processor that may have more than one core, may have an integrated memory controller, and may have integrated graphics according to embodiments of the disclosure.

FIG. 79 is a block diagram of a processor 7900 that may have more than one core, may have an integrated memory controller, and may have integrated graphics according to embodiments of the disclosure. The solid lined boxes in FIG. 79 illustrate a processor 7900 with a single core 7902A, a system agent 7910, a set of one or more bus controller units 7916, while the optional addition of the dashed lined boxes illustrates an alternative processor 7900 with multiple cores 7902A-N, a set of one or more integrated memory controller unit(s) 7914 in the system agent unit 7910, and special purpose logic 7908.

Thus, different implementations of the processor 7900 may include: 1) a CPU with the special purpose logic 7908 being integrated graphics and/or scientific (throughput) logic (which may include one or more cores), and the cores 7902A-N being one or more general purpose cores (e.g., general purpose in-order cores, general purpose out-of-order cores, a combination of the two); 2) a coprocessor with the cores 7902A-N being a large number of special purpose cores intended primarily for graphics and/or scientific (throughput); and 3) a coprocessor with the cores 7902A-N being a large number of general purpose in-order cores. Thus, the processor 7900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 7900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 7906, and external memory (not shown) coupled to the set of integrated memory controller units 7914. The set of shared cache units 7906 may include one or more mid-level caches, such as level 2 (L2), level 3 (L3), level 4 (L4), or other levels of cache, a last level cache (LLC), and/or combinations thereof. While in one embodiment a ring based interconnect unit 7912 interconnects the integrated graphics logic 7908, the set of shared cache units 7906, and the system agent unit 7910/integrated memory controller unit(s) 7914, alternative embodiments may use any number of well-known techniques for interconnecting such units. In one embodiment, coherency is maintained between one or more cache units 7906 and cores 7902-A-N.

In some embodiments, one or more of the cores 7902A-N are capable of multi-threading. The system agent 7910 includes those components coordinating and operating cores 7902A-N. The system agent unit 7910 may include for example a power control unit (PCU) and a display unit. The PCU may be or include logic and components needed for regulating the power state of the cores 7902A-N and the integrated graphics logic 7908. The display unit is for driving one or more externally connected displays.

The cores 7902A-N may be homogenous or heterogeneous in terms of architecture instruction set; that is, two or more of the cores 7902A-N may be capable of execution the same instruction set, while others may be capable of executing only a subset of that instruction set or a different instruction set.

Exemplary Computer Architectures

FIGS. 80-83 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 80:
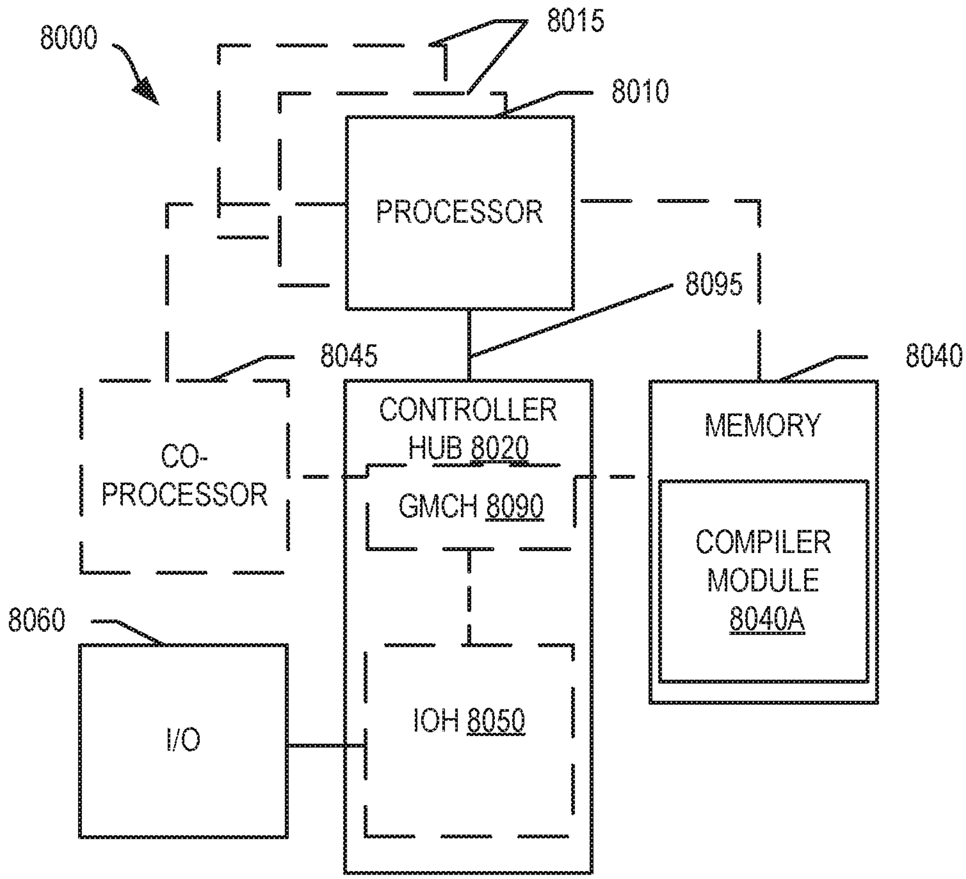
FIG. 80 is a block diagram of a system in accordance with one embodiment of the present disclosure.

Referring now to FIG. 80, shown is a block diagram of a system 8000 in accordance with one embodiment of the present disclosure. The system 8000 may include one or more processors 8010, 8015, which are coupled to a controller hub 8020. In one embodiment the controller hub 8020 includes a graphics memory controller hub (GMCH) 8090 and an Input/Output Hub (IOH) 8050 (which may be on separate chips); the GMCH 8090 includes memory and graphics controllers to which are coupled memory 8040 and a coprocessor 8045; the IOH 8050 is couples input/output (I/O) devices 8060 to the GMCH 8090. Alternatively, one or both of the memory and graphics controllers are integrated within the processor (as described herein), the memory 8040 and the coprocessor 8045 are coupled directly to the processor 8010, and the controller hub 8020 in a single chip with the IOH 8050. Memory 8040 may include a compiler moudle 8040A, for example, to store code that when executed causes a processor to perform any method of this disclosure.

The optional nature of additional processors 8015 is denoted in FIG. 80 with broken lines. Each processor 8010, 8015 may include one or more of the processing cores described herein and may be some version of the processor 7900.

The memory 8040 may be, for example, dynamic random access memory (DRAM), phase change memory (PCM), or a combination of the two. For at least one embodiment, the controller hub 8020 communicates with the processor(s) 8010, 8015 via a multi-drop bus, such as a frontside bus (FSB), point-to-point interface such as QuickPath Interconnect (QPI), or similar connection 8095.

In one embodiment, the coprocessor 8045 is a special-purpose processor, such as, for example, a high-throughput MIC processor, a network or communication processor, compression engine, graphics processor, GPGPU, embedded processor, or the like. In one embodiment, controller hub 8020 may include an integrated graphics accelerator.

There can be a variety of differences between the physical resources 8010, 8015 in terms of a spectrum of metrics of merit including architectural, microarchitectural, thermal, power consumption characteristics, and the like.

In one embodiment, the processor 8010 executes instructions that control data processing operations of a general type. Embedded within the instructions may be coprocessor instructions. The processor 8010 recognizes these coprocessor instructions as being of a type that should be executed by the attached coprocessor 8045. Accordingly, the processor 8010 issues these coprocessor instructions (or control signals representing coprocessor instructions) on a coprocessor bus or other interconnect, to coprocessor 8045. Coprocessor(s) 8045 accept and execute the received coprocessor instructions.

Figure 81:
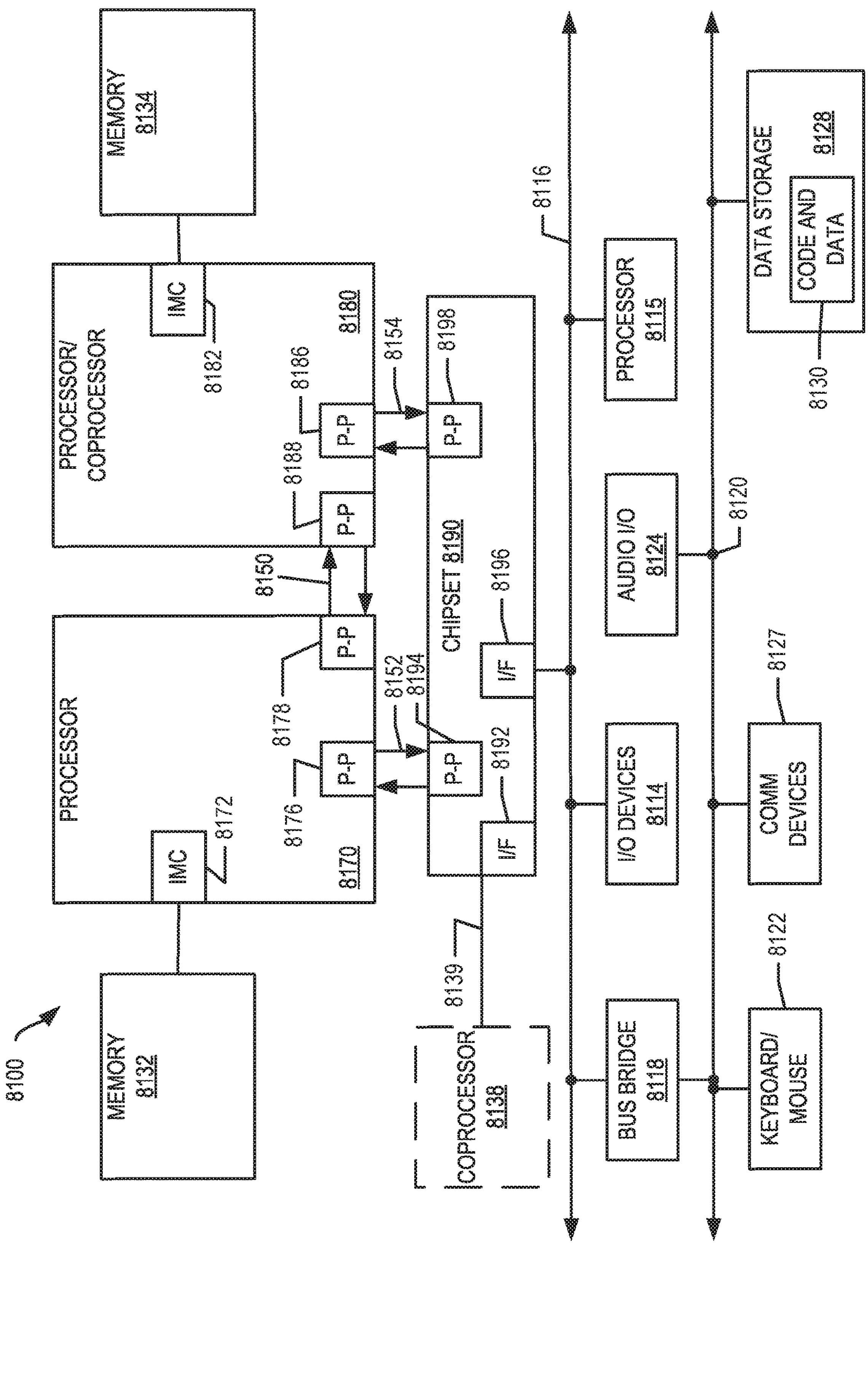
FIG. 81 is a block diagram of a more specific exemplary system in accordance with an embodiment of the present disclosure.

Referring now to FIG. 81, shown is a block diagram of a first more specific exemplary system 8100 in accordance with an embodiment of the present disclosure. As shown in FIG. 81, multiprocessor system 8100 is a point-to-point interconnect system, and includes a first processor 8170 and a second processor 8180 coupled via a point-to-point interconnect 8150. Each of processors 8170 and 8180 may be some version of the processor 7900. In one embodiment of the disclosure, processors 8170 and 8180 are respectively processors 8010 and 8015, while coprocessor 8138 is coprocessor 8045. In another embodiment, processors 8170 and 8180 are respectively processor 8010 coprocessor 8045.

Processors 8170 and 8180 are shown including integrated memory controller (IMC) units 8172 and 8182, respectively. Processor 8170 also includes as part of its bus controller units point-to-point (P-P) interfaces 8176 and 8178; similarly, second processor 8180 includes P-P interfaces 8186 and 8188. Processors 8170, 8180 may exchange information via a point-to-point (P-P) interface 8150 using P-P interface circuits 8178, 8188. As shown in FIG. 81, IMCs 8172 and 8182 couple the processors to respective memories, namely a memory 8132 and a memory 8134, which may be portions of main memory locally attached to the respective processors.

Processors 8170, 8180 may each exchange information with a chipset 8190 via individual P-P interfaces 8152, 8154 using point to point interface circuits 8176, 8194, 8186, 8198. Chipset 8190 may optionally exchange information with the coprocessor 8138 via a high-performance interface 8139. In one embodiment, the coprocessor 8138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 8190 may be coupled to a first bus 8116 via an interface 8196. In one embodiment, first bus 8116 may be a Peripheral Component Interconnect (PCI) bus, or a bus such as a PCI Express bus or another third generation I/O interconnect bus, although the scope of the present disclosure is not so limited.

As shown in FIG. 81, various I/O devices 8114 may be coupled to first bus 8116, along with a bus bridge 8118 which couples first bus 8116 to a second bus 8120. In one embodiment, one or more additional processor(s) 8115, such as coprocessors, high-throughput MIC processors, GPGPU's, accelerators (such as, e.g., graphics accelerators or digital signal processing (DSP) units), field programmable gate arrays, or any other processor, are coupled to first bus 8116. In one embodiment, second bus 8120 may be a low pin count (LPC) bus. Various devices may be coupled to a second bus 8120 including, for example, a keyboard and/or mouse 8122, communication devices 8127 and a storage unit 8128 such as a disk drive or other mass storage device which may include instructions/code and data 8130, in one embodiment. Further, an audio I/O 8124 may be coupled to the second bus 8120. Note that other architectures are possible. For example, instead of the point-to-point architecture of FIG. 81, a system may implement a multi-drop bus or other such architecture.

Figure 82:
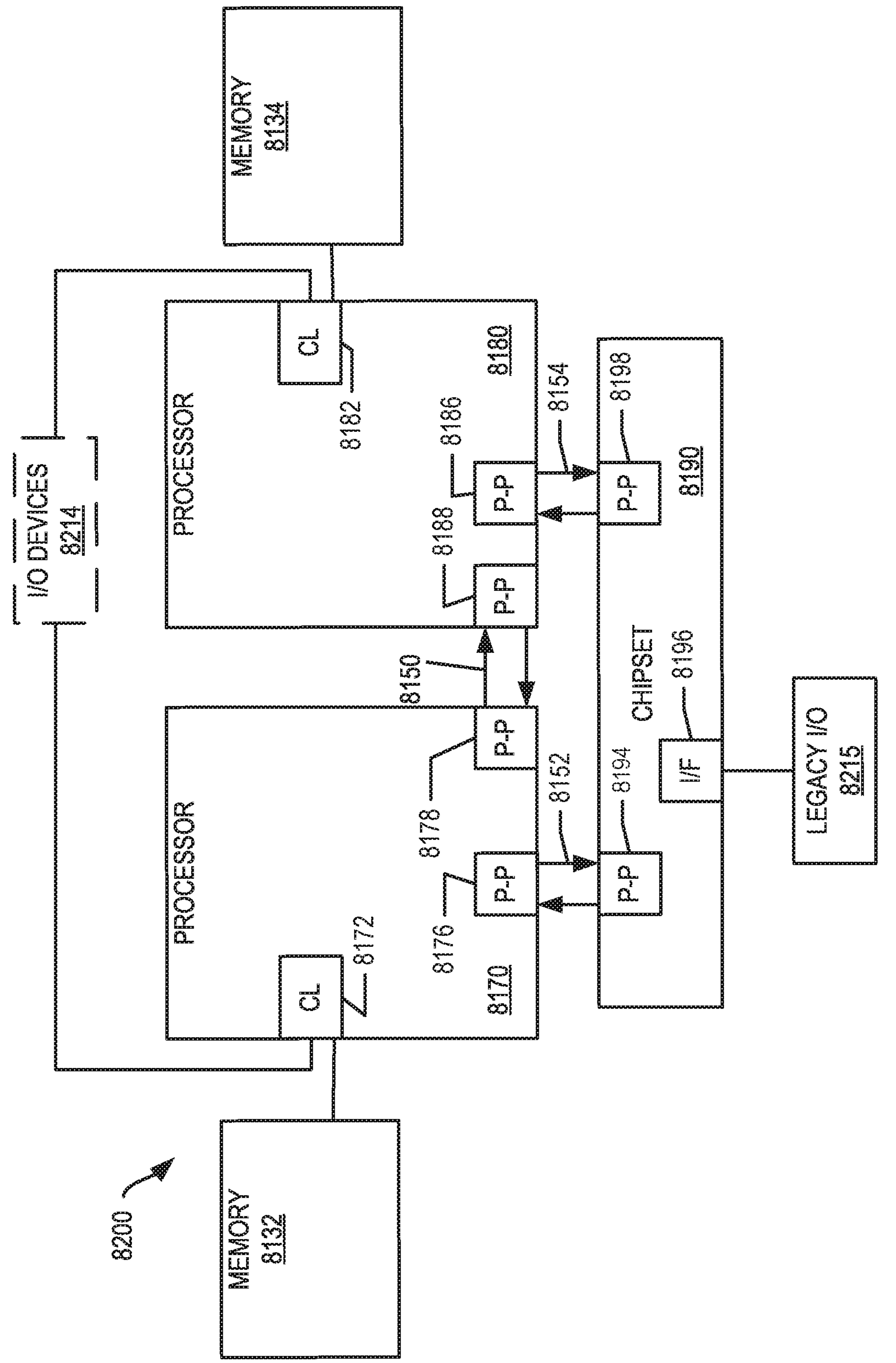
FIG. 82, shown is a block diagram of a second more specific exemplary system in accordance with an embodiment of the present disclosure.

Referring now to FIG. 82, shown is a block diagram of a second more specific exemplary system 8200 in accordance with an embodiment of the present disclosure Like elements in FIGS. 81 and 82 bear like reference numerals, and certain aspects of FIG. 81 have been omitted from FIG. 82 in order to avoid obscuring other aspects of FIG. 82.

FIG. 82 illustrates that the processors 8170, 8180 may include integrated memory and I/O control logic ("CL") 8172 and 8182, respectively. Thus, the CL 8172, 8182 include integrated memory controller units and include I/O control logic. FIG. 82 illustrates that not only are the memories 8132, 8134 coupled to the CL 8172, 8182, but also that I/O devices 8214 are also coupled to the control logic 8172, 8182. Legacy I/O devices 8215 are coupled to the chipset 8190.

Figure 83:
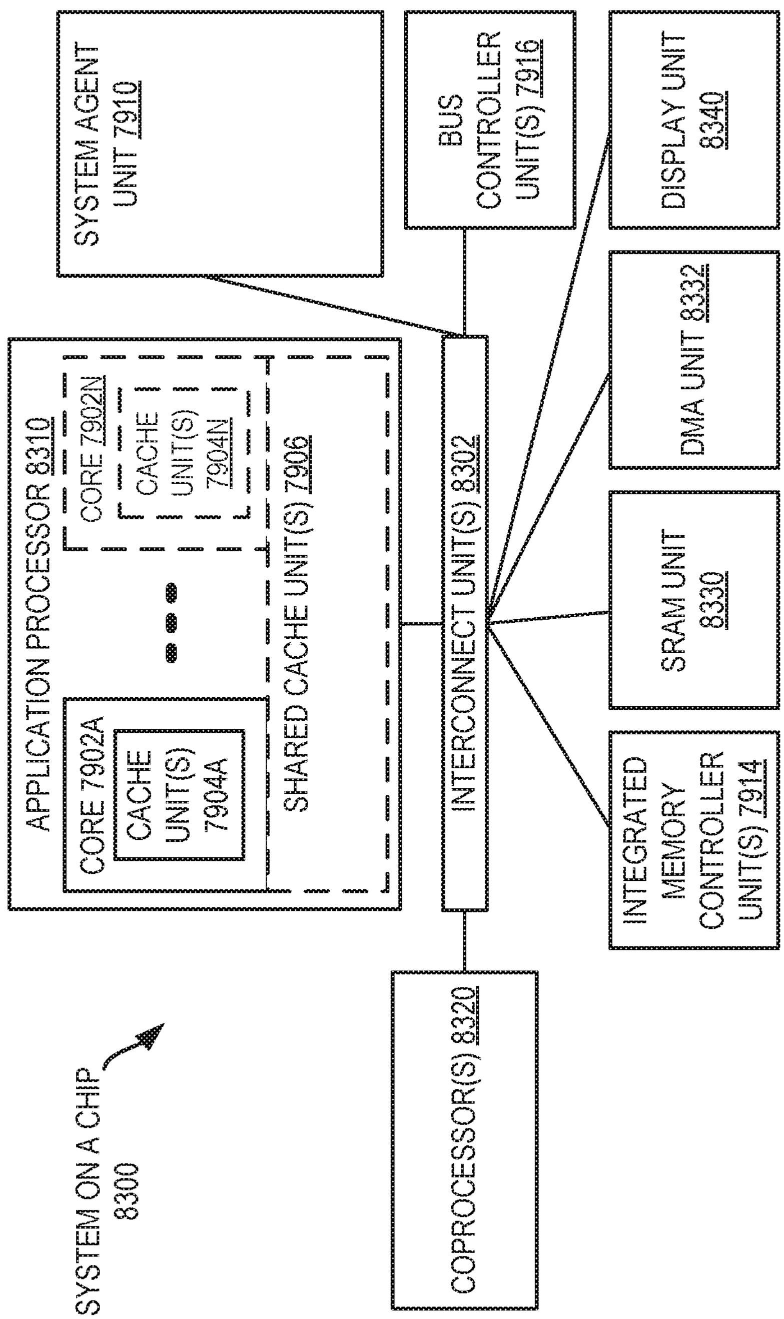
FIG. 83, shown is a block diagram of a system on a chip (SoC) in accordance with an embodiment of the present disclosure.

Referring now to FIG. 83, shown is a block diagram of a SoC 8300 in accordance with an embodiment of the present disclosure. Similar elements in FIG. 79 bear like reference numerals. Also, dashed lined boxes are optional features on more advanced SoCs. In FIG. 83, an interconnect unit(s) 8302 is coupled to: an application processor 8310 which includes a set of one or more cores 202A-N and shared cache unit(s) 7906; a system agent unit 7910; a bus controller unit(s) 7916; an integrated memory controller unit(s) 7914; a set or one or more coprocessors 8320 which may include integrated graphics logic, an image processor, an audio processor, and a video processor; an static random access memory (SRAM) unit 8330; a direct memory access (DMA) unit 8332; and a display unit 8340 for coupling to one or more external displays. In one embodiment, the coprocessor(s) 8320 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 8130 illustrated in FIG. 81, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 84:
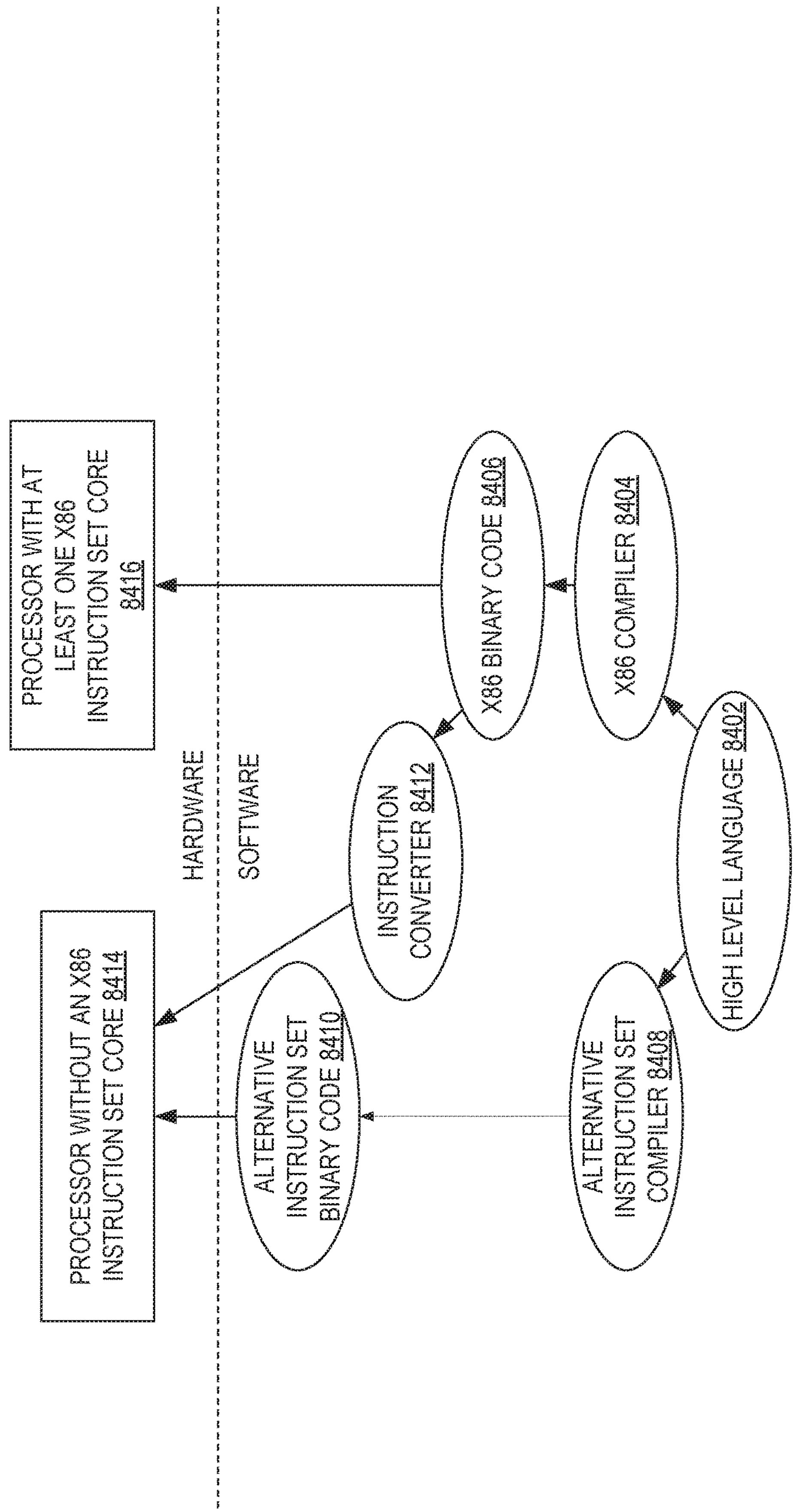
FIG. 84 is a block diagram contrasting the use of a software instruction converter to convert binary instructions in a source instruction set to binary instructions in a target instruction set according to embodiments of the disclosure.

FIG. 84 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 84 shows a program in a high level language 8402 may be compiled using an x86 compiler 8404 to generate x86 binary code 8406 that may be natively executed by a processor with at least one x86 instruction set core 8416. The processor with at least one x86 instruction set core 8416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 8404 represents a compiler that is operable to generate x86 binary code 8406 (e.g., object code) that can, with or without additional linkage processing, be executed on the processor with at least one x86 instruction set core 8416. Similarly, FIG. 84 shows the program in the high level language 8402 may be compiled using an alternative instruction set compiler 8408 to generate alternative instruction set binary code 8410 that may be natively executed by a processor without at least one x86 instruction set core 8414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 8412 is used to convert the x86 binary code 8406 into code that may be natively executed by the processor without an x86 instruction set core 8414. This converted code is not likely to be the same as the alternative instruction set binary code 8410 because an instruction converter capable of this is difficult to make; however, the converted code will accomplish the general operation and be made up of instructions from the alternative instruction set. Thus, the instruction converter 8412 represents software, firmware, hardware, or a combination thereof that, through emulation, simulation or any other process, allows a processor or other electronic device that does not have an x86 instruction set processor or core to execute the x86 binary code 8406.

What is claimed is:

1. An apparatus comprising:

a first tile and a second tile, each comprising a plurality of processing elements and an interconnect network between the plurality of processing elements to receive an input of a dataflow graph comprising a plurality of nodes, wherein the dataflow graph is to be overlaid into the interconnect network and the plurality of processing elements of the first tile and the second tile with each node represented as a dataflow operator in the interconnect network and the plurality of processing elements of the first tile or the second tile, and the plurality of processing elements of the first tile and the second tile are to perform an operation when an incoming operand set arrives at the plurality of processing elements of the first tile and the second tile;

a synchronizer circuit coupled between the interconnect network of the first tile and the interconnect network of the second tile and comprising storage to store data to be sent between the interconnect network of the first tile and the interconnect network of the second tile, the synchronizer circuit to convert the data from the storage between a first voltage or a first frequency of the first tile and a second voltage or a second frequency of the second tile to generate converted data, and send the converted data between the interconnect network of the first tile and the interconnect network of the second tile; and one of:

a second synchronizer circuit coupled between the interconnect network of the first tile and the interconnect network of the second tile and comprising storage to store second data to be sent from the interconnect network of the second tile into the interconnect network of the first tile, the second synchronizer circuit to convert the second data from the storage from the second voltage or the second frequency of the second tile to the first voltage or the first frequency of the first tile to generate second converted data, and send the second converted data into the interconnect network of the first tile, wherein the synchronizer circuit is coupled between the interconnect network of the first tile and the interconnect network of the second tile and comprises storage to store data to be sent from the interconnect network of the first tile into the interconnect network of the second tile, the synchronizer circuit to convert the data from the storage from the first voltage or the first frequency of the first tile to the second voltage or the second frequency of the second tile to generate the converted data, and send the converted data into the interconnect network of the second tile, or wherein the synchronizer circuit is to send a backpressure signal from a downstream processing element of the second tile to a processing element of the first tile to stall execution of the processing element of the first tile, wherein the backpressure signal indicates that storage in the downstream processing element is not available for an output of the processing element.

2. The apparatus of claim 1, wherein the synchronizer circuit further comprises a privilege register that when set with a privilege value is to allow the converted data to be sent between the interconnect network of the first tile and the interconnect network of the second tile.

3. The apparatus of claim 1, wherein the one is the apparatus comprising the second synchronizer circuit coupled between the interconnect network of the first tile and the interconnect network of the second tile and comprising storage to store the second data to be sent from the interconnect network of the second tile into the interconnect network of the first tile, the second synchronizer circuit to convert the second data from the storage from the second voltage or the second frequency of the second tile to the first voltage or the first frequency of the first tile to generate second converted data, and send the second converted data into the interconnect network of the first tile, wherein the synchronizer circuit is coupled between the interconnect network of the first tile and the interconnect network of the second tile and comprises storage to store data to be sent from the interconnect network of the first tile into the interconnect network of the second tile, the synchronizer circuit to convert the data from the storage from the first voltage or the first frequency of the first tile to the second voltage or the second frequency of the second tile to generate the converted data, and send the converted data into the interconnect network of the second tile.

4. The apparatus of claim 1, wherein the synchronizer circuit comprises a metastability buffer for each of multiple data lanes between the interconnect network of the first tile and the interconnect network of the second tile to store a data element to be sent on each of multiple data lanes.

5. The apparatus of claim 1, wherein the one is the synchronizer circuit is to send the backpressure signal from the downstream processing element of the second tile to the processing element of the first tile to stall execution of the processing element of the first tile, wherein the backpressure signal indicates that storage in the downstream processing element is not available for the output of the processing element.

6. The apparatus of claim 2, wherein the privilege value is set in the privilege register when the dataflow graph is overlaid into the interconnect network and the plurality of processing elements of the first tile and the second tile.

7. A method comprising:

providing a first tile and a second tile, each comprising a plurality of processing elements and an interconnect network between the plurality of processing elements, having a dataflow graph comprising a plurality of nodes overlaid into the first tile and the second tile, with each node represented as a dataflow operator in the interconnect network and the plurality of processing elements of the first tile or the second tile;

storing data to be sent between the interconnect network of the first tile and the interconnect network of the second tile in storage with a synchronizer circuit coupled between the interconnect network of the first tile and the interconnect network of the second tile;

converting the data from the storage between a first voltage or a first frequency of the first tile and a second voltage or a second frequency of the second tile to generate converted data with the synchronizer circuit;

sending the converted data with the synchronizer circuit between the interconnect network of the first tile and the interconnect network of the second tile; and one of:

providing a second synchronizer circuit coupled between the interconnect network of the first tile and the interconnect network of the second tile, storing second data to be sent from the interconnect network of the second tile into the interconnect network of the first tile in storage of the second synchronizer circuit, converting the second data from the storage from the second voltage or the second frequency of the second tile to the first voltage or the first frequency of the first tile to generate second converted data with the second synchronizer circuit, and sending the second converted data into the interconnect network of the first tile, wherein the synchronizer circuit is coupled between the interconnect network of the first tile and the interconnect network of the second tile and comprises storage to store data to be sent from the interconnect network of the first tile into the interconnect network of the second tile, the synchronizer circuit to convert the data from the storage from the first voltage or the first frequency of the first tile to the second voltage or the second frequency of the second tile to generate the converted data, and send the converted data into the interconnect network of the second tile, or sending, with the synchronizer circuit, a backpressure signal from a downstream processing element of the second tile to a processing element of the first tile to stall execution of the processing element of the first tile, the backpressure signal indicating that storage in the downstream processing element is not available for an output of the processing element.

8. The method of claim 7, further comprising performing an operation of the dataflow graph with a first dataflow operator of the first tile when an incoming operand set arrives at the first dataflow operator of the first tile, and an output for the respective, incoming operand set from the first tile to the second tile is the data in the storing and converting.

9. The method of claim 7, further comprising setting a privilege value in a privilege register of the synchronizer circuit to allow the converted data to be sent between the interconnect network of the first tile and the interconnect network of the second tile.

10. The method of claim 7, wherein the one is:

the providing the second synchronizer circuit coupled between the interconnect network of the first tile and the interconnect network of the second tile;

the storing the second data to be sent from the interconnect network of the second tile into the interconnect network of the first tile in storage of the second synchronizer circuit;

the converting the second data from the storage from the second voltage or the second frequency of the second tile to the first voltage or the first frequency of the first tile to generate the second converted data with the second synchronizer circuit; and the sending the second converted data into the interconnect network of the first tile, wherein the synchronizer circuit is coupled between the interconnect network of the first tile and the interconnect network of the second tile and comprises storage to store data to be sent from the interconnect network of the first tile into the interconnect network of the second tile, the synchronizer circuit to convert the data from the storage from the first voltage or the first frequency of the first tile to the second voltage or the second frequency of the second tile to generate the converted data, and send the converted data into the interconnect network of the second tile.

11. The method of claim 7, wherein the one is the sending, with the synchronizer circuit, the backpressure signal from the downstream processing element of the second tile to the processing element of the first tile to stall execution of the processing element of the first tile, the backpressure signal indicating that storage in the downstream processing element is not available for the output of the processing element.

12. The method of claim 9, wherein the setting of the privilege value in the privilege register occurs when the dataflow graph is overlaid into the interconnect network and the plurality of processing elements of the first tile and the second tile.

13. An apparatus comprising:

a first data path network between a plurality of processing elements in a first tile;

a second data path network between a plurality of processing elements in a second tile;

a first flow control path network between the plurality of processing elements of the first tile;

a second flow control path network between the plurality of processing elements of the second tile, the first data path network, the second data path network, the first flow control path network, and the second flow control path network are to receive an input of a dataflow graph comprising a plurality of nodes, the dataflow graph is to be overlaid into the first data path network, the second data path network, the first flow control path network, the second flow control path network, the plurality of processing elements of the first tile, and the plurality of processing elements of the second tile with each node represented as a dataflow operator in the plurality of processing elements of the first tile or the plurality of processing elements of the second tile to perform an operation by a respective, incoming operand set arriving at each of the dataflow operators of the plurality of processing elements of the first tile, and the plurality of processing elements of the second tile;

a synchronizer circuit coupled between the first data path network of the first tile and the second data path network of the second tile, and comprising storage to store data to be sent between the first data path network of the first tile and the second data path network of the second tile, the synchronizer circuit to convert the data from the storage between a first voltage or a first frequency of the first tile and a second voltage or a second frequency of the second tile to generate converted data, and send the converted data between the first data path network of the first tile and the second data path network of the second tile; and one of:

a second synchronizer circuit coupled between the first flow control path network of the first tile and the second flow control path network of the second tile, and comprising storage to store control data to be sent from the second flow control path network of the second tile into the first flow control path network of the first tile, the second synchronizer circuit to convert the control data from the storage from the second voltage or the second frequency of the second tile to the first voltage or the first frequency of the first tile to generate converted control data, and send the converted control data into the first flow control path network of the first tile, or wherein the synchronizer circuit is to send a backpressure control signal as control data from a downstream processing element of the second tile to a processing element of the first tile to stall execution of the processing element of the first tile, wherein the backpressure control signal indicates that storage in the downstream processing element is not available for an output of the processing element.

14. The apparatus of claim 13, wherein the synchronizer circuit further comprises a privilege register that when set with a privilege value is to allow the converted data to be sent between the first data path network of the first tile and the second data path network of the second tile.

15. The apparatus of claim 13, wherein the one is the apparatus comprising the second synchronizer circuit coupled between the first flow control path network of the first tile and the second flow control path network of the second tile, and comprising storage to store the control data to be sent from the second flow control path network of the second tile into the first flow control path network of the first tile, the second synchronizer circuit to convert the control data from the storage from the second voltage or the second frequency of the second tile to the first voltage or the first frequency of the first tile to generate converted control data, and send the converted control data into the first flow control path network of the first tile.

16. The apparatus of claim 13, wherein the one is the synchronizer circuit is to send the backpressure control signal as the control data from the downstream processing element of the second tile to the processing element of the first tile to stall execution of the processing element of the first tile, wherein the backpressure control signal indicates that storage in the downstream processing element is not available for the output of the processing element.

17. The apparatus of claim 13, wherein the synchronizer circuit comprises a metastability buffer for each of multiple data lanes between the first data path network of the first tile and the second data path network of the second tile to store a data element to be sent on each of multiple data lanes.

18. The apparatus of claim 14, wherein the privilege value is set in the privilege register when the dataflow graph is overlaid into the first data path network, the second data path network, the first flow control path network, the second flow control path network, the plurality of processing elements of the first tile, and the plurality of processing elements of the second tile.

19. A method comprising:

providing a first tile and a second tile having a dataflow graph comprising a plurality of nodes overlaid into a first data path network between a plurality of processing elements in the first tile, a second data path network between a plurality of processing elements in the second tile, a first flow control path network between the plurality of processing elements of the first tile, a second flow control path network between the plurality of processing elements of the second tile, the plurality of processing elements of the first tile, and the plurality of processing elements of the second tile with each node represented as a dataflow operator in the plurality of processing elements of the first tile or the plurality of processing elements of the second tile;

storing data to be sent between the first data path network of the first tile and the second data path network of the second tile in storage with a synchronizer circuit coupled between the first data path network of the first tile and the second data path network of the second tile;

converting the data from the storage between a first voltage or a first frequency of the first tile and a second voltage or a second frequency of the second tile to generate converted data with the synchronizer circuit;

sending the converted data with the synchronizer circuit between the first data path network of the first tile and the second data path network of the second tile; and one of:

providing a second synchronizer circuit coupled between the first flow control path network of the first tile and the second flow control path network of the second tile, storing control data to be sent from the second flow control path network of the second tile into the first flow control path network of the first tile in storage of the second synchronizer circuit, converting the control data from the storage from the second voltage or the second frequency of the second tile to the first voltage or the first frequency of the first tile to generate converted control data with the second synchronizer circuit, and sending the converted control data into the first flow control path network of the first tile, or sending, with the synchronizer circuit, a backpressure control signal as control data from a downstream processing element of the second tile to a processing element of the first tile to stall execution of the processing element of the first tile, wherein the backpressure control signal indicates that storage in the downstream processing element is not available for an output of the processing element.

20. The method of claim 19, further comprising performing an operation of the dataflow graph with a first dataflow operator of the first tile when an incoming operand set arrives at the first dataflow operator of the first tile, and an output for the respective, incoming operand set from the first tile to the second tile is the data in the storing and converting.

21. The method of claim 19, further comprising setting a privilege value in a privilege register of the synchronizer circuit to allow the converted data to be sent between the first data path network of the first tile and the second data path network of the second tile.

22. The method of claim 21, wherein the setting of the privilege value in the privilege register occurs when the dataflow graph is overlaid into the first data path network, the second data path network, the first flow control path network, the second flow control path network, the plurality of processing elements of the first tile, and the plurality of processing elements of the second tile.

23. The method of claim 19, wherein the one is:

the providing the second synchronizer circuit coupled between the first flow control path network of the first tile and the second flow control path network of the second tile;

the storing the control data to be sent from the second flow control path network of the second tile into the first flow control path network of the first tile in storage of the second synchronizer circuit;

the converting the control data from the storage from the second voltage or the second frequency of the second tile to the first voltage or the first frequency of the first tile to generate the converted control data with the second synchronizer circuit; and the sending the converted control data into the first flow control path network of the first tile.

24. The method of claim 19, wherein the one is the sending, with the synchronizer circuit, the backpressure control signal as the control data from the downstream processing element of the second tile to the processing element of the first tile to stall execution of the processing element of the first tile, wherein the backpressure control signal indicates that storage in the downstream processing element is not available for the output of the processing element.

* * * * *